(12) United States Patent
Waetzig et al.

(10) Patent No.: US 12,448,366 B2
(45) Date of Patent: Oct. 21, 2025

(54) SOLID FORMS OF PRALSETINIB

(71) Applicant: Rigel Pharmaceuticals, Inc., South San Francisco, CA (US)

(72) Inventors: Joshua Waetzig, Cambridge, MA (US); Gordon D. Wilkie, Cambridge, MA (US); Lauren MacEachern, Halifax (CA); Kimberly Jean Miller, Halifax (CA)

(73) Assignee: Rigel Pharmaceuticals, Inc., South San Francisco, CA (US)

( * ) Notice: Subject to any disclaimer, the term of this patent is extended or adjusted under 35 U.S.C. 154(b) by 405 days.

(21) Appl. No.: 18/000,168

(22) PCT Filed: May 28, 2021

(86) PCT No.: PCT/US2021/034823
§ 371 (c)(1),
(2) Date: Nov. 29, 2022

(87) PCT Pub. No.: WO2021/243192
PCT Pub. Date: Dec. 2, 2021

(65) Prior Publication Data
US 2023/0295121 A1   Sep. 21, 2023

Related U.S. Application Data

(60) Provisional application No. 63/047,353, filed on Jul. 2, 2020, provisional application No. 63/032,121, filed on May 29, 2020.

(51) Int. Cl.
*C07D 401/14* (2006.01)

(52) U.S. Cl.
CPC ........ *C07D 401/14* (2013.01); *C07B 2200/13* (2013.01)

(58) Field of Classification Search
CPC .................. C07D 401/14; C07B 2200/13
See application file for complete search history.

(56) References Cited

U.S. PATENT DOCUMENTS

| 8,088,806 | B2 | 1/2012 | Zhang et al. |
| 8,802,697 | B2 | 8/2014 | Bifulco, Jr. |
| 9,126,951 | B2 | 9/2015 | Bifulco, Jr. |
| 9,187,475 | B2 | 11/2015 | Kawamura et al. |
| 9,200,002 | B2 | 12/2015 | Hodous et al. |

(Continued)

FOREIGN PATENT DOCUMENTS

| CN | 104844567 A | 8/2015 |
| CN | 105255927 A | 1/2016 |

(Continued)

OTHER PUBLICATIONS

U.S. Appl. No. 18/606,346, RET Inhibitor for Use in Treating Cancer Having a RET Alteration, filed Mar. 15, 2024.

(Continued)

*Primary Examiner* — Brandon J Fetterolf
(74) *Attorney, Agent, or Firm* — Jones Day

(57) ABSTRACT

The compound cis)-N-((S)-1-(6-(4-fluoro-1H-pyrazol-1-yl) pyridin-3-yl)ethyl)-1-methoxy-4-(4 methyl-6-(5-methyl-1H-pyrazol-3-ylamino)pyrimidin-2-yl)cyclohexanecarboxamide can be prepared as a free base in various crystalline solid forms, and in various salt forms each having one or more solid forms.

19 Claims, 105 Drawing Sheets

(56) References Cited

U.S. PATENT DOCUMENTS

| | | | |
|---|---|---|---|
| 9,216,172 B2 | 12/2015 | Kohno et al. | |
| 9,297,011 B2 | 3/2016 | Downing et al. | |
| 9,334,263 B2 | 5/2016 | Hodous et al. | |
| 9,340,514 B2 | 5/2016 | Bifulco, Jr. | |
| 9,434,700 B2 | 9/2016 | Bifulco, Jr. | |
| 9,499,522 B2 | 11/2016 | DiPietro et al. | |
| 9,688,680 B2 | 6/2017 | Hodous | |
| 9,695,165 B2 | 7/2017 | Bifulco, Jr. | |
| 9,884,861 B2 | 2/2018 | Hodous et al. | |
| 9,944,651 B2 | 4/2018 | Hodous et al. | |
| 9,994,552 B2 | 6/2018 | DiPietro et al. | |
| 9,994,575 B2 | 6/2018 | Hodous et al. | |
| 10,000,490 B2 | 6/2018 | Bifulco, Jr. | |
| 10,000,496 B2 | 6/2018 | Hodous et al. | |
| 10,017,512 B2 | 7/2018 | Wenglowsky et al. | |
| 10,030,005 B2 * | 7/2018 | Brubaker et al. | |
| 10,035,789 B2 | 7/2018 | Brubaker et al. | |
| 10,183,928 B2 | 1/2019 | Kim et al. | |
| 10,196,436 B2 | 2/2019 | Miduturu | |
| 10,202,365 B2 | 2/2019 | Brooijmans et al. | |
| 10,221,154 B2 | 3/2019 | Bifulco, Jr. et al. | |
| 10,227,329 B2 | 3/2019 | Brubaker et al. | |
| 10,584,114 B2 | 3/2020 | Brubaker et al. | |
| 10,774,070 B2 | 9/2020 | Brooijmans et al. | |
| 11,273,160 B2 | 3/2022 | Evans Raab et al. | |
| 11,279,688 B2 | 3/2022 | Brubaker et al. | |
| 11,872,192 B2 | 1/2024 | Evans Raab et al. | |
| 11,963,958 B2 | 4/2024 | Evans Raab et al. | |
| 2012/0316137 A1 | 12/2012 | Huang et al. | |
| 2013/0096136 A1 | 4/2013 | Hata et al. | |
| 2013/0115313 A1 | 5/2013 | Charrier et al. | |
| 2013/0116280 A1 | 5/2013 | Ju et al. | |
| 2014/0187559 A1 | 7/2014 | Miduturu | |
| 2014/0221404 A1 | 8/2014 | Kohno et al. | |
| 2014/0243357 A1 | 8/2014 | Dar et al. | |
| 2014/0272951 A1 | 9/2014 | Chakravarti et al. | |
| 2015/0057335 A1 | 2/2015 | Kohno et al. | |
| 2015/0177246 A1 | 6/2015 | Shibata et al. | |
| 2016/0102097 A1 | 4/2016 | Hodous et al. | |
| 2017/0014413 A1 | 1/2017 | Downing et al. | |
| 2017/0022206 A1 | 1/2017 | Hodous et al. | |
| 2017/0029409 A1 | 2/2017 | DiPietro et al. | |
| 2017/0057953 A1 | 3/2017 | Hodous et al. | |
| 2017/0066773 A1 | 3/2017 | Wenglowsky et al. | |
| 2017/0066812 A1 | 3/2017 | Bifulco, Jr. | |
| 2017/0121312 A1 | 5/2017 | Brubaker et al. | |
| 2017/0145018 A1 | 5/2017 | Wenglowsky et al. | |
| 2017/0174652 A1 | 6/2017 | Bifulco, Jr. | |
| 2017/0204104 A1 | 7/2017 | Hodous et al. | |
| 2017/0253593 A1 | 9/2017 | Bifulco, Jr. et al. | |
| 2017/0267661 A1 | 9/2017 | Kim et al. | |
| 2017/0281633 A1 | 10/2017 | Boylan et al. | |
| 2017/0298069 A1 | 10/2017 | Brooijmans et al. | |
| 2018/0022731 A1 | 1/2018 | Brooijmans et al. | |
| 2018/0022732 A1 | 1/2018 | Brubaker et al. | |
| 2018/0030032 A1 | 2/2018 | Brubaker et al. | |
| 2019/0185454 A1 | 6/2019 | Brubaker et al. | |
| 2019/0192522 A1 | 6/2019 | Hagel et al. | |
| 2020/0407341 A1 | 12/2020 | Brubaker et al. | |
| 2021/0085680 A1 | 3/2021 | Evans Raab et al. | |
| 2021/0100795 A1 | 4/2021 | Evans Raab et al. | |
| 2021/0100799 A1 | 4/2021 | Evans Raab et al. | |
| 2021/0308134 A1 | 10/2021 | Hata et al. | |
| 2022/0175773 A1 | 6/2022 | Evans Raab et al. | |
| 2022/0315560 A1 | 10/2022 | Brubaker et al. | |
| 2023/0203009 A1 | 6/2023 | Waetzig et al. | |
| 2024/0059672 A1 | 2/2024 | Waetzig et al. | |

FOREIGN PATENT DOCUMENTS

| | | | |
|---|---|---|---|
| CN | 107980784 A | 5/2018 | |
| CN | 108341782 A | 7/2018 | |
| CN | 111362923 A | 7/2020 | |
| CN | 111440151 A | 7/2020 | |
| EP | 3037547 A1 | 6/2016 | |
| JP | 2015109806 A | 6/2015 | |
| WO | WO-2001/060816 A1 | 8/2001 | |
| WO | WO-2004/009087 A1 | 1/2004 | |
| WO | WO-2005/062795 A2 | 7/2005 | |
| WO | WO-2007/023382 A2 | 3/2007 | |
| WO | WO-2007/087245 A2 | 8/2007 | |
| WO | WO-2007/124221 A1 | 11/2007 | |
| WO | WO-2007/136103 A1 | 11/2007 | |
| WO | WO-2008/061201 A1 | 5/2008 | |
| WO | WO-2009/003136 A1 | 12/2008 | |
| WO | WO-2009/007748 A2 | 1/2009 | |
| WO | WO-2009/014637 A2 | 1/2009 | |
| WO | 2009018415 A1 | 2/2009 | |
| WO | WO-2009/100536 A1 | 8/2009 | |
| WO | WO-2010/006432 A1 | 1/2010 | |
| WO | WO-2010/111056 A1 | 9/2010 | |
| WO | WO-2010/144359 A1 | 12/2010 | |
| WO | WO-2010/144394 A1 | 12/2010 | |
| WO | WO-2011/060295 A1 | 5/2011 | |
| WO | WO-2013/077921 A2 | 5/2013 | |
| WO | WO-2013/133367 A1 | 9/2013 | |
| WO | WO-2013/170159 A1 | 11/2013 | |
| WO | WO-2014/039971 A1 | 3/2014 | |
| WO | WO-2014/050781 A1 | 4/2014 | |
| WO | WO-2014/072220 A1 | 5/2014 | |
| WO | WO-2014/130810 A1 | 8/2014 | |
| WO | WO-2014/141187 A1 | 9/2014 | |
| WO | WO-2014/147640 A2 | 9/2014 | |
| WO | WO-2015/006875 A1 | 1/2015 | |
| WO | WO-2015/079251 A1 | 6/2015 | |
| WO | WO-2016/037578 A1 | 3/2016 | |
| WO | WO-2016/038552 A1 | 3/2016 | |
| WO | WO-2016/075224 A1 | 5/2016 | |
| WO | WO-2016/127074 A1 | 8/2016 | |
| WO | WO-2017/011776 A1 | 1/2017 | |
| WO | WO-2017/079117 A1 | 5/2017 | |
| WO | WO-2017/079121 A2 | 5/2017 | |
| WO | WO-2017/079140 A1 | 5/2017 | |
| WO | WO-2017/100642 A1 | 6/2017 | |
| WO | WO-2017/145050 A1 | 8/2017 | |
| WO | WO-2017/161269 A1 | 9/2017 | |
| WO | WO-2017/178844 A1 | 10/2017 | |
| WO | WO-2017/178845 A1 | 10/2017 | |
| WO | WO-2018/017983 A1 | 1/2018 | |
| WO | WO-2018/022761 A1 | 2/2018 | |
| WO | WO-2018/049233 A1 | 3/2018 | |
| WO | WO-2018/060714 A1 | 4/2018 | |
| WO | WO-2018/064852 A1 | 4/2018 | |
| WO | WO-2018/071447 A1 | 4/2018 | |
| WO | WO-2018/071454 A1 | 4/2018 | |
| WO | WO-2018/102455 A1 | 6/2018 | |
| WO | WO-2018/136661 A1 | 7/2018 | |
| WO | WO-2018/136663 A1 | 7/2018 | |
| WO | WO-2018/183712 A1 | 10/2018 | |
| WO | WO-2018/189553 A1 | 10/2018 | |
| WO | WO-2018/213329 A1 | 11/2018 | |
| WO | WO-2018/237134 A1 | 12/2018 | |
| WO | WO-2019/001556 A1 | 1/2019 | |
| WO | WO-2019/008172 A1 | 1/2019 | |
| WO | WO-2019/126121 A1 | 6/2019 | |
| WO | WO-2019/143977 A1 | 7/2019 | |
| WO | WO-2019/143991 A1 | 7/2019 | |
| WO | WO-2019/143994 A1 | 7/2019 | |
| WO | WO-2019/195471 A1 | 10/2019 | |
| WO | WO-2020/033838 A2 | 2/2020 | |
| WO | WO-2021/243186 A1 | 12/2021 | |
| WO | WO-2021/243192 A1 | 12/2021 | |
| WO | WO-2022/120136 A1 | 6/2022 | |

OTHER PUBLICATIONS

U.S. Appl. No. 18/422,258, Inhibitors of RET, filed Jan. 25, 2024.
Gainor et al., "Pralsetinib for RET fusion-positive non-small-cell lung cancer (ARROW): a multi-cohort, open-label, phase 1/2 study," Lancet Oncology, 2021, 22(7), 959-969 (supplementary appendix) (218 pages).

(56) References Cited

OTHER PUBLICATIONS

Gainor et al., "Pralsetinib for RET fusion-positive non-small-cell lung cancer (ARROW): a multi-cohort, open-label, phase 1/2 study," Lancet Oncology, 2021, 22(7), 959-969.
Konno, "Effect of polymers on stabilization of drugs in solid dispersions," Pharmaceutics, 2011, 71(2), pp. 109-113.
Pharmaceutical Dosage Forms: Tablets.—3rd ed., vol. 2 /edited by Larry L. Augsburger, Stephen W. Hoag, 2008, Chapter 6 (38 pages).
Phase 1 Cancer Clinical Trials: A Practical Guide, Second Edition, Eds. E.A. Eisenhauer et al., Chapter 4, Basics of Phase I Design: First-in-Human Studies, Oxford University Press, 2015 (37 pages).
Tanno et al., "Evaluation of Hypromellose Acetate Succinate (HPMCAS) as a Carrier in Solid Dispersions," Drug Dev. Ind. Pharm., 2004, vol. 30, No. 1, pp. 9-17 (10 pages).
U.S. Appl. No. 17/061,743 US 2021-0085680, RET Inhibitor for Use in Treating Cancer Having a RET Alteration, filed Oct. 2, 2020.
U.S. Appl. No. 17/127,041 U.S. Pat. No. 11,273,160, RET Inhibitor for Use in Treating Cancer Having a RET Alteration, filed Dec. 18, 2020.
U.S. Appl. No. 17/377,885 US 2022-0175773, RET Inhibitor for Use in Treating Cancer Having a RET Alteration, filed Jul. 16, 2021.
U.S. Appl. No. 17/267,149 US 2021-0308134, Treatment of EGFR-Mutant Cancer, filed Feb. 9, 2021.
U.S. Appl. No. 18/255,402, Method of Preparing Pralsetinib, filed Jun. 1, 2023.
U.S. Appl. No. 18/000,166 US 2023-0203009, Pralsetinib Pharmaceutical Compositions, filed Nov. 29, 2022.
U.S. Appl. No. 15/340,428 U.S. Pat. No. 10,030,005, Inhibitors of RET, filed Nov. 1, 2016.
U.S. Appl. No. 16/041,719 U.S. Pat. No. 10,584,114, Inhibitors of RET, filed Jul. 20, 2018.
U.S. Appl. No. 16/775,646 U.S. Pat. No. 11,279,688, Inhibitors of RET, filed Jan. 29, 2020.
U.S. Appl. No. 17/669,785 US 2022-0315560, Inhibitors of RET, filed Feb. 11, 2022.
U.S. Appl. No. 15/548,925 U.S. Pat. No. 10,202,365, 2-(Pyridin-3-yl)-pyrimidine Derivatives as RET Inhibitors, filed Aug. 4, 2017.
U.S. Appl. No. 16/228,381 U.S. Pat. No. 10,774,070, 2-(Pyridin-3-yl)-pyrimidine Derivatives as RET Inhibitors, filed Dec. 20, 2018.
U.S. Appl. No. 15/462,255 U.S. Pat. No. 10,183,928, Inhibitors of RET, filed Mar. 17, 2017.
U.S. Appl. No. 15/657,057 U.S. Pat. No. 10,227,329, Compounds Useful for Treating Disorders Related to RET, filed Jul. 21, 2017.
U.S. Appl. No. 15/660,840 U.S. Pat. No. 10,035,789, Compounds Useful for Treating Disorders Related to RET, filed Jul. 26, 2017.
Abdel-Rahman, O. and M. Fouad (2014) "Risk of cardiovascular toxicities in patients with solid tumors treated with sunitinib, axitinib, cediranib or regorafenib: an updated systematic review and comparative meta-analysis" Crit Rev Oncol Hematol,92:194-207.
Ahn M. et al. "OA 09.03 TATTON Ph Ib Expansion Cohort: Osimertinib plus Savolitinib for Pts with EGFR-Mutant MET-Amplified NSCLC after Progression on Prior EGFR-TKI." J Thorac Oncol. 12(11) S1768, 2017.
Anonymous "BLU-667 Targets RET-Altered Cancers" Cancer Discovery, vol. 8, No. 6, OF8, Jun. 2018 (Jun. 2018), p. 5pp, XP002792436, Retrieved from the Internet: URL:http://cancerdiscovery.aacrjournals.org/content/8/6/OF8.long [retrieved on Jun. 25, 2019].
Anonymous "Estimating the Maximum Safe Starting Dose in Initial Clinical Trials for Therapeutics in Adult Healthy Volunteers", Guidance for Industry, Jul. 1, 2005 (Jul. 1, 2005), pp. 1-30, XP093000005, Retrieved from the Internet: URL:https://www.fda.gov/media/ 72309/download [retrieved on Nov. 21, 2022].
Anonymous, "Phase 1 Study of the Highly-selective RET Inhibitor BLU-667 in Patients With Thyroid Cancer, Non-Small Cell Lung Cancer, and Other Advanced Solid Tumors," ClinicalTrials.org Internet Citation, Feb. 7, 2020, p. 12pp, XP002783685.
Anonymous: "Phase 1 Study of the Highly-selective RET Inhibitor BLU-667 in Patients With Thyroid Cancer, Non-Small Cell Lung Cancer, and Other Advanced Solid Tumors," Internet Citation, Apr. 21, 2017, Retrieved from the Internet: URL:https://www.clinicaltrials.gov/ct2/history/NCT03037385?V _3=View#StudyPageTop.
Antonescu, C.R. et al. (Jul. 2015) "Molecular Characterization of Inflammatory Myofibroblastic Tumors with Frequent ALK and ROS1 Fusions and Rare Novel RET Gene Rearrangement" Am J Surg Pathol, 39(7):957-967. HHS Public Access Author Manuscript;available in PMC Jul. 1, 2015 (19 pages).
Arighi, E. et al. (2005) "RET tyrosine kinase signaling in development and cancer" Cytokine & Growth Factor Reviews, 16:441-467.
Baselga, J. et al. (2005) "Phase II and Tumor Pharmacodynamic Study of Gefitinib in Patients with Advanced Breast Cancer" J Clin Oncol, 23(23):5323-5333.
Bentzien, F. et al. (2013) "In Vitro and in Vivo Activity of Cabozantinib (XL184), an Inhibitor of RET, MET, and VEGFR2, in a Model of Medullary Thyroid Cancer" Thyroid, 23(12):1569-1577.
Brandt, W. et al. (2010) "Inhibitors of the RET tyrosine kinase based on a 2-(alkylsulfanyl)-4-(3-thienyl) nicotinonitrile scaffold" Eur J Med Chem, 45:2919-2927.
Brown et al. (1984) "Heterocyclic Amplifiers of Phleomycin. IV Pyrimidinylpurines, Phenylpyrimidines and Related Systems with Basic Side Chains," Aust. J. Chem., 37:2093-101.
Caira (1998) "Crystalline Polymorphism of Organic Compounds," Topics in Current Chemistry 198:163-208.
Caprelsa (vandetanib) "Full Prescribing Information" Reference ID: 3964956, Cambridge, MA: Sanofi Genzyme; 2016.
Carlomagno, F et al. (Feb. 1995) "Point Mutation of the Ret Proto-oncogene in the TT Human Medullary Thyroid Carcinoma Cell Line" Biochem Biophys Res Common, 207(3):1022-1028.
Cascone, T. et al., "Significant Systemic and CNS Activity of RET Inhibitor Vandetanib Combined with mTOR Inhibitor Everolimus in Patients with Advanced NSCLC with RET Fusion", J. of Clinical Oncology 34, No. 15, 2 pages.
Ceccherini, I. et al. (1997) "Somatic in frame deletions not involving juxtamembranous cysteine residues strongly activate the RET proto-oncogene" Oncogene, 14:2609-2612.
Chalice Software Technical Guide, Horizon CombinatoRx Inc., Cambridge, MA, USA (downloaded Jul. 2018).
Chen, M-H et al. (2014) "Antitumor activity of the combination of a HSP90 inhibitor and a PI3K/mTOR dual inhibitor against cholangiocarcinoma," Oncotarget, 5(8):2372-2389.
Chilean Search Report dated Jun. 27, 2022, in Chilean Patent Application No. 202002544, Chilean National Stage of International Patent Application No. PCT/US2019/025655, filed Apr. 3, 2019, by Blueprint Medicines Corp.
Chilean Search Report dated Mar. 16, 2023, in Chilean Patent Application No. 202002544, Chilean National Stage of International Patent Application No. PCT/US2019/025655, filed Apr. 3, 2019, by Blueprint Medicines Corp.
Cometriq (cabozantinib)"Full Prescribing Information" Reference ID: 3964956, South San Francisco, CA: Exelixix, Inc.; 2018.
Drilon et al. (2018) "Targeting RET-driven cancers: lessons from evolving preclinical and clinical landscapes," *Nature Reviews Clinical Oncology* 15:151-167.
Druker, B.J. et al. (2001) "Efficacy and Safety of a Specific Inhibitor of the BCR-ABL Tyrosine Kinase in Chronic Myeloid Leukemia" New Engl J Med, 344(14):1031-1037.
Eisenhauer, E.A. et al. (2009) "New response evaluation criteria in solid tumours: Revised RECIST guideline (version 1.1)" Eur J Cancer, 45:228-247.
Elisei, R. et al. (2008) "Prognostic Significance of Somatic RET Oncogene Mutations in Sporadic Medullary Thyroid Cancer: A 10-Year Follow-Up Study" J Clin Endocrinol Metab, 93(3):682-687.
Engelman J.A. et al. "MET Amplification Leads to Gefitinib Resistance in Lung Cancer by Activating ERBB3 Signaling." Science, 2007, 316 (5827), pp. 1039-1043.
Evans, E. (May 1, 2016) "The Development of Potent and Selective RET Inhibitors" Slides presented at the 2016 Annual Meeting of the International Thyroid Oncology Group at the University of Colorado (19 pages).
Fagin, J.A. et al. "Biologic and Clinical Perspectives on Thyroid Cancer." N Engl J Med. 2016, 375 (11) pp. 1054-1067.

(56) References Cited

OTHER PUBLICATIONS

Fang, P. et al. (Feb. 2016) "Detection of a novel RET gene fusion in a non-small cell lung cancer patient using AMP chemistry" J Thorac Oncol, 11.2:S21-S22.

Ferrara et al. "Clinical and Translational Implications of RET Rearrangements in Non-Small Cell Lung Cancer," Journal of Thoracic Oncology, 2018, 13, pp. 27-45.

Gainor J.F. et al. "Dramatic Response to Combination Erlotinib and Crizotinib in a Patient with Advanced, EGFR-Mutant Lung Cancer Harboring De Novo MET Amplification." J Thorac Oncol. 11(7) 2016, pp. e83-e85.

Gautschi, O. et al. (2016) "Targeting RET in patients with RET-rearranged lung cancers: Results from a global registry" J Clin Oncol, 34(15S) (suppl; abstr 9014).

Gild, M.L. et al. (Oct. 2013) "Targeting mTOR in RET mutant medullary and differentiated thyroid cancer cells" Endocr Re/at Cancer, 20(5):659-667. HHS Public Access Author Manuscript; available in PMC Mar. 27, 2015 (16 pages).

Graham et al., 17 Bioorganic & Medicinal Chemistry, 5886-5893 (2007).

Grubbs, E.G. et al. (Mar. 2015) "RET Fusion as a Novel Driver of Medullary Thyroid Carcinoma" J Clin Endocrinol Metab, 100:788-793.

Halkova, T. et al. (2015) "A novel RET/PTC variant detected in a pediatric patient with papillary thyroid cancer without ionization history" Hum Pathol, 46:1962-1969.

Hayashi, H. et al. (2000) "Characterization of intracellular signals via tyrosine 1062 in RET activated by glial cell line-derived neurotrophic factor" Oncogene, 19:4469-4475.

Hilfiker et al. (2006) "Relevance of Solid-state Properties for Pharmaceutical Products," Polymorphism in the Pharmaceutical Industry, XP002528052, 19 pages.

Horiike, A. et al. (2016) "Sorafenib treatment for patients with RET fusion-positive non-small cell lung cancer" Lung Cancer, 93:43-46.

Hughes (2021) "Review of Synthetic Routes and Crystalline Forms of the Oncology Drugs Capmatinib, Selpercatinib, and Pralsetinib," Org. Process Res. Dev. 25:2192-2204.

International Search Report and Written Opinion dated Apr. 29, 2016, in International Patent Application No. PCT/US2016/016808, filed Feb. 5, 2016, by Blueprint Medicines Corp. (8 pages).

International Search Report and Written Opinion dated Aug. 16, 2021, in International Patent Application No. PCT/US2021/034823, filed May 28, 2021, by Blueprint Medicines Corp. (14 pages).

International Search Report and Written Opinion dated Feb. 24, 2022, in International Patent Application No. PCT/US2021/061754, filed Dec. 3, 2021, by Blueprint Medicines Corp. (16 pages).

International Search Report and Written Opinion dated Jan. 18, 2017, in International Patent Application No. PCT/US2016/059879, filed Nov. 1, 2016, by Blueprint Medicines Corp. (12 pages).

International Search Report and Written Opinion dated Jun. 12, 2017, in International Patent Application No. PCT/US2017/022969, filed Mar. 17, 2017, by Blueprint Medicines Corp. (12 pages).

International Search Report and Written Opinion dated May 11, 2021, in International Patent Application No. PCT/US2021/034811, filed May 28, 2021, by Blueprint Medicines Corp. (16 pages).

International Search Report and Written Opinion dated Oct. 12, 2017, in International Patent Application No. PCT/US2017/043964, filed Jul. 26, 2017, by Blueprint Medicines Corp. (13 pages).

International Search Report and Written Opinion dated Oct. 25, 2017, in International Patent Application No. PCT/US2017/043340, filed Jul. 21, 2017, by Blueprint Medicines Corp. (14 pages).

International Search Report and Written Opinion mailed Aug. 21, 2018, in International Patent Application No. PCT/US2018/032794, filed May 15, 2018, by Blueprint Medicines Corp. (18 pages).

International Search Report and Written Opinion of the International Searching Authority for International Application No. PCT/US2019/025655 mailed Jul. 23, 2019 (16 pages).

International Search Report and Written Opinion of the International Searching Authority for International Application No. PCT/US2019/045919 mailed Jan. 22, 2020 (11 pages).

Jin, N. et al. (Oct. 15, 2011), "Synergistic Action of a RAF Inhibitor and a Dual PI3K/mTOR Inhibitor in Thyroid Cancer," Clin Cancer Res, 17(20):6482-6489.

Joung, J.Y. et al. (2016) "Diffuse sclerosing variant of papillary thyroid carcinoma: major genetic alterations and prognostic implications" Histopathology, 69:45-53.

Jovanovic, R. et al. (2015) "Novel RET Mutations in Macedonian Patients with Medullary Thyroid Carcinoma: Genotype-Phenotype Correlations" Prilozi, 36(1):93-107.

Kamil et al. "Dose estimation, conversion and translation from animal to human and human to animal for clinical and animal studies", Int. J. Biol. Biotech., Jul. 1, 2017 (Jul. 1, 2017), pp. 311-317, XP093000013, Retrieved from the Internet: URL:https://www.researchgate.net/publication/322329638_Dose_estimation_conversion_and_translation_from_animal_to_human_and_human_to_animal_for_clinical_and_animal_studies [retrieved on Nov. 21, 2022].

Kang et al., "Osimertinib and Cabozantinib Combinatorial Therapy in an EGFR-Mutant Lung Adenocarcinoma Patient with Multiple MET Secondary-Site Mutations after Resistance to Crizotinib," Journal of Thoracic Oncology, Apr. 2018, vol. 13, No. 4, pp. e49-e53.

Karrasch, T. et al. (2016) "How to Assess the Clinical Relevance of Novel RET Missense Variants in the Absence of Functional Studies?" Eur Thyroid J, 5:73-77.

Kato, S. et al. (Apr. 15, 2017) "RET Aberrations in Diverse Cancers: Next-Generation Sequencing of 4,871 Patients" Clin Cancer Res, 23(8):1988-1997.

Kim, S.H. et al. (2015) "A New Germline ALA641THR Variant in the Transmembrane Domain of the RET Gene Associated with Medullary Thyroid Cancer" Acta Endocrinologica (Buc), 11.2:189-194.

Klempner et al. "Emergence of RET rearrangement co-existing with activated EGFR mutation in EGFR-mutated NSCLC patients who had progressed on first- or second-generation EGFR TKI" Lung Cancer, Sep. 2015, vol. 89, No. 3, pp. 357-359; abstract, p. 358, col. 1, para 2, p. 359, col. 1, para 2.

Kohno et al. (2013) "RET fusion gene: Translation to personalized lung cancer therapy," Cancer Sci 104(11):1396-1400.

Krampitz, G.W. and J.A. Norton (2014) "RET Gene Mutations (Genotype and Phenotype) of Multiple Endocrine Neoplasia Type 2 and Familial Medullary Thyroid Carcinoma" Cancer, 120:1920-1931.

Kuster, B. (Ed.) (2012) *Kinase Inhibitors. Methods and Protocols.* Humana Press; Chapters 1 and 2, pp. 1-44.

Latteyer, S. et al. (Mar. 2016) "A 6-Base Pair in Frame Germline Deletion in Exon 7 of RET Leads to Increased RET Phosphorylation, ERK Activation, and MEN2A" J Clin Endocrinol Metab, 101(3):1016-1022.

Le Rolle, A. et al. (2015) "Identification and characterization of RET fusions in advanced colorectal cancer" Oncotarget, 6(30):28929-28937.

Lee, M.S. et al. (2016) "Efficacy of the combination of MEK and CDK4/6 inhibitors in vitro and in vivo in KRAS mutant colorectal cancer models" Oncotarget, 7(26):39595-39608.

Lehar, J. et al. (2009) "Synergistic drug combinations improve therapeutic selectivity" Nat Biotechnol, 27(7):659-666. HHS Public Access Author Manuscript; available in PMC Jan. 1, 2010 (23 pages).

Lin, J.J. et al. (2016) "Clinical Activity of Alectinib in Advanced RET-Rearranged Non-Small Cell Lung Cancer" J Thorac Oncol, 11(11):2027-2032.

Lipson, D. et al. (2012) "Identification of new ALK and RET gene fusions from colorectal and lung cancer biopsies" Nat Med, 18(3):382-384. HHS Public Access Author Manuscript; available in PMC Feb. 6, 2014 (7 pages).

Machens, A. et al. (2003) "Early Malignant Progression of Hereditary Medullary Thyroid Cancer" New Engl J Med, 349:1517-1525.

McMahon (2000) "VEGF Receptor Signaling in Tumor Angiogenesis," The Oncologist 5(suppl 1):3-10.

Mologni, L. et al. (2010) "Synthesis, structure-activity relationship and crystallographic studies of 3-substituted indolin-2-one RET inhibitors" Bioorg Med Chem, 18:1482-1496.

(56) References Cited

OTHER PUBLICATIONS

Mologni, L. et al. (2013) "Ponatinib is a potent inhibitor of wild-type and drug-resistant gatekeeper mutant RET kinase" Mol Cell Endocrinol, 377:1-6.
Mologni, L. et al. (2017) "RET kinase inhibitors: a review of recent patents (2012-2015)" Exp Opin Ther Patents, 27(1):91-99.
Moura, M.M. et al. (2009) "Correlation of RET somatic mutations with clinicopathological features in sporadic medullary thyroid carcinomas" Br J Cancer, 100:1777-1783.
Mulligan, L.M. (Mar. 2014) "RET revisited: expanding the oncogenic portfolio" Nat Rev Cancer, 14:173-186.
Mulligan, L.M. et al. (1995) "Genotype-phenotype correlation in multiple endocrine neoplasia type 2: report of the International RET Mutation Consortium" J Int Med, 238:343-346.
Mulligan, L.M. et al. (Jun. 3, 1993) "Germ-line mutations of the RET proto-oncogene in multiple endocrine neoplasia type 2A" Nature, 363:458-460.
NCT03037385, entitled "Phase 1 Study of BLU-667 in Patients With Thyroid Cancer, Non-Small Cell Lung Cancer, and OtherAdvanced Solid Tumors," ClinicalTrials.gov, Jan. 17, 2018 (8 pages).
NCT03037385, entitled "Phase 1 Study of BLU-667 in Patients With Thyroid Cancer, Non-Small Cell Lung Cancer, and OtherAdvanced Solid Tumors," ClinicalTrials.gov, Jan. 27, 2017 (7 pages).
NCT03037385, entitled Phase 1/2 Study of the Highly-selective RET Inhibitor, Pralsetinib (BLU-667), in Patients With Thyroid Cancer, Non-Small Cell Lung Cancer, and Other Advanced Solid Tumors (ARROW) (13 pages).
NCT04222972, entitled AcceleRET Lung Study of Pralsetinib for 1L Ret Fusion-positive, Metastatic NSCLC (11 pages).
Neal et la., "Erlotinib, cabozantinib, or erlotinib plus cabozantinib as second-line or third-line treatment of patients with EGFR wild-type advanced non-small-cell lung cancer (ECOG-ACRIN 1512): a randomised, controlled, open-label multicentre, phase 2 trial," Lancet Oncol, 2016, vol. 17, pp. 1661-1671.
Oxnard, G.R. et al. "Assessment of Resistance Mechanisms and Clinical Implications in Patients With EGFR T790M-Positive Lung Cancer and Acquired Resistance to Osimertinib." JAMA Oncol. 2018, 4(11), pp. 1527-1534.
Pinedo (2000) Translational Research: The Role of VEGF in Tumor Angiogenesis, The Oncologist 5(suppl 1):1-2.
Piotrowska et al.(2018) "MA26.03 Activity of Osimertinib and the Selective RET Inhibitor BLU-667 in an EGFR-Mutant Patient with Acquired RET Rearrangement," Journal of Thoracic Oncology— IASLC 19th World Conference on Lung Cancer, Sep. 23, 2018, pp. S451-S451.
Piotrowska et al. (2018) "Landscape of Acquired Resistance to Osimertinib in EGFR-Mutant NSCLC and Clinical Validation of Combined EGFR and RET Inhibition with Osimertinib and BLU-677 for Acquired RET Fusion," Cancer Discovery 8(12):1529-1539.
Pirker, R. and M. Filipits (2015) "Alectinib in RET-rearranged non-small cell lung cancer—Another progress in precision medicine?" Transl Lung Cancer Res, 4(6):797-800.
Plaza-Menacho, I. et al. (2014) "Mechanisms of RET signaling in cancer: Current and future implications for targeted therapy" Cellular Signalling, 26:1743-1752.
Pound et al. "Is it possible to overcome issues of external validity in preclinical animal research? Why most animal models are bound to fail", J. Transl Med, Jan. 1, 2018 (Jan. 1, 2018), pp. 1-8, XP093000231, DOI: 10.1186/s12967-018-1678-1 Retrieved from the Internet: URL:https://www.researchgate.net/publication/328793141_1s_it_possible_to_overcome_issues_of_external_validity_in_preclinical_animal_research_Why_most_animal_models_are_bound_to_fail [retrieved on Nov. 21, 2022].
Qi, X. et al. (2015) "RET mutation p.S891A in a Chinese family with familial medullary thyroid carcinoma and associated cutaneous amyloidosis binding OSMR variant p.G513D" Oncotarget, 6(32):33993-34003.

Rahal, R. (Apr. 18, 2016) "The development of potent, selective RET inhibitors" Slides of a Presentation at the American Association for Cancer Research (AACR) Annual Meeting, Apr. 16-20, 2016, New Orleans (15 pages).
Rahal, R. et al. "BLU-667 is a Potent and Highly Selective RET Inhibitor Being Developed for RET-Driven Cancers," Poster B151, Blueprint Medicines Corporation (1 page).
Rahal, R. et al. (2016) "The development of potent, selective RET inhibitors that target both wild-type RET and prospectively identified resistance mutations to multi-kinase inhibitors" Abstract submitted to the American Association for CancerResearch (AACR) Annual Meeting, Apr. 16-20, 2016, New Orleans; submission date Dec. 1, 2015 (2 pages).
Ramalingam et al. "Osimertinib As First-Line Treatment of EGFR Mutation-Positive Advanced Non-Small-Cell Lung Cancer" Journal Of Clinical Oncology, Mar. 20, 2018, vol. 36, No. 9, p. 841-849; abstract.
Reagan-Shaw et al. (2007) "Dose translation from animal to human studies revisited" The FASEB Journal, 22:659-661.
Reckamp et al. (2014) "Phase II trial of XL184 (cabozantinib) plus erlotinib in patients (pts) with advanced EGFR-mutant non-small cell lung cancer (NSCLC) with progressive disease (PD) on epidermal growth factor receptor (EGFR) tyrosine kinase inhibitor (TKI) therapy: A California Cancer Consortium phase II trial (NCI 9303)," *Journal of Clinical Oncology* 32(15)8014 4 pages.
Reckamp, K. L. et al. "Abstract 936: Analysis of cell-free DNA from 32,991 advanced cancers reveals novel co-occurring activating RET alterations and oncogenic signaling pathway aberrations." Cancer Research. Pubished Jul. 2018. Proceedings: AACR Annual Meeting 2018; Apr. 14-18, 2018; Chicago, IL. Retrieved from the internet URL: "<https://cancerres.aacrjournals.org/content/78/13_Supplement/936>" (3 pages).
Robinett, R.G. et al. (2007) "The discovery of substituted 4-(3-hyroxyanilino)-quinolines as potent RET kinase inhibitors" Bioorg Med Chem Lett, 17:5886-5893.
Robinson B. G. et al. "Vandetanib (100 mg) in Patients with Locally Advanced or Metastatic Hereditary Medullary Thyroid Cancer," Journal of Clinical En doc ri no logy and Metabolism, vol. 95, No. 6, Jun. 1, 2010 (Jun. 1, 2010), pp. 2664-2671, XP055599340.
Romei, C. et al. (Apr. 2016) "A comprehensive overview of the role of the RET proto-oncogene in thyroid carcinoma" Nat Rev Endocrinol, 12:192-202.
Russian Search Report dated Jan. 13, 2023, in Russian Patent Application No. 2020135917, Russian National Stage of International Patent Application No. PCT/US2019/025655, filed Apr. 3, 2019, by Blueprint Medicines Corp.
Saito, M. et al. (Jun. 2016) "Gene aberrations for precision medicine against lung adenocarcinoma" Cancer Sci, 107(6):713-720.
Sarker, D. and P. Workman (2007) "Pharmacodynamic Biomarkers for Molecular Cancer Therapeutics" Adv Cancer Res, 96:213-268.
Schrock, A.B. et al. "Receptor Tyrosine Kinase Fusions and BRAF Kinase Fusions are Rare but Actionable Resistance Mechanisms to EGFR Tyrosine Kinase Inhibitors." Translational Oncology, 2018, 13 (9) pp. 1312-1323.
Scollo, C. et al. (2016) "A novel RET gene mutation in a patient with apparently sporadic pheochromocytoma" Endocr J, 63(1):87-91.
Sentürk et al. (2020) "Quantitative bioanalytical assay for the selective RET inhibitors selpercatinib and pralsetinib in mouse plasma and tissue homogenates using liquid chromatography-tandem mass spectrometry," Journal of Chromatography B 1147:122131 8 pages.
Silva, A.L. et al. (2015) "Identification and characterization of two novel germline RET variants associated with medullary thyroid carcinoma" Endocrine, 49:366-372.
Singapore Written Opinion dated Dec. 13, 2021, in Singapore Patent Application No. 11202009681Y, Singapore National Stage of International Patent Application No. PCT/US2019/025655, filed Apr. 3, 2019, by Blueprint Medicines Corp.
Smith et al., "Role of ERBB signaling in RET-rearranged lung cancer and contribution of EGFR amplification to cabozantinib resistance," Journal of Clinical Oncology, 2017, vol. 35, No. 15_suppl, Abstract No. 11583.

(56) References Cited

OTHER PUBLICATIONS

Stransky, N. et al. (2014) "The landscape of kinase fusions in cancer" Nat Commun, 5:4846 (10 pages).

Subbiah et al. "Clinical activity and safety of the RET inhibitor pralsetinib in patients with RET fusion-positive solid tumours: update from the ARROW trial", ASCO, Jun. 4, 2021 (Jun. 4, 2021), pp. 1-1, XP093000210, Retrieved from the Internet: URL:https://ascopubs.org/doi/abs/10.1200/JCO.2021.39.15_suppl.3079 [retrieved on Nov. 21, 2022].

Subbiah et al. Abstract CT043 "Highly potent and selective RET inhibitor, BLU-667, achieves proof of concept in a phase I study of advanced, RET-altered solid tumors," Cancer Research vol. 78, No. 13, Supplement Jul. 1, 2018 (Jul. 2018), XP002792435, Proceedings: AACR Annual Meeting 2018; Apr. 14-18, 2018; Chicago, IL. Retrieved from the Internet: URL:http://cancerres.aacrjournals.org/content/78/13_Supplement/CT043 [retrieved on Jun. 26, 2019].

Subbiah V. et al. "Precision Targeted Therapy with BLU-667 for RET-Driven Cancers," Cancer Discovery, vol. 8, No. 7, Apr. 15, 2018 (pp. 836-849).

Subbiah, V. et al. (Jul. 2015) "Systemic and CNS activity of the RET inhibitor vandetanib combined with the mTOR inhibitor everolimus in KIF5B-RET re-arranged Non-Small Cell Lung Cancer with brain metastases" Lung Cancer, 89(1):76-79. HHS Public Access Author Manuscript; available in PMC Aug. 25, 2016 (10 pages).

Suehara, Y. et al. (Dec. 15, 2012) "Identification of KIF5B-RET and GOPC-ROS1 fusions in lung adenocarcinomas through a comprehensive mRNA-based screen for tyrosine kinase fusions" Clin Cancer Res, 18(24): 6599-6608. HHS Public Access AuthorManuscript; available in PMC Nov. 17, 2014 (18 pages).

Suzuki, M. et al. (Jul. 2013) "Identification of a lung adenocarcinoma cell line with CCDC6-RET fusion gene and the effect of RET inhibitors in vitro and in vivo" Cancer Sci, 104(7):896-903.

Takeuchi, K. et al. (Mar. 2012) "RET, ROS1 and ALK fusions in lung cancer" Nat Med, 18(3):378-381.

Tan, D.S. et al. (2009) "Biomarker-Driven Early Clinical Trials in Oncology" Cancer J, 15(5):406-420.

Thackaberry et al. (2012) "Non-clinical toxicological considerations for pharmaceutical salt selection," Expert Opin. Drug Metab. Toxicol. 8(11):1419-1433.

Touat, M. et al. (2015) "Targeting FGFR Signaling in Cancer" Clin Cancer Res, 21(12):2684-2694.

U.S. Nat'l Library of Med., A Phase 1 Trial of Vandetanib (a Multi-kinase Inhibitor of EGFR, VEGFR and RET Inhibitor) in Combination With Everolimus (an mTOR Inhibitor) in Advanced Cancer, ClinicalTrials.gov,https://clinicaltrials.gov/ct2/show/NCT01582191 (last updated Jul. 3, 2018) (7 pages).

U.S. Nat'l Library of Med., Phase 1 Study of the Highly-selective RET Inhibitor BLU-667 in Patients With Thyroid Cancer, Non-Small Cell Lung Cancer, and Other Advanced Solid Tumors, ClinicalTrials.gov, https://clinicaltrials.gov/ct2/show/NCT03037385(last updated Jun. 27, 2018) (8 pages).

Wakelee et al. (2017) "A phase Ib/II study of cabozantinib (XL184) with or without erlotinib in patients with non-small cell lung cancer," Cancer Chemother Pharmacol 79:923-932.

Wang et al., "Abstract 4110: Combinatory approaches targeting EGFR, HER2 and c-MET in recurrent SCCHN," Cancer Res, 2017, vol. 77, No. 13_Supplement, Abstract No. 4110.

Wang, L. et al. (2012) "Identification of a Novel, Recurrent HEY1-NCOA2 Fusion in Mesenchymal Chondrosarcoma based on a Genome-wide Screen of Exon-level Expression Data" Genes Chromosomes Cancer, 51(2):127-139. HHS Public Access Author Manuscript; available in PMC Feb. 1, 2013 (24 pages).

Wang, R. et al. (Dec. 10, 2012) "RET Fusions Define a Unique Molecular and Clinicopathologic Subtype of Non-Small-Cell Lung Cancer" J Clin Oncol, 30(35):4352-4359.

Wells, S.A. et al. (2015) "Revised American Thyroid Association Guidelines for the Management of Medullary Thyroid Carcinoma" Thyroid, 25(6):567-610.

Zhang et al., "Activation of the AXL kinases causes resistance to EGFR-targeted therapy in lung cancer," Nature Genetics, 2012, vol. 44, No. 8, pp. 852-860.

* cited by examiner

| Pattern | Method of Generation | DSC Onsets (°C) | TGA Mass Loss (wt. %) | NMR Residual Solvent (wt. %) | Comment |
|---|---|---|---|---|---|
| A | evaporation from MeOH | 204 | 0.73 | MeOH BDL | anhydrous |
| B | Heat P-C to 150 °C | 149, 162 (exo), 205 | 1.15 | BDL | anhydrous (obtained from dehydration or desolvation) |
| | Drying of Pattern D (from cooling in MeOH:chloroform) | 113, 145 | 1.56, 0.89 | BDL (MeOH and Chloroform) | |
| C | acetone/water | 122, 127, and 206 | 3.09 | Trace acetone | hydrate |
| D | wet solid from MeOH/chloroform slurry | - | - | - | unstable on drying, MeOH or chloroform solvate. Converts to F or G on drying. |
| E | slurry Pattern B in MtBE | - | - | - | unknown |
| F | drying of Pattern D | 105, 150, 207 | 2.26, 2.84 | 2.98 (chloroform) 0.07 (MeOH) | desolvate #1 of Pattern D |
| G | air dry Pattern D | minor: 57, 81, 107, 123; major: 150; minor: 206 | 8.79 | 3.42 (chloroform) 0.14 (MeOH) | desolvate #2 of Pattern D |
| H (HCl salt) | amorphous slurries, slurry in chloroform | 235 | 3.38 | BDL | Most likely is HCl salt leftover from freebasing or from minor HCl in chloroform |
| I | antisolvent THF/heptane slow cool THF (mixture with O) | 78, 114, 125 (exo), 196 | 1.46 (initial), 2.8 (w/78 endo)s, 1.72 | 2.45 (THF) | Possible THF solvate |
| J | antisolvent THF/cyclohexane | - | - | - | loses crystallinity then becomes amorphous on drying. Likely THF or heptane solvate |
| K | DMSO/water antisolvent (K converts to M on drying) | 108, minor: 145, 168, major: 191 | 1.52, 6.61 | - | K eventually converted to M on drying |
| L | MeOH/water antisolvent | 73, 140, 158 (exo), 203 | 4.0, 0.15 | peak overlap w/ MeOH | Possible monohydrate |
| M | DMSO/water antisolvent, drying of Pattern K | 81, 141, 162 (exo), 203 | 0.9, 2.7, 0.45 | 0.44 (DMSO) | Pattern B plus small extra peaks |
| N | fast cool in THF | - | - | - | Few solids |
| O | Slow cool THF (mixture with Pattern I) | - | - | - | possible THF solvate |
| P | fast cooling MeOH to 0 °C then stagnant cooling to -20 °C | - | - | - | converts to mixture of P+L+extra peaks upon drying |
| Q | cooling 1,4-dioxane | 104, 146 (exo), 199 | 3.3, 2.9, 2.6 | little solid | possible 1,4-dioxane solvate |
| amorphous | evaporation from chloroform solution | minor: 117, 161 | 7.97, 1.98 (step), 7.7 | 8.07 (chloroform) | upon scale-up, evaporation from CHCl3 gave hard gel which was broken to powder. |

Figure. 2

| Counter Ion | XRPD Pattern → Solvent ↓ | Wet | Dry | Humid | Comments |
|---|---|---|---|---|---|
| BSA | EtOH | - | - | - | Clear solution |
| BSA | EtOAc | | | | Clear, some gum on walls |
| BSA | IPA:water (9:1 vol) | 18-A | 18-A | 18-B, gummed | Opalescent, gel-like; centrifuged to obtain solids |
| MSA | EtOH | 2-A + 2-B | 2-B | | White slurry |
| MSA | EtOAc | 2-B | 2-B | 2-D | White slurry |
| MSA | IPA:water (9:1 vol) | 2-C (small sample) | 2-B + extra peaks | | Thin slurry; centrifuged to obtain |
| HCl | EtOH | 5-B | 5-C | | White slurry |
| HCl | EtOAc | 5-B +5-C | 5-C + broad extra peaks | 5-C + trace 5-B | White slurry, somewhat gel-like |
| HCl | IPA:water (9:1 vol) | 5-B | 5-C | 5-C + trace 5-B | White slurry |
| HBr | EtOH | 19-A | 19-A (slight peak shifts) | 19-A (slight peak shifts) | White slurry |
| HBr | EtOAc | 19-B (low cryst.) | 19-A (low cryst.) | | Off-white gel-like slurry |
| HBr | IPA:water (9:1 vol) | 19-C (some shared peaks w/ A) | 19-C + 19-D | 19-C + 19-D | White slurry |
| HNO$_3$ | EtOH | 20-A | 20-A | 20-A | White slurry |
| HNO$_3$ | EtOAc | 20-A | 20-A | | White slurry |
| HNO$_3$ | IPA:water (9:1 vol) | 20-A | 20-A | | White slurry |
| none | EtOH | FB-A | FB-A | | White slurry |
| none | EtOAc | FB-A | | | White slurry |
| none | IPA:water (9:1 vol) | - | - | - | Insufficient solids to filter |

Figure. 24

| Counter Ion | Solvent | XRPD (Dry, used for analysis) | Crystallinity | DSC Onsets (°C) | TGA Mass Loss (wt. %)[1] | Water Solubility (mg/mL) | Stability |
|---|---|---|---|---|---|---|---|
| BSA | IPA: water | 18-A | low | - | - | - | - |
| MSA | EtOH | 2-B | moderate-high | - | - | | physically stable, 99.73% a/a (HPLC) |
| MSA | EtOAc | 2-B | | 167.50 | 2.96 | >5.47 | - |
| MSA | IPA: water | 2-B + extra peaks | | - | - | | - |
| HCl | EtOH, IPA: water | 5-C | moderate-high | 86.78, 224.11, 241.70 | 3.41, 2.00 | 2.18 | physically stable, 99.71% a/a (HPLC) |
| HCl | EtOAc | 5-C + broad extra peaks | | - | - | - | - |
| HBr | EtOH | 19-A (slight peak shifts) | moderate | 83.08, 207.28, 241.33 | 2.02, 7.65 | 1.88 | converted to 4-C/D, 99.44% a/a (HPLC) |
| HBr | EtOAc | 19-A (low cryst.) | low | - | - | - | - |
| HBr | IPA: water (9:1 vol) | 19-C + 19-D | moderate-high | 88.84, 194.63, 210.02, 230.60 | 3.11, 8.55 | 1.47 | - |
| HNO$_3$ | EtOH, EtOAc, IPA: water | 20-A | high | 224.20, 228.54 (exo) | 5.82 | 1.63 | physically stable, 99.66% a/a (HPLC) |

Figure. 25

| Counter Ion | Solvent | XRPD | | | Crystallinity | DSC Onsets (°C) | TGA Mass Loss (wt. %)[1] |
|---|---|---|---|---|---|---|---|
| | | Wet | Dry | Humid | | | |
| Pyruvic Acid | EtOH | 1-A | 1-A | 1-A + peak shift | low | - | - |
| | EtOAc | 1-B | 1-B | Low cryst. | | 95.4 | - |
| Citric Acid | EtOH | 3-A | 3-A + 1 peak | Del. | low | 124.4 | 3.8 |
| | IPA:water (9:1 vol) | | 3-A | | | 153.7 | 9.8 |
| | | | | | | 195.9 | 4.6 |
| Fumaric Acid | EtOH, EtOAc | 4-A | 4-C | 4-C | low | 101.0 | 2.3 |
| | | | | | | 181.7 | 8.4 |
| | | | | | | 205.0 | |
| | IPA:water (9:1 vol) | 4-B | 4-D | 4-D | high | 111.7 | 3.5 |
| | | | | | | 167.9 | 0.3 |
| | | | | | | 203.2 | 6.1 |
| HCl (2.2 eq) | EtOH | 5-A | 5-A | Del. | high | 70.9 | - |
| | | | | | | 240.5 | |
| | EtOAc, IPA:water (9:1 vol) | 5-B | 5-C | 5-C | | 5-C: 86.8 224.1 241.7 5-B: 88.7 244.2 | |
| Saccharin | EtOAc, IPA:water (9:1 vol) | 6-A | 6-A | Am. + 1 Peak | low | - | - |
| Maleic Acid | EtOH, EtOAc, IPA:water (9:1 vol) | 8-A | 8-A | 8-A | moderate | - 188.5 196.1 | 1.1 2.3 6.5 |
| Oxalic Acid | EtOH, EtOAc, IPA:water (9:1 vol) | 9-A | 9-A | 9-A | high | - 231.8 | 2.4 13.7 |
| Salicylic Acid | MtBe | Am. | Am. | 10-C | moderate | - | - |
| | EtOAc | 10-A | 10-A | 10-A | | 167.3 | - |
| | IPAc | 10-A+B | 10-A+B | 10-A+B | | 87.0 127.0 137.1 (exo) 167.0 | - |
| Glutaric Acid | EtOH, EtOAc, MtBE | 11-A | 11-A | 11-A | high | 177.8 | 0.3 |
| Sulfuric Acid (0.55 eq.) | MtBE, EtOAc | Am. with trace 12-A | Am. with trace 12-A | Am. with trace 12-A | low | 81.7 159.8 207.6 | - |

Figure. 26A

| Counter Ion | Solvent | XRPD | | | Crystallinity | DSC Onsets (°C) | TGA Mass Loss (wt. %)[1] |
|---|---|---|---|---|---|---|---|
| | | Wet | Dry | Humid | | | |
| Sulfuric Acid (1.1 eq.) | IPA:water (9:1 vol) | 12-A | 12-A | 12-A | high | | |
| | EtOH | 12-B | 12-B | 12-F (low cryst) | high | 184.9 | - |
| | EtOH direct addition | 12-G + 2 peaks | 12-H | 12-G | high | 60.17 186.9 | 2.4 0.8 |
| | EtOAc | 12-C | 12-C | 12-F (low cryst) | moderate | - | - |
| | IPA:water (9:1 vol) | 12-D | 12-E | 12-F (low cryst) | moderate to high | - | - |
| Succinic Acid | EtOH | 15-A | 15-A | 15-A | low due to low quality of recovered solids | 126.8 150.9 | 3.4 |
| | EtOAc, IPA:water (9:1 vol) | 15-A | 15-A | 15-A | moderate | | |
| Tartaric Acid | EtOH | 13-A | 13-A | 13-A | high | 150.1 | - |
| | EtOAc | 13-B | 13-B | 13-B | moderate | 99.3 127.6 169.3 | |
| | IPA:water (9:1 vol) | 13-C | 13-C | 13-C | high | 77.3 132.4 | - |
| Phosphoric Acid | EtOH, EtOAc, IPA:water (9:1 vol) | 14-A | 14-A | 14-A | high | 113.3 198.4 237.5 | 1.1 1.6 |

Figure. 26A (Continued)

| Counter Ion | Solvent | Stoichiometry by 1H-NMR (CI:API) | Residual Solvents by 1H-NMR (wt. %) | Qualitative Water Solubility at RT (mg/mL) |
|---|---|---|---|---|
| Fumaric Acid | EtOH, EtOAc | 0.96 | BDL (EtOH in EtOH solvent) | - |
| | IPA:water (9:1 vol) | 0.60 | 0.26 (IPA) | 0.16 |
| HCl (2.2 eq) | EtOH | - | - | - |
| | EtOAc, IPA:water (9:1 vol) | - | 5-B 4.04 (EtOAc) | - |
| Maleic Acid | EtOH, EtOAc, IPA:water (9:1 vol) | 0.91 | 0.13 (EtOH in EtOH solvent) | 0.18 |
| Oxalic Acid | EtOH, EtOAc, IPA:water (9:1 vol) | - | 0.08 (EtOH in EtOH solvent) | |
| Salicylic Acid | MtBe | - | - | - |
| | EtOAc | 1.00 | 0.12 (EtOAc) | 0.04 |
| | IPAc | - | - | - |
| Glutaric Acid | EtOH, EtOAc, MtBE | 1.00 | 0.09 (EtOH in EtOH solvent) | 0.24 |
| Sulfuric Acid (0.55 eq.) | MtBE, EtOAc | - | 0.1 (IPA in 4-37) | 0.03 |
| | IPA:water (9:1 vol) | | | |
| Sulfuric Acid (1.1 eq.) | EtOH | - | 3.10 (EtOH) | - |
| | EtOH direct addition | - | - | 0.06 |
| | EtOAc | - | 5.86 (EtOAc) | - |
| | IPA: water (9:1 vol) | - | 3.20 (IPA) | - |
| Succinic Acid | EtOH, EtOAc, IPA:water (9:1 vol) | 1.01 | 0.29 (EtOH in EtOH solvent) | 0.60 |
| Tartaric Acid | EtOH | 0.79 | 0.03 (EtOH in EtOH solvent) | 0.27 |
| | EtOAc | 1.03 | 0.34 (EtOAc) | - |
| | IPA:water (9:1 vol) | 1.03 | 1.36 (IPA) | - |
| Phosphoric Acid | EtOH, EtOAc, IPA:water (9:1 vol) | - | 0.06 (EtOH in EtOH solvent) | 0.35 |

Figure. 26B

SOLID FORMS OF PRALSETINIB

CROSS-REFERENCE TO RELATED APPLICATIONS

This application is a U.S. National Stage Application of International Patent Application No. PCT/US2021/034823, filed on May 28, 2021, which claims the benefit of and priority to U.S. Provisional Patent Application No. 63/032,121, filed on May 29, 2020; and U.S. Provisional Patent Application No. 63/047,353, filed on Jul. 2, 2020, the disclosure of each of which is hereby incorporated by reference in its entirety for all purposes.

TECHNICAL FIELD

This disclosure relates to certain solid forms and salts of pralsetinib useful for the preparation of pharmaceutical compositions, and for selective inhibition of receptor tyrosine kinase rearranged during transfection (RET).

BACKGROUND

Targeting oncogenic driver kinases with specifically tailored inhibitors has transformed the management of a variety of hematologic malignancies and solid tumors. The receptor tyrosine kinase, rearranged during transfection (RET), is an oncogenic driver activated in multiple cancers including non-small cell lung cancer (NSCLC), medullary thyroid cancer (MTC) and papillary thyroid cancer (PTC). Oncogenic RET alterations promote ligand-independent, constitutive RET kinase activation, which drives tumorigenesis (e.g., RET fusions are seen in 10%-20% of PTC, 1%-2% of NSCLC, and multiple other cancer subtypes).

Pralsetinib is a highly potent and selective RET inhibitor designed to overcome these limitations, through the highly potent and selective targeting of oncogenic RET alterations, including the most prevalent RET fusions and certain RET activating mutations. Pralsetinib can also be referred to as: (cis)-N-((S)-1-(6-(4-fluoro-1H-pyrazol-1-yl)pyridin-3-yl)ethyl)-1-methoxy-4-(4 methyl-6-(5-methyl-1H-pyrazol-3-ylamino)pyrimidin-2-yl)cyclohexanecarboxamide, and has the following chemical structure:

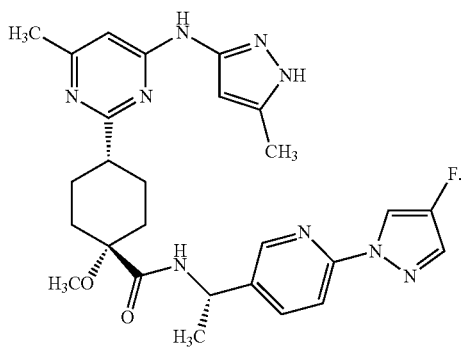

(I)

In early clinical testing, pralsetinib attenuated RET signaling and produced durable clinical responses in patients with RET-altered NSCLC and MTC without notable off target toxicity, establishing initial proof-of-principle for highly selective RET targeting in RET-driven malignancies.

Chemical compounds can often form one or more different salts and/or solid forms, including amorphous and polymorphic crystal solid forms. The salts and solid forms of an active pharmaceutical ingredient (API) can have different properties. There is a need for the discovery and selection of appropriate salts and/or solid forms of API compounds (e.g., crystalline salt forms of an API) suitable for development of pharmaceutically acceptable dosage forms for the treatment of various diseases.

Pralsetinib is disclosed as one of many RET inhibitor compounds in patent publication WO2017/079140. Clinical trials under NCT03037385, entitled "Phase ½ Study of the Highly-selective RET Inhibitor, Pralsetinib (BLU-667), in Patients With Thyroid Cancer, Non-Small Cell Lung Cancer, and Other Advanced Solid Tumors (ARROW)." However, therapeutic compounds often exist in a variety of solid forms having different properties. There remains a need for identifying solid forms of pralsetinib useful for the preparation of therapeutic compositions including oral dosage forms.

SUMMARY

In a first embodiment, the present invention relates to solid forms, and methods for the selective production of polymorphs of the free base solid form of (cis)-N-((S)-1-(6-(4-fluoro-1H-pyrazol-1-yl)pyridin-3-yl)ethyl)-1-methoxy-4-(4 methyl-6-(5-methyl-1H-pyrazol-3-ylamino)pyrimidin-2-yl)cyclohexanecarboxamide (herein, Compound (I)).

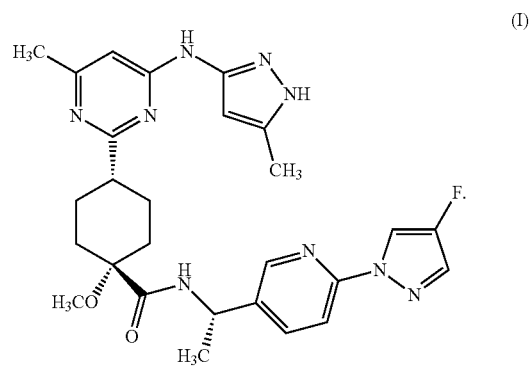 [SMILES: CO[C@]1(C(=O)N[C@@H](C)c2ccc(-n3cc(F)cn3)nc2)CC[C@H](c2nc(C)cc(Nc3cc(C)[nH]n3)n2)CC1]

(I)

The presence of Compound (I) in each solid form can be identified by one or more techniques, including DSC, TGA, DVS and XRPD.

FIG. 1A is a schematic showing three crystalline solid forms of the free base of Compound (I) that were identified and characterized: an anhydrous solid form designated as Solid Form A, an hydrate solid form was designated as Solid Form C, and a dehydrated solid form of Solid Form C was designated as Solid Form B. Solid Form C converted to a dehydrate, Solid Form B, upon drying at 50° C.

In some embodiments, the free base solid form can be a first anhydrous solid form of the free base of pralsetinib. A first pralsetinib free base solid form designated as Solid Form A can be identified by one or more of the following characteristics: (a) a X-ray powder diffraction (XRPD) pattern comprising characteristic diffraction peaks at 2-theta angles at approximately (±0.2 degrees) 5.0, 9.7, 12.7, 13.6, and 16.1; (b) a differential scanning calorimetry (DSC) thermogram with an endothermic event observed at about 205° C. (±0.2 degrees); and/or (c) a reversible mass change of about 10% by dynamic vapor sorption (DVS) between 2-95% relative humidity.

Solid Form A of pralsetinib can be a crystalline anhydrous solid form of the free base of pralsetinib. Solid Form A of the free base of Compound (I) can exhibit a XRPD pattern having characteristic peaks expressed in degrees 2-theta at approximately (±0.2): 5.0, 9.7, 12.7, 13.6, and 16.1, corresponding to d-spacing (angstroms±0.2) of 17.8, 9.1, 7.0, 6.5, and 5.5, respectively. Solid Form A of the free base of Compound (I) can be further characterized by a XRPD, having additional diffractions at angles (2 theta±0.2) of 6.8, 19.2, 19.5, 23.1, corresponding to d-spacing (angstroms±0.2) of 13.0, 4.6, 4.5, and 3.8, respectively. FIG. 3A, FIG. 20B and FIG. 22A are XRPD patterns obtained from samples of Solid Form A of the free base of pralsetinib. In some embodiments, the solid form of the free base of Compound (I) is XRPD Pattern A including peaks at the same or substantially the same angles (2 theta±0.2) and corresponding d-spacing (Angstrom±0.2) of Table 1A:

TABLE 1A

| 2-theta (deg) | d-Spacing (ang.) | Relative Intensity |
|---|---|---|
| 4.95 | 17.82 | 62 |
| 9.74 | 9.07 | 29 |
| 12.71 | 6.96 | 48 |
| 13.62 | 6.50 | 100 |
| 16.06 | 5.52 | 39 |

In some embodiments, the Solid Form A of the free base of Compound (I) is characterized by a differential scanning calorimetry (DSC) thermogram with an endothermic event observed at about 205° C. (±0.2 degrees); and/or a reversible mass change of about 10% by dynamic vapor sorption (DVS) between 2-95% relative humidity. FIG. 3B is a DSC/TGA thermogram and FIG. 20A is a DVS isotherm plot obtained from a sample of Solid Form A of the free base of pralsetinib. The Solid Form A of the free base of pralsetinib can be characterized by a DSC thermogram with an endothermic event observed at about 205° C. (±0.2 degrees). The Solid Form A of the free base of pralsetinib reversible mass change of about 10% by DVS between 2-95% relative humidity. The Solid Form A of the free base of Compound (I) can be a solid form obtained by a process comprising a step selected from the group consisting of: (a) slurrying in alcohols, acetone, or ACN; (b) evaporative crystallization and cooling crystallization in IPA and 1-propanol; and (c) recrystallization in acetone:water. The Solid Form A of pralsetinib can also be obtained by heating a sample of pralsetinib free base in Solid Form B to at least about 190° C. under suitable conditions to form Solid Form A (e.g., a slurry in an alcohol such as IPA); or by heating a sample of pralsetinib free base in Solid Form C to at least about 190° C. under suitable conditions to form Solid Form A (e.g., a slurry in an alcohol, acetone or ACN).

In some embodiments, the free base solid form can be a second anhydrous solid form of the free base of pralsetinib. A second pralsetinib free base solid form designated as Solid Form B can be identified by one or more characteristics: (a) a X-ray powder diffraction (XRPD) pattern comprising characteristic diffraction peaks at 2-theta angles at approximately (±0.2 degrees) 5.9, 8.8, 11.6, 14.7, and 19.5; and/or (b) a DSC thermogram including an endotherm with onset at about 149° C. (±0.2 degrees), followed by an exotherm with onset at 162° C. (±0.2 degrees), and melting onset at about 205° C. (±0.2 degrees).

Solid Form B of the free base of Compound (I) exhibits a XRPD pattern having characteristic peaks expressed in degrees 2-theta at approximately (±0.2): 5.9, 8.8, 11.6, 14.7, and 19.5, corresponding to d-spacing (angstroms±0.2) of 15.0, 10.0, 7.6, 6.0, and 4.6, respectively. Solid Form B of the free base of Compound (I) can be further characterized by an X-ray Powder Diffraction (XRPD), having additional diffractions at angles (2 theta±0.2) of 17.0, 17.6, and 22.2 corresponding to d-spacing (angstroms±0.2) of 5.2, 5.0, and 4.0 respectively. FIG. 4A, FIG. 22B and FIG. 23B are XRPD patterns obtained from samples of Solid Form B of the free base of pralsetinib. In some embodiments, the solid form of the free base of Compound (I) is XRPD Pattern B including peaks at the same or substantially the same angles (2 theta±0.2) and corresponding d-spacing (A±0.2) of Table 2A:

TABLE 2A

| 2-theta (deg) | d-Spacing (ang.) | Relative Intensity |
|---|---|---|
| 5.89 | 14.99 | 100 |
| 8.81 | 10.03 | 28 |
| 11.58 | 7.64 | 33 |
| 14.73 | 6.01 | 23 |
| 19.45 | 4.56 | 13 |

The crystalline anhydrous Solid Form B of the free base of pralsetinib can be characterized by a DSC thermogram including an endotherm with onset at about 149° C. (±0.2 degrees), followed by an exotherm with onset at 162° C. (±0.2 degrees), and melting onset at about 205° C. (±0.2 degrees). The Solid Form B of the free base of Compound (I) can be a solid form obtained by a process comprising a step of heating a sample of pralsetinib free base in Solid Form C to about 150° C. FIG. 4B is a DSC and TGA thermogram of the sample of pralsetinib free base in Solid Form C, used to obtain the XRPD pattern in FIG. 4A. FIG. 23A is a DVS isotherm plot obtained from a sample of Solid Form B of the free base of pralsetinib.

In some embodiments, the free base solid form can be a hydrated solid form of the free base of pralsetinib. A hydrate pralsetinib free base solid form designated as Solid Form C can be identified by one or more characteristics: (a) a X-ray powder diffraction (XRPD) pattern comprising characteristic diffraction peaks at 2-theta angles at approximately (±0.2 degrees) 5.8, 8.7, 11.0, 13.6, and 20.2; (b) a differential scanning calorimetry (DSC) thermogram has onsets occurring at 1220 (±0.2 degrees), 127° (±0.2 degrees), and 206° (±0.2 degrees); and/or (c) a TGA having about a 3 wt. % observed mass loss.

Solid Form C of the free base of Compound (I) can exhibit a XRPD pattern having characteristic peaks expressed in degrees 2-theta at approximately (±0.2): 5.8, 8.7, 11.0, 13.6, and 20.2, corresponding to d-spacing (angstroms±0.2) of 15.2, 10.2, 8.1, 6.5, and 4.4, respectively. Solid Form C of the free base of Compound (I) can be further characterized by an X-ray Powder Diffraction (XRPD), having additional diffractions at angles (2 theta±0.2) of 11.6, 14.5, 22.2 and 23.2, corresponding to d-spacing (angstroms±0.2) of 7.6, 6.1, 4.0 and 3.8, respectively. The Solid Form C of Compound (I) can have the XRPD pattern shown in FIG. 5A. FIG. 5A, FIG. 21B and FIG. 22C are XRPD patterns obtained from samples of Solid Form C of the free base of pralsetinib. In some embodiments, the solid form of the free base of Compound (I) is XRPD Pattern C including XRPD peaks at the same or substantially the same angles (2 theta±0.2) and corresponding d-spacing (A±0.2) as shown in Table 3A:

TABLE 3A

| 2-theta (deg) | d-Spacing (ang.) | Relative Intensity |
|---|---|---|
| 5.81 | 15.21 | 100 |
| 8.69 | 10.17 | 32 |
| 10.96 | 8.06 | 60 |
| 13.56 | 6.52 | 48 |
| 20.19 | 4.39 | 29 |

The solid form of pralsetinib can be a crystalline hydrated solid form of the free base of pralsetinib described as Solid Form C having certain characteristics determined by DSC, and/or TGA analysis. In some embodiments, the Solid Form C of the free base of Compound (I) is characterized by a differential scanning calorimetry (DSC) thermogram has onsets occurring at 122°, 127°, and 206° (e.g., FIG. 5B). The TGA of Solid Form C of the free base of Compound (I) can have about a 3 wt. % observed mass loss associated (e.g., FIG. 5B). The crystalline hydrated solid form of the free base of pralsetinib can be characterized by a DSC thermogram with multiple endothermic events observed at about 122(±0.2 degrees), 127 (±0.2 degrees) and 206° C. (±0.2 degrees). FIG. 5B is a DSC/TGA thermograms obtained from a sample of Solid Form C of the free base of pralsetinib. FIG. 21A is a DVS isotherm obtained from a sample of the Solid Form C of the free base of pralsetinib. The crystalline anhydrous solid form of the free base of pralsetinib reversible mass change of about 1.4% by DVS between 2-95% relative humidity. The Solid Form C of the free base of pralsetinib can be obtained by slurrying and then recrystallizing a sample of pralsetinib free base in an anhydrous solid form (e.g., slurry pralsetinib free base Solid Form A in water and methanol, then recrystallize in acetone/IPA/methanol and water to obtain hydrated crystalline solid form C of the pralsetinib free base).

Applicants have discovered numerous additional solid forms of the free base of pralsetinib. FIG. 1B is a schematic showing additional solid forms of the free base of Compound (I) and processes useful in preparing these solid forms, in addition to the solid forms of the free base of Compound (I) shown in FIG. 1A. FIG. 2 is a table summarizing characteristics of solid forms of the free base of pralsetinib.

Solid Forms D, F and G can be characterized by XRPD Pattern D (FIG. 6), Pattern F (FIG. 7A) and Pattern G (FIG. 8A), respectively, and obtained using a methanol:chloroform 1:1 slurry process. The pralsetinib free base in Solid Form D can be converted to Solid Form F (desolvate 1 of Solid Form D), or Solid Form G (desolvate 2 of Solid Form D) by drying and heating to 50° C. in a vacuum. These solid forms can be subsequently further converted to the anhydrous Solid Form B (e.g., by heating to 140° C.).

Solid Forms I, O and N can be characterized by XRPD Pattern I (FIG. 10A), Pattern O (FIG. 16) and Pattern N (FIG. 15), respectively, and obtained using a THF process. The pralsetinib free base in Solid Form I can be characterized by XRPD Pattern I and can be obtained from antisolvent recrystallization of pralsetinib free base in THF/heptane as well as slow cooling in THF (producing a mixture with Solid Form O). Solid Form O can be characterized by XRPD Pattern O, and can be obtained as a mixture with Solid Form I from slow cooling in THF. Solid Form N can be characterized by XRPD Pattern N and can be obtained by fast cooling in THF.

Solid Forms J, K and M can be characterized by XRPD Pattern J (FIG. 11), Pattern K (FIG. 12A) and Pattern M (FIG. 14A), respectively, and obtained using various antisolvent process. The pralsetinib free base in Solid Form J can be characterized by XRPD Pattern J and can be obtained from antisolvent recrystallization in THF/cyclohexane. Solid Form K can be characterized by XRPD Pattern K, and can be obtained from DMSO/water antisolvent recrystallization. Solid Form M can be characterized by XRPD Pattern M and can be obtained by further drying a Solid Form K sample obtained from antisolvent crystallization in DMSO:water.

Solid Forms L and P were characterized by XRPD Pattern L (FIG. 13A), and Pattern P (FIG. 17), respectively, and obtained using various antisolvent process. The pralsetinib free base in Solid Form L can be characterized by XRPD Pattern L and can be obtained from antisolvent recrystallization in methanol/water. Solid Form P can be characterized by XRPD Pattern P, and can be obtained from fast cooling in methanol to 0° C. followed by stagnant cooling to −20° C.

Solid Form Q can be characterized by XRPD Pattern Q (FIG. 18A) and can be obtained from cooling in 1,4-dioxane.

The free base of pralsetinib can also form a Solid Form H characterized by XRPD Pattern H (FIG. 9A).

Solid Form E can be obtained from a slurry of Solid Form B (anhydrous) in MtBE.

Amorphous forms of the free base of pralsetinib are also provided, including a composition providing the XRPD pattern of FIG. 19A.

In a second embodiment, the present invention also relates to salt forms of Compound (I), in an anhydrous or hydrous form, as well as in its various polymorph solid forms of these salts Salt forms of Compound (I). Salts of Compound (I) include certain salt forms formed using a counter ion selected from the group consisting of: benzenesulfonic acid (BSA) (e.g., in a solid form characterized by XRPD Pattern 18-A or 18-B shown in FIG. 44), methanesulfonic acid (MSA) (e.g., in solid forms of MSA pralsetinib salt compositions characterized by XRPD Pattern 2-B in FIG. 43A, 2-A or 2-B in FIG. 43C, 2-C in FIG. 43E or 2-D in FIG. 43D), hydrobromic acid (HBr) (e.g., in solid forms characterized by XRPD Pattern 19-A shown in FIG. 45A, Pattern 19-A or 19-B or 19-C shown in FIG. 45C, or Pattern 19-C shown in FIG. 45D), or nitric acid (HNO3) (e.g., in a solid form characterized by XPRD Pattern 20-A shown in FIG. 46A). FIG. 3-A provides the XRPD pattern obtained from Solid Form 3-A of a citric acid salt of pralsetinib. FIG. 40A and FIG. 40B provide XRPD patterns obtained from multiple solid forms of a fumaric acid salt of pralsetinib (i.e., XRPD patterns from samples of solid form 4-A and 4-C in FIG. 40A and XRPD patterns obtained from samples of solid form 4-B and 4-D of a fumaric acid salt of pralsetinib). FIG. 41 is a XRPD pattern obtained from a sample of a saccharin salt of pralsetinib in a solid form designated herein as solid form 6-A. FIG. 42 is a XRPD pattern obtained from solid form 7-A of a gentisic acid salt of pralsetinib. FIG. 32 is a XRPD pattern obtained from solid form 8-A of a maleate salt of pralsetinib. FIG. 33A is a XRPD pattern obtained from solid form 9-A of an oxalate salt of pralsetinib. FIG. 34A is a XRPD pattern obtained from solid form 10-A of a salicylate salt of pralsetinib. FIG. 29A and FIG. 30 are XRPD patterns obtained from solid forms 11-A and 11-B (respectively) of a glutarate salt of pralsetinib. FIG. 35A and FIG. 35G are XRPD patterns obtained from solid forms 12-A and 12-G (respectively) of a sulfate salts of pralsetinib. FIG. 36A is a XRPD patterns obtained a solid form 13-A of a tartarate salt of pralsetinib. FIG. 36E shows XRPD patterns obtained from solid forms 13-A, 13-B and 13-C of tartarate salts of pralsetinib. FIG. 28A is a XRPD pattern obtained from solid form 14-A of a phosphate salt of pralsetinib. FIG. 31A is a XRPD pattern obtained from solid form 15-A of a succinate salt of pralsetinib. FIG. 37A is a XRPD pattern obtained from solid form 16-A of a urea salt of pralsetinib. FIG. 47 is a XRPD pattern obtained from solid form 17-A of a quercetin dihydrate (QD) salt of pralsetinib.

In some embodiments, a hydrochloride salt of pralsetinib can be a crystalline solid form selected from HCl salt comprising Solid Form 5-A, Solid Form 5-B and/or Solid Form 5-C (e.g., obtained by drying Solid Form 5-B of the HCl salt of Compound (I)). Pralsetinib hydrochloric acid (HCl) salts can be prepared as solid forms characterized by XRPD Pattern 5-A in FIG. 27A, XRPD Pattern 5-B in FIG. 27C, and XRPD Pattern 5-C in FIG. 27E.

For example, a pralsetinib HCl salt solid form designated as Solid Form 5-A can be identified by a X-ray powder diffraction (XRPD) pattern comprising characteristic diffraction peaks at 2-theta angles at approximately (±0.2 degrees) 5.0° 6.1°, 9.1°, 9.9°, and 14.7°. Solid Form 5-A of the HCl salt of Compound (I) can exhibit a XRPD pattern having characteristic peaks expressed in degrees 2-theta at approximately (±0.2): 5.0°, 6.1°, 9.1°, 9.90 and 14.70, corresponding to d-spacing (angstroms±0.2) of 17.6, 14.5, 9.7, 9.0, and 6.0, respectively. Solid Form 5-A of the HCl salt of Compound (I) can be further characterized by an X-ray Powder Diffraction (XRPD), having additional diffractions at angles (2 theta±0.2) of 13.8, 15.3, 17.2, 18.1, 19.6, 20.3, 20.7, 21.8, 24.2, 25.6, and 26.3, corresponding to d-spacing (angstroms±0.2) of 6.4, 5.8, 5.2, 4.9, 4.5, 4.4, 4.3, 4.1, 3.7, 3.5, and 3.4, respectively.

The Solid Form 5-A of the HCl salt of Compound (I) can have the XRPD pattern shown in FIG. 27A. In some embodiments, the solid form of the hydrochloric acid salt of Compound (I) is XRPD Pattern 5-A having peaks at the same or substantially the same angles (2 theta±0.2) and corresponding d-spacing (A±0.2) of Table 17A:

TABLE 17A

| 2-theta (θ) | d (Å) | Relative Intensity |
| --- | --- | --- |
| 5.03 | 17.57 | 100 |
| 6.08 | 14.52 | 27 |
| 9.08 | 9.74 | 36 |
| 9.85 | 8.98 | 55 |
| 13.81 | 6.41 | 18 |
| 14.72 | 6.01 | 47 |
| 15.28 | 5.79 | 12 |
| 17.17 | 5.16 | 18 |
| 18.10 | 4.90 | 15 |
| 19.62 | 4.52 | 21 |
| 20.25 | 4.38 | 8 |
| 20.70 | 4.29 | 28 |
| 21.77 | 4.08 | 22 |
| 24.24 | 3.67 | 16 |
| 25.63 | 3.47 | 23 |
| 26.34 | 3.38 | 6 |

In some embodiments, the DSC of Solid Form 5-A of the HCl salt of Compound (I) is characterized by a very broad endotherm with an onset temperature of 70.9° C. and a sharp endotherm at 240.5°.

For example, a pralsetinib HCl salt solid form designated as Solid Form 5-B can be identified by a X-ray powder diffraction (XRPD) pattern comprising characteristic diffraction peaks at 2-theta angles at approximately (±0.2 degrees) 6.1, 8.9, 9.5, 15.0, and 16.6. Solid Form 5-B of the HCl salt of Compound (I) can exhibit a XRPD pattern having characteristic peaks expressed in degrees 2-theta at approximately (±0.2): 6.1, 8.9, 9.5, 15.0, and 16.6, corresponding to d-spacing (angstroms±0.2) of 14.5, 9.9, 9.3, 5.9 and 5.3, respectively. Solid Form 5-B of the HCl salt of Compound (I) can be further characterized by an X-ray Powder Diffraction (XRPD), having additional diffractions at angles (2 theta±0.2) of 17.2, 17.9, 18.4, 19.8, 25.8, and 28.3, corresponding to d-spacing (angstroms±0.2) of 5.2, 5.0, 4.8, 4.5, 3.5, and 3.3, respectively.

The Solid Form 5-B of the HCl salt of Compound (I) can have the XRPD pattern shown in FIG. 27C. In some embodiments, the solid form of the hydrochloric acid salt of Compound (I) is XRPD Pattern 5-B having peaks at the same or substantially the same angles (2 theta±0.2) and corresponding d-spacing (A±0.2) of Table 18A:

TABLE 18A

| 2-theta (deg) | d-Spacing (ang.) | Relative Intensity |
| --- | --- | --- |
| 6.10 | 14.47 | 56 |
| 8.90 | 9.93 | 100 |
| 9.54 | 9.26 | 22 |
| 15.02 | 5.89 | 6 |
| 16.64 | 5.32 | 15 |
| 17.19 | 5.15 | 7 |
| 17.89 | 4.95 | 13 |
| 18.41 | 4.82 | 8 |
| 19.80 | 4.48 | 6 |
| 25.82 | 3.45 | 21 |
| 26.83 | 3.32 | 36 |

In some embodiments, the TGA/DSC of Solid Form 5-B of the HCl salt of Compound (1) is characterized by an initial mass loss of about 3 wt. % (e.g., 3.4 wt. %) associated with a broad endotherm with an onset of about 89° C. (e.g., 88.7° C.) and a melt onset of about 244° C. (e.g., 244.2° C.).

For example, a pralsetinib HCl salt solid form designated as Solid Form 5-C can be identified by a X-ray powder diffraction (XRPD) pattern comprising characteristic diffraction peaks at 2-theta angles at approximately (±0.2 degrees) 6.4°, 8.5°, 8.9°, 9.6°, and 17.3°. Solid Form 5-C of the HCl salt of Compound (I) can exhibit a XRPD pattern having characteristic peaks expressed in degrees 2-theta at approximately (±0.2): 6.4°, 8.5°, 8.9°, 9.6°, and 17.3°, corresponding to d-spacing (angstroms±0.2) of 13.9, 10.4, 9.9, 9.2, and 5.1, respectively. Solid Form 5-C of the HCl salt of Compound (I) can be further characterized by an X-ray Powder Diffraction (XRPD), having additional diffractions at angles (2 theta±0.2) of 11.5, 16.7, and 19.2, corresponding to d-spacing (angstroms±0.2) of 7.7, 5.3, 4.6, respectively.

The Solid Form 5-C of the HCl salt of Compound (I) can have the XRPD pattern shown in FIG. 27E. In some embodiments, the solid form of the hydrochloric acid salt of Compound (I) is XRPD Pattern 5-C having peaks at the same or substantially the same angles (2 theta±0.2) and corresponding d-spacing (A±0.2) of Table 18C:

TABLE 18C

| 2-theta (deg) | d-Spacing (ang.) | Relative Intensity |
| --- | --- | --- |
| 5.99 | 14.75 | 6 |
| 6.38 | 13.85 | 42 |
| 8.49 | 10.40 | 55 |
| 8.92 | 9.91 | 100 |
| 9.60 | 9.21 | 48 |
| 11.51 | 7.68 | 9 |
| 12.70 | 6.97 | 8 |
| 15.89 | 5.57 | 5 |
| 16.74 | 5.29 | 21 |
| 17.34 | 5.11 | 28 |

TABLE 18C-continued

| 2-theta (deg) | d-Spacing (ang.) | Relative Intensity |
|---|---|---|
| 19.19 | 4.60 | 9 |
| 21.00 | 4.23 | 7 |
| 26.88 | 3.31 | 7 |

In some embodiments, the TGA of Solid Form 5-C of the HCl salt of Compound (I) is characterized by an initial mass loss of 3.4 wt. % and a second mass loss event of 2 wt. %. In some embodiments, the DSC of Solid Form 5-C of the HCl salt of Compound (I) is characterized by onsets of 86.8° C., 224.1° C. and 241.7° C.

BRIEF DESCRIPTION OF THE FIGURES

FIG. 2 is a table summarizing characteristics of various solid forms of the free base of pralsetinib.

FIG. 24 is a table summarizing certain physical characteristics of solid forms obtained as various salts of pralsetinib.

FIG. 25 is a table summarizing certain physical characteristics of solid forms obtained as various salts of pralsetinib.

FIG. 26A is a table summarizing certain physical characteristics of solid forms obtained as various salts of pralsetinib.

FIG. 26B is a table summarizing certain physical characteristics of solid forms obtained as various salts of pralsetinib.

DETAILED DESCRIPTION

Figure 1A:
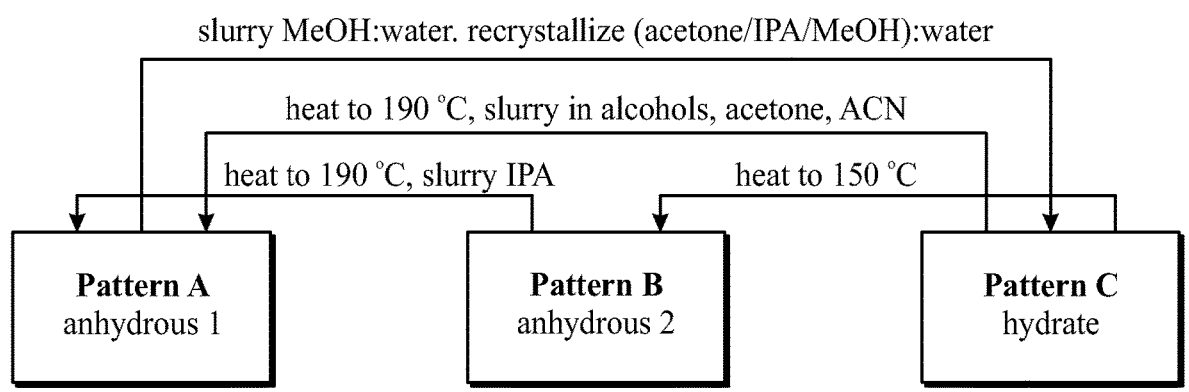
FIG. 1A is a schematic of certain anhydrous and hydrated solid forms of the free base of pralsetinib.

The bioactive Compound (I), also referred to as pralsetinib, or (cis)-N-((S)-1-(6-(4-fluoro-1H-pyrazol-1-yl)pyridin-3-yl)ethyl)-1-methoxy-4-(4 methyl-6-(5-methyl-1H-pyrazol-3-ylamino)pyrimidin-2-yl) cyclohexanecarboxamide as shown below, can be prepared as a solid form of the free base or in a variety of salt forms.

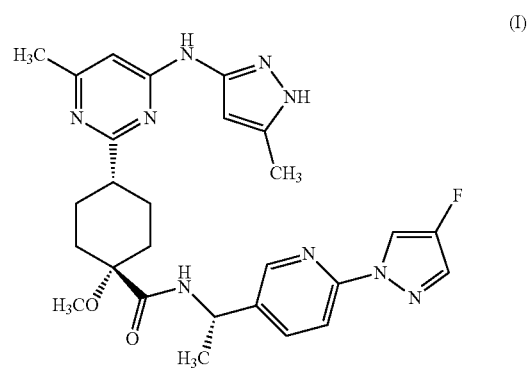 [SMILES: CO[C@]1(C(=O)N[C@@H](C)c2ccc(-n3cc(F)cn3)nc2)CC[C@H](c2nc(C)cc(Nc3cc(C)[nH]n3)n2)CC1]

(I)

Pralsetinib can also be referred to as CAS No.: 2097132-94-8, cis-N-{(1S)-1-[6-(4-fluoro-1H-pyrazol-1-yl)pyridin-3-yl]ethyl}-1-methoxy-4-{4-methyl-6-[(5-methyl-1H-pyrazol-3-yl)amino]pyrimidin-2-yl}cyclohexanel-carboxamide, or BLU-667, and can include free base or salt forms thereof. Human clinical trials of pralsetinib include the administration of pralsetinib to patients diagnosed with unresectable or metastatic non-small cell lung cancer (NSCLC) or medullary thyroid cancer (MTC) (e.g., NCT04204928), patients diagnosed with RET Fusion-positive, Metastatic Non-Small Cell Lung Cancer (e.g., NCT04222972) and patients diagnosed with medullary thyroid cancer, RET-altered NSCLC and other RET-altered solid tumors (e.g., NCT03037385).

When used alone, the term "Solid Form A" refers to the crystalline polymorph Solid Form A of pralsetinib. The terms "Solid Form A", "Form A", "Form A of pralsetinib", "Form A of ((cis)-N-((S)-1-(6-(4-fluoro-1H-pyrazol-1-yl) pyridin-3-yl)ethyl)-1-methoxy-4-(4 methyl-6-(5-methyl-1H-pyrazol-3-ylamino)pyrimidin-2-yl)cyclohexanecarboxamide", or "Form A of Compound (I)" are used interchangeably. Form A can be characterized by, for example, XRPD alone or XRPD in combination with any one or more of DSC, DVS, and TGA. Form A is anhydrous.

When used alone, the term "Solid Form B" refers to the crystalline polymorph Solid Form B of pralsetinib. The terms "Solid Form B", "Form B", "Form B of pralsetinib", "Form B of ((cis)-N-((S)-1-(6-(4-fluoro-1H-pyrazol-1-yl) pyridin-3-yl)ethyl)-1-methoxy-4-(4 methyl-6-(5-methyl-1H-pyrazol-3-ylamino)pyrimidin-2-yl)cyclohexanecarboxamide", or "Form B of Compound (I)" are used interchangeably. Form B can be characterized by, for example, XRPD alone or XRPD in combination with any one or more of DSC, DVS, and TGA. Form B is a dehydrate.

When used alone, the term "Solid Form C" refers to the crystalline polymorph Solid Form C of pralsetinib. The terms "Solid Form C", "Form C", "Form C of pralsetinib", "Form C of ((cis)-N-((S)-1-(6-(4-fluoro-1H-pyrazol-1-yl) pyridin-3-yl)ethyl)-1-methoxy-4-(4 methyl-6-(5-methyl-1H-pyrazol-3-ylamino)pyrimidin-2-yl)cyclohexanecarboxamide", or "Form C of Compound (I)" are used interchangeably. Form C can be characterized by, for example, XRPD alone or XRPD in combination with any one or more of DSC, DVS, and TGA. Form C is a hydrate.

As used herein, "crystalline" refers to a solid having a crystal structure wherein the individual molecules have a highly homogeneous regular locked-in chemical configuration.

"Anhydrous" as used herein, means that the crystalline form comprises substantially no water in the crystal lattice e.g., less than 1% by weight as determined by Karl Fisher (KF), or less than 1% by weight as determined by another quantitative analysis.

As used herein, the term "hydrate" refers to a crystalline solid form containing Compound (I) and either stoichiometric or nonstoichiometric amounts of a water incorporated within the crystal structure. A "dehydrate" refers to a crystalline solid form containing Compound (I) in which the stoichiometric or nonstoichiometric amounts of a water incorporated within the crystal structure has been removed. Techniques known to one of skill in the art to determine the to determine the amount of water present include, for example, TGA and KF.

Solid state ordering of solids may be determined by standard techniques known in the art, e.g., by X-ray powder diffraction (XRPD), differential scanning calorimetry (DSC), thermal gravimetric analysis (TGA), or dynamic vapor sorption (DVS). Amorphous solids can also be differentiated from crystalline solids e.g., by birefringence using polarized light microscopy. Amorphous solids consist of disordered arrangements of molecules and do not possess a distinguishable crystal lattice.

Relative intensity is calculated as a ratio of the peak intensity of the peak of interest versus the peak intensity of the largest peak. In certain embodiments, the relative intensity of the peaks may vary due to the preferred orientation of the sample. Preferred orientation in the specimen influences the intensities of various reflections so that some are more intense and others less intense, compared to what would be expected from a completely random specimen. In general, the morphology of many crystalline particles tends to give a specimen that exhibits some degree of preferred orientation in the specimen holder. This is particularly evident for needlelike or plate-like crystals when size reduction yields finer needles or platelets.

In some embodiments, Form A is at least 70%, 80%, 90%, 95%, 98%, 99%, 99.5%, or 99.9% pure. The purity of Form A is determined by dividing the weight of Form A of the Compound (I) in a composition comprising Compound (I) over the total weight of Compound (1) in the composition.

In some embodiments, Form B is at least 70%, 80%, 90%, 95%, 98%, 99%, 99.5%, or 99.9% pure. The purity of Form B is determined by dividing the weight of Form B of the Compound (I) in a composition comprising Compound (I) over the total weight of Compound (1) in the composition.

In some embodiments, Form C is at least 70%, 80%, 90%, 95%, 98%, 99%, 99.5%, or 99.9% pure. The purity of Form C is determined by dividing the weight of Form C of the Compound (I) in a composition comprising Compound (I) over the total weight of Compound (1) in the composition.

In some embodiments, Form 5-A is at least 70%, 80%, 90%, 95%, 98%, 99%, 99.5%, or 99.9% pure. The purity of Form 5-A is determined by dividing the weight of Form 5-A of the Compound (I) in a composition comprising Compound (I) over the total weight of Compound (I) in the composition.

In some embodiments, Form 5-B is at least 70%, 80%, 90%, 95%, 98%, 99%, 99.5%, or 99.9% pure. The purity of Form 5-B is determined by dividing the weight of Form 5-B of the Compound (I) in a composition comprising Compound (I) over the total weight of Compound (I) in the composition.

In some embodiments, Form 5-C1 is at least 70%, 80%, 90%, 95%, 98%, 99%, 99.5%, or 99.9% pure. The purity of Form 5-C is determined by dividing the weight of Form 5-C of the Compound (I) in a composition comprising Compound (I) over the total weight of Compound (I) in the composition.

The crystalline forms disclosed in the present application, for example, Form A, Form B, Form C, Form 5-A, Form 5-B, and Form 5-C have numerous advantages. In particular, the advantages of Form A, Form B, Form C, Form 5-A, Form 5-B, and Form 5-C include ease of isolation, process reproducibility, suitability for large scale manufacturing process, etc.

Pralsetinib Free Base Solid Forms

A free base form of Compound (I) can exist in an amorphous solid form or in different solid forms, or mixtures of solid forms, which can additionally include one or more equivalents of water (e.g., anhydrous or hydrate forms). As provided herein, crystalline solid form(s) of Compound (I) can be identified by distinct XRPD peaks that are not characterized in previous disclosures of Compound (I). There are provided herein certain crystalline solid forms of the free base of Compound (I) and related methods for preparing and using these solid form materials.

A first solid form of the free base of Compound (I) can be identified by a X-ray powder diffraction (XRPD) pattern comprising characteristic diffraction peaks at 2-theta angles at approximately (±0.2 degrees 5.0°, 9.7°, 12.7°, 13.6°, and 16.1°. Solid Form A is an anhydrous solid which can be produced by various methods. For example, solid Form A was observed after slurrying in alcohols, acetone, and ACN. Solid Form A was prepared by evaporative crystallization in multiple solvents and cooling crystallization in IPA and 1-propanol. Solid Form A can also be produced by recrystallization in acetone:water. Methods of making pralsetinib free base in solid Form A of Compound (I) are provided in the Examples.

Figure 3A:
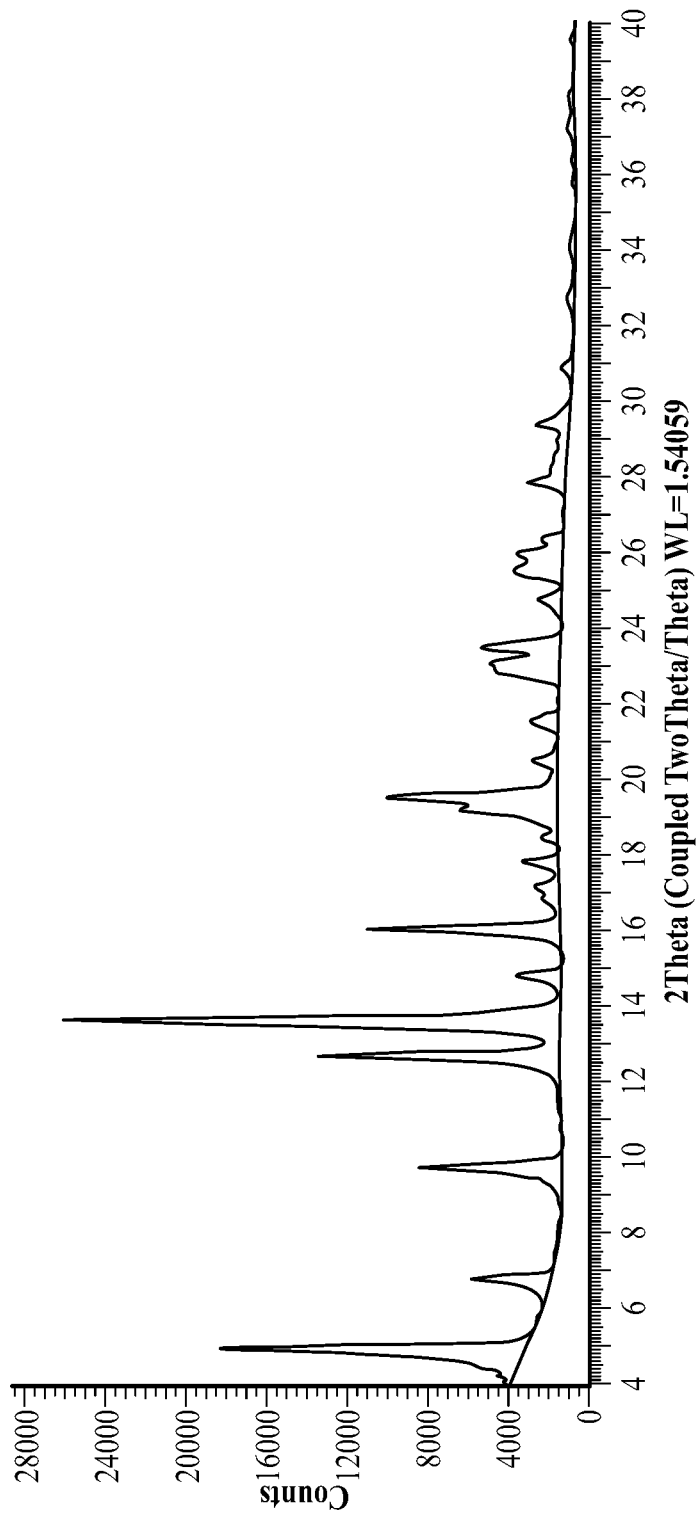
FIG. 3A is a XPPD pattern designated as Pattern A obtained from pralsetinib free base designated as solid form A, from 4-40 degrees 2-theta.

FIG. 3A is a XRPD pattern obtained from the free base solid form A of pralsetinib; Table 1A, Table 1B, Table 1C and Table 1D are each lists of XPRD (2-theta) peaks obtained from samples of solid form A of the free base of pralsetinib.

TABLE 1A

| 2-theta (deg) | d-Spacing (ang.) | Relative Intensity |
|---|---|---|
| 4.95 | 17.82 | 62 |
| 9.74 | 9.07 | 29 |
| 12.71 | 6.96 | 48 |
| 13.62 | 6.50 | 100 |
| 16.06 | 5.52 | 39 |

TABLE 1B

| 2-theta (deg) | d-Spacing (ang.) | Relative Intensity |
|---|---|---|
| 4.95 | 17.82 | 62 |
| 6.80 | 12.98 | 16 |
| 9.74 | 9.07 | 29 |
| 12.71 | 6.96 | 48 |
| 13.62 | 6.50 | 100 |
| 16.06 | 5.52 | 39 |
| 19.22 | 4.62 | 20 |
| 19.52 | 4.54 | 35 |
| 23.51 | 3.78 | 16 |

TABLE 1C

| 2-theta (deg) | d-Spacing (ang.) | Relative Intensity |
| --- | --- | --- |
| 4.95 | 17.82 | 62 |
| 6.80 | 12.98 | 16 |
| 9.74 | 9.07 | 29 |
| 12.71 | 6.96 | 48 |
| 13.62 | 6.50 | 100 |
| 14.82 | 5.97 | 9 |
| 16.06 | 5.52 | 39 |
| 17.18 | 5.16 | 5 |
| 17.83 | 4.97 | 8 |
| 19.22 | 4.62 | 20 |
| 19.52 | 4.54 | 35 |
| 20.50 | 4.33 | 5 |
| 21.56 | 4.12 | 6 |
| 23.09 | 3.85 | 14 |
| 23.51 | 3.78 | 16 |
| 24.77 | 3.59 | 5 |
| 25.59 | 3.48 | 10 |
| 25.97 | 3.43 | 9 |
| 27.86 | 3.20 | 7 |
| 29.41 | 3.03 | 7 |

TABLE 1D

| 2θ (degrees) | d-spacing (Å) | Relative Intensity |
| --- | --- | --- |
| 4.96 | 17.80 | 60 |
| 6.80 | 12.98 | 14 |
| 9.73 | 9.98 | 32 |
| 12.70 | 6.96 | 46 |
| 13.63 | 6.49 | 100 |
| 14.78 | 5.99 | 5 |
| 16.07 | 5.51 | 27 |
| 17.20 | 5.15 | 5 |
| 17.81 | 4.98 | 4 |
| 18.42 | 4.81 | 1 |
| 19.24 | 4.61 | 30 |
| 19.51 | 4.55 | 19 |
| 20.46 | 4.34 | 3 |
| 21.53 | 4.12 | 5 |
| 22.81 | 3.90 | 4 |
| 23.10 | 3.85 | 18 |
| 23.49 | 3.78 | 14 |
| 24.79 | 3.59 | 5 |
| 25.48 | 3.49 | 15 |
| 25.97 | 3.43 | 6 |
| 26.36 | 3.38 | 4 |
| 27.79 | 3.21 | 18 |
| 29.36 | 3.04 | 7 |
| 30.85 | 2.90 | 2 |
| 32.67 | 2.74 | 2 |
| 36.30 | 2.47 | 1 |
| 37.18 | 2.42 | 2 |
| 38.04 | 2.36 | 2 |

Figure 3B:
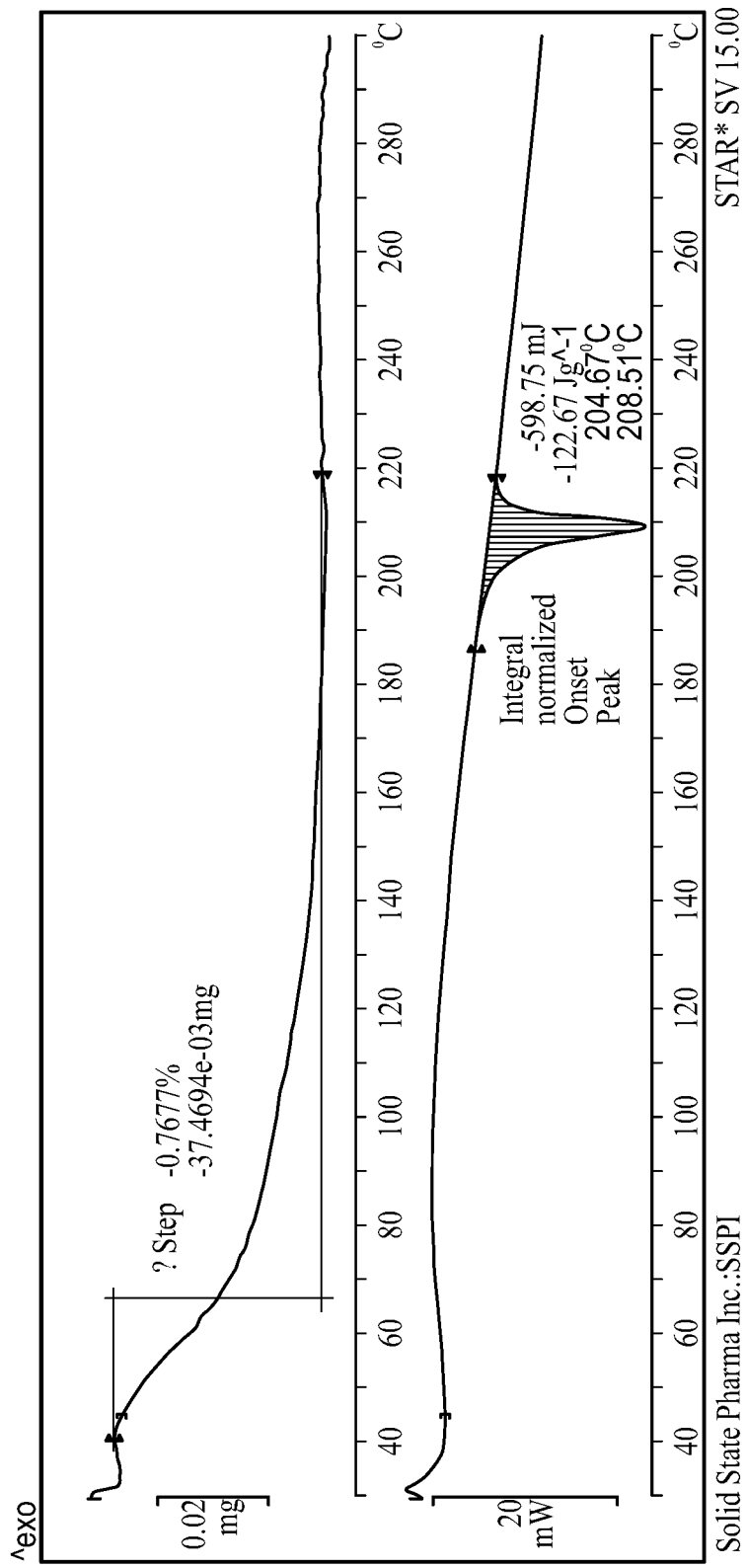
FIG. 3B shows DSC and TGA thermograms of the material tested in FIG. 3A, obtained from a sample of pralsetinib free base designated as solid form A.

The solid Form A of Compound (I) was characterized by differential scanning calorimetry (DSC) endotherm and by the thermogravimetric analysis (TGA) plots shown in FIG. 3B. Solid Form A of the pralsetinib free base (herein "Solid Form A") was found to be crystalline throughout the screening and samples exhibited melting onsets of about 205° C. Solid Form A was observed when slurrying in alcohols, acetone, and acetonitrile. Solid Form A was prepared by evaporative crystallization in multiple solvents and cooling crystallization in isopropanol and 1-propanol. Solid Form A can also be produced by recrystallization in acetone:water (e.g., as described in the Examples). Solid Form A was stable upon humidity exposure by X-ray powder diffraction (75% relative humidity and 40° C. for one week, and cycling up to 95% relative humidity by dynamic vapor sorption), but a dynamic vapor sorption measurement showed the sample was hygroscopic, gaining a water mass of 10% between 2 and 95% relative humidity at 25° C. However, the water pick-up between 15 to 75% relative humidity was about 2%.

Figure 20A:
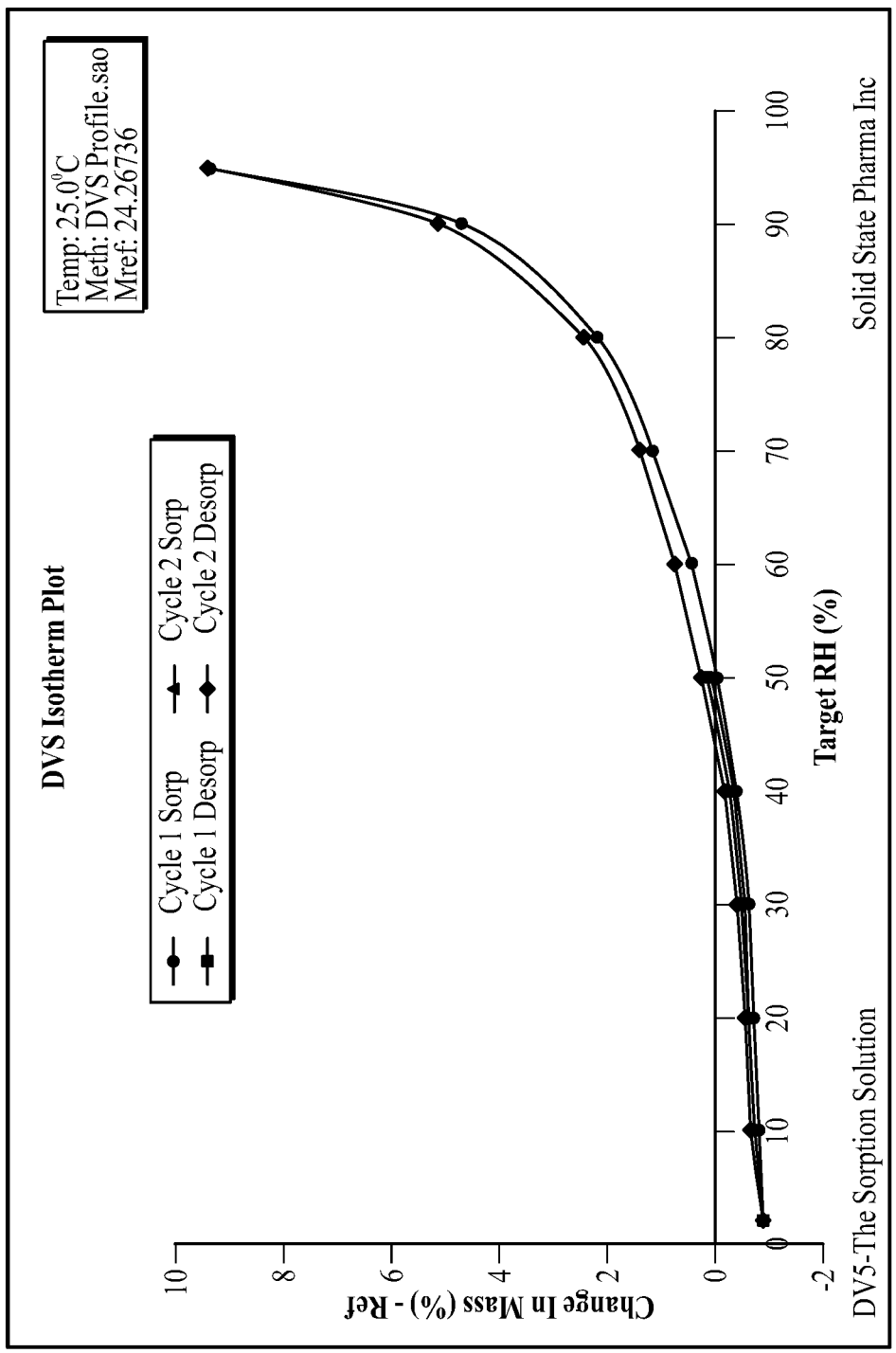
FIG. 20A is a DVS isotherm of a sample of pralsetinib free base in Solid Form A.
Figure 20B:
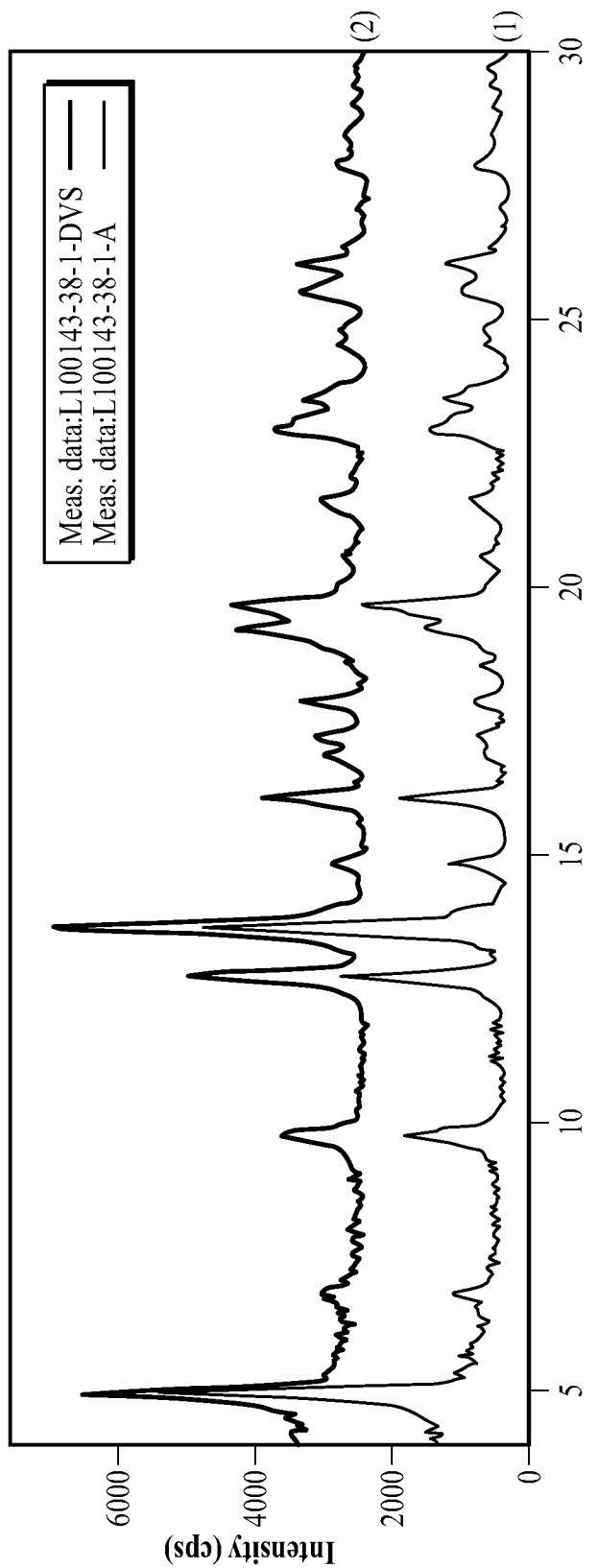
FIG. 20B shows the XRPD pattern obtained from the sample of pralsetinib free base before (1) and after (2) DVS isotherm measurement shown in FIG. 20A.

In addition, a dynamic vapor sorption (DVS) experiment was performed on a sample of solid form A of the free base of pralsetinib. This solid form A sample was prepared by IPA slurry with solids recovered from previous recrystallizations. The total mass chance observed between 2-95% relative humidity was 10.2 wt. %, showing that the sample is hygroscopic. The majority of the mass change occurred at high humidity (70% of the mass change occurring above 80% relative humidity, 80% of the mass change occurring above 70% relative humidity). The mass change was reversible. The DVS isotherms are shown in FIG. 20A. XRPD of the sample before and after DVS measurement was Pattern A (FIG. 20B).

Figure 4A:
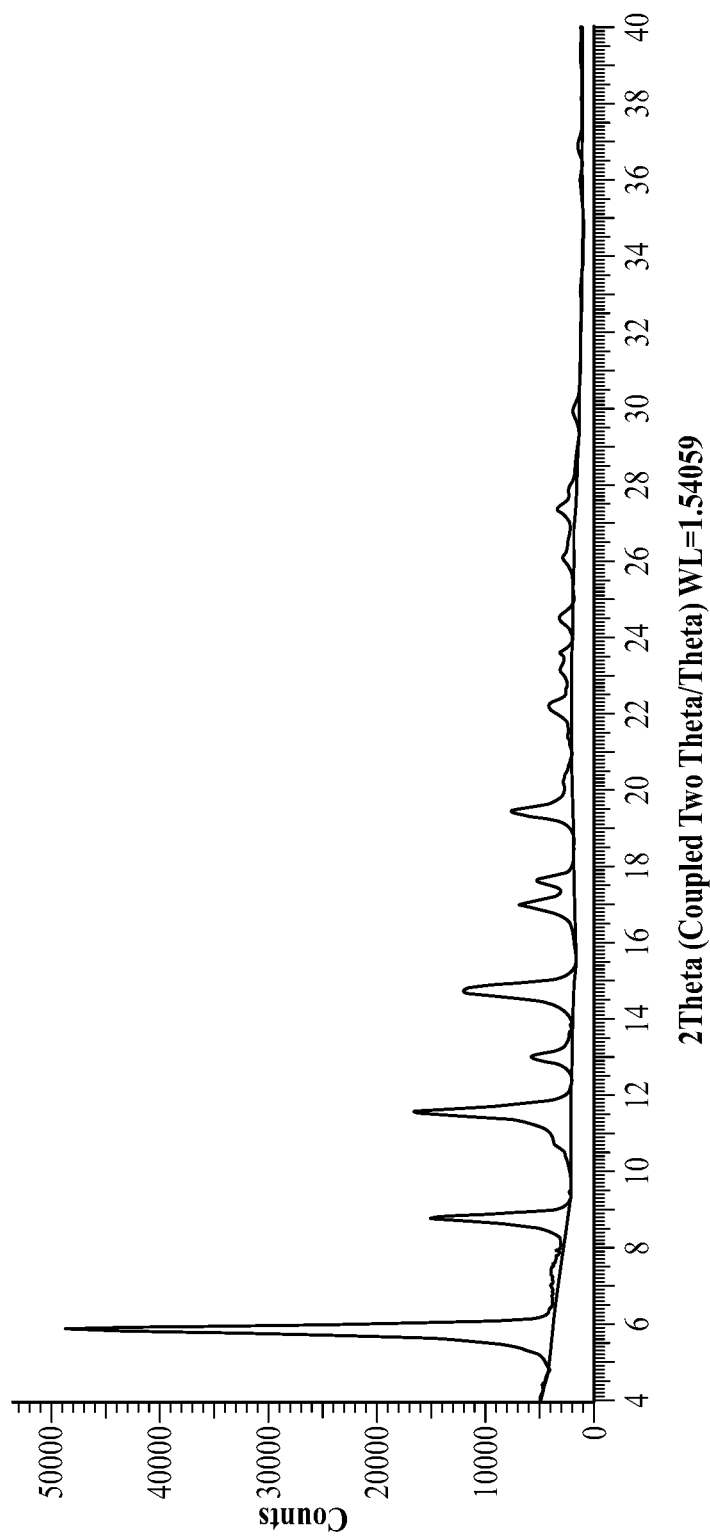
FIG. 4A is a XPPD pattern designated as Pattern B obtained from pralsetinib free base designated as solid form B.

A second pralsetinib free base solid form designated as Solid Form B can be identified by a X-ray powder diffraction (XRPD) pattern comprising characteristic diffraction peaks at 2-theta angles at approximately (±0.2 degrees) 5.9°, 8.8°, 11.6°, 14.70, and 19.5°. FIG. 4A is a XRPD pattern obtained from the free base solid form B of pralsetinib; Table 2A, Table 2B and Table 2C are each lists of XPRD (2-theta) peaks obtained from solid form B of the free base of Compound (I).

TABLE 2A

| 2-theta (deg) | d-Spacing (ang.) | Relative Intensity |
| --- | --- | --- |
| 5.89 | 14.99 | 100 |
| 8.81 | 10.93 | 28 |
| 11.58 | 7.64 | 33 |
| 14.73 | 6.01 | 23 |
| 19.45 | 4.56 | 13 |

TABLE 2B

| 2-theta (deg) | d-Spacing (ang.) | Relative Intensity |
| --- | --- | --- |
| 5.89 | 14.99 | 100 |
| 8.81 | 10.03 | 28 |
| 11.58 | 7.64 | 33 |
| 14.73 | 6.01 | 23 |
| 17.01 | 5.21 | 11 |
| 17.63 | 5.03 | 8 |
| 19.45 | 4.56 | 13 |
| 22.21 | 4.00 | 5 |

TABLE 2C

| 2θ (degrees) | d-spacing (Å) | Relative Intensity |
| --- | --- | --- |
| 5.90 | 14.98 | 100 |
| 7.45 | 11.86 | 3 |
| 8.81 | 10.03 | 26 |
| 11.57 | 7.64 | 48 |
| 13.02 | 6.79 | 9 |
| 14.75 | 6.00 | 33 |
| 17.00 | 5.21 | 12 |
| 17.64 | 5.02 | 8 |
| 19.45 | 4.56 | 17 |
| 22.16 | 4.01 | 6 |
| 23.19 | 3.83 | 3 |
| 23.60 | 3.77 | 2 |
| 24.47 | 3.63 | 3 |
| 26.08 | 3.41 | 7 |

TABLE 2C-continued

| 2θ (degrees) | d-spacing (Å) | Relative Intensity |
|---|---|---|
| 27.38 | 3.26 | 7 |
| 29.91 | 2.99 | 2 |
| 35.92 | 2.50 | 1 |
| 36.83 | 2.44 | 2 |

Figure 4B:
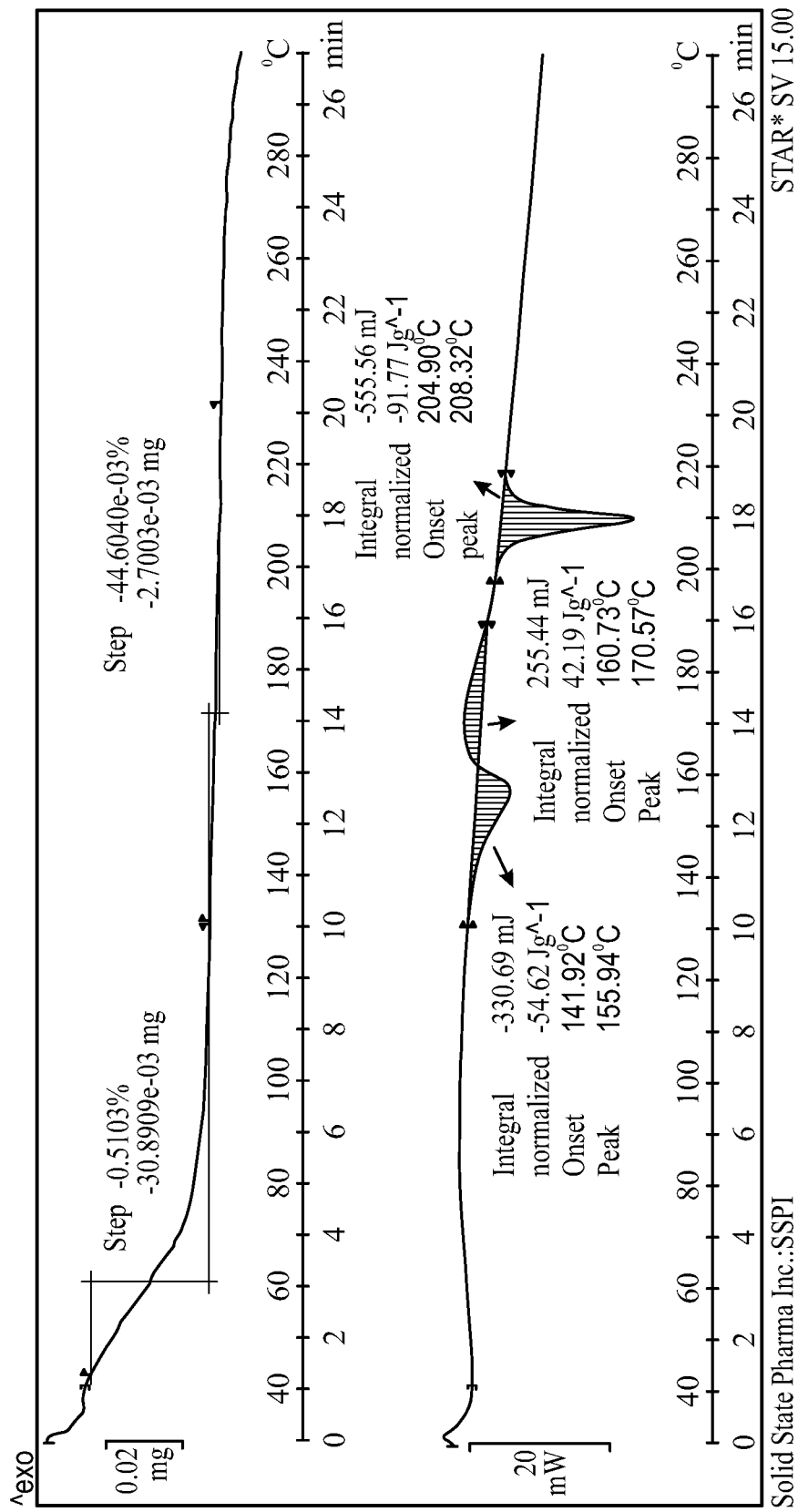
FIG. 4B shows DSC and TGA thermograms obtained from pralsetinib free base in a solid form designated as solid form B.

The Solid Form B of Compound (I) can be obtained by heating a sample of Solid Form B to 150° C. was characterized by differential scanning calorimetry (DSC) endotherm and by the thermogravimetric analysis (TGA) to obtain the plots shown in FIG. 4B.

Figure 23A:
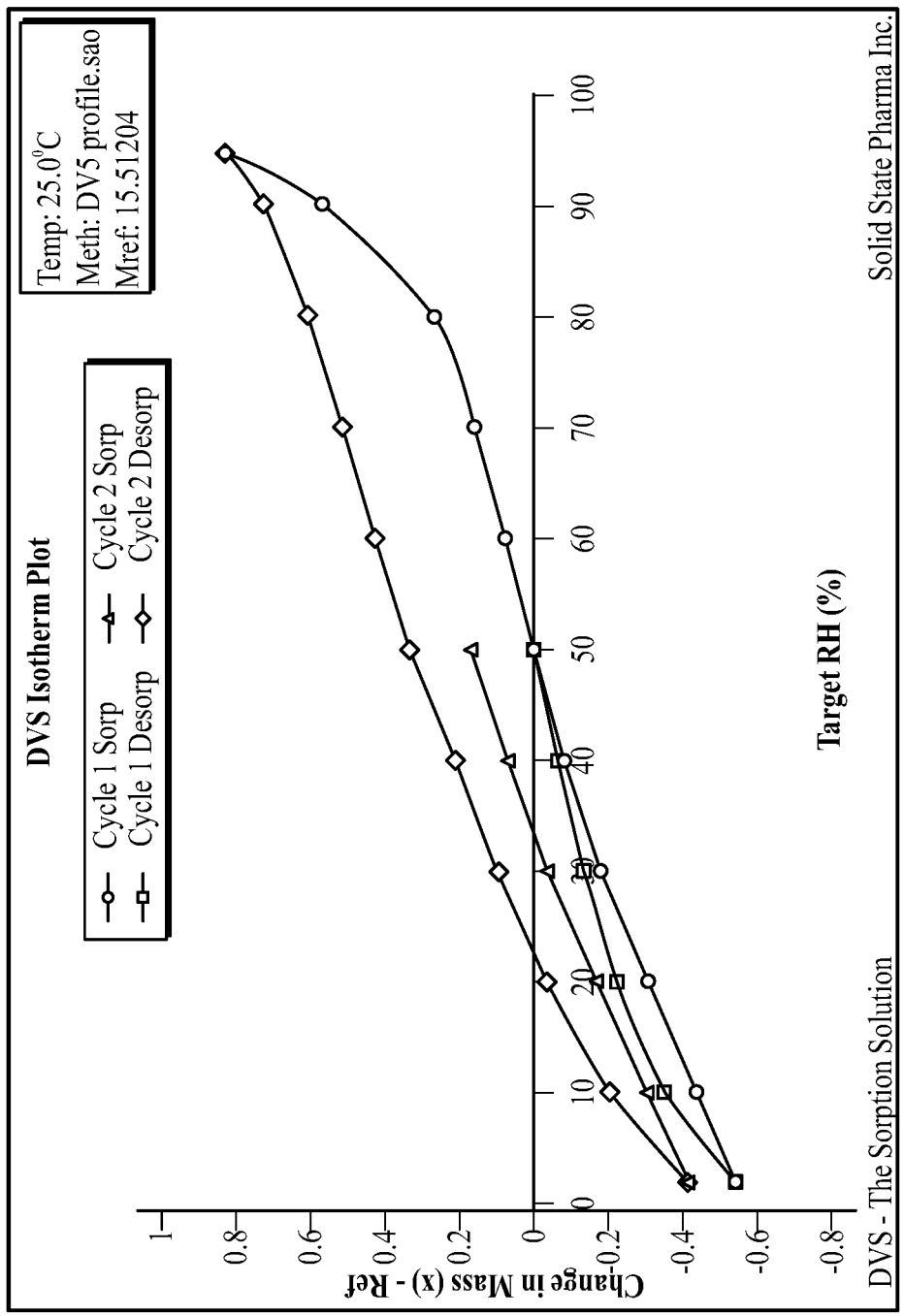
FIG. 23A is a DVS isotherm obtained from a sample of pralsetinib free base in Solid Form B.
Figure 23B:
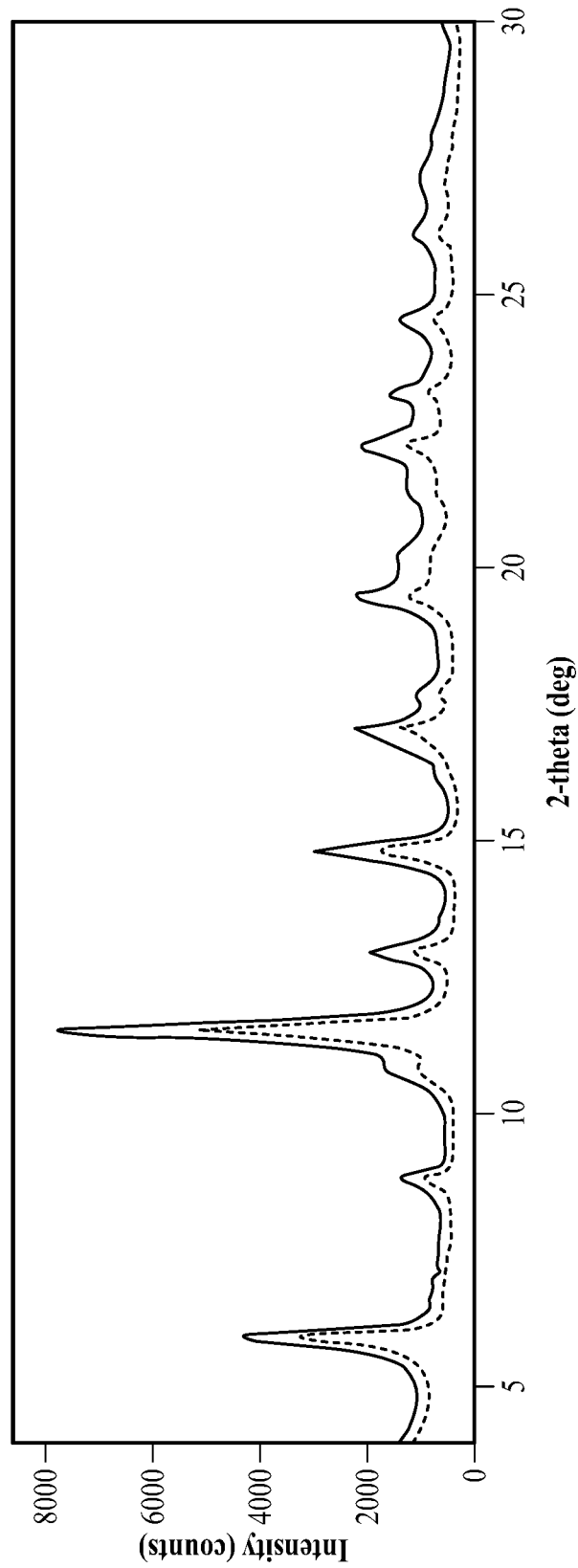
FIG. 23B shows the XRPD pattern obtained from the sample of pralsetinib free base in Solid Form C before (top trace) and after (bottom trace) DVS measurement shown in FIG. 23A.

The DVS isotherms for Pattern B are shown in FIG. 23A. The sample showed a total mass change of 1.4 wt. % between 2% and 95% relative humidity. A simple drying experiment was done by putting Pattern C (filtered from a slurry sample) at 50° C. under vacuum. The resulting solid was pattern B by XRD. Samples of pralsetinib free base characterized by XRPD Pattern B (a dehydrate of Pattern C) were not observed to convert back to hydrate XRPD Pattern C during high humidity exposure.

Figure 5A:
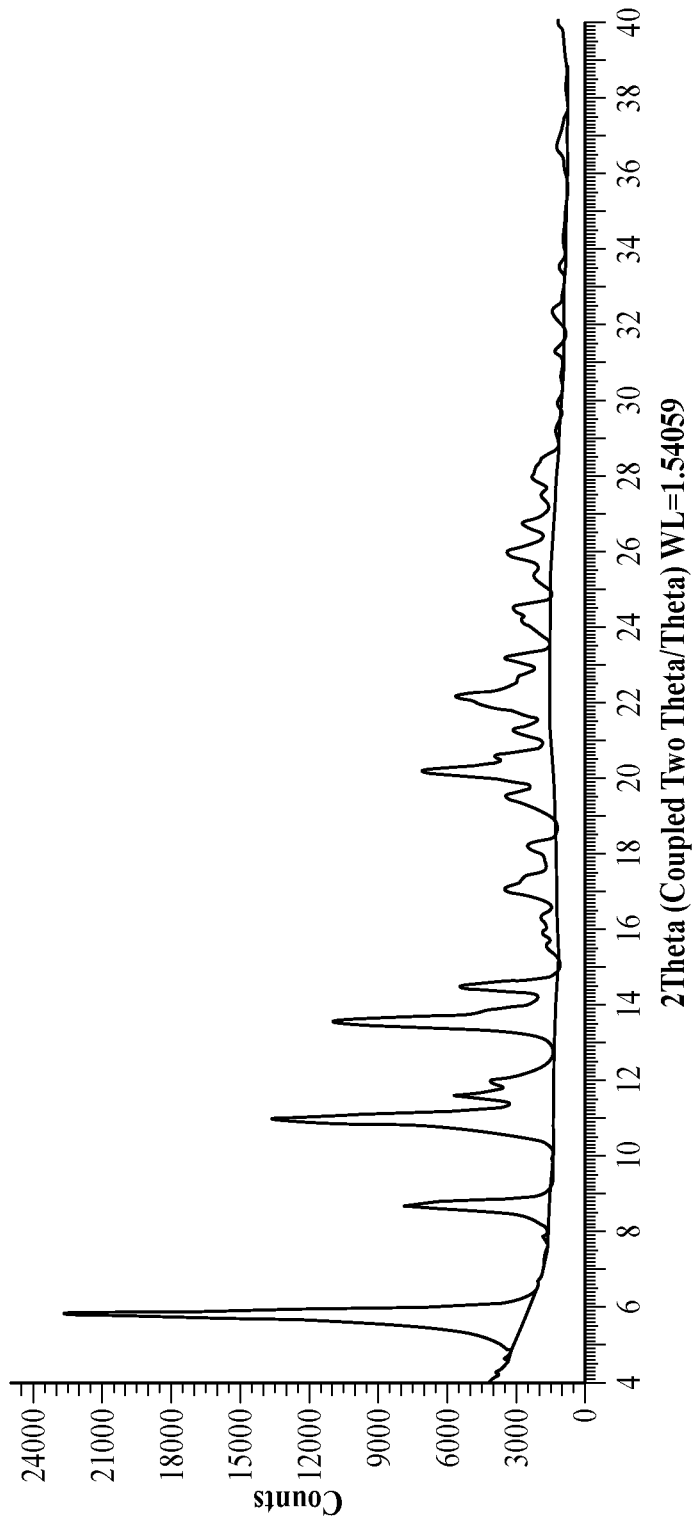
FIG. 5A is a XPPD pattern designated as Pattern C obtained from pralsetinib free base designated as solid form C, from 4-40 degrees 2-theta.

A third pralsetinib free base solid form designated as Form C can be identified by a X-ray powder diffraction (XRPD) pattern comprising characteristic diffraction peaks at 2-theta angles at approximately (±0.2 degrees) 5.8°, 8.7°, 11.0°, 13.6°, and 20.2°. FIG. 5A is a XRPD pattern obtained from the free base solid form C of the free base of Compound (I); Table 3A, Table 3B, Table 3C and Table 3D are each a list of XPRD (2-theta) peaks obtained from Solid Form C of the free base of Compound (I).

TABLE 3A

| 2-theta (deg) | d-Spacing (ang.) | Relative Intensity |
|---|---|---|
| 5.81 | 15.21 | 100 |
| 8.69 | 10.17 | 32 |
| 10.96 | 8.06 | 60 |
| 13.56 | 6.52 | 48 |
| 20.19 | 4.39 | 29 |

TABLE 3B

| 2-theta (deg) | d-Spacing (ang.) | Relative Intensity |
|---|---|---|
| 5.81 | 15.21 | 100 |
| 8.69 | 10.17 | 32 |
| 10.96 | 8.06 | 60 |
| 31.59 | 7.63 | 21 |
| 13.56 | 6.52 | 48 |
| 14.49 | 6.11 | 21 |
| 20.19 | 4.39 | 29 |
| 22.18 | 4.00 | 20 |
| 23.20 | 3.83 | 10 |

TABLE 3C

| 2-theta (deg) | d-Spacing (ang.) | Relative Intensity |
|---|---|---|
| 5.81 | 15.21 | 100 |
| 8.69 | 10.17 | 32 |
| 10.96 | 8.06 | 60 |
| 11.59 | 7.63 | 21 |
| 11.96 | 7.40 | 14 |
| 13.56 | 6.52 | 48 |
| 14.49 | 6.11 | 21 |

TABLE 3C-continued

| 2-theta (deg) | d-Spacing (ang.) | Relative Intensity |
|---|---|---|
| 17.09 | 5.19 | 12 |
| 18.19 | 4.87 | 6 |
| 19.51 | 4.55 | 11 |
| 20.19 | 4.39 | 29 |
| 20.58 | 4.31 | 12 |
| 21.27 | 4.17 | 8 |
| 22.18 | 4.00 | 20 |
| 22.63 | 3.93 | 7 |
| 23.20 | 3.83 | 10 |
| 24.18 | 3.68 | 6 |
| 24.48 | 3.63 | 9 |
| 26.00 | 3.42 | 10 |
| 26.75 | 3.33 | 7 |
| 28.08 | 3.18 | 5 |

TABLE 3D

| 2θ (degrees) | d-spacing (Å) | Relative Intensity |
|---|---|---|
| 5.80 | 15.23 | 100 |
| 8.67 | 10.19 | 29 |
| 10.97 | 8.06 | 64 |
| 11.58 | 7.63 | 17 |
| 11.93 | 7.41 | 14 |
| 13.58 | 6.52 | 52 |
| 14.46 | 6.12 | 11 |
| 16.33 | 5.42 | 4 |
| 17.01 | 5.21 | 13 |
| 18.20 | 4.87 | 4 |
| 19.50 | 4.55 | 8 |
| 20.16 | 4.40 | 23 |
| 20.60 | 4.31 | 5 |
| 21.28 | 4.17 | 4 |
| 21.93 | 4.05 | 5 |
| 22.20 | 4.00 | 20 |
| 23.18 | 3.83 | 4 |
| 24.07 | 3.69 | 2 |
| 24.47 | 3.63 | 4 |
| 25.97 | 3.43 | 10 |
| 26.73 | 3.33 | 5 |
| 27.51 | 3.24 | 1 |
| 28.11 | 3.17 | 9 |
| 31.31 | 2.85 | 1 |
| 32.33 | 2.77 | 4 |
| 33.53 | 2.67 | 1 |
| 34.48 | 2.60 | 1 |
| 36.79 | 2.44 | 4 |

Figure 5B:
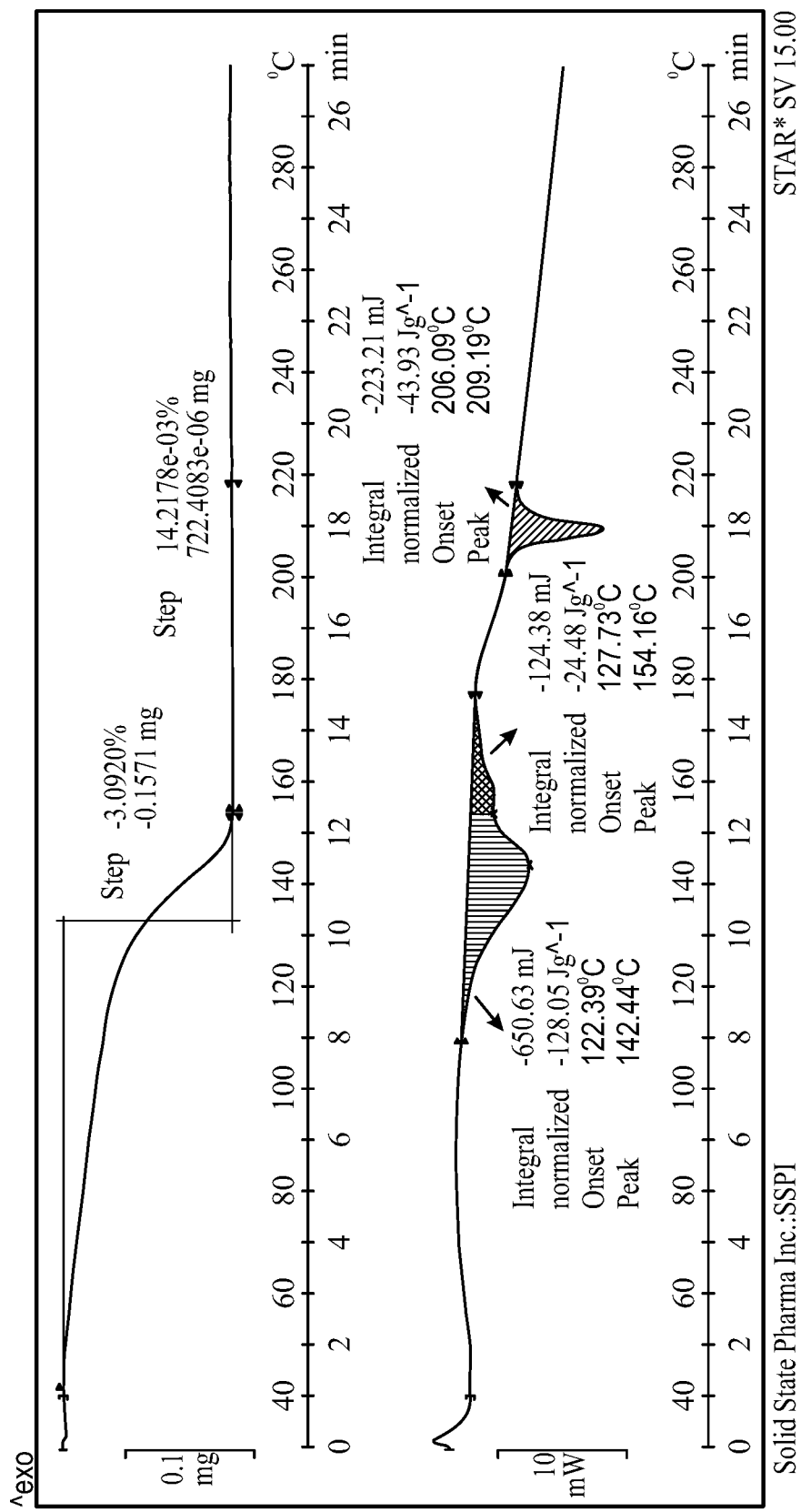
FIG. 5B shows DSC and TGA thermograms of the material tested in FIG. 4A, obtained from pralsetinib free base designated as solid form C.

Solid Form C is a hydrate solid form, which remained when slurrying this solid form in multiple solvents. Solid Form C was also recrystallized in various water containing solvent systems (acetone:water, MeOH:water, IPA:water, DMAc:water, THF:water). The Solid Form C of the free base of Compound (I) was characterized by differential scanning calorimetry (DSC) endotherm and by the thermogravimetric analysis (TGA) plots shown in FIG. 5B. The DSC thermogram onsets occurring at 122°, 127°, and 206°. The TGA shows a 3.09 wt. % mass loss.

Figure 21A:
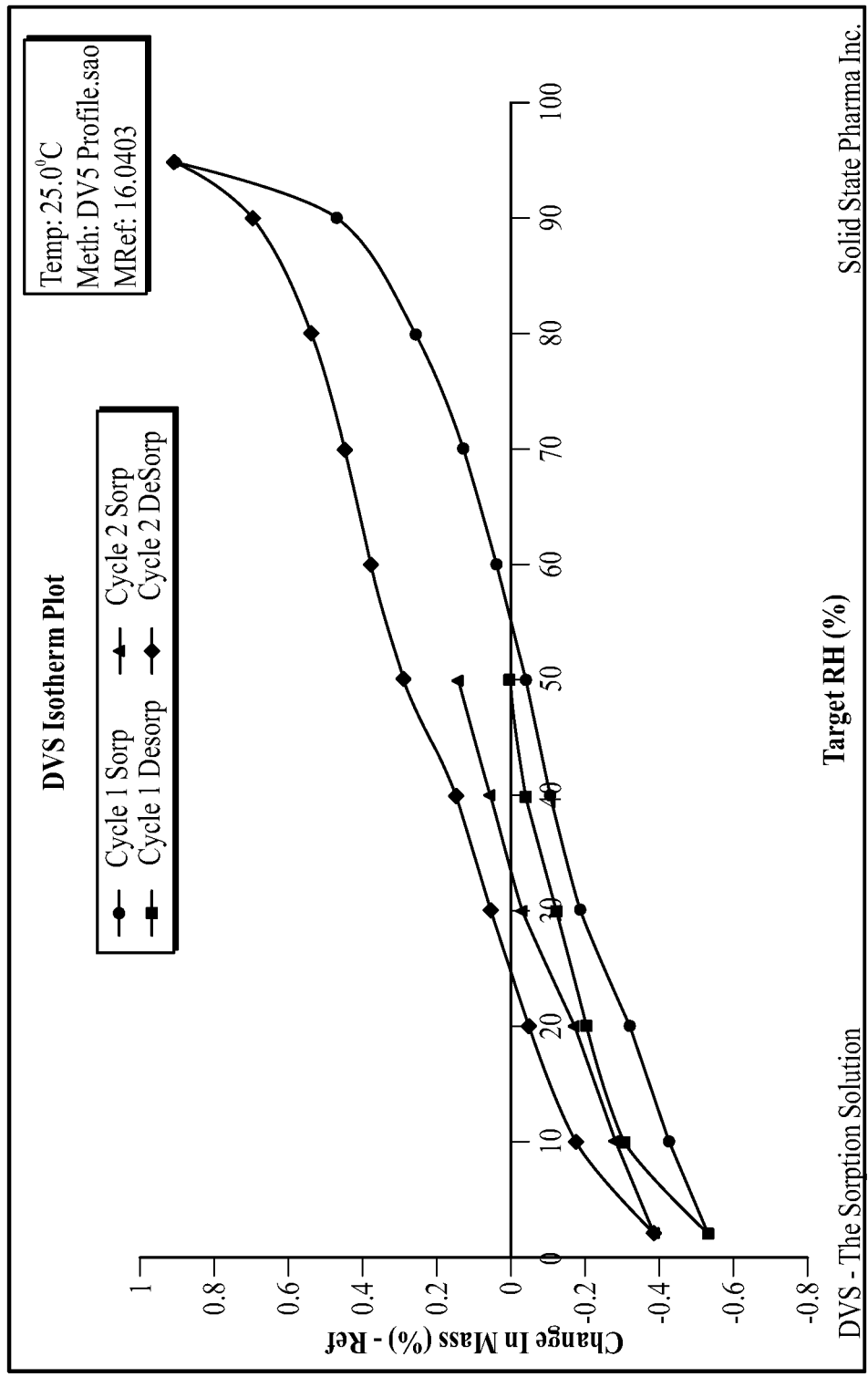
FIG. 21A is a DVS isotherm of a sample of pralsetinib free base in Solid Form C.
Figure 21B:
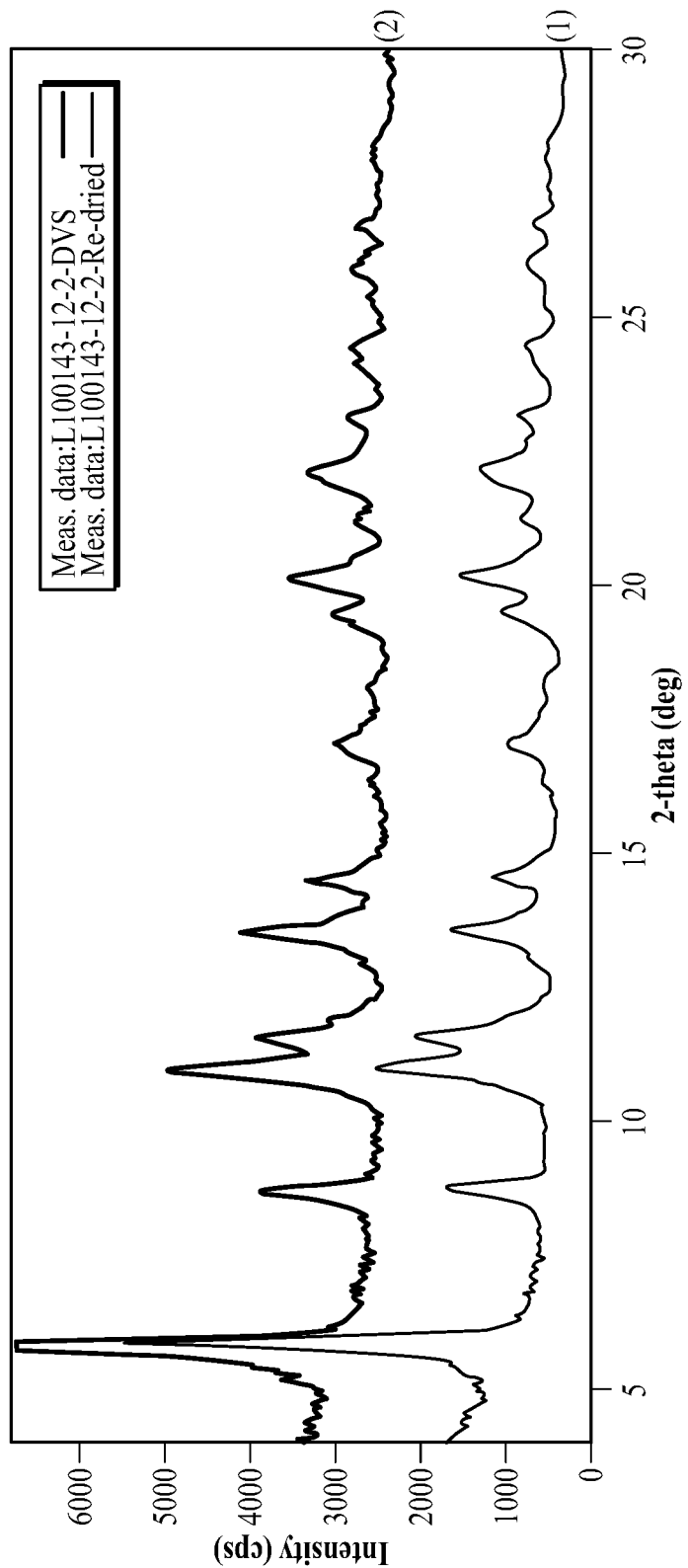
FIG. 21B shows the XRPD pattern obtained from the sample of pralsetinib free base before (1) an after (2) DVS isotherm measurement shown in FIG. 21A.
Figure 22A:
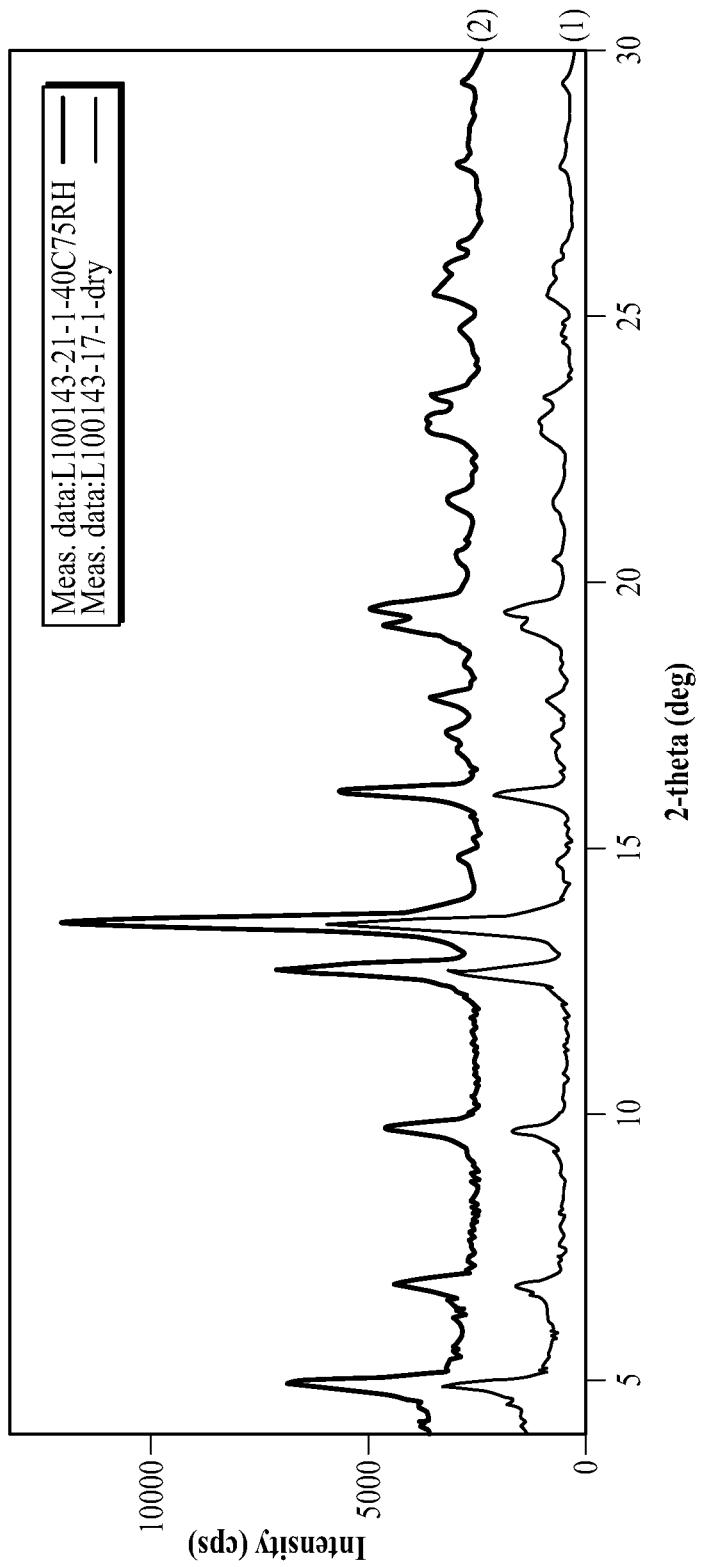
FIG. 22A shows the XRPD pattern obtained from a sample of pralsetinib free base in Solid Form A before (1) and after (2) one week of humidity exposure (75% RH at 40 degrees C. for one week).
Figure 22B:
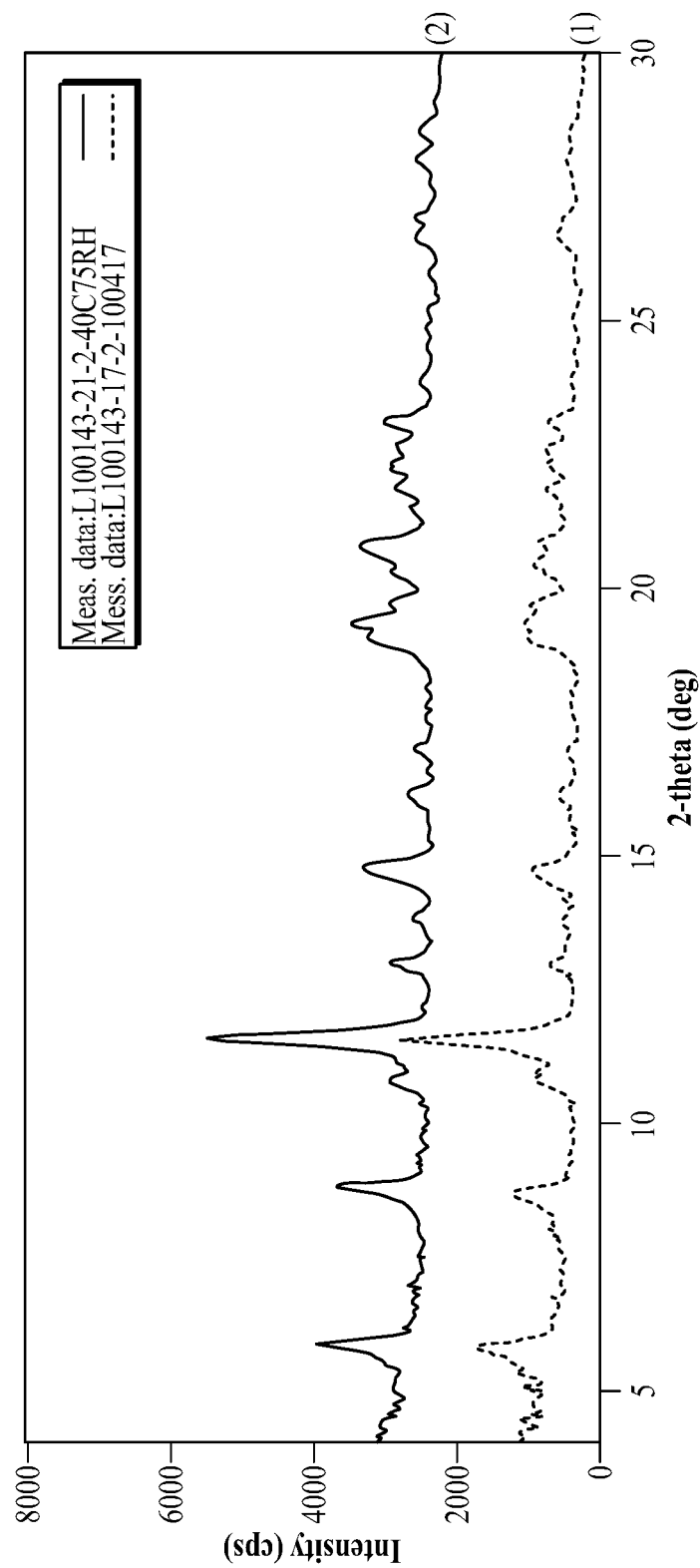
FIG. 22B shows the XRPD pattern obtained from a sample of pralsetinib free base in Solid Form B before (1) and after (2) one week of humidity exposure (75% RH at 40 degrees C. for one week).
Figure 22C:
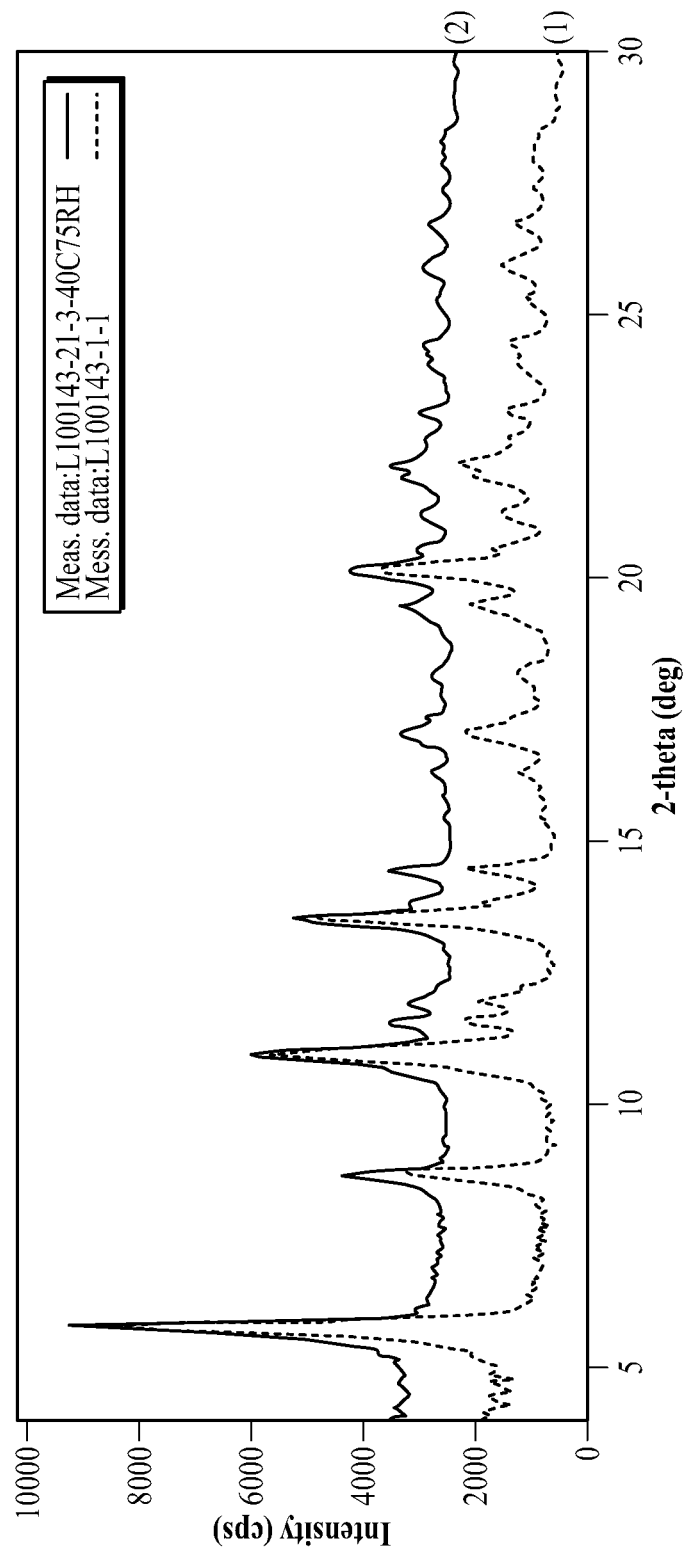
FIG. 22C shows the XRPD pattern obtained from a sample of pralsetinib free base in Solid Form C before (1) and after (2) one week of humidity exposure (75% RH at 40 degrees C. for one week).

DVS was performed on a sample of the pralsetinib free base in Solid Form C. The total mass change observed was 1.4 wt. %. The DVS isotherms are shown in FIG. 21A. XRPD of the sample before and after DVS measurement was the same (FIG. 22C).

The pralsetinib free base in solid form characterized by XRPD Pattern A converted to a praletinib free base material characterized by XRPD Pattern C during competitive slurry experiments in methanol:water at high ratios of water to methanol and lower temperatures. Solid Form C of the pralsetinib free base was also found to be crystalline throughout the screening. Solid Form C of pralsetinib free base was recrystallized in various water containing solvent systems (acetone:water, methanol:water, isopropanol:water, dimethylacetamide:water, tetrahydrofuran:water). Solid Form A of pralsetinib free base did not convert to Solid Form C of the pralsetinib free base after prolonged humidity exposure.

The pralsetinib free base material in solid form C was stable drying at 50° C. under vacuum, and converted to Pattern B (anhydrous) upon heating to 150° C. Pralsetinib free base in solid form B then converted to pralsetinib material in solid form A before melting. Solid form C of the pralsetinib free base remained stable by X-ray powder diffraction during humidity testing (75% relative humidity and 40 C for one week, and cycling down to 2% relative humidity by dynamic vapor sorption). Solid form C of pralsetinib free base was not as hygroscopic as pralsetinib free base in solid form A during the dynamic vapor sorption measurements, gaining only 1.44% water. Solid form C of the pralsetiib free base was converted to solid form A of the pralsetinib free base during competitive slurry experiments in acetone and isopropanol. A summary of Patterns A and C properties are presented in Table 3E below.

TABLE 3E

| Solid | Crystallinity | DSC Onsets (° C.) | DVS Water Mass Change (wt. %) | Competitive slurry MeOH: water (1:1 vol) at 23 and 50° C. | Competitive slurry isopropanol, MeOH:MtBE |
|---|---|---|---|---|---|
| Pattern A | high | 205-206 | 10.2 | A converts to C | A stable |
| Pattern C | moderate to high | 122, 127, 206 | 1.29-1.44 | C stable | C converts to A |

Samples of the solid forms of the free base of Compound (I) characterized by XRPD Patterns A, B (with small extra peaks) and C were exposed to 75% relative humidity at 40° C. for one week. Solids were collected for XRPD analysis after one week. XRPD of Patterns A, B, and C remained unchanged after one week. FIG. 22A is an XRPD of pattern of Solid Form A of the free base of Compound (I), before (1) and after (2) one week humidity exposure. FIG. 22B is an XRPD of pattern of Solid Form B of the free base of Compound (I), before (1) and after (2) one week humidity exposure. FIG. 22C is an XRPD of pattern of Solid Form C of the free base of Compound (I), before (1) and after (2) one week humidity exposure.

Figure 1B:
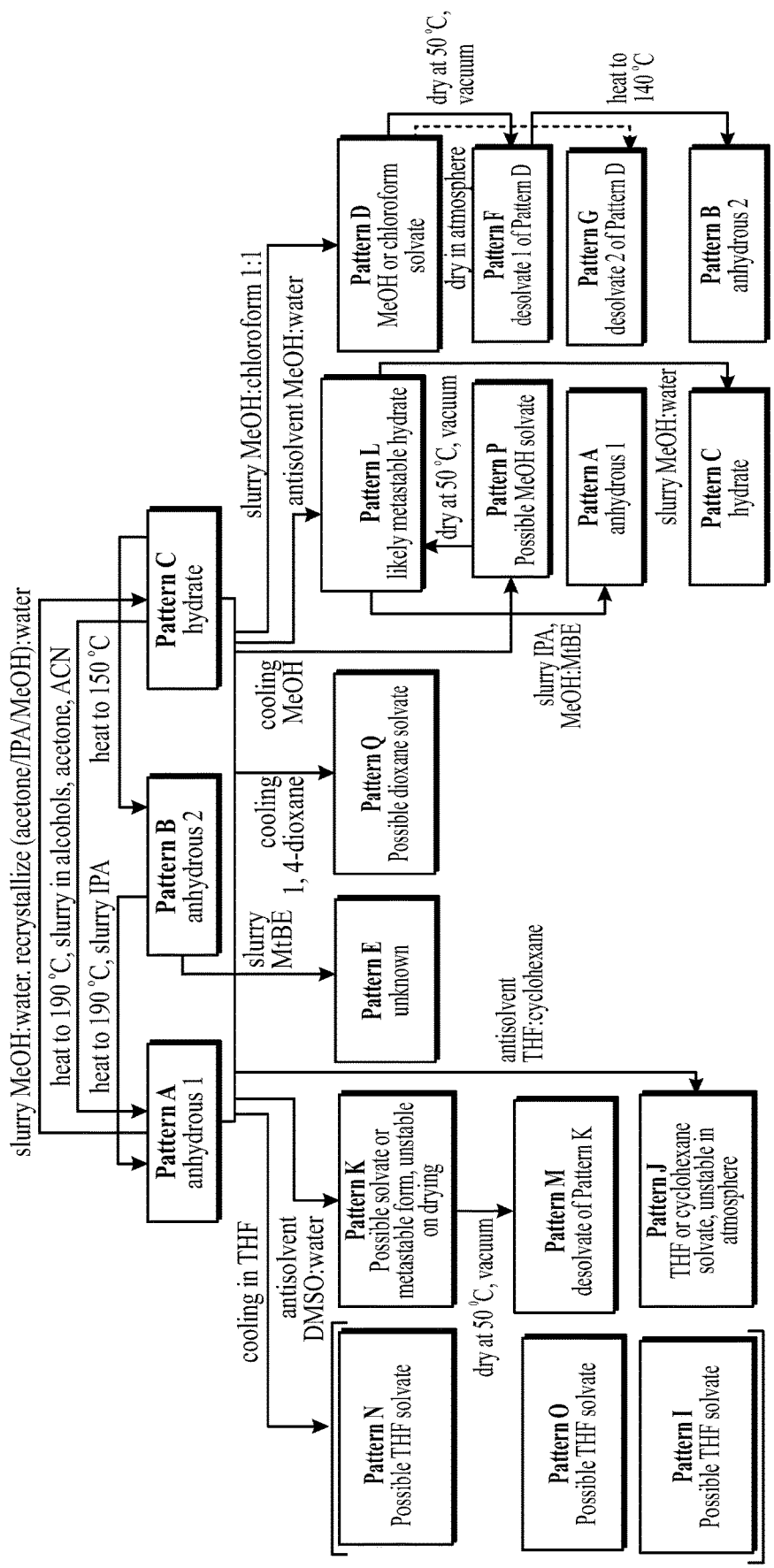
FIG. 1B is a schematic showing additional solid forms of the free base of pralsetinib.

FIG. 1B is a schematic summarizing additional solid forms of the free base of pralsetinib. A total of 14 additional solid forms of the pralsetinib free base were also prepared and observed (designated Solid Forms D, F, G, H, I J, K, L, M, N, O, P and Q, in addition to an amorphous form), and prepared as described in the Examples. Many of these solid forms can be converted to solid forms A, B or C of the pralsetinib free base.

Figure 6:
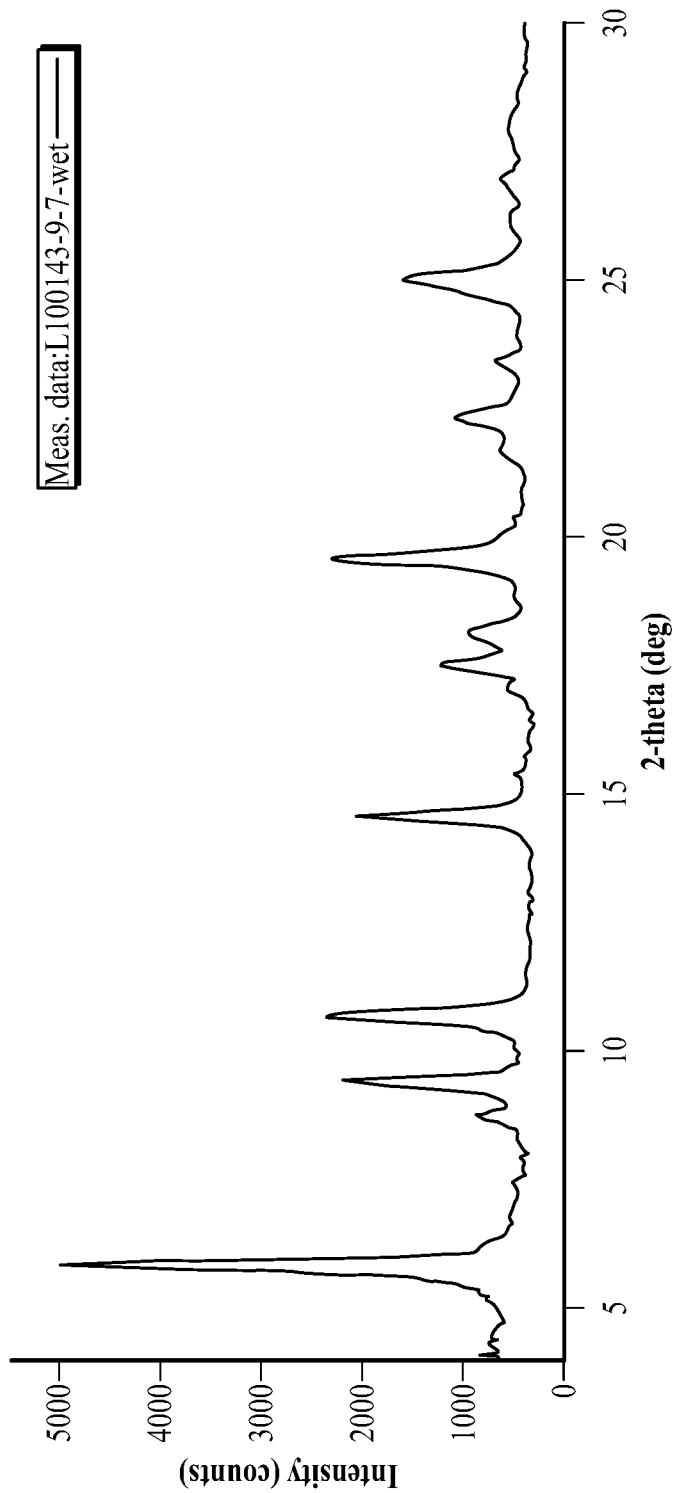
FIG. 6 is a XPPD pattern designated as Pattern D obtained from pralsetinib free base designated as solid form D.

Solid Form D was observed as a wet solid, and subsequently converted to solid form B (e.g., characterized by the XPRD pattern in FIG. 4A and/or a TGA or DSC thermogram in FIG. 4B), solid form F (e.g., characterized by the XRPD pattern in FIG. 7A and/or the DSC/TGA thermogram patters in FIG. 7B), or solid form G (e.g., characterized by the XRPD pattern in FIG. 8A and/or the DSC/TGA thermogram patters in FIG. 8B) depending on the drying regime used. Solid Form D also converted to other solid forms sitting in atmosphere. FIG. 6 is a XRPD pattern obtained from the free base solid form D of Compound (I); Table 4 is a list of XPRD (2-theta) peaks obtained from the Solid Form D of the free base of Compound (I).

TABLE 4

| 2θ (degrees) | d-spacing (Å) | Relative Intensity |
|---|---|---|
| 5.86 | 15.06 | 100 |
| 8.72 | 10.13 | 8 |
| 9.44 | 9.36 | 40 |
| 10.71 | 8.25 | 52 |
| 14.60 | 6.06 | 37 |
| 17.53 | 5.06 | 21 |
| 18.20 | 4.87 | 1 |
| 19.64 | 4.52 | 51 |
| 21.62 | 4.11 | 7 |
| 22.30 | 3.98 | 13 |
| 23.36 | 3.81 | 3 |
| 25.05 | 3.55 | 33 |
| 26.97 | 3.30 | 3 |
| 27.85 | 3.20 | 4 |

Solid Form E of Compound (I) was observed when slurrying the free base Solid Form B sample in MtBE.

Figure 7A:
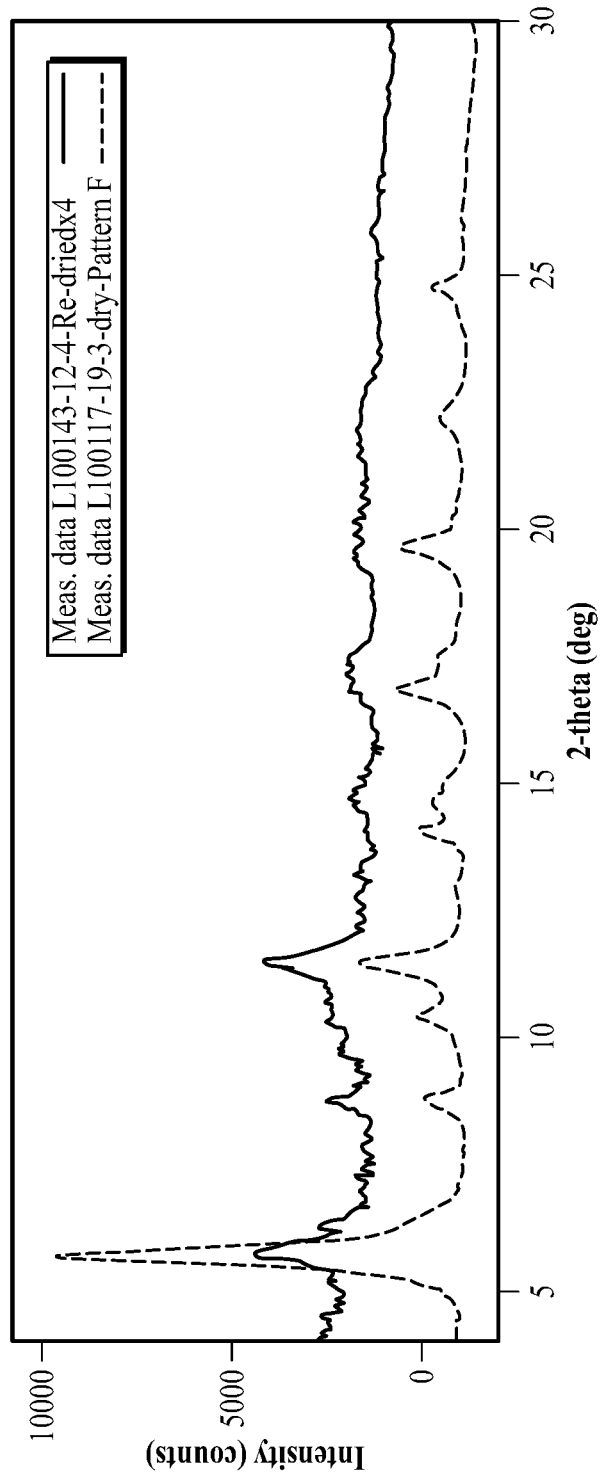
FIG. 7A is a XPPD pattern designated as Pattern F obtained from pralsetinib free base designated as solid form F.

Solid Form F of the free base of Compound (I) was observed as a desolvate of Solid Form D. FIG. 7A is a XRPD patterns obtained from two different samples of the free base Solid Form F of Compound (I). The XRPD pattern of Solid Form F shown in FIG. 7A was obtained upon drying a sample of Solid Form D (providing the XRPD Pattern D in FIG. 6) at 50° C. under vacuum. The Solid Form F material was not recrystallized directly. Table 5 is a list of XPRD (2-theta) peaks obtained from Solid Form F of the free base of Compound (I).

TABLE 5

| 2θ (degrees) | d-spacing (Å) | Relative Intensity |
|---|---|---|
| 5.66 | 15.59 | 100 |
| 8.75 | 10.09 | 5 |
| 10.37 | 8.53 | 8 |
| 11.44 | 7.73 | 27 |
| 14.01 | 6.31 | 12 |
| 16.87 | 5.25 | 17 |
| 19.71 | 4.50 | 14 |
| 22.24 | 3.99 | 5 |
| 24.72 | 3.60 | 7 |

Figure 7B:
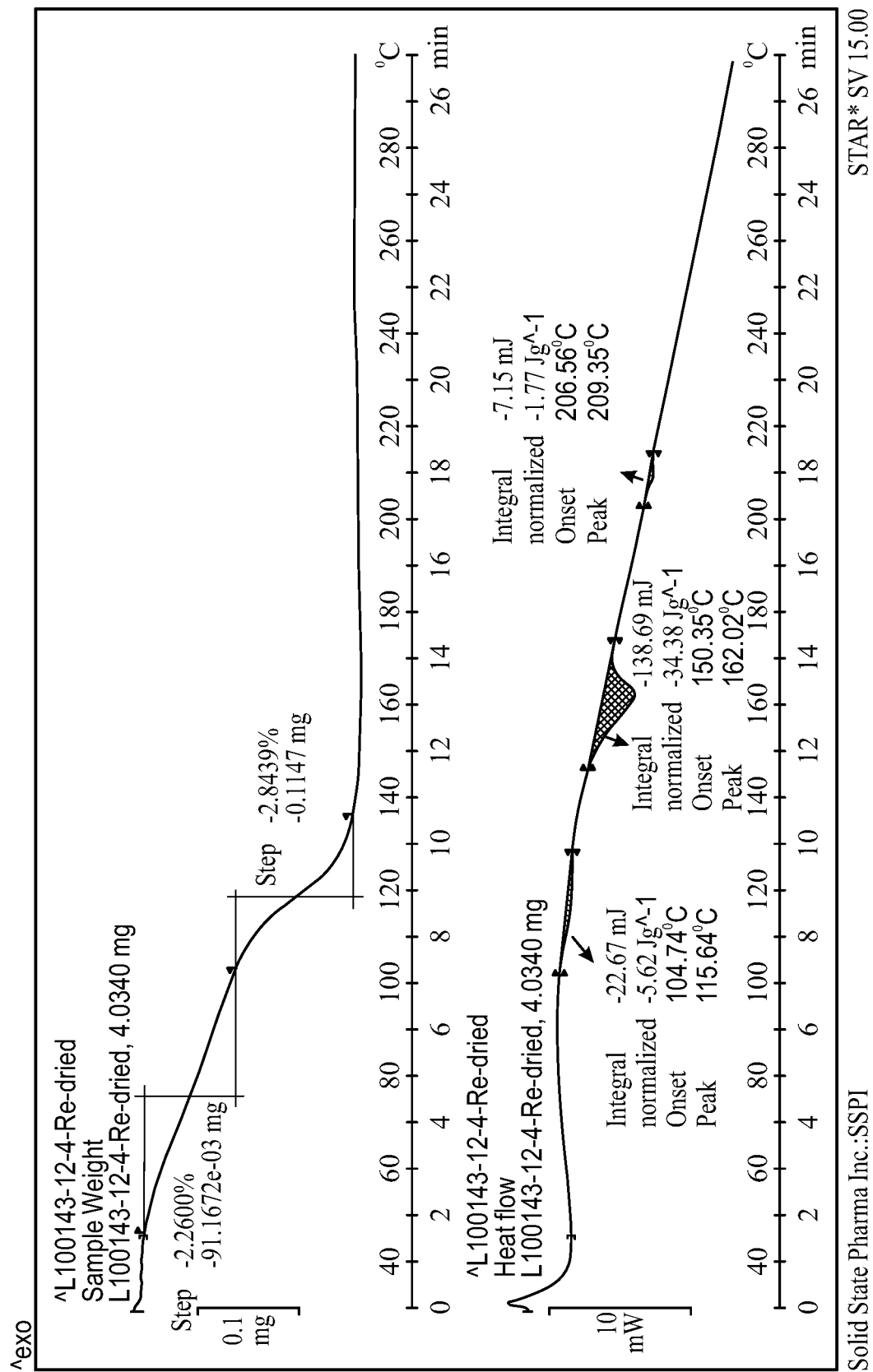
FIG. 7B shows DSC and TGA thermograms of the material tested in FIG. 7A, obtained from pralsetinib free base designated as solid form F.

The Solid Form F of the free base of Compound (I), obtained by drying a sample of Solid Form D (characterized by the XRPD pattern of FIG. 6) at 50° C. under vacuum, was characterized by differential scanning calorimetry (DSC) endotherm and by the thermogravimetric analysis (TGA) to obtain the plots shown in FIG. 7B.

Figure 8A:
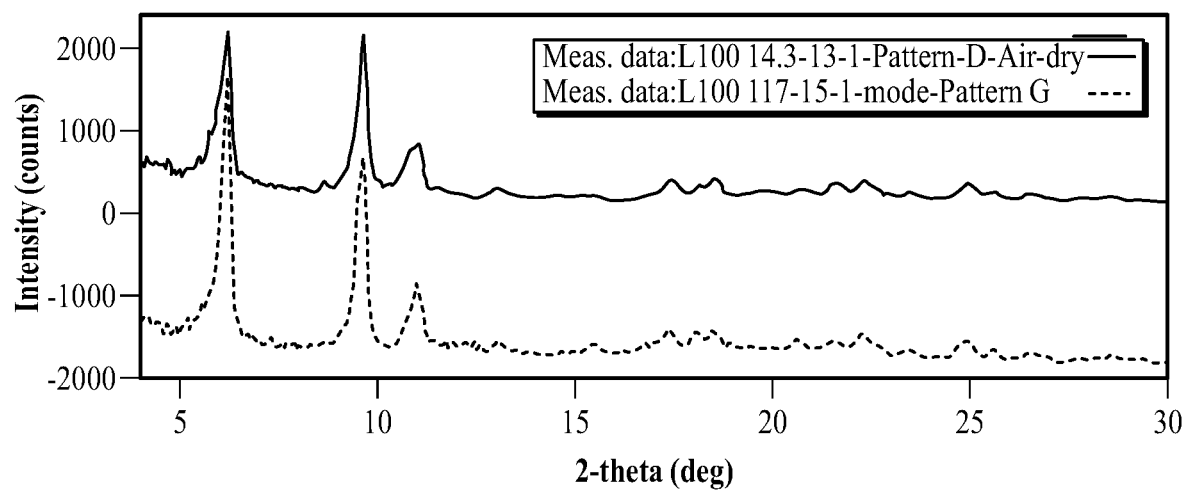
FIG. 8A is a XPPD pattern designated as Pattern G obtained from pralsetinib free base designated as solid form G.

Solid Form G of the free base of Compound (I) was observed as a desolvate of Solid Form D (characterized by the XRPD Pattern D in FIG. 6). Solid Form G was obtained upon drying material of Solid Form D in atmosphere. Solid Form G was not recrystallized directly. FIG. 8A shows two XRPD patterns: (a) an upper XRPD pattern of the free base of Compound (I) in Solid Form G obtained by air drying a sample of the free base Solid Form D of Compound (I) and (b) a lower XRPD pattern from the free base of Compound (I) in Solid Form G. The Solid Form G material was not recrystallized directly. Table 6 is a list of XPRD (2-theta) peaks obtained from the Solid Form G of the free base of Compound (I) having the upper XRPD pattern in FIG. 8A.

TABLE 6

| 2θ (degrees) | d-spacing (Å) | Relative Intensity |
| --- | --- | --- |
| 6.24 | 14.14 | 100 |
| 9.69 | 9.12 | 82 |
| 11.06 | 8.00 | 43 |
| 17.48 | 5.07 | 10 |
| 18.59 | 4.77 | 15 |
| 19.71 | 4.50 | 6 |
| 20.64 | 4.30 | 4 |
| 21.59 | 4.11 | 7 |
| 22.36 | 3.97 | 9 |
| 24.91 | 3.57 | 8 |

Figure 8B:
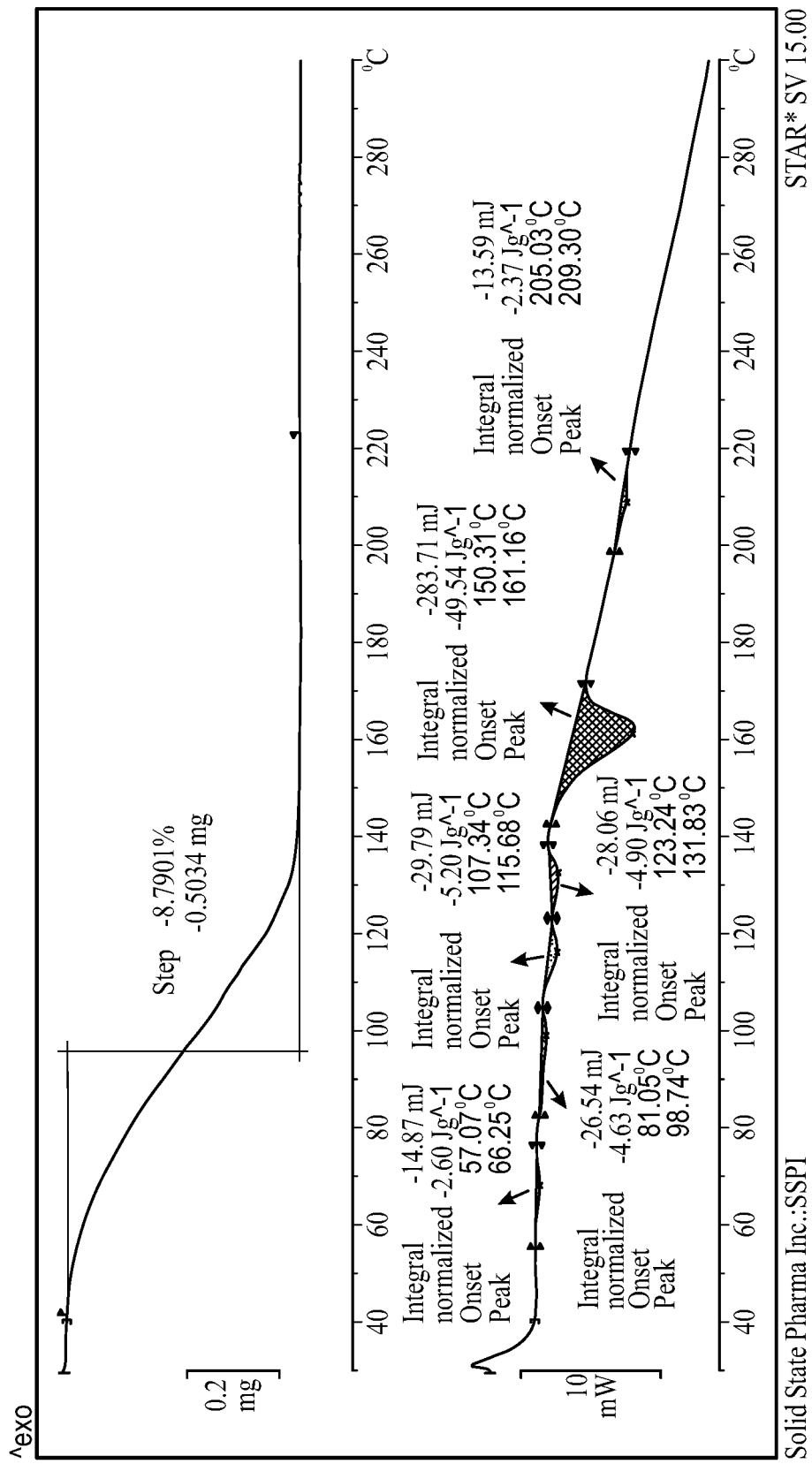
FIG. 8B shows DSC and TGA thermograms of the material tested in FIG. 8A, obtained from pralsetinib free base designated as solid form G.

The Solid Form G of the free base of Compound (I) (characterized by the upper XRPD pattern of FIG. 8A) was characterized by differential scanning calorimetry (DSC) endotherm and by the thermogravimetric analysis (TGA) to obtain the plots shown in FIG. 8B.

Figure 9A:
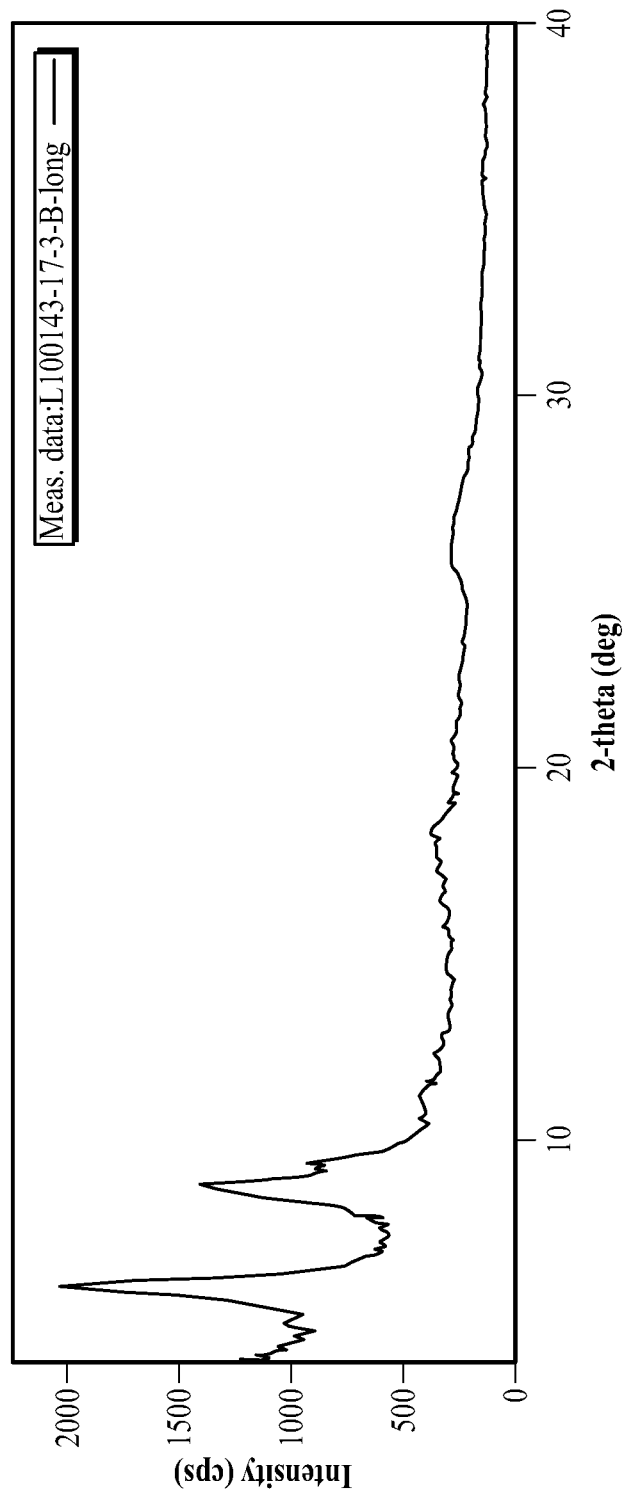
FIG. 9A is a XPPD pattern designated as Pattern H obtained from pralsetinib HCl salt designated as solid form H.

Solid Form H of the free base of Compound (I) was observed after slurrying in chloroform as a sticky solid. Solid Form H of the free base of Compound (I) was also observed after solids obtained from chloroform evaporation were subject to amorphous slurries. The composition characterized by solid form H was first observed by filtering the two day slurry in chloroform. The phase of the chloroform slurry is somewhat oily, but solids are obtained during filtration. The solid obtained by this method is sticky. Solid form H of the free base of pralsetinib was also observed during amorphous slurry experiments. FIG. 9A shows a XRPD pattern obtained from the free base of Compound (I) in Solid Form H. Table 7 is a list of XPRD (2-theta) peaks obtained from the Solid Form H of the free base of Compound (I) having the XRPD pattern in FIG. 9A.

TABLE 7

| 2θ (degrees) | d-spacing (Å) | Relative Intensity |
| --- | --- | --- |
| 6.05 | 14.60 | 100 |
| 8.76 | 10.08 | 75 |
| 9.38 | 9.42 | 16 |

Figure 9B:
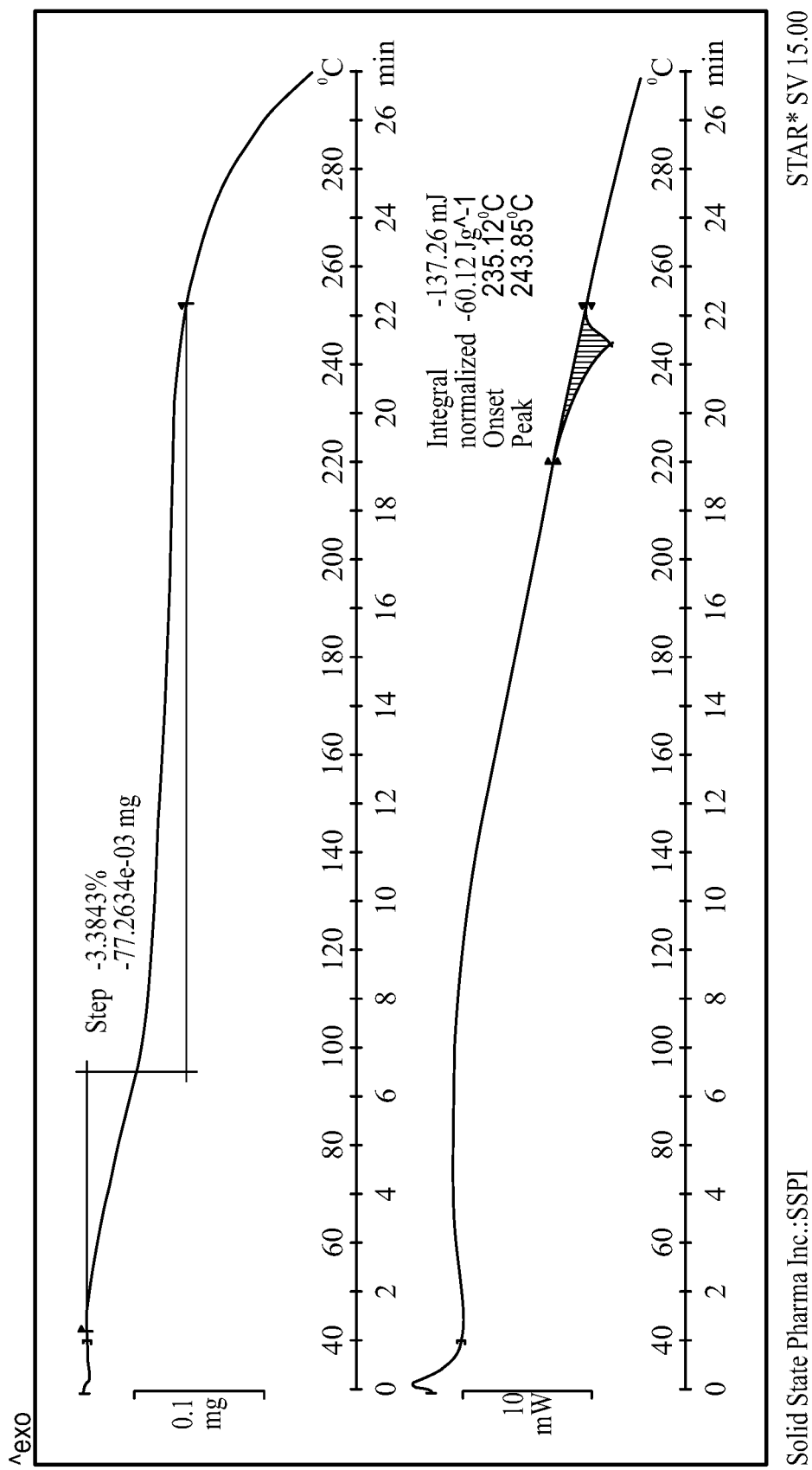
FIG. 9B shows DSC and TGA thermograms of the material tested in FIG. 9A, obtained from pralsetinib HCl salt designated as solid form H.

The Solid Form H of the free base of Compound (I) (characterized by the XRPD pattern of FIG. 9A) prepared by chloroform slurry was characterized by differential scanning calorimetry (DSC) endotherm and by the thermogravimetric analysis (TGA) to obtain the plots shown in FIG. 9B. The DSC thermogram of a Solid Form H samples showed a melting onset of 235° C. which is about 30° C. higher than that of anhydrous Compound (I) free base material that provided XRPD Pattern A. Residual solvent was below detectable levels by proton NMR.

Solid Form I of the free base of Compound (I) was observed from antisolvent recrystallization in THF/heptane and also slow cooling in THF (as a mixture with Solid Form O). Solid Form I is most likely a THF solvate based on DSC and residual THF in proton NMR.

Figure 10A:
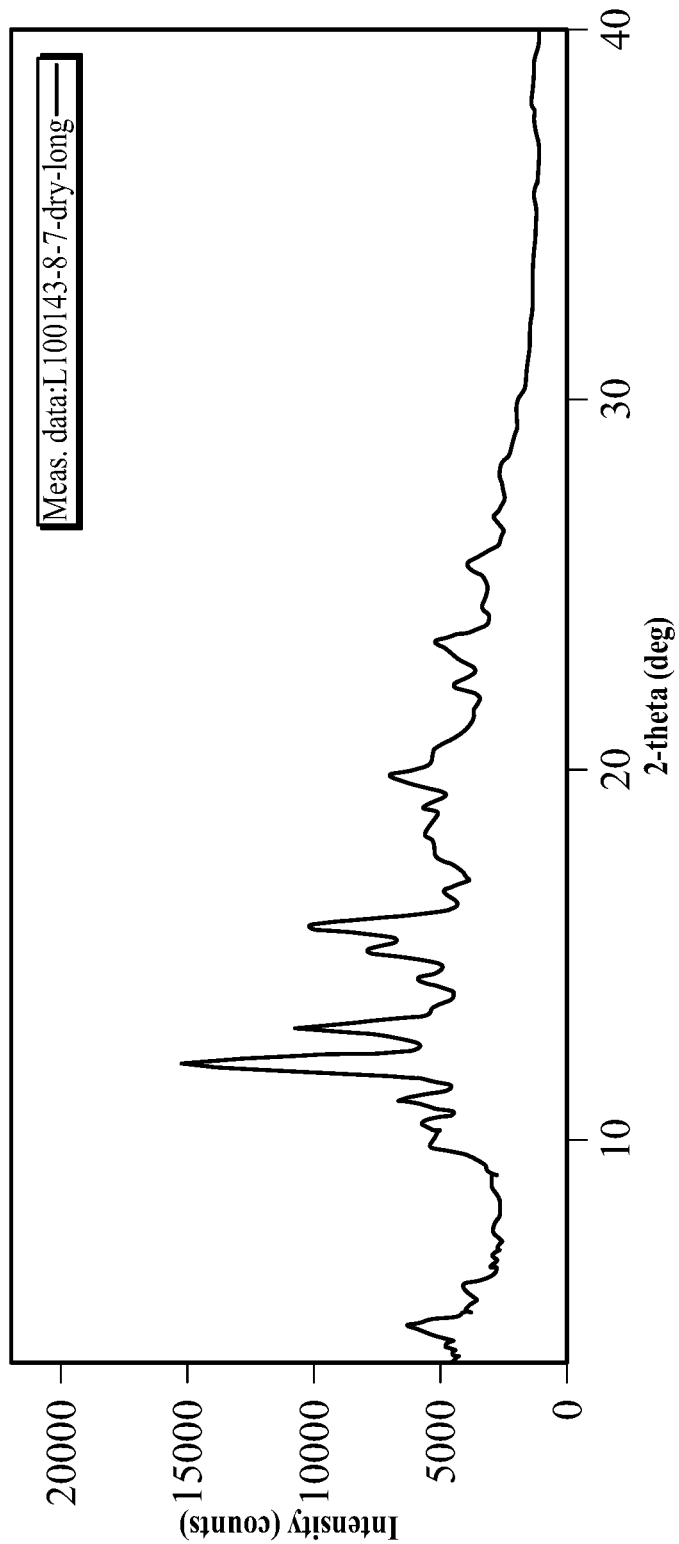
FIG. 10A is a XPPD pattern designated as Pattern I obtained from pralsetinib HCl salt designated as solid form I.

FIG. 10A is a XRPD pattern obtained from a sample of the free base of Compound (I) in Solid Form I. Table 8 is a list of XPRD (2-theta) peaks obtained from Solid Form I of the free base of Compound (I).

TABLE 8

| 2θ (degrees) | d-spacing (Å) | Relative Intensity |
| --- | --- | --- |
| 4.96 | 17.82 | 100 |
| 6.03 | 14.63 | 6 |
| 9.85 | 8.97 | 7 |
| 10.47 | 8.44 | 3 |
| 11.10 | 7.97 | 5 |
| 12.09 | 7.32 | 27 |
| 13.04 | 6.78 | 13 |
| 14.30 | 6.19 | 1 |
| 15.11 | 5.86 | 8 |
| 15.77 | 5.62 | 13 |
| 18.03 | 4.92 | 8 |
| 19.00 | 4.67 | 1 |
| 19.76 | 4.49 | 5 |
| 20.54 | 4.32 | 6 |
| 22.29 | 3.98 | 1 |
| 23.46 | 3.79 | 5 |
| 25.56 | 3.48 | 3 |
| 28.00 | 3.18 | 1 |
| 33.28 | 2.69 | 4 |

Figure 10B:
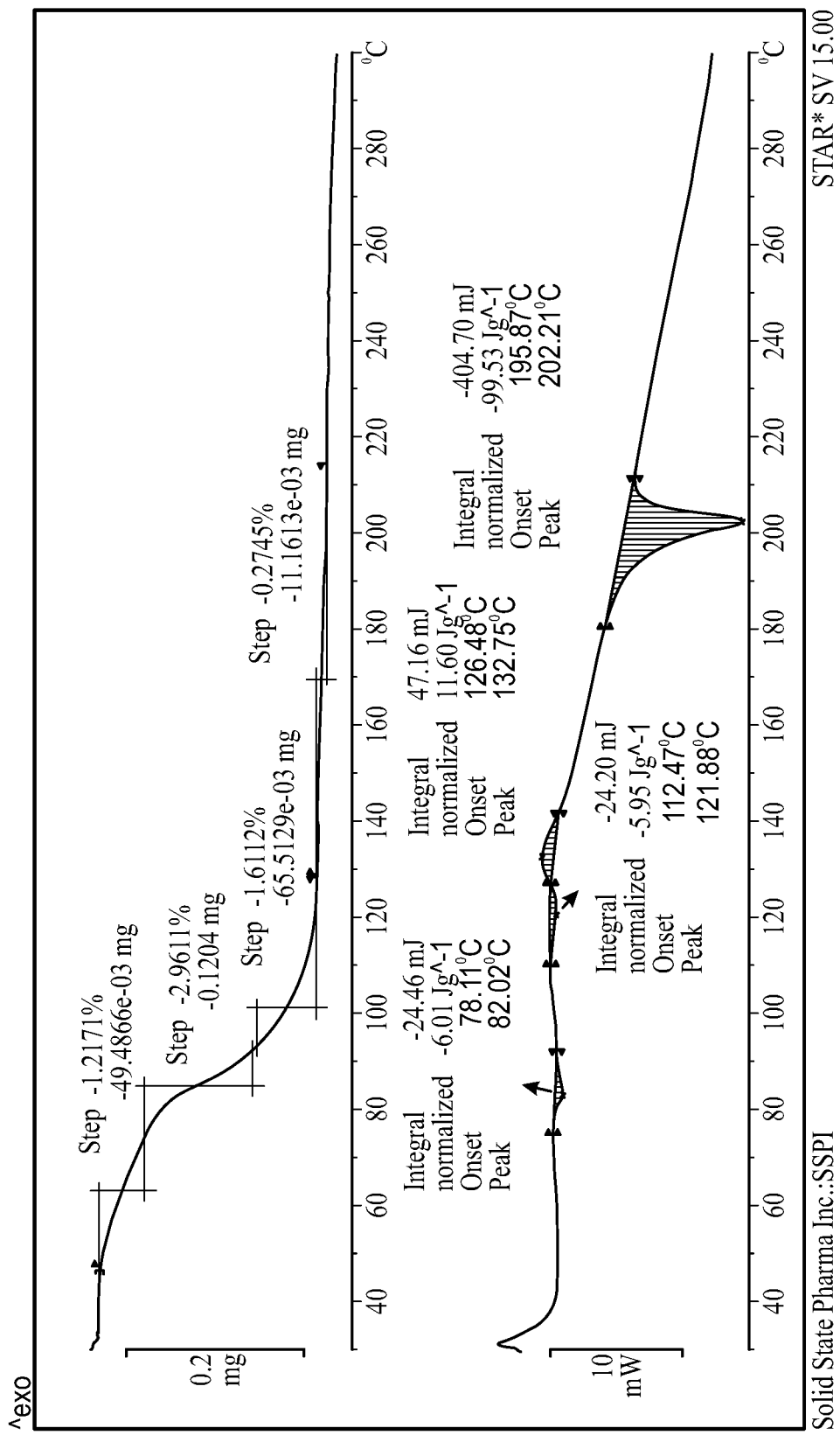
FIG. 10B shows DSC and TGA thermograms of the material tested in FIG. 10A, obtained from pralsetinib HCl salt designated as solid form I.

The Solid Form I of the free base of Compound (I) (characterized by the upper XRPD pattern of FIG. 10A) was further characterized by differential scanning calorimetry (DSC) endotherm and by the thermogravimetric analysis (TGA) to obtain the plots shown in FIG. 10B.

Figure 11:
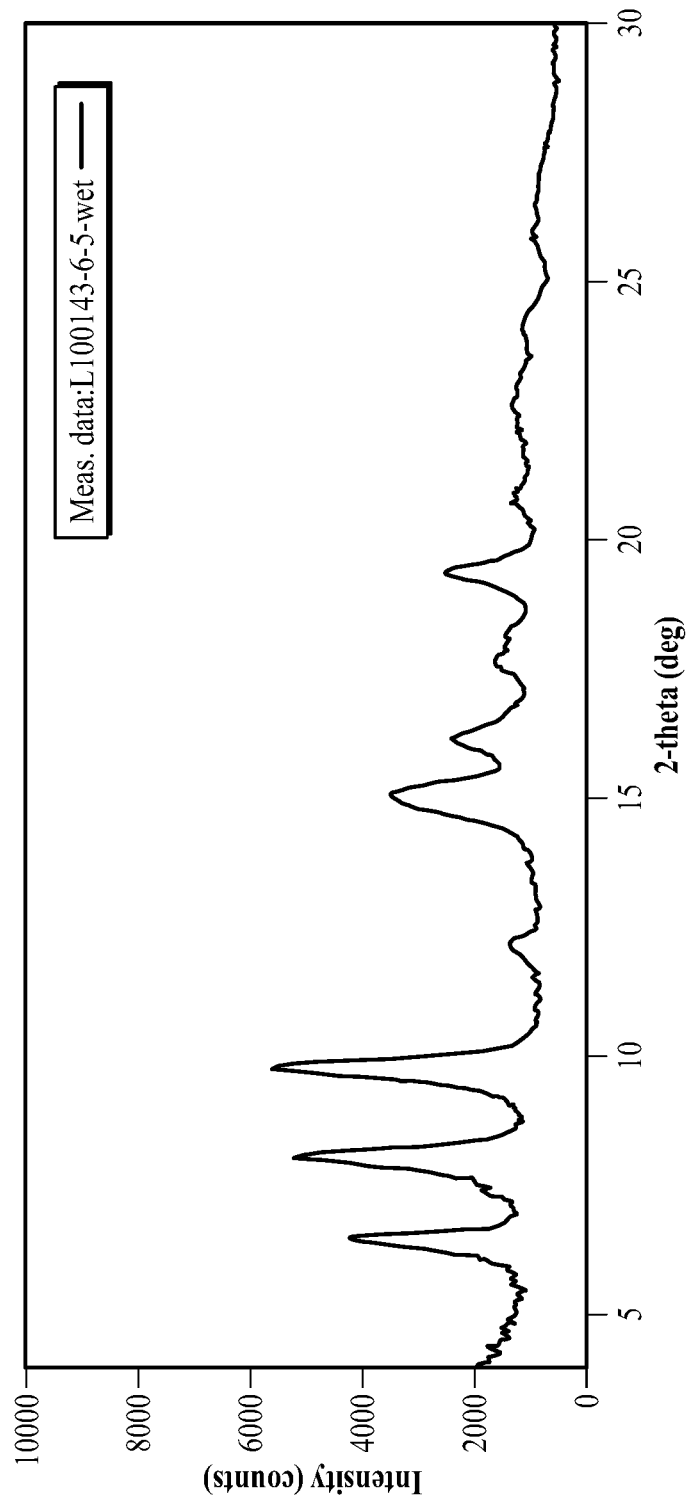
FIG. 11 is a XPPD pattern designated as Pattern J obtained from pralsetinib free base designated as solid form J.

Solid Form J of the free base of Compound (I) was observed from antisolvent recrystallization in THF/cyclohexane. Solid Form J was unstable and quickly converted to amorphous upon drying both under vacuum and in atmosphere. FIG. 11 is a XRPD pattern obtained from a sample of the free base of Compound (I) in Solid Form J. Table 9 is a list of XPRD (2-theta) peaks obtained from Solid Form J of the free base of Compound (I).

TABLE 9

| 2θ (degrees) | d-spacing (Å) | Relative Intensity |
| --- | --- | --- |
| 6.51 | 13.56 | 51 |
| 8.08 | 10.94 | 100 |
| 9.77 | 9.04 | 9 |
| 12.15 | 7.28 | 7 |
| 15.04 | 5.89 | 73 |
| 16.12 | 5.50 | 34 |
| 17.68 | 5.01 | 16 |
| 19.39 | 4.57 | 25 |
| 20.78 | 4.27 | 2 |
| 22.74 | 3.91 | 8 |

Figure 12A:
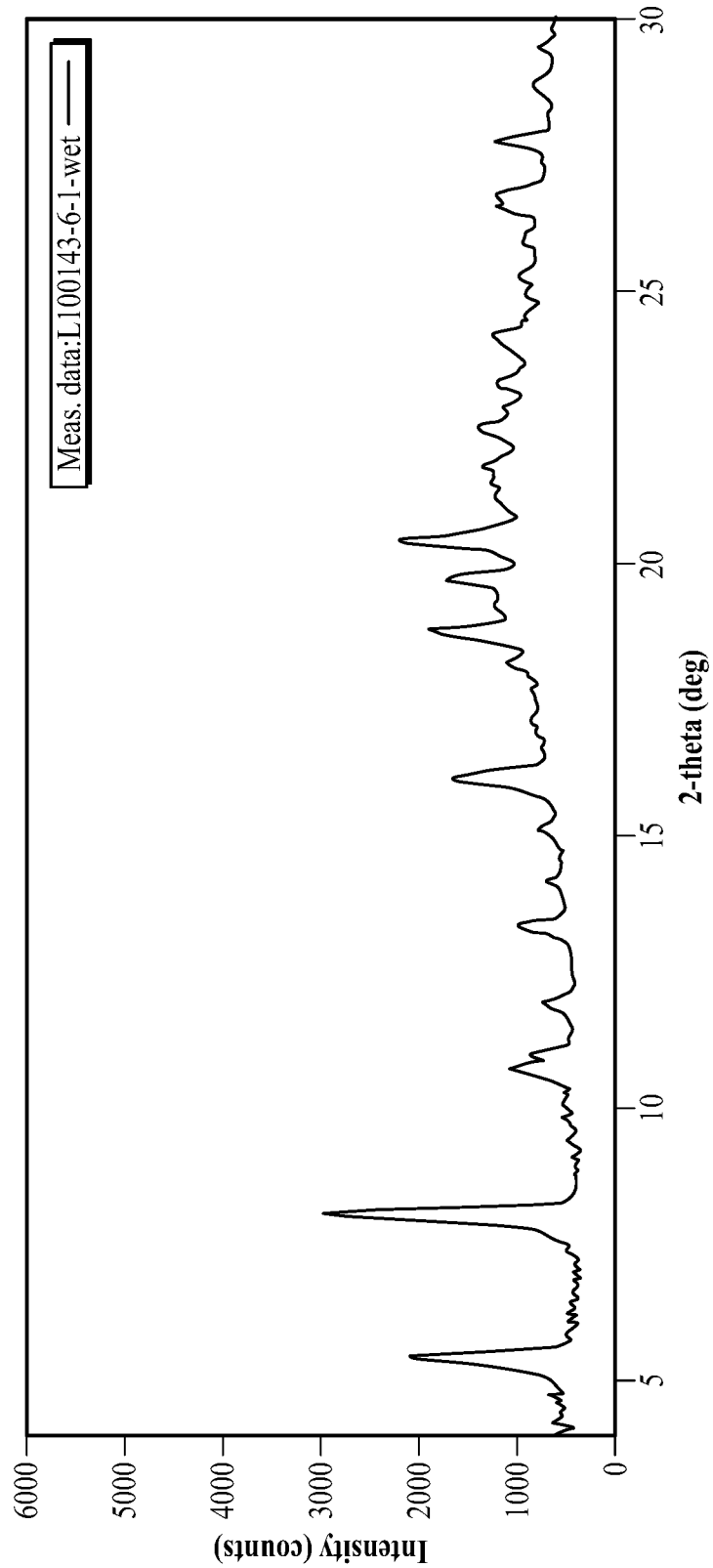
FIG. 12A is a XPPD pattern designated as Pattern K obtained from pralsetinib free base designated as solid form K.
Figure 12B:
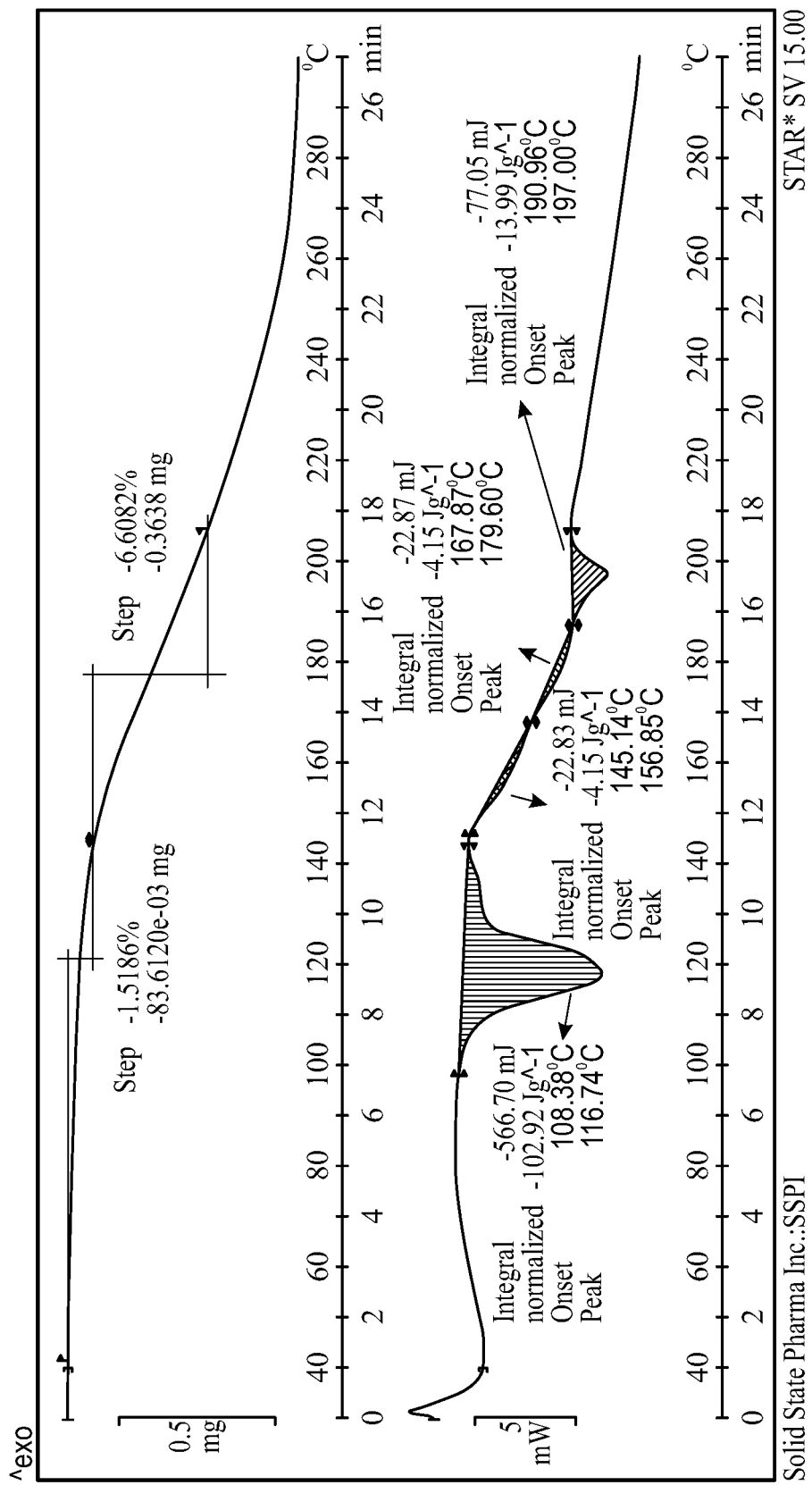
FIG. 12B shows DSC and TGA thermograms of the material tested in FIG. 12A, obtained from pralsetinib free base designated as solid form K.

Solid Form K of the free base of Compound (I) was observed from a DMSO/water antisolvent recrystallization. Solid Form K was unstable on drying and converted to material characterized by XRPD Pattern M. FIG. 12A is a XRPD pattern obtained from a sample of the free base of Compound (I) in Solid Form K. Table 10 is a list of XPRD (2-theta) peaks obtained from Solid Form K of the free base of Compound (I).

TABLE 10

| 2θ (degrees) | d-spacing (Å) | Relative Intensity |
|---|---|---|
| 5.46 | 16.17 | 67 |
| 8.09 | 10.92 | 100 |
| 10.71 | 8.25 | 39 |
| 11.88 | 7.44 | 8 |
| 13.36 | 6.62 | 13 |
| 16.07 | 5.51 | 37 |
| 18.17 | 4.88 | 7 |
| 18.69 | 4.74 | 34 |
| 19.75 | 4.49 | 43 |
| 20.40 | 4.35 | 46 |
| 21.77 | 4.08 | 25 |
| 22.40 | 3.97 | 15 |
| 26.66 | 3.34 | 19 |
| 27.67 | 3.22 | 11 |

A sample of the Solid Form K of the free base of Compound (I) prepared by antisolvent crystallization in DM50/water was further characterized by differential scanning calorimetry (DSC) endotherm and by the thermogravimetric analysis (TGA) to obtain the plots shown in FIG. 121B.

Figure 13A:
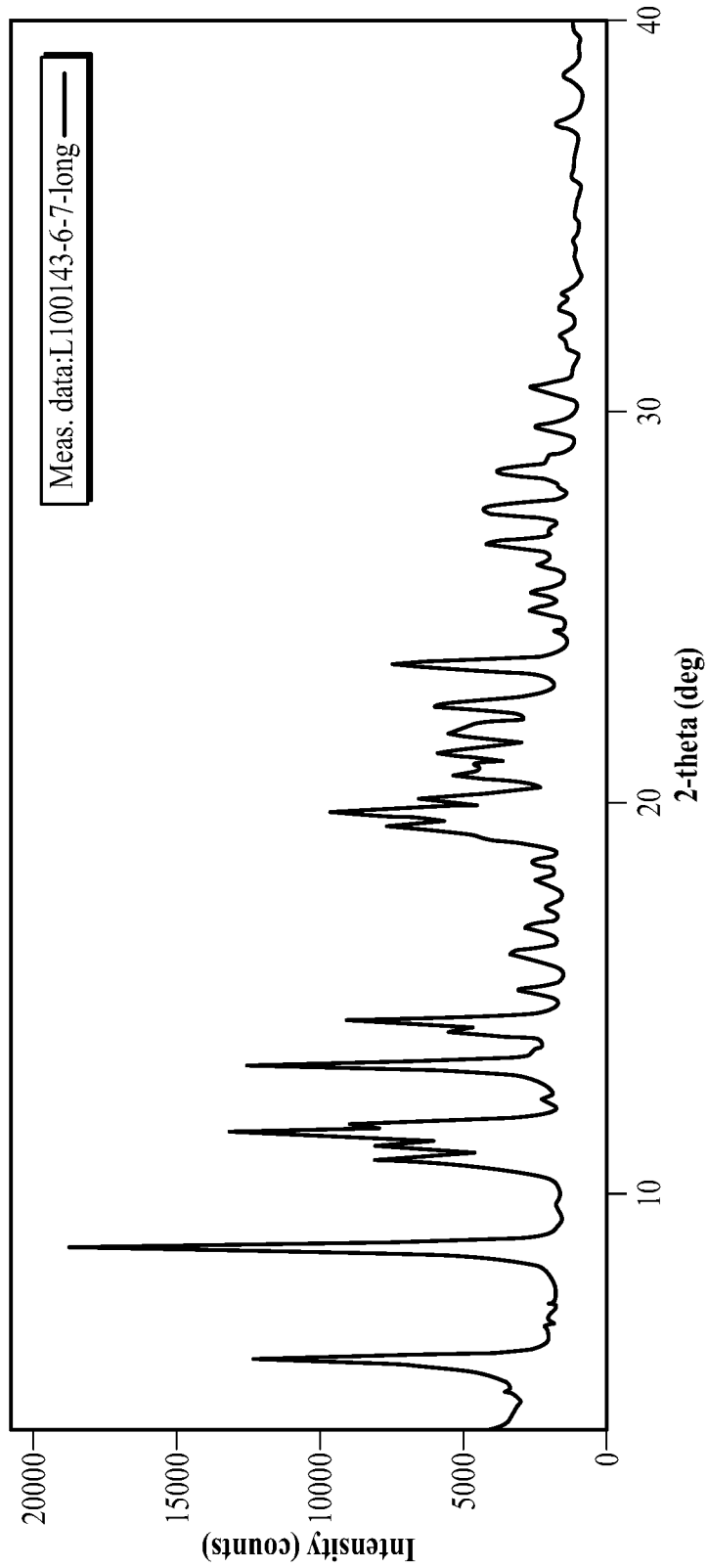
FIG. 13A is a XPPD pattern designated as Pattern L obtained from pralsetinib free base designated as solid form L.

Solid Form L of the free base of Compound (I) was observed through a MeOH/water antisolvent recrystallization. Pattern L was stable upon drying. FIG. 13A is a XRPD pattern obtained from a sample of the free base of Compound (I) in Solid Form L. Table 11A, Table 11B, Table 11C and Table 11D are each lists of XPRD (2-theta) peaks obtained from samples of Solid Form L of the free base of Compound (I).

TABLE 11A

| 2-theta (deg) | d-Spacing (ang.) | Relative Intensity |
|---|---|---|
| 5.81 | 15.19 | 59 |
| 8.69 | 10.17 | 100 |
| 11.57 | 7.64 | 68 |
| 13.32 | 6.64 | 64 |
| 23.55 | 3.77 | 35 |

TABLE 11B

| 2-theta (deg) | d-Spacing (ang.) | Relative Intensity |
|---|---|---|
| 5.81 | 15.19 | 59 |
| 8.69 | 10.17 | 100 |
| 10.89 | 8.12 | 38 |
| 11.57 | 7.64 | 68 |
| 13.32 | 6.64 | 64 |
| 19.40 | 4.57 | 35 |
| 19.40 | 4.57 | 35 |
| 19.75 | 4.49 | 47 |
| 22.47 | 3.95 | 27 |
| 23.55 | 3.77 | 35 |

TABLE 11C

| 2θ (deg.) | d-spacing (ang.) | Relative Intensity |
|---|---|---|
| 5.88 | 15.01 | 53 |
| 8.80 | 10.04 | 57 |
| 9.62 | 9.19 | 43 |
| 10.05 | 8.80 | 100 |
| 11.23 | 7.88 | 30 |
| 12.99 | 6.81 | 86 |
| 14.66 | 6.04 | 6 |
| 15.15 | 5.84 | 58 |
| 16.39 | 5.40 | 7 |
| 16.69 | 5.31 | 9 |
| 17.57 | 5.04 | 51 |
| 18.95 | 4.68 | 23 |
| 19.49 | 4.55 | 60 |
| 20.17 | 4.40 | 39 |
| 21.21 | 4.19 | 89 |
| 21.87 | 4.06 | 5 |
| 22.50 | 3.95 | 67 |
| 23.55 | 3.77 | 13 |
| 24.29 | 3.66 | 39 |
| 25.43 | 3.50 | 13 |
| 26.09 | 3.41 | 20 |
| 26.53 | 3.36 | 23 |
| 27.40 | 3.25 | 8 |
| 28.48 | 3.13 | 24 |
| 29.07 | 3.07 | 8 |
| 30.17 | 2.91 | 9 |
| 32.95 | 2.72 | 6 |
| 35.27 | 2.54 | 6 |

| 2-theta (deg) | d-Spacing (ang.) | Relative Intensity |
|---|---|---|
| 23.55 | 3.77 | 35 |
| 24.94 | 3.57 | 8 |
| 25.39 | 3.50 | 8 |
| 26.12 | 3.41 | 6 |
| 26.62 | 3.35 | 16 |
| 27.49 | 3.24 | 18 |
| 28.48 | 3.13 | 15 |
| 28.82 | 3.09 | 5 |
| 29.62 | 3.01 | 8 |
| 30.64 | 2.92 | 9 |

TABLE 11D

| 2θ (degrees) | d-spacing (Å) | Relative Intensity |
|---|---|---|
| 5.82 | 15.16 | 76 |
| 8.68 | 10.18 | 100 |
| 10.91 | 8.11 | 36 |
| 11.23 | 7.87 | 32 |
| 11.56 | 7.65 | 42 |
| 11.81 | 7.49 | 34 |
| 13.33 | 6.64 | 63 |
| 14.12 | 6.27 | 16 |
| 14.43 | 6.13 | 38 |
| 15.22 | 5.82 | 7 |
| 16.14 | 5.49 | 11 |
| 16.84 | 5.26 | 6 |
| 17.32 | 5.12 | 2 |
| 18.01 | 4.92 | 2 |
| 19.40 | 4.57 | 37 |
| 19.75 | 4.49 | 44 |
| 20.11 | 4.41 | 22 |
| 20.66 | 4.30 | 7 |
| 20.93 | 4.24 | 20 |
| 21.24 | 4.18 | 23 |
| 21.75 | 4.08 | 5 |
| 21.94 | 4.05 | 24 |
| 22.46 | 3.96 | 30 |
| 23.53 | 3.78 | 31 |
| 24.90 | 3.57 | 5 |
| 25.36 | 3.51 | 4 |
| 26.06 | 3.42 | 7 |
| 26.62 | 3.35 | 14 |
| 27.46 | 3.25 | 20 |
| 28.38 | 3.14 | 19 |
| 29.60 | 3.02 | 6 |
| 30.63 | 2.92 | 9 |
| 31.76 | 2.82 | 5 |

TABLE 11D-continued

| 2θ (degrees) | d-spacing (Å) | Relative Intensity |
|---|---|---|
| 32.60 | 2.74 | 4 |
| 32.96 | 2.72 | 2 |
| 37.30 | 2.41 | 5 |
| 38.55 | 2.33 | 4 |

Figure 13B:
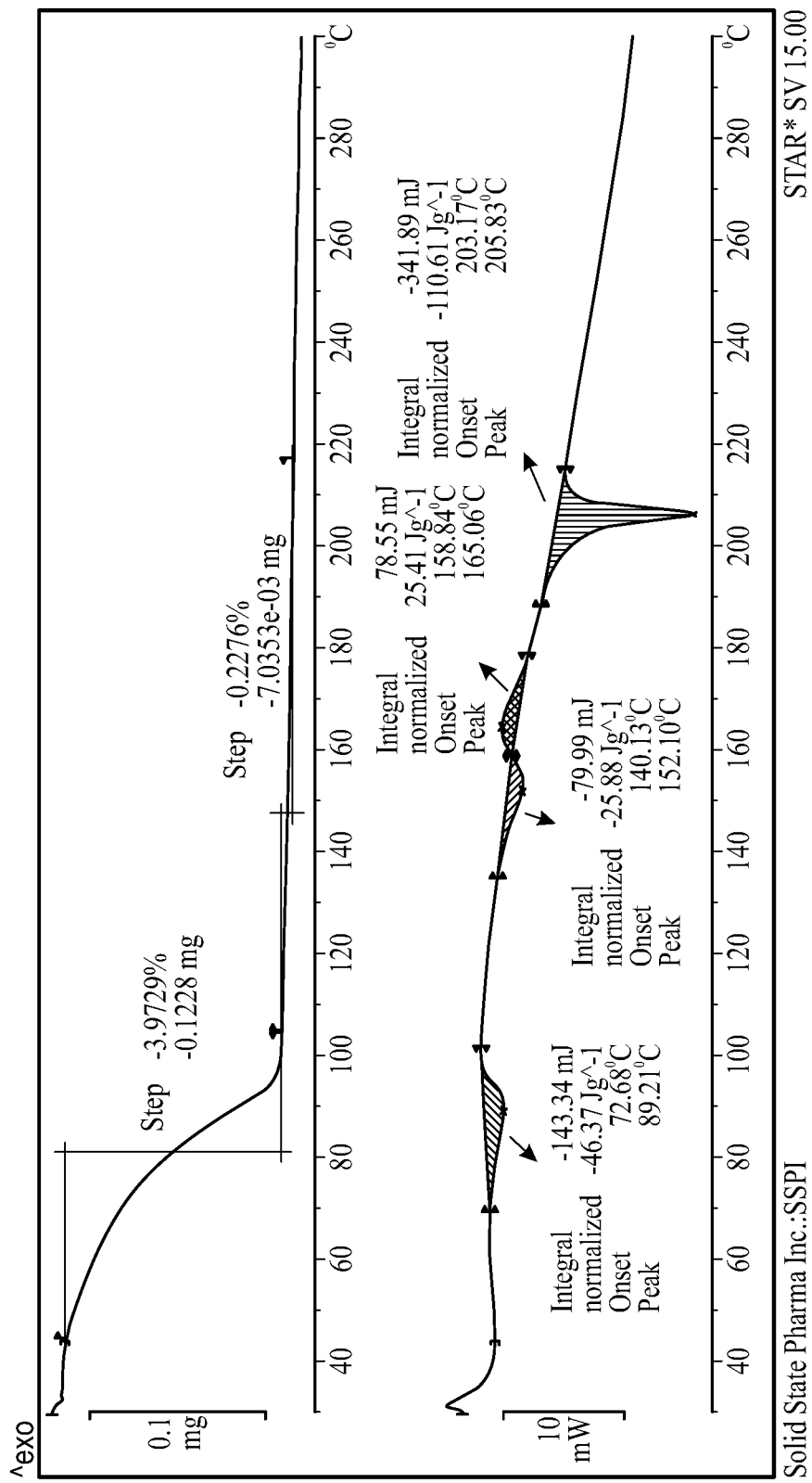
FIG. 13B shows DSC and TGA thermograms of the material tested in FIG. 13A, obtained from pralsetinib free base designated as solid form L.
Figure 13C:
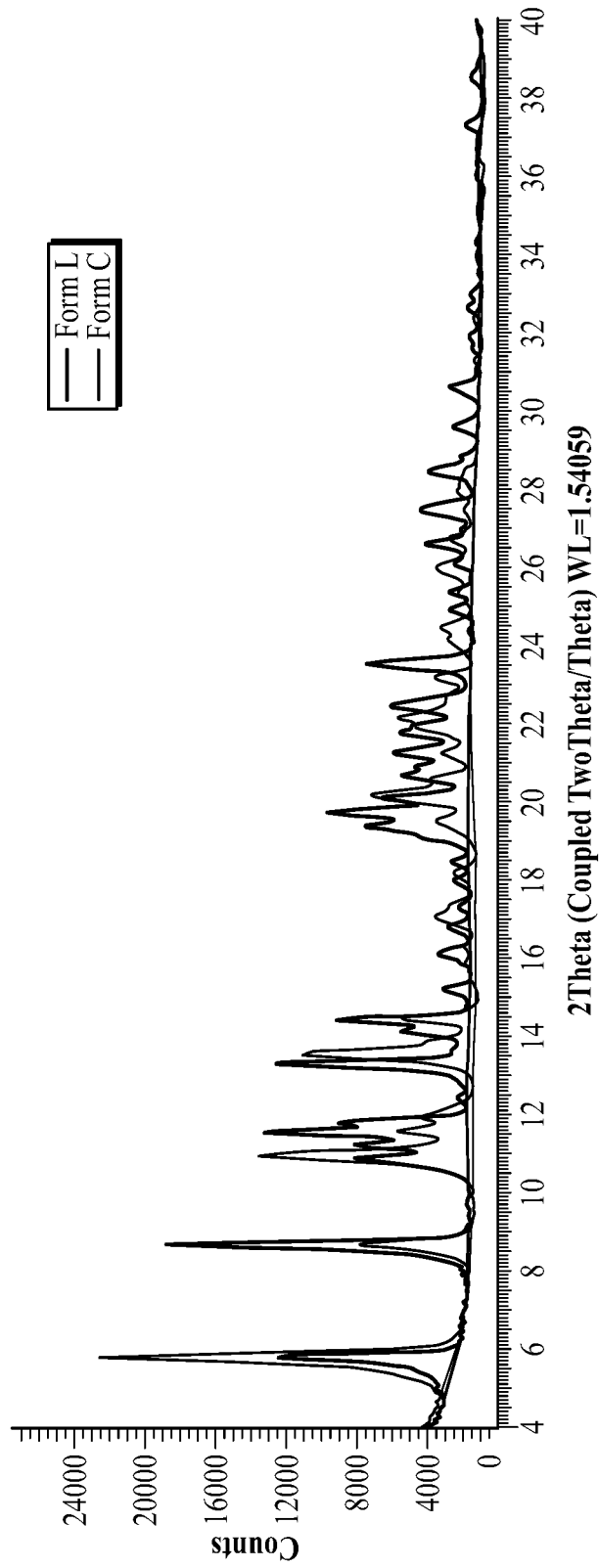
FIG. 13C shows an overlay of XPPD patterns designated as Pattern C from solid form C and Pattern L obtained from pralsetinib free base designated as solid form L.

A sample of the Solid Form L of the free base of Compound (I) prepared by antisolvent crystallization in DMSO/water was further characterized by differential scanning calorimetry (DSC) endotherm and by the thermogravimetric analysis (TGA) to obtain the thermograms shown in FIG. 13B.

Figure 14A:
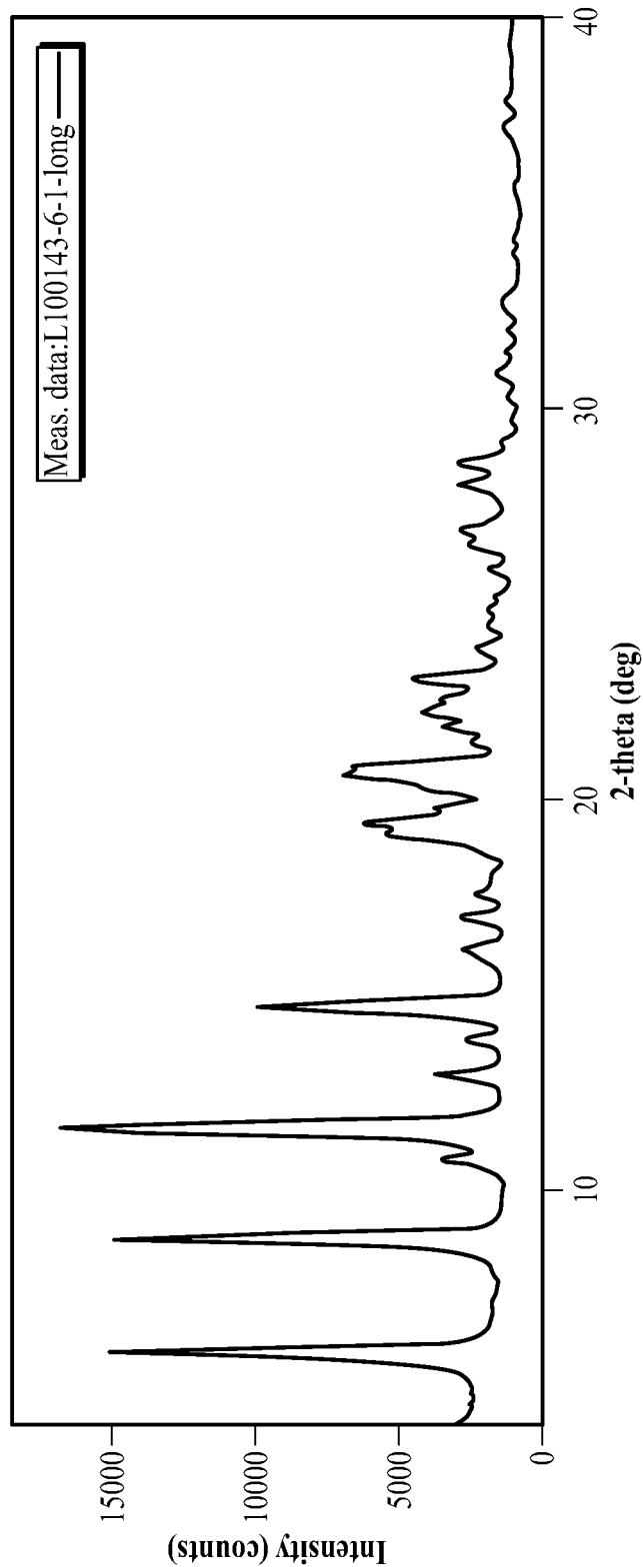
FIG. 14A is a XPPD pattern designated as Pattern M obtained from pralsetinib free base designated as solid form M.

Solid Form M of the free base of Compound (I) shared all peaks with Compound (I) free base compositions characterized by XRPD Pattern B, but some extra peaks were observed in the XRPD (e.g., 2θ 13.84, 16.11, 19.09). Solid Form M was prepared by drying a solid form of the free base of Compound (I) characterized by XRPD Pattern K prepared from antisolvent crystallization in DMSO:water. FIG. 14A is a XRPD pattern obtained from a sample of the free base of Compound (I) in Solid Form M. Table 12 is a list of XPRD (2-theta) peaks obtained from Solid Form M of the free base of Compound (I).

TABLE 12

| 2θ (degrees) | d-spacing (Å) | Relative Intensity |
|---|---|---|
| 5.87 | 15.04 | 99 |
| 8.79 | 10.06 | 93 |
| 10.77 | 8.21 | 26 |
| 11.60 | 7.62 | 100 |
| 12.96 | 6.83 | 12 |
| 13.83 | 6.40 | 5 |
| 14.67 | 6.03 | 64 |
| 16.18 | 5.47 | 9 |
| 16.98 | 5.22 | 6 |
| 17.56 | 5.05 | 3 |
| 19.17 | 4.63 | 32 |
| 19.38 | 4.58 | 22 |
| 20.57 | 4.31 | 13 |
| 20.85 | 4.26 | 43 |
| 21.87 | 4.06 | 5 |
| 22.26 | 3.99 | 11 |
| 22.59 | 3.93 | 13 |
| 23.09 | 3.85 | 16 |
| 23.93 | 3.72 | 4 |
| 24.97 | 3.56 | 6 |
| 25.91 | 3.44 | 3 |
| 26.54 | 3.36 | 10 |
| 26.94 | 3.31 | 10 |
| 28.00 | 3.18 | 11 |
| 28.55 | 3.12 | 15 |
| 29.15 | 3.06 | 2 |
| 30.85 | 2.90 | 4 |
| 31.46 | 2.84 | 1 |
| 32.69 | 2.74 | 5 |
| 37.23 | 2.41 | 3 |
| 37.82 | 2.38 | 2 |

Figure 14B:
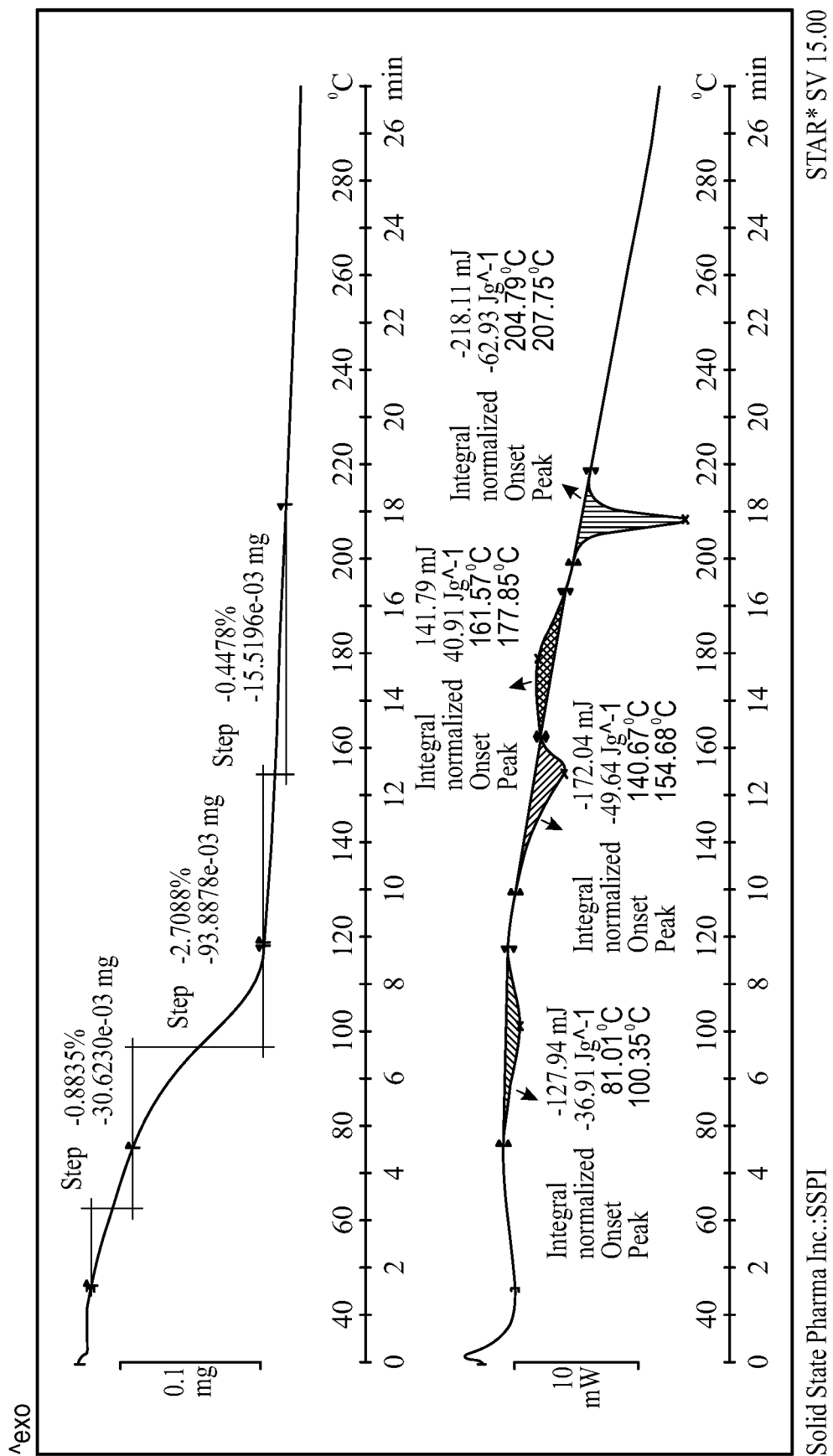
FIG. 14B shows DSC and TGA thermograms of the material tested in FIG. 14A, obtained from pralsetinib free base designated as solid form M.

A sample of the Solid Form M of the free base of Compound (I) was characterized by differential scanning calorimetry (DSC) endotherm and by the thermogravimetric analysis (TGA) to obtain the thermograms shown in FIG. 14B.

Figure 15:
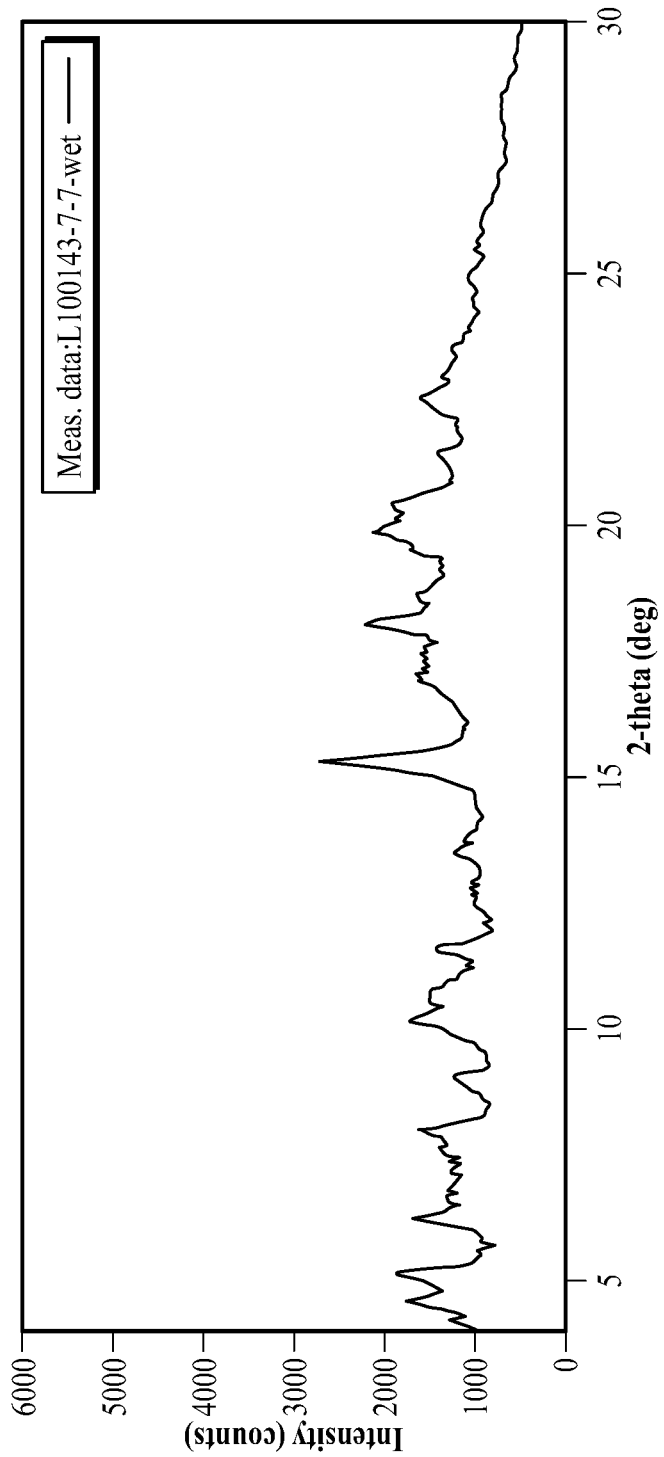
FIG. 15 is a XPPD pattern designated as Pattern N obtained from pralsetinib free base designated as solid form N.

Solid Form N of the free base of Compound (I) was observed out of fast cooling in THF. Very few solids were obtained for analysis. Solid Form N could possibly be a THF solvate. FIG. 15 is a XRPD pattern obtained from a wet sample of the free base of Compound (I) in Solid Form N. Table 13 is a list of XPRD (2-theta) peaks obtained from Solid Form N of the free base of Compound (I).

TABLE 13

| 2θ (degrees) | d-spacing (Å) | Relative Intensity |
|---|---|---|
| 4.61 | 19.16 | 32 |
| 5.15 | 17.14 | 50 |
| 6.21 | 14.22 | 36 |
| 7.99 | 11.06 | 52 |
| 10.10 | 8.75 | 44 |
| 10.70 | 8.26 | 70 |
| 11.58 | 7.64 | 21 |
| 15.31 | 5.78 | 100 |
| 16.93 | 5.23 | 70 |
| 18.05 | 4.91 | 34 |
| 19.88 | 4.46 | 47 |
| 20.47 | 4.33 | 44 |
| 22.46 | 3.96 | 52 |
| 24.82 | 3.58 | 30 |

Figure 16:
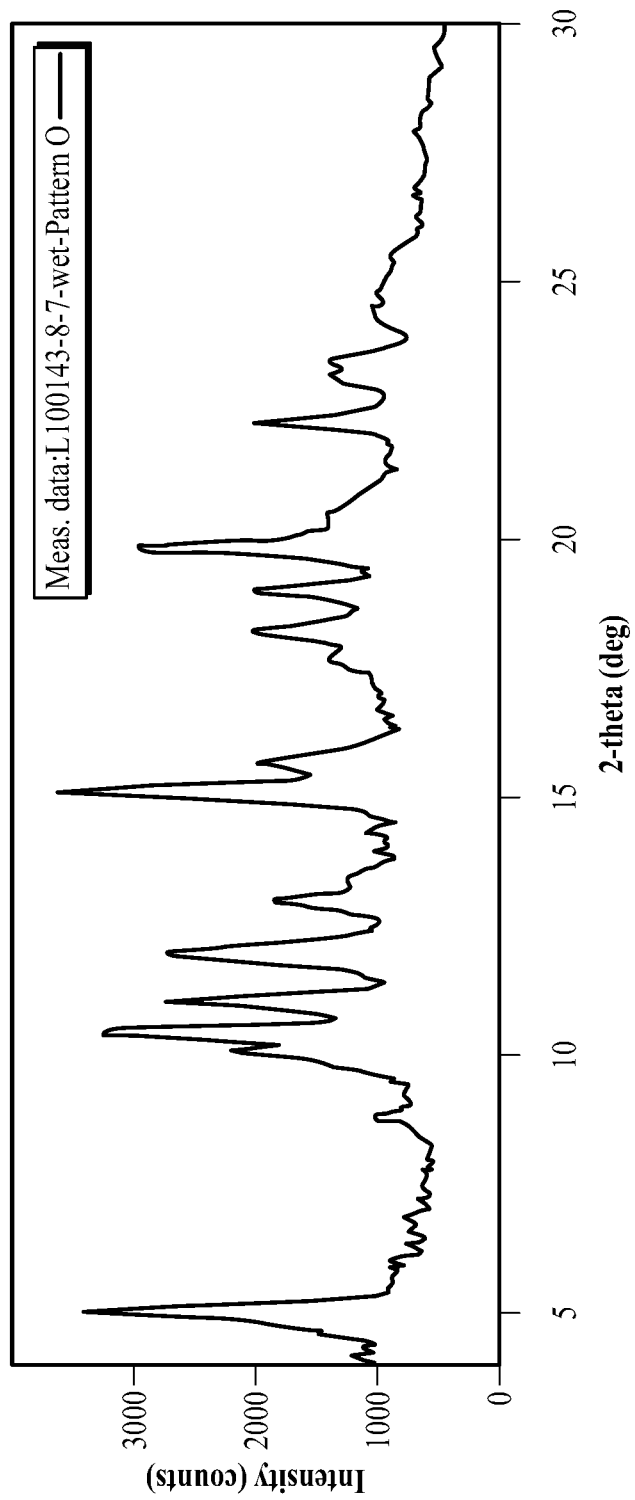
FIG. 16 is a XPPD pattern designated as Pattern O obtained from pralsetinib free base designated as solid form O.

Solid Form O of the free base of Compound (I) was obtained as a mixture with a composition of the free base of Compound (I) characterized by XRPD Pattern I from slow cooling in THF. Solid Form O is possibly a THF solvate. FIG. 16 is a XRPD pattern obtained from a wet sample of the free base of Compound (I) in Solid Form O. Table 14 is a list of XPRD (2-theta) peaks obtained from Solid Form O of the free base of Compound (I).

TABLE 14

| 2θ (degrees) | d-spacing (Å) | Relative Intensity |
|---|---|---|
| 5.11 | 17.29 | 100 |
| 8.79 | 10.06 | 9 |
| 10.09 | 8.76 | 46 |
| 10.44 | 3.47 | 86 |
| 11.06 | 7.99 | 64 |
| 11.96 | 7.40 | 84 |
| 12.92 | 6.85 | 32 |
| 15.10 | 5.86 | 83 |
| 15.65 | 5.66 | 39 |
| 18.25 | 4.86 | 50 |
| 19.03 | 4.66 | 29 |
| 19.77 | 4.49 | 90 |
| 22.25 | 3.99 | 25 |
| 23.36 | 3.80 | 27 |
| 24.67 | 3.61 | 22 |

Figure 17:
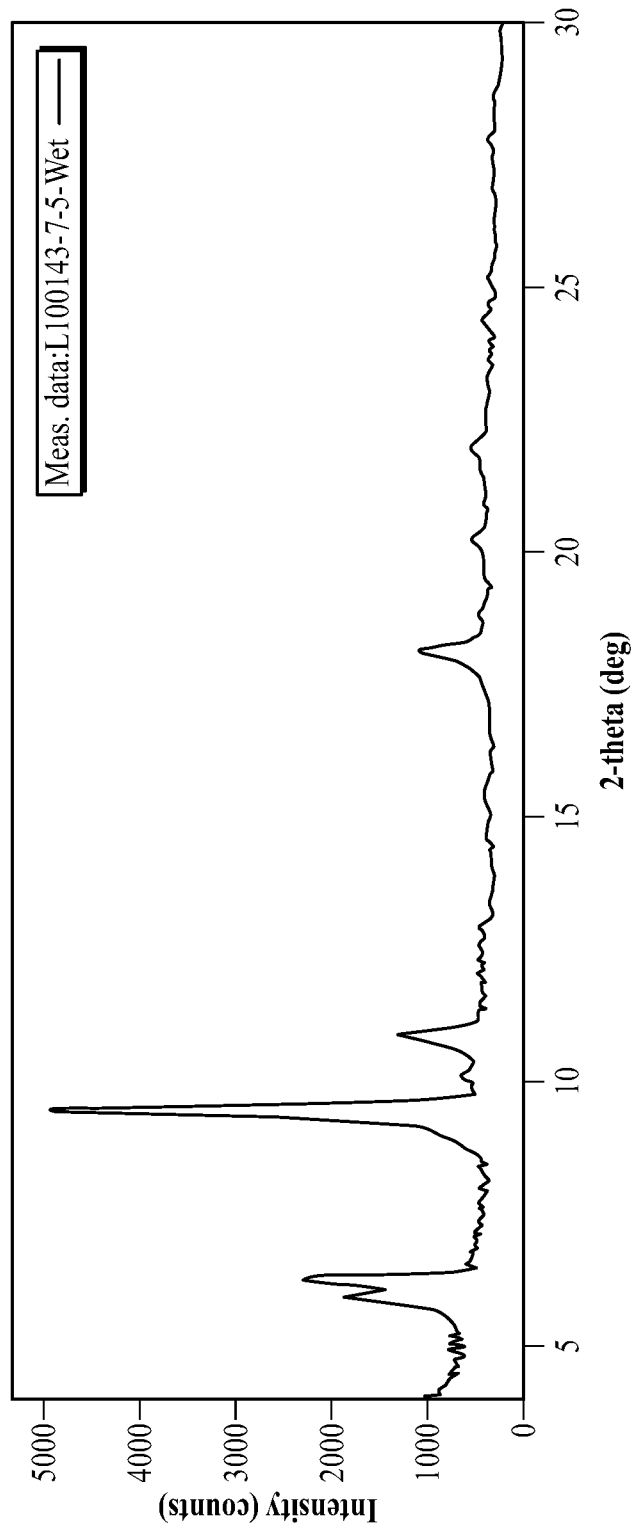
FIG. 17 is a XPPD pattern designated as Pattern P obtained from pralsetinib free base designated as solid form P.

Solid Form P of the free base of Compound (I) was obtained from fast cooling in MeOH to 0° C. followed by stagnant cooling to −20° C. Solid Form P was unstable upon drying and converted to a mixture of material characterized by XRPD Pattern P and XRPD Pattern L and extra peaks upon drying. FIG. 17 is a XRPD pattern obtained from a wet sample of the free base of Compound (I) in Solid Form P. Table 15 is a list of XPRD (2-theta) peaks obtained from Solid Form P of the free base of Compound (I).

TABLE 15

| 2θ (degrees) | d-spacing (Å) | Relative Intensity |
|---|---|---|
| 5.93 | 14.88 | 20 |
| 6.31 | 14.00 | 43 |
| 9.47 | 9.33 | 100 |
| 10.92 | 8.10 | 30 |
| 18.17 | 4.88 | 23 |

TABLE 15-continued

| 2θ (degrees) | d-spacing (Å) | Relative Intensity |
|---|---|---|
| 18.84 | 4.71 | 3 |
| 20.32 | 4.37 | 5 |
| 22.00 | 4.04 | 7 |

Figure 18A:
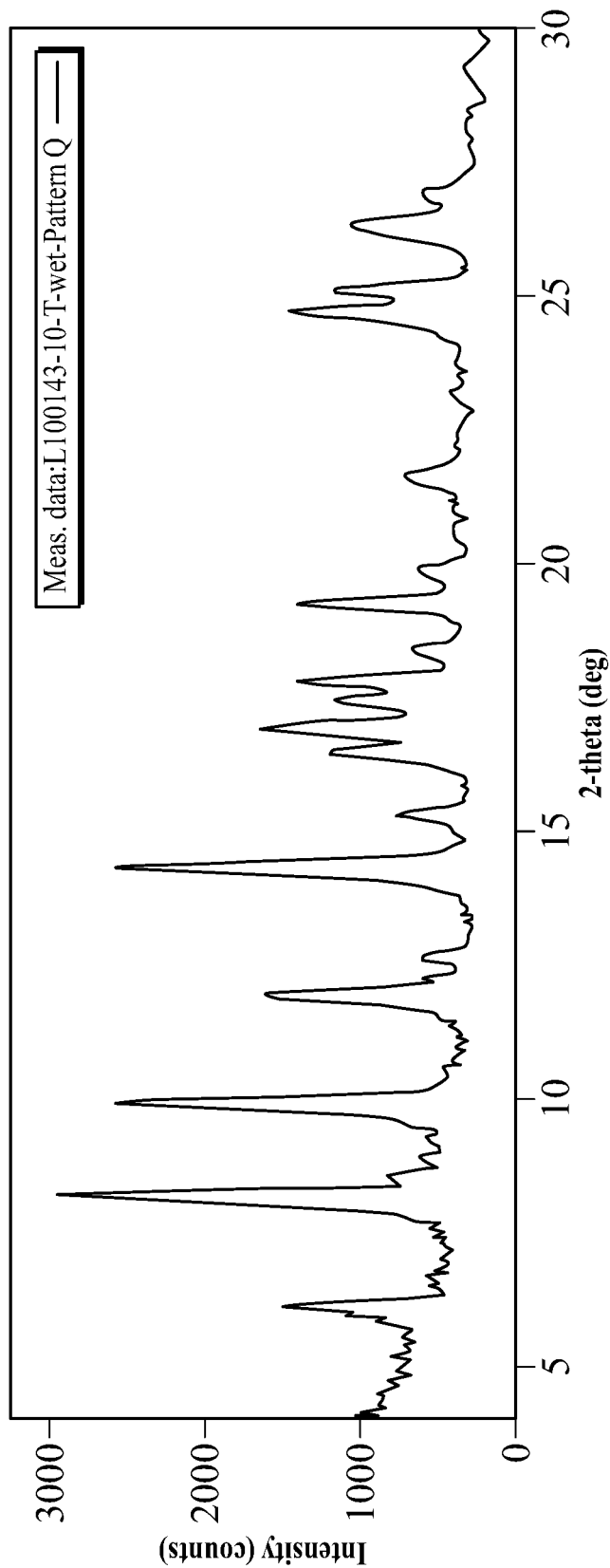
FIG. 18A is a XPPD pattern designated as Pattern Q obtained from pralsetinib free base designated as solid form Q.
Figure 18B:
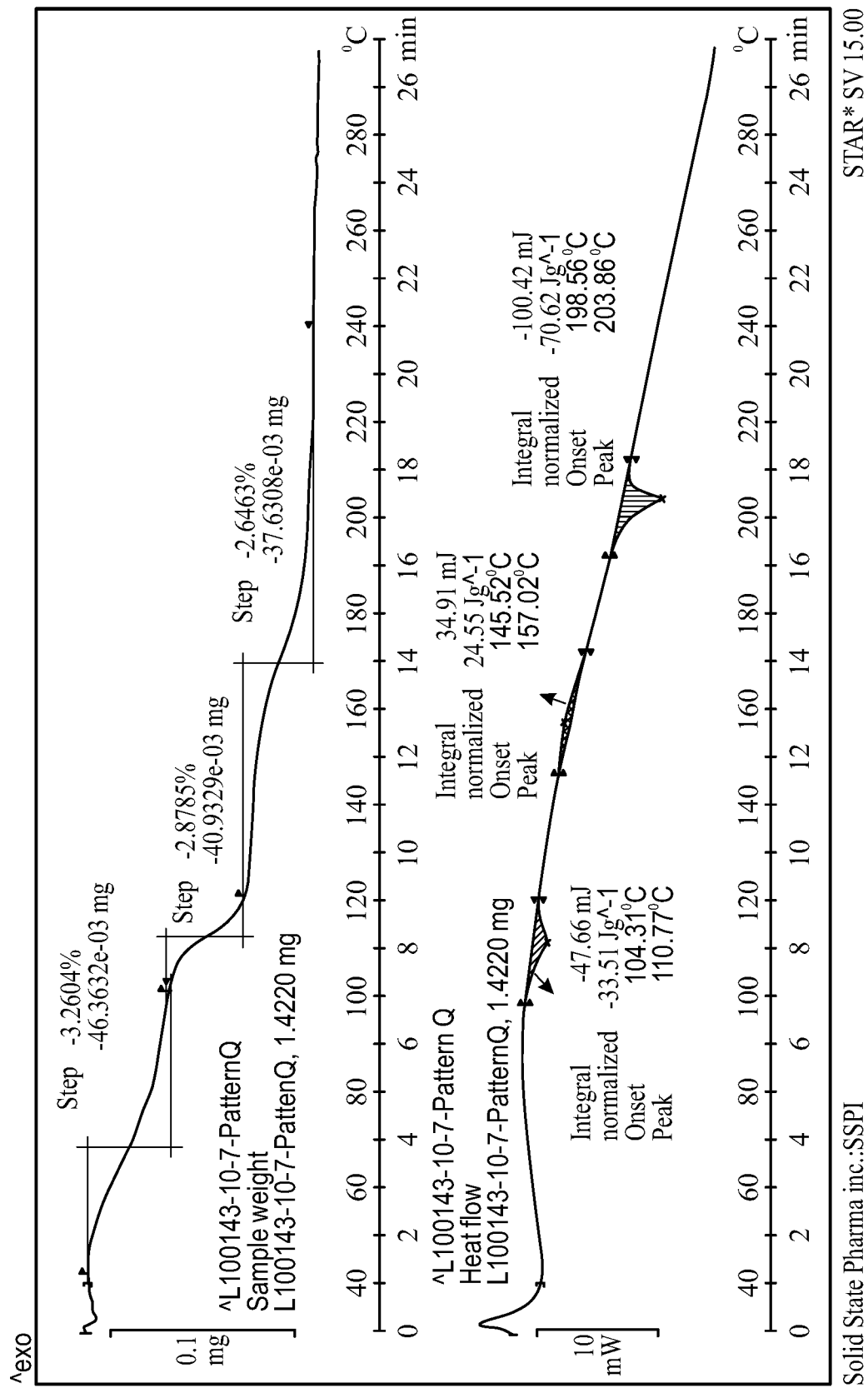
FIG. 18B shows DSC and TGA thermograms of the material tested in FIG. 18A, obtained from pralsetinib free base designated as solid form Q.

Solid Form Q of the free base of Compound (I) was observed after cooling in 1,4-dioxane. Solid Form Q lost crystallinity upon drying and is likely a 1,4-dioxane solvate. FIG. 18A is a XRPD pattern obtained from a wet sample of the free base of Compound (I) in Solid Form Q. Table 16 is a list of XPRD (2-theta) peaks obtained from Solid Form Q of the free base of Compound (I).

TABLE 16

| 2θ (degrees) | d-spacing (Å) | Relative Intensity |
|---|---|---|
| 6.11 | 14.44 | 41.4 |
| 8.20 | 10.78 | 92 |
| 9.94 | 8.89 | 100 |
| 11.96 | 7.39 | 58.89 |
| 12.70 | 6.97 | 5.68 |
| 14.36 | 6.16 | 92.67 |
| 15.30 | 5.79 | 13.13 |
| 16.51 | 5.37 | 36.05 |
| 16.94 | 5.23 | 54.37 |
| 17.49 | 5.07 | 26.51 |
| 17.83 | 4.97 | 34.78 |
| 18.43 | 4.81 | 10.97 |
| 19.30 | 4.60 | 32.52 |
| 19.93 | 4.45 | 11.4 |
| 21.56 | 4.12 | 15.25 |
| 24.71 | 3.60 | 44.54 |
| 25.08 | 3.55 | 32.23 |
| 26.27 | 3.39 | 41.13 |
| 26.84 | 3.32 | 12.1 |

A sample of the Solid Form Q of the free base of Compound (I) was characterized by differential scanning calorimetry (DSC) endotherm and by the thermogravimetric analysis (TGA) obtained from cooling crystallization in 1,4-dioxane to obtain the thermograms shown in FIG. 186.

Figure 19A:
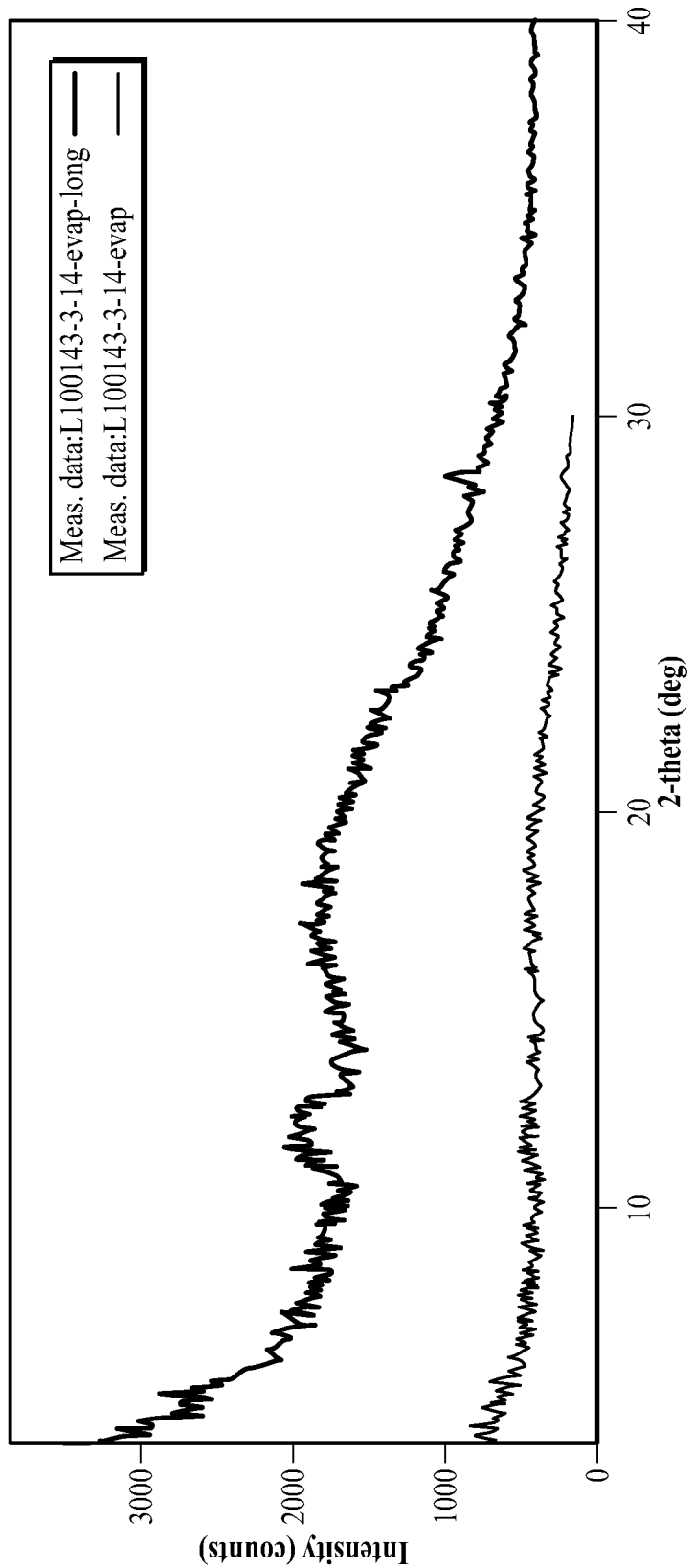
FIG. 19A is a XPPD pattern obtained from amorphous pralsetinib free base.

Amorphous solids of Compound (I) were generated by evaporation from chloroform solution. The solids were a hard gel after evaporation which could be broken into a more flowable powder. It was later determined that the amorphous solid contained trace amounts of Compound (I) free base material characterized by XRPD Pattern H, which was a resulting solid in many amorphous slurries. Significant chloroform was observed in proton NMR, agreeing with mass loss observed at low temperature in TGA. FIG. 19A is a XRPD pattern obtained from XRPD of amorphous solid from evaporation in DCM solution.

Figure 19B:
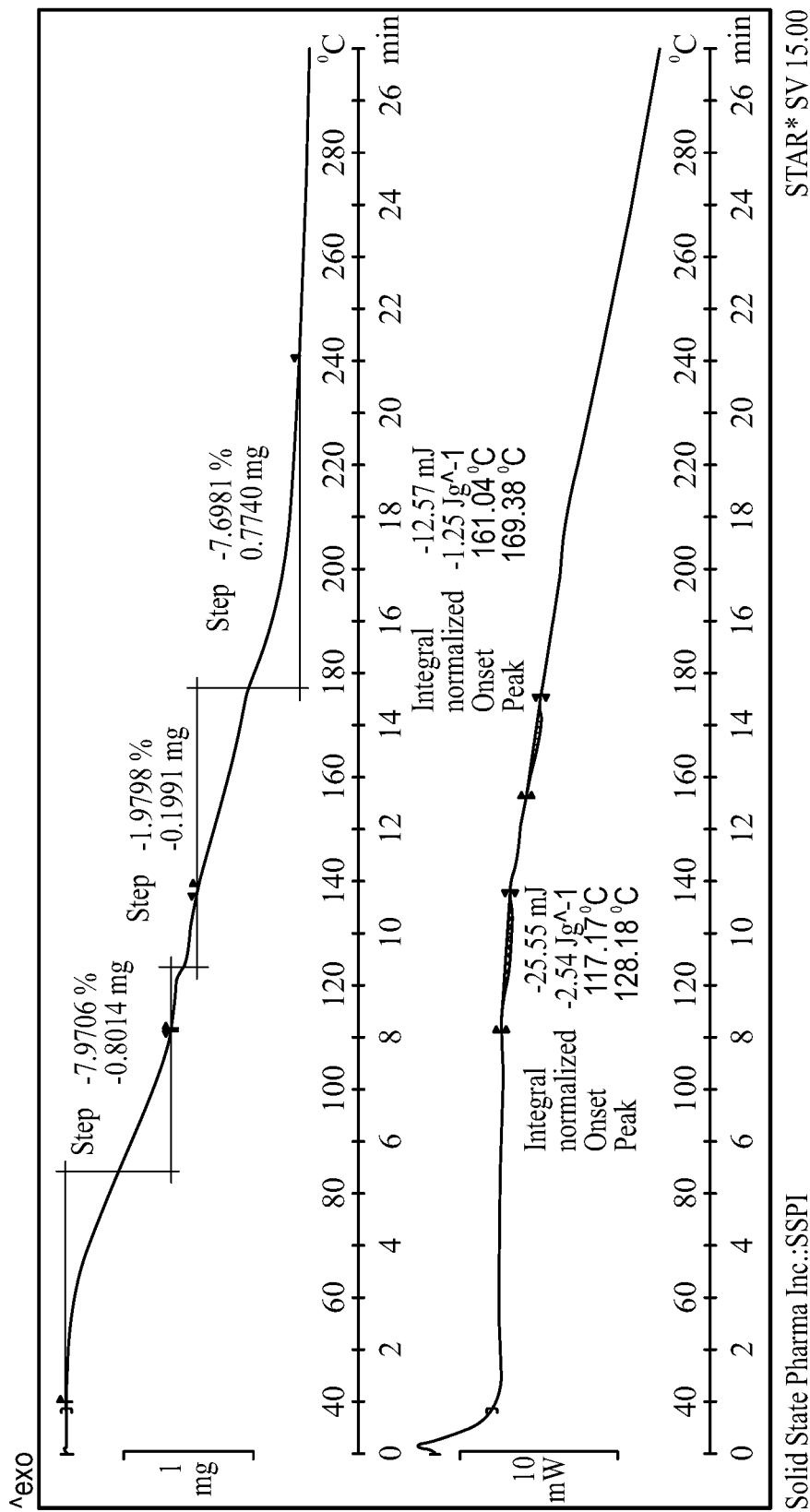
FIG. 19B shows DSC and TGA thermograms of the material tested in FIG. 19A, obtained from amorphous pralsetinib free base.

FIG. 19B shows DSC and TGA thermograms of amorphous solid of Compound (I) obtained by evaporation from chloroform solution.

Pralsetinib Salt Forms

Various salts of pralsetinib were formed using various counter-ions and solvents (e.g., as described in Example 3). The preparation and characterization of at least twenty different pralsetinib salts are described herein. For example, FIG. 24 and FIG. 25 are tables summarizing characteristics of five pralsetinib salt forms (formed using BSA, MSA, HCl, HBr and HNO3 counterions). FIGS. 26A and 26B are tables summarizing characteristics of thirteen salt forms of pralsetinib (formed using pyruvic acid, citric acid, fumaric acid, HCl, saccharin, maleic acid, oxalic acid, salicylic acid, glutaric acid, sulfuric acid, succinic acid, tartaric acid and phosphoric acid).

Crystalline patterns of pralsetinib salts were obtained with many but not all counter-ions tested in the examples. Fumarate and sulfate changed on drying. As described in the examples, certain citrate, hydrochloride, and gentisate deliquesced on exposure to >95% relative humidity. Pyruvate, saccharine salt, and sulfates generated from the 1.1 eq. experiments changed form after exposure to >95% relative humidity. X-ray powder diffraction patterns of many salts were stable to both drying and humidity exposure (e.g., maleate 8-A, oxalate 9-A, glutarate 11-A, succinate 15-A, and phosphate 14-A). Low crystalline patterns were obtained from screening with pyruvic acid, sulfuric acid, citric acid, fumaric acid, and saccharine while moderate to high crystallinity patterns were obtained from hydrochloric acid, maleic acid, oxalic acid, salicylic acid, glutaric acid, sulfuric acid, succinic acid, tartaric acid, and phosphoric acid. Crystalline salts were characterized and evaluated for viability based on melting point, crystallinity, stability on drying and humidity exposure, water solubility, polymorphism, and acceptability of counter-ion.

Turning to the particular pralsetinib salts provided herein, Compound (I) was prepared as multiple different solid hydrochloride (HCl) salts, including multiple crystalline solid HCl salt forms of Compound (I).

In one aspect, the present disclosure provides crystalline pralsetinib HCl salt Form 5-A. In one aspect, crystalline pralsetinib HCl salt Form 5-A is characterized by x-ray powder diffraction pattern. The x-ray powder diffraction pattern can be acquired using a Rigaku MiniFlex 600 described herein. In one embodiment, crystalline pralsetinib HCl salt Form 5-A is characterized by at least three, at least four, or at least five x-ray powder diffraction peaks at 2-theta angles (±0.2 degrees) selected from 5.0°, 6.1°, 9.10 9.9°, and 14.7°.

Alternatively, crystalline pralsetinib HCl salt Form 5-A is characterized by at least three, at least four, at least five, at least six, at least seven, at least eight, at least nine, or at least ten x-ray powder diffraction peaks at 2-theta angles (±0.2 degrees) 5.0°, 6.1°, 9.1°, 9.9°, 13.8°, 14.7°, 15.3°, 17.2°, 18.1°, 19.6°, 20.3°, 20.7°, 21.8°, 24.2°, 25.6°, and 26.3°. Alternatively, crystalline pralsetinib HCl salt Form 5-A is characterized by x-ray powder diffraction peaks at 2-theta angles (±0.2 degrees) 5.0° 6.1°, 9.1°, 9.9°, 13.8°, 14.7°, 15.3°, 17.2°, 18.1°, 19.6°, 20.3°, 20.7°, 21.8°, 24.2°, 25.6°, and 26.3°. In some embodiments, the peaks described above for crystalline pralsetinib HCl salt Form 5-A have a relative intensity of at least 10%, of at least 15%, of at least 20%, or of at least 25%.

Figure 27A:
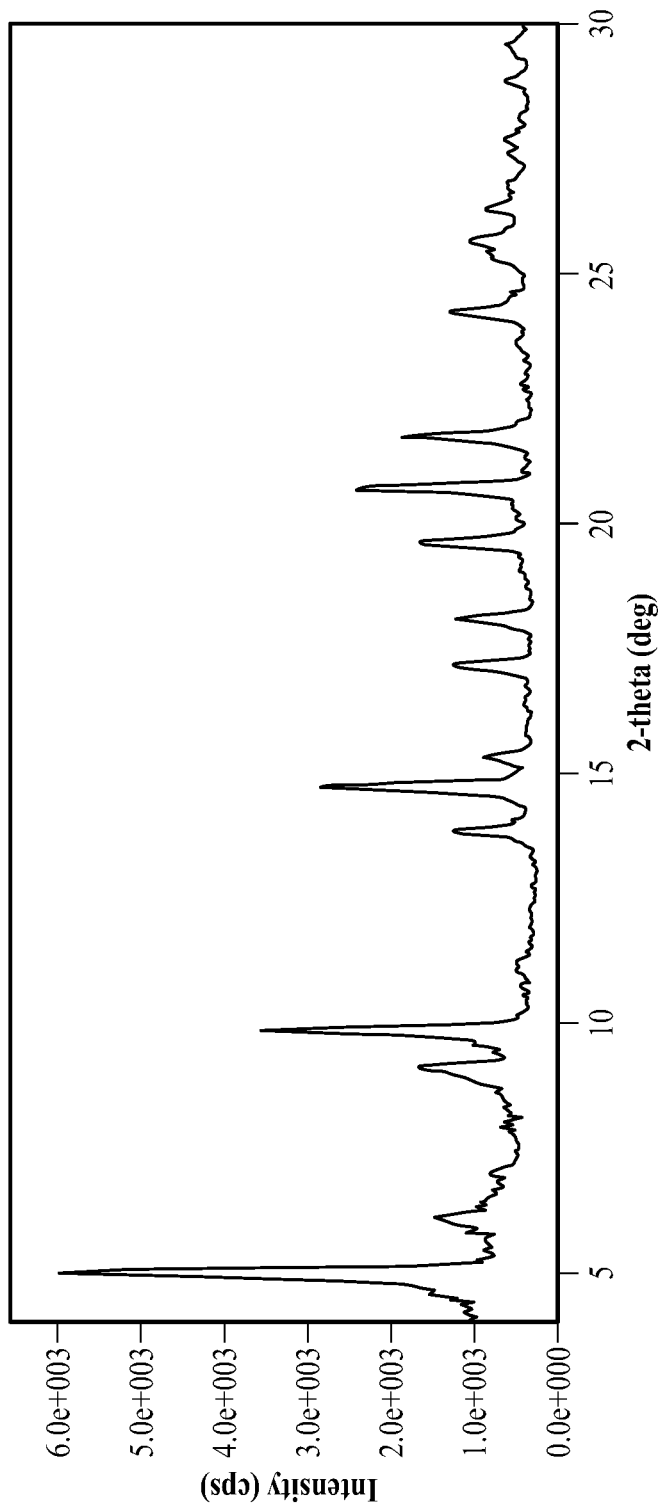
FIG. 27A is a XRPD pattern obtained from a hydrochloride salt of pralsetinib in Solid Form 5-A.

In another aspect, crystalline pralsetinib HCl salt Form 5-A of pralsetinib has an XRPD pattern that is substantially the same XRPD pattern shown in FIG. 27A.

In another aspect, crystalline pralsetinib HCl salt Form 5-A has an XRPD pattern that substantially includes the peaks in Table 17A-B.

Figure 27B:
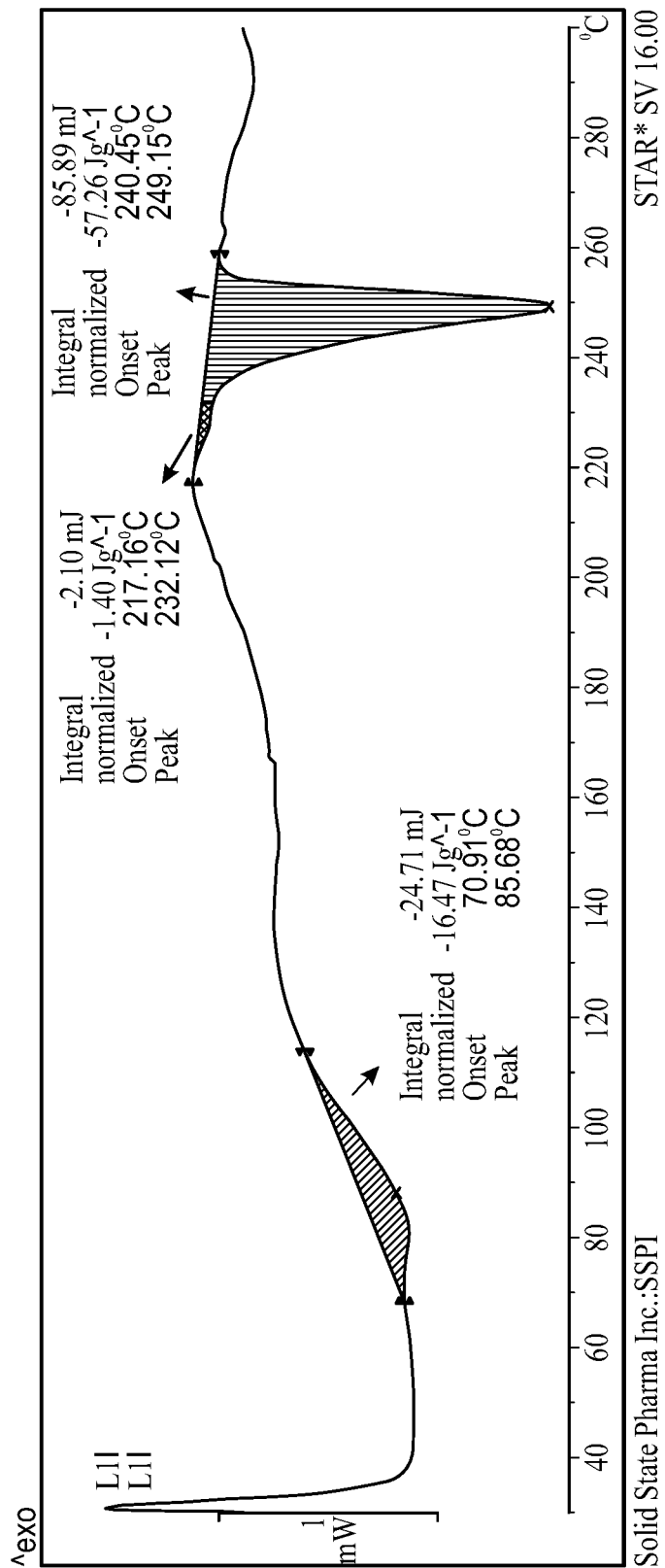
FIG. 27B shows DSC of Solid Form 5-A.

In one aspect, crystalline pralsetinib HCl salt Form 5-A has a DSC pattern that is substantially the same DSC pattern shown in FIG. 27B. In particular, pralsetinib HCl salt Form 5-A was observed to have a very broad endotherm with an onset temperature of 70.9° C. (±0.2 degrees) and a sharp endotherm at 240.5° C. (±0.2 degrees).

In one aspect, the crystalline pralsetinib HCl salt Form 5-A is characterized by at least three, at least four, or by at least five, x-ray powder diffraction peaks at 2-theta angles (±0.2 degrees) 5.0°, 6.1°, 9.1°, 9.9°, and 14.7°; optionally together with the TGA and DSC parameters recited above for pralsetinib HCl salt Form 5-A. Alternatively, crystalline pralsetinib HCl salt Form 5-A is characterized by at least three, at least four, at least five, at least six, at least seven, at least eight, at least nine, or at least ten x-ray powder diffraction peaks at 2-theta angles (±0.2 degrees) selected from 5.0° 6.1°, 9.1°, 9.9°, 13.8°, 14.7°, 15.3°, 17.2°, 18.1°, 19.6°, 20.3°, 20.7°, 21.8°, 24.2°, 25.6°, and 26.3° optionally together with the DSC parameters recited above for pralsetinib HCl salt Form 5-A.

In one aspect, the crystalline pralsetinib HCl salt Form 5-A is characterized by one or more of the following characteristics: (a) a X-ray powder diffraction (XRPD) pattern comprising characteristic diffraction peaks at 2-theta angles at approximately (±0.2 degrees) 5.0°, 6.1°, 9.1°, 9.9° and 14.7°; and/or (b) a differential scanning calorimetry (DSC) thermogram with a very broad endotherm with an onset temperature of 70.9° C. (±0.2 degrees) and a sharp endotherm at 240.5° C. (±0.2 degrees).

Pralsetinib HCl salt Form 5-A can obtained by a process comprising isolating the solid from the slurry of the HCl salt in EtOH or IPA:water (9:1 Vol).

In one disclosure, the present disclosure provides crystalline pralsetinib HCl salt Form 5-B. In one aspect, crystalline pralsetinib HCl salt Form 5-B is characterized by x-ray powder diffraction pattern. The x-ray powder diffraction pattern can be acquired using a Bruker D8 described herein. In one embodiment, crystalline pralsetinib HCl salt Form 5-B is characterized by at least three, at least four, or at least five x-ray powder diffraction peaks at 2-theta angles (±0.2 degrees) selected from 6.1°, 8.9°, 9.5°, 15.0°, 16.6°.

Alternatively, crystalline pralsetinib HCl salt Form 5-B is characterized by at least three, at least four, at least five, at least six, at least seven, at least eight, at least nine, or at least 10 x-ray powder diffraction peaks at 2-theta angles (±0.2 degrees) 6.1°, 8.9°, 9.5°, 15.0°, 16.6°, 17.2°, 17.9°, 18.4°, 19.8°, 25.8°, and 26.8°. Alternatively, crystalline pralsetinib HCl salt Form 5-B is characterized by x-ray powder diffraction peaks at 2-theta angles (±0.2 degrees) 6.1°, 8.9°, 9.5°, 15.0°, 16.6°, 17.2°, 17.9°, 18.4°, 19.8°, 25.8°, and 26.8°. In some embodiments, the peaks described above for crystalline pralsetinib HCl salt Form 5-B have a relative intensity of at least 10%, of at least 15%, of at least 20%, or of at least 25%.

Figure 27C:
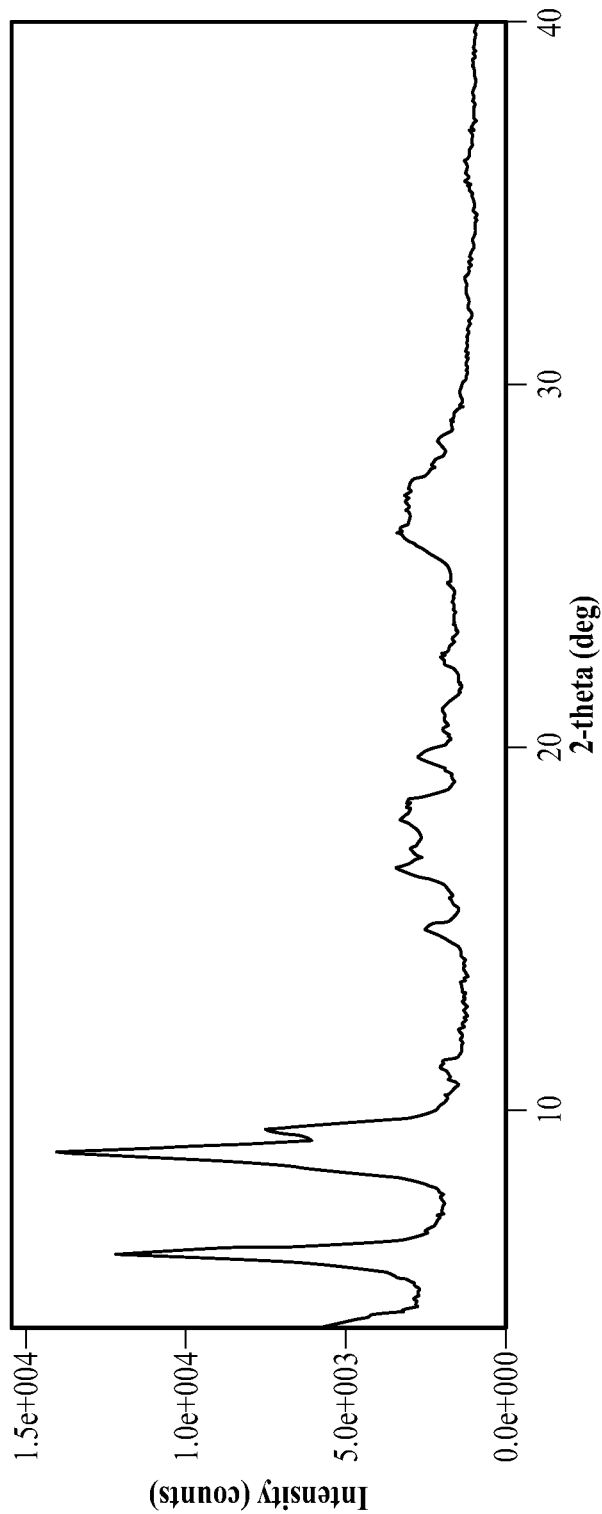
FIG. 27C is a XRPD pattern obtained from a hydrochloride salt of pralsetinib in Solid Form 5-B.

In another aspect, crystalline pralsetinib HCl salt Form 5-B of pralsetinib has an XRPD pattern that is substantially the same XRPD pattern shown in FIG. 27C.

In another aspect, crystalline pralsetinib HCl salt Form 5-B has an XRPD pattern that substantially includes the peaks in Table 18A-B.

Figure 27D:
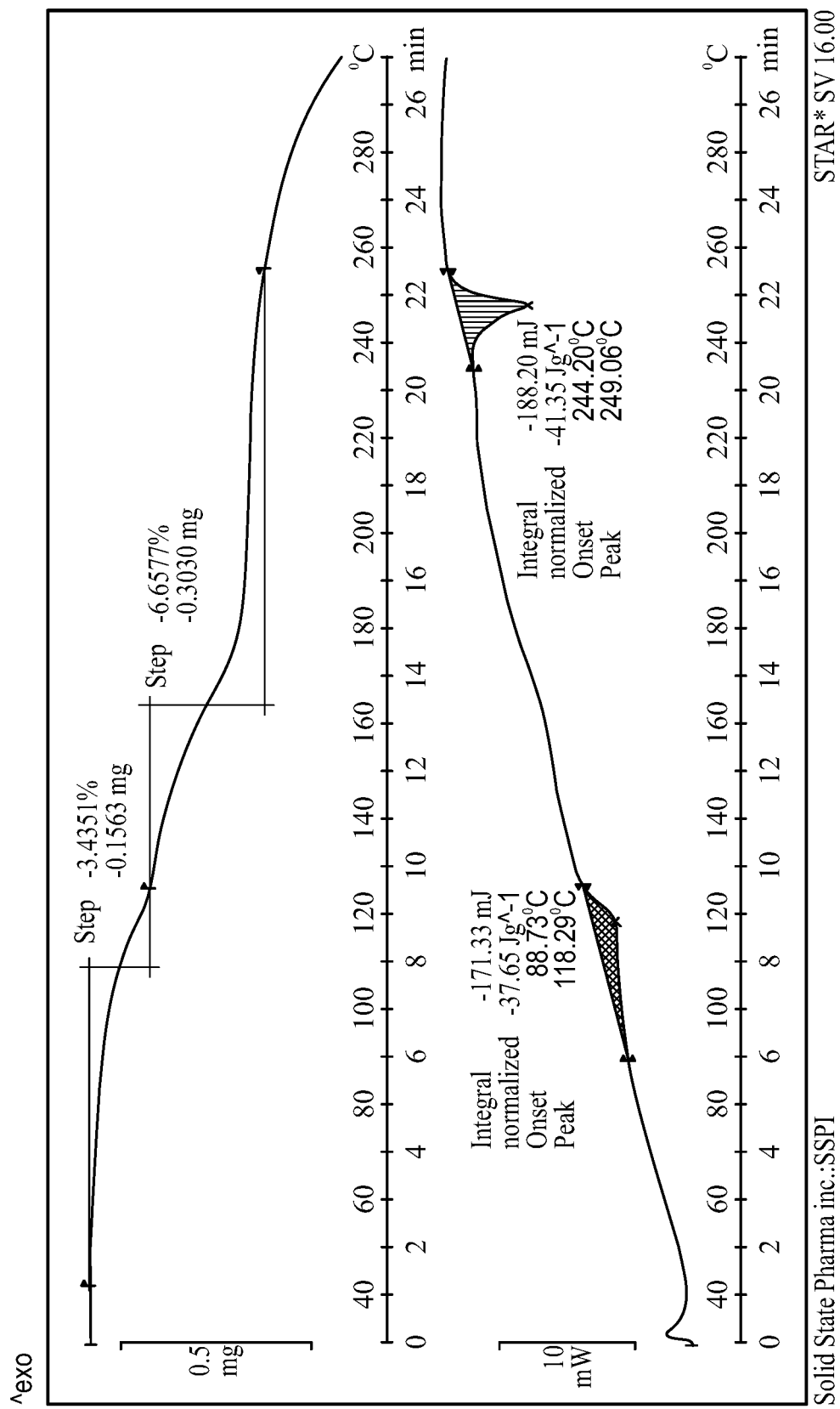
FIG. 27D shows TGA/DSC of Solid Form 5-B.

In one aspect, crystalline pralsetinib HCl salt Form 5-B has a DSC pattern that is substantially the same DSC pattern shown in FIG. 27D. In particular, pralsetinib HCl salt Form 5-B was observed to have a broad endotherm with an onset of 88.7° C. (±0.2 degrees) and a melt which had an onset of 244.2° C. (±0.2 degrees).

In one aspect, crystalline pralsetinib HCl salt Form 5-B has a TGA pattern that is substantially the same TGA pattern shown in FIG. 27D. In particular, an initial mass loss of 3.4 wt. % associated with a broad endotherm with an onset of 88.7° C. (±0.2 degrees) and a second mass loss event of 6.7 wt. % was observed from the end of the first broad endotherm to the end of the melt which had an onset of 244.2° C. (±0.2 degrees). was observed in the pralsetinib HCl salt Form 5-B TGA thermogram.

In one aspect, the crystalline pralsetinib HCl salt Form 5-B is characterized by at least three, at least four, or by at least five, x-ray powder diffraction peaks at 2-theta angles (±0.2 degrees) selected 6.1°, 8.9°, 9.5°, 15.0°, 16.6°; optionally together with one or two the TGA and DSC parameters recited above for pralsetinib HCl salt Form 5-B. Alternatively, crystalline pralsetinib HCl salt Form 5-B is characterized by at least three, at least four, at least five, at least six, at least seven, at least eight, or at least nine x-ray powder diffraction peaks at 2-theta angles (±0.2 degrees) selected from 6.1, 8.9°, 9.5°, 15.0°, 16.6°, 17.2°, 17.9°, 18.4°, 19.8°, 25.8°, and 26.8° optionally together with one, two, or three of the TGA, DSC parameters recited above for pralsetinib HCl salt Form 5-B.

In one aspect, the crystalline pralsetinib HCl salt Form 5-B is characterized by one or more of the following characteristics: (a) a X-ray powder diffraction (XRPD) pattern comprising characteristic diffraction peaks at 2-theta angles at approximately (±0.2 degrees) 6.1°, 8.9°, 9.5°, 15.0°, 16.6°; (b) a DSC thermogram with a to have a broad endotherm with an onset of 88.7° C. (±0.2 degrees) and a melt which had an onset of 244.2° C. (±0.2 degrees); and/or (c) an initial mass loss of 3.4 wt. % associated with a broad endotherm with an onset of 88.7° C. and a second mass loss event of 6.7 wt. % was observed from the end of the first broad endotherm to the end of the melt which had an onset of 244.2° C. (±0.2 degrees).

Pralsetinib HCl salt Form 5-B can obtained by a process comprising isolating the solid from EtOAc and IPA:water (9:1 vol).

In one aspect, the present disclosure provides crystalline pralsetinib HCl salt Form 5-C. In one aspect, crystalline pralsetinib HCl salt Form 5-C is characterized by x-ray powder diffraction pattern. The x-ray powder diffraction pattern can be acquired using a Bruker D8 Advance as described herein. In one embodiment, crystalline pralsetinib HCl salt Form 5-C is characterized by at least three, at least four, or at least five x-ray powder diffraction peaks at 2-theta angles (±0.2 degrees) selected from 6.4°, 8.5°, 8.9°, 9.6°, and 17.3°.

Alternatively, crystalline pralsetinib HCl salt Form 5-C is characterized by at least three, at least four, at least five, at least six, at least seven, at least eight, or at least nine x-ray powder diffraction peaks at 2-theta angles (±0.2 degrees) 6.4°, 8.5°, 8.9°, 9.6°, 11.5°, 16.7°, 17.3°, 19.2°. Alternatively, crystalline pralsetinib HCl salt Form 5-C is characterized by x-ray powder diffraction peaks at 2-theta angles (±0.2 degrees) 6.4°, 8.5°, 8.9°, 9.6°, 11.5°, 16.7°, 17.3°, 19.2°. Alternatively, crystalline pralsetinib HCl salt Form 5-C is characterized by at least three, at least four, at least five, at least six, at least seven, at least eight, at least nine, or at least ten x-ray powder diffraction peaks at 2-theta angles (±0.2 degrees) selected from 6.0°, 6.4°, 8.5°, 8.9°, 9.6°, 11.5°, 12.7°, 15.9°, 16.7°, 17.3°, 19.2°, 21.0°, 26.9°. In another alternative crystalline pralsetinib HCl salt Form 5-C is characterized by x-ray powder diffraction peaks at 2-theta angles (±0.2 degrees) 6.0°, 6.4°, 8.5°, 8.9°, 9.6°, 11.5°, 12.7°, 15.9°, 16.7°, 17.3°, 19.2°, 21.0°, 26.9°. In some embodiments, the peaks described above for crystalline pralsetinib HCl salt Form 5-C have a relative intensity of at least 10%, of at least 15%, of at least 20%, or of at least 25%.

Figure 27E:
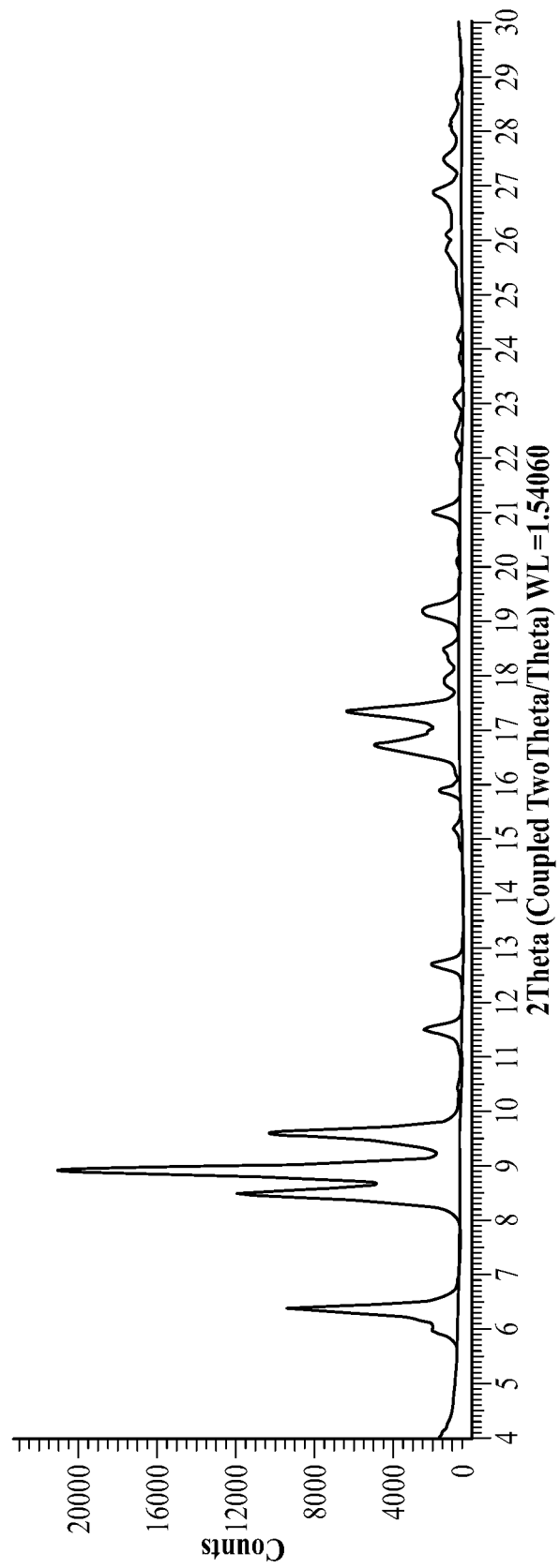
FIG. 27E is a XRPD pattern obtained from a hydrochloride salt of pralsetinib in Solid Form 5-C.

In another aspect, crystalline pralsetinib HCl salt Form 5-C of pralsetinib has an XRPD pattern that is substantially the same XRPD pattern shown in FIG. 27E.

In another aspect, crystalline pralsetinib HCl salt Form II has an XRPD pattern that substantially includes the peaks in Table 18C-E.

Figure 27F:
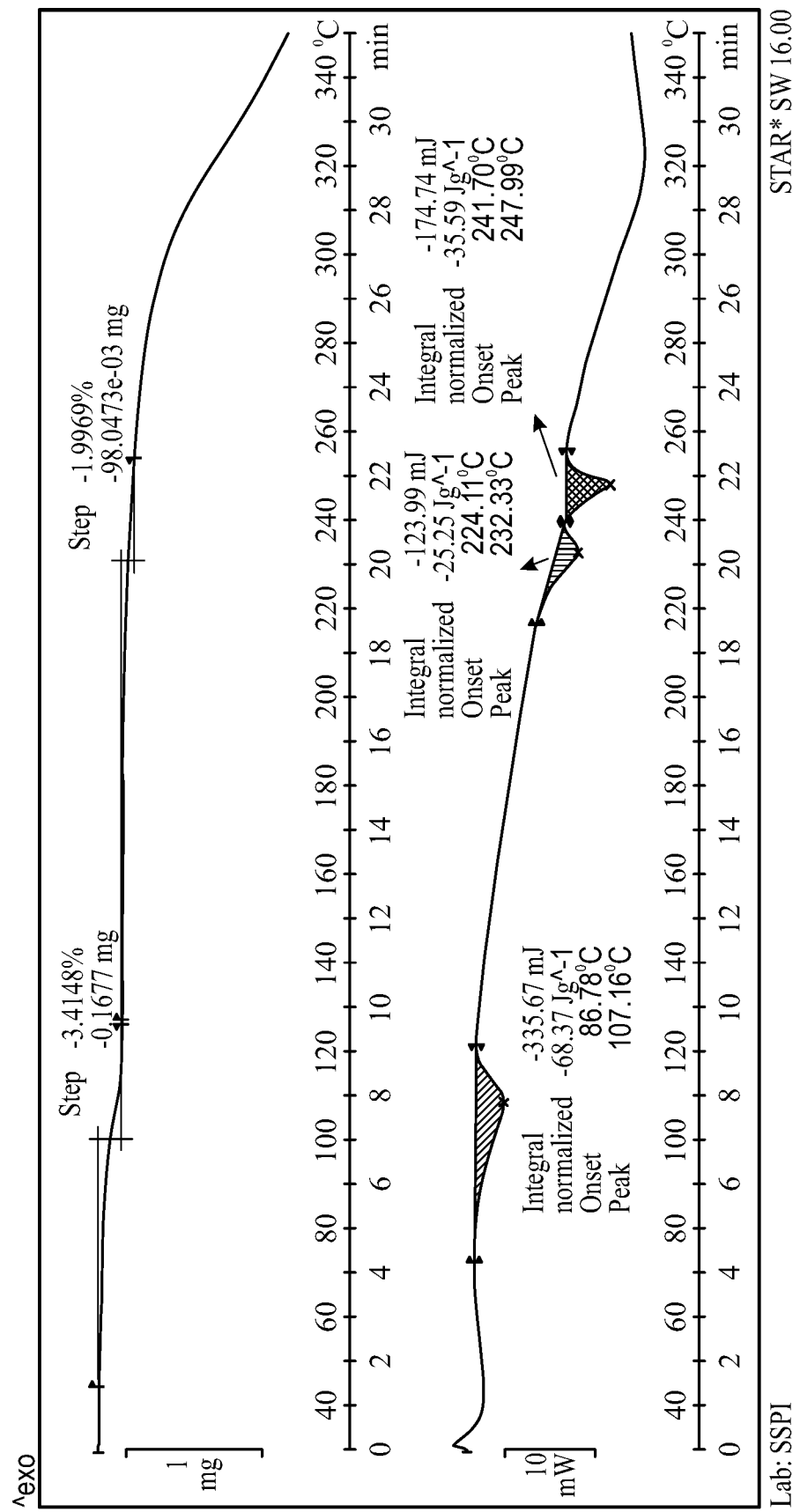
FIG. 27F shows TGA/DSC of Solid Form 5-C.

In one aspect, crystalline pralsetinib HCl salt Form 5-C has a DSC pattern that is substantially the same DSC pattern shown in FIG. 27F. In particular, pralsetinib HCl salt Form 5-C had observed DSC onsets of 86.8° C. (±0.2 degrees), 224.1° C. (±0.2 degrees) and 241.7° C. (±0.2 degrees).

In one aspect, crystalline pralsetinib HCl salt Form 5-C has a TGA pattern that is substantially the same TGA pattern shown in FIG. 27F. In particular, an initial mass loss of 3.4 wt. % and a second mass loss event of 2 wt. % was observed in the pralsetinib HCl salt Form 5-C TGA thermogram.

In one aspect, the crystalline pralsetinib HCl salt Form 5-C is characterized by at least three, at least four, or by at least five, x-ray powder diffraction peaks at 2-theta angles (±0.2 degrees) selected 6.4°, 8.5°, 8.9°, 9.6°, and 17.3° optionally together with one or two the TGA and DSC parameters recited above for pralsetinib HCl salt Form 5-C. Alternatively, crystalline pralsetinib HCl salt Form 5-C is characterized by at least three, at least four, at least five, at least six, at least seven, at least eight, or at least nine x-ray powder diffraction peaks at 2-theta angles (±0.2 degrees) selected from 6.4°, 8.5°, 8.9°, 9.6°, 11.5°, 16.7°, 17.3°, 19.2° optionally together with one, two, or three of the TGA, DSC, DVS parameters recited above for pralsetinib HCl salt Form 5-C. Alternatively, crystalline pralsetinib HCl salt Form 5-C is characterized by at least three, at least four, at least five, at least six, at least seven, at least eight, at least nine, or at least ten x-ray powder diffraction peaks at 2-theta angles (±0.2 degrees) selected from 6.0°, 6.4°, 8.5°, 8.9°, 9.60, 11.5°, 12.7°, 15.9°, 16.7°, 17.3°, 19.2°, 21.0°, 26.9° optionally together with one or two of the TGA, DSC parameters recited above for pralsetinib HCl salt Form 5-C.

In one aspect, the crystalline pralsetinib HCl salt Form 5-C is characterized by one or more of the following characteristics: (a) a X-ray powder diffraction (XRPD) pattern comprising characteristic diffraction peaks at 2-theta angles at approximately (±0.2 degrees) 6.4°, 8.5°, 8.9°, 9.60, and 17.3°; and (b) observed DSC onsets of 86.8° C. (±0.2 degrees), 224.1° C. (±0.2 degrees) and 241.7° C. (±0.2 degrees), and/or (c) an initial mass loss of 3.4 wt. % and a second mass loss event of 2 wt. % was observed in the pralsetinib HCl salt Form 5-C TGA thermogram.

Pralsetinib HCl salt Form 5-C can obtained by a process comprising drying the isolated Pralsetinib HCl salt Form 5-B.

TABLE 17A

XRPD peak list for pralsetinib HCl salt Form 5-A

| 2-theta (θ) | d (Å) | Relative Intensity |
|---|---|---|
| 5.03 | 17.57 | 100 |
| 6.08 | 14.52 | 27 |
| 9.08 | 9.74 | 36 |
| 9.85 | 8.98 | 55 |
| 13.81 | 6.41 | 18 |
| 14.72 | 6.01 | 47 |
| 15.28 | 5.79 | 12 |
| 17.17 | 5.16 | 18 |
| 18.10 | 4.90 | 15 |
| 19.62 | 4.52 | 21 |
| 20.25 | 4.38 | 8 |
| 20.70 | 4.29 | 28 |
| 21.77 | 4.08 | 22 |
| 24.24 | 3.67 | 16 |
| 25.63 | 3.47 | 23 |
| 26.34 | 3.38 | 6 |

TABLE 17B

Selected XRPD peak list for pralsetinib HCl salt Form 5-A

| 2-theta (θ) | d (Å) | Relative Intensity |
|---|---|---|
| 5.03 | 17.57 | 100 |
| 6.08 | 14.52 | 27 |
| 9.08 | 9.74 | 36 |
| 9.85 | 8.98 | 55 |
| 14.72 | 6.01 | 47 |

TABLE 18A

XRPD peak list for pralsetinib HCl salt Form 5-B

| 2-theta (deg) | d-Spacing (ang.) | Relative Intensity |
|---|---|---|
| 6.10 | 14.47 | 56 |
| 8.90 | 9.93 | 100 |
| 9.54 | 9.26 | 22 |
| 15.02 | 5.89 | 6 |
| 16.64 | 5.32 | 15 |
| 17.19 | 5.15 | 7 |
| 17.89 | 4.95 | 13 |
| 18.41 | 4.82 | 8 |
| 19.80 | 4.48 | 6 |
| 25.82 | 3.45 | 21 |
| 26.83 | 3.32 | 36 |

TABLE 18B

Selected XRPD peak list for pralsetinib HCl salt Form 5-B

| 2-theta (deg) | d-Spacing (ang.) | Relative Intensity |
|---|---|---|
| 6.10 | 14.47 | 56 |
| 8.90 | 9.93 | 100 |
| 9.54 | 9.26 | 22 |
| 15.02 | 5.89 | 6 |
| 16.64 | 5.32 | 15 |

TABLE 18C

XRPD peak list for pralsetinib HCl salt Form 5-C

| 2-theta (deg) | d-Spacing (ang.) | Relative Intensity |
|---|---|---|
| 5.99 | 14.75 | 6 |
| 6.38 | 13.85 | 42 |
| 8.49 | 10.40 | 55 |
| 8.92 | 9.91 | 100 |
| 9.60 | 9.21 | 48 |
| 11.51 | 7.68 | 9 |
| 12.70 | 6.97 | 8 |
| 15.89 | 5.57 | 5 |
| 16.74 | 5.29 | 21 |
| 17.34 | 5.11 | 28 |
| 19.19 | 4.60 | 9 |
| 21.00 | 4.23 | 7 |
| 26.88 | 3.31 | 7 |

TABLE 18D

Selected XRPD peak list for pralsetinib HCl salt Form 5-C

| 2-theta (deg) | d-Spacing (ang.) | Relative Intensity |
|---|---|---|
| 6.38 | 13.85 | 42 |
| 8.49 | 10.40 | 55 |
| 8.92 | 9.91 | 100 |

TABLE 18D-continued

Selected XRPD peak list for pralsetinib HCl salt Form 5-C

| 2-theta (deg) | d-Spacing (ang.) | Relative Intensity |
|---|---|---|
| 9.60 | 9.21 | 48 |
| 11.51 | 7.68 | 9 |
| 16.74 | 5.29 | 21 |
| 17.34 | 5.11 | 28 |
| 19.19 | 4.60 | 9 |

TABLE 18E

Further selected XRPD peak list for pralsetinib HCl salt Form 5-C

| 2-theta (deg) | d-Spacing (ang.) | Relative Intensity |
|---|---|---|
| 6.38 | 13.85 | 42 |
| 8.49 | 10.40 | 55 |
| 8.92 | 9.91 | 100 |
| 9.60 | 9.21 | 48 |
| 17.34 | 5.11 | 28 |

Compound (I) can be prepared as a solid phosphate salt form. The phosphate pralsetinib salt form in solid form 14A (e.g., characterized by the XRPD pattern 14A in FIG. 28A) was the only pattern isolated from all three of the solvent systems and was high crystallinity and stable to both drying and humidification. Pralsetinib phosphate solid form 14-A was also the only pattern observed for this counter-ion during the screening and was found to be stable to both drying and humidification. Table 19A, Table 19B, Table 19C and Table 19D are each a list of XPRD (2-theta) peaks obtained from samples of the phosphate salt of pralsetinib in Solid Form 14-A.

TABLE 19A

| 2-theta (deg) | d-Spacing (ang.) | Relative Intensity |
|---|---|---|
| 10.05 | 8.80 | 85 |
| 12.99 | 6.81 | 88 |
| 15.16 | 5.84 | 50 |
| 19.51 | 4.55 | 49 |
| 21.23 | 4.18 | 100 |

TABLE 19B

| 2-theta (deg) | d-Spacing (ang.) | Relative Intensity |
|---|---|---|
| 5.88 | 15.01 | 39 |
| 8.80 | 10.04 | 48 |
| 9.62 | 9.18 | 41 |
| 10.05 | 8.80 | 85 |
| 12.99 | 6.81 | 88 |
| 15.16 | 5.84 | 50 |
| 17.55 | 5.05 | 43 |
| 19.51 | 4.55 | 49 |
| 21.23 | 4.18 | 100 |
| 22.54 | 3.94 | 47 |

TABLE 19C

| 2-theta (deg) | d-Spacing (ang.) | Relative Intensity |
|---|---|---|
| 5.88 | 15.01 | 39 |
| 8.80 | 10.04 | 48 |
| 9.62 | 9.18 | 41 |
| 10.05 | 8.80 | 85 |
| 11.24 | 7.86 | 27 |
| 12.99 | 6.81 | 88 |
| 14.66 | 6.04 | 8 |
| 15.16 | 5.84 | 50 |
| 16.40 | 5.40 | 6 |
| 16.69 | 5.31 | 9 |
| 17.55 | 5.05 | 43 |
| 18.94 | 4.68 | 19 |
| 18.94 | 4.68 | 19 |
| 19.51 | 4.55 | 49 |
| 20.15 | 4.40 | 33 |
| 20.12 | 4.41 | 33 |
| 20.82 | 4.26 | 10 |
| 21.23 | 4.18 | 100 |
| 21.91 | 4.05 | 11 |
| 22.28 | 3.99 | 14 |
| 22.54 | 3.94 | 47 |
| 23.55 | 3.77 | 16 |
| 24.30 | 3.66 | 37 |
| 25.43 | 3.50 | 13 |
| 26.10 | 3.41 | 14 |
| 26.55 | 3.36 | 24 |
| 27.40 | 3.25 | 6 |
| 28.51 | 3.13 | 16 |
| 29.08 | 3.07 | 9 |
| 30.75 | 2.91 | 8 |
| 35.30 | 2.54 | 5 |

TABLE 19D

| 2θ (deg.) | d-spacing (ang.) | Relative Intensity |
|---|---|---|
| 5.88 | 15.01 | 53 |
| 8.80 | 10.04 | 57 |
| 9.62 | 9.19 | 43 |
| 10.05 | 8.80 | 100 |
| 11.23 | 7.88 | 30 |
| 12.99 | 6.81 | 86 |
| 14.66 | 6.04 | 6 |
| 15.15 | 5.84 | 58 |
| 16.39 | 5.40 | 7 |
| 16.69 | 5.31 | 9 |
| 17.57 | 5.04 | 51 |
| 18.95 | 4.68 | 23 |
| 19.49 | 4.55 | 60 |
| 20.17 | 4.40 | 39 |
| 21.21 | 4.19 | 89 |
| 21.87 | 4.06 | 5 |
| 22.50 | 3.95 | 67 |
| 23.55 | 3.77 | 13 |
| 24.29 | 3.66 | 39 |
| 25.43 | 3.50 | 13 |
| 26.09 | 3.41 | 20 |
| 26.53 | 3.36 | 23 |
| 27.40 | 3.25 | 8 |
| 28.48 | 3.13 | 24 |
| 29.07 | 3.07 | 8 |
| 30.71 | 2.91 | 9 |
| 32.95 | 2.72 | 6 |
| 35.27 | 2.54 | 6 |

The phosphate pralsetinib salt in solid form 14-A had low residual solvent (0.06 wt. 5% in EtOH). The thermogram revealed a high temperature melt with an onset at 198.4° C. TGA/DSC in FIG. 28B of the pralsetinib phosphate salt in solid form 14-A revealed an initial mass loss of 1.3 wt. % associated with a small broad endotherm with an onset of 105.8° C. From the end of the initial endotherm to the end of the melt event with an onset of 241.9° C., a second mass loss of 1.6 wt. % was observed, followed by decomposition. Water content by KF was found to be 1.1 wt. % and 1H-NMR revealed 0.32 wt. % residual EtOH in the dried solids.

Figure 28A:
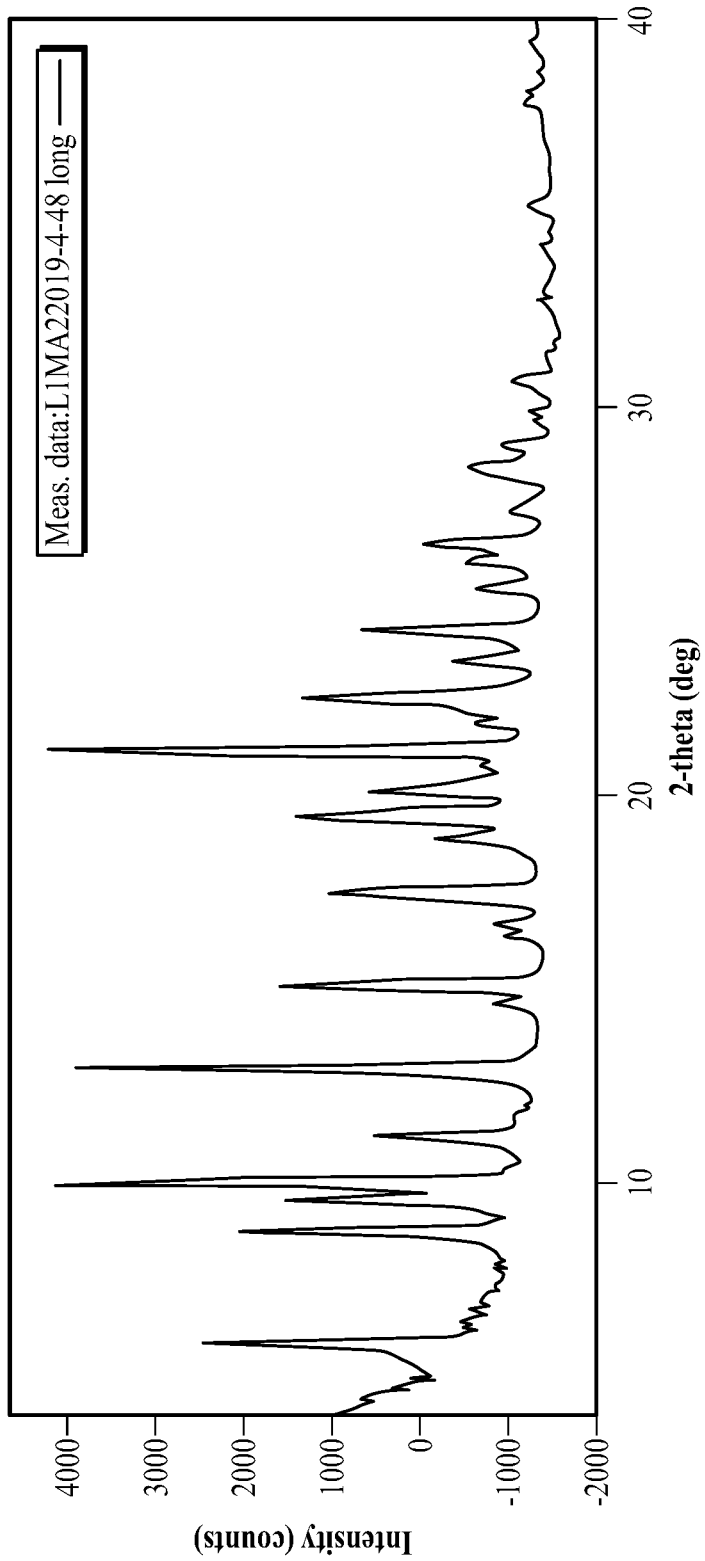
FIG. 28A is a XRPD pattern obtained from a phosphate salt of pralsetinib in Solid Form 14-A.
Figure 28B:
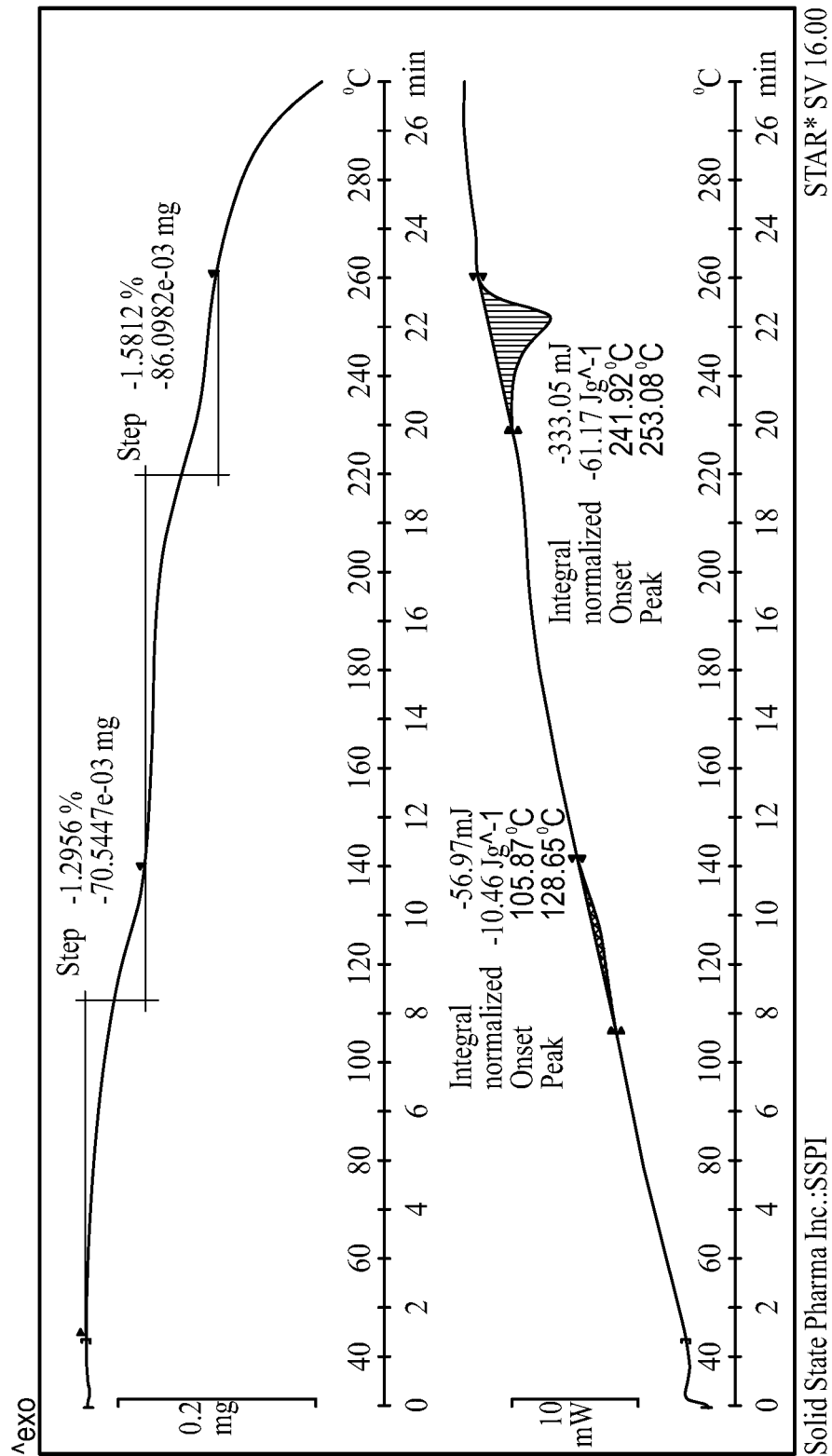
FIG. 28B shows DSC and TGA thermograms of the material tested in FIG. 28A, obtained from a phosphate salt of pralsetinib in Solid Form 14-A.
Figure 28C:
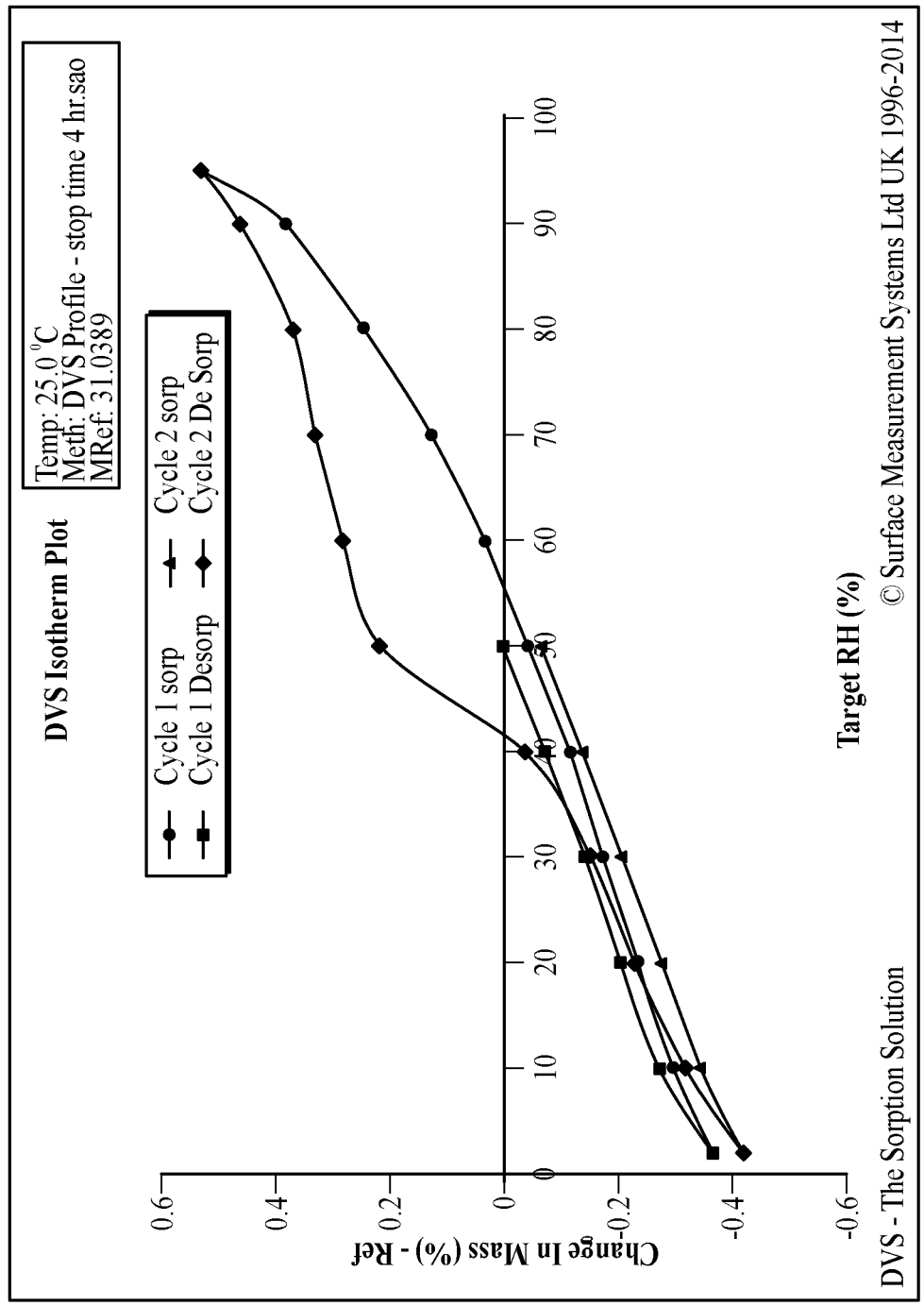
FIG. 28C is a DVS isotherm obtained from a sample of a phosphate salt of pralsetinib pralsetinib in Solid Form 14-A.

Samples of pralsetinib phosphate salt in solid form 14-A exhibited high purity (99.88% by HPLC). Pralsetinib phosphate salt in solid form 14-A was stable slurrying 7 days in EtOH, EtOAc, and EtOH:water (95:5 vol) by XRPD and HPLC, however there was a 0.07% reduction in the materials isolated from EtOAc. The pralsetinib phosphate salt was also stable on exposure to 75% RH at 40° C. for 7 days. In addition, the pralsetinib phosphate salt in solid form 14-A exhibited high solubility in water and some simulated fluids. Solubility in fasted state simulated intestinal fluid was 0.20 mg/mL and the residual solid was identified as pralsetinib freebase solid form A. The solubility was 0.49 mg/mL in the fed state simulated intestinal fluid with residual solids being amorphous. Solubility in fasted state simulated gastric fluid was 1.76 mg/mL and the resulting solid was amorphous. Solubility in water was 1.70 mg/mL and the residual solids were characterized as XRPD Pattern 14-A (FIG. 28A). Pralsetinib phosphate salt in solid form 14-A showed a mass change of 0.94 wt. % between 2% and 90% relative humidity. Between 15% and 75% relative humidity there was a mass change of 0.86 wt. %. There was minimal hysteresis observed in the plot and this loss of water appears to be reversible. DVS isotherms of pralsetinib phosphate salt in solid form 14-A were obtained as shown in FIG. 28C.

Figure 29A:
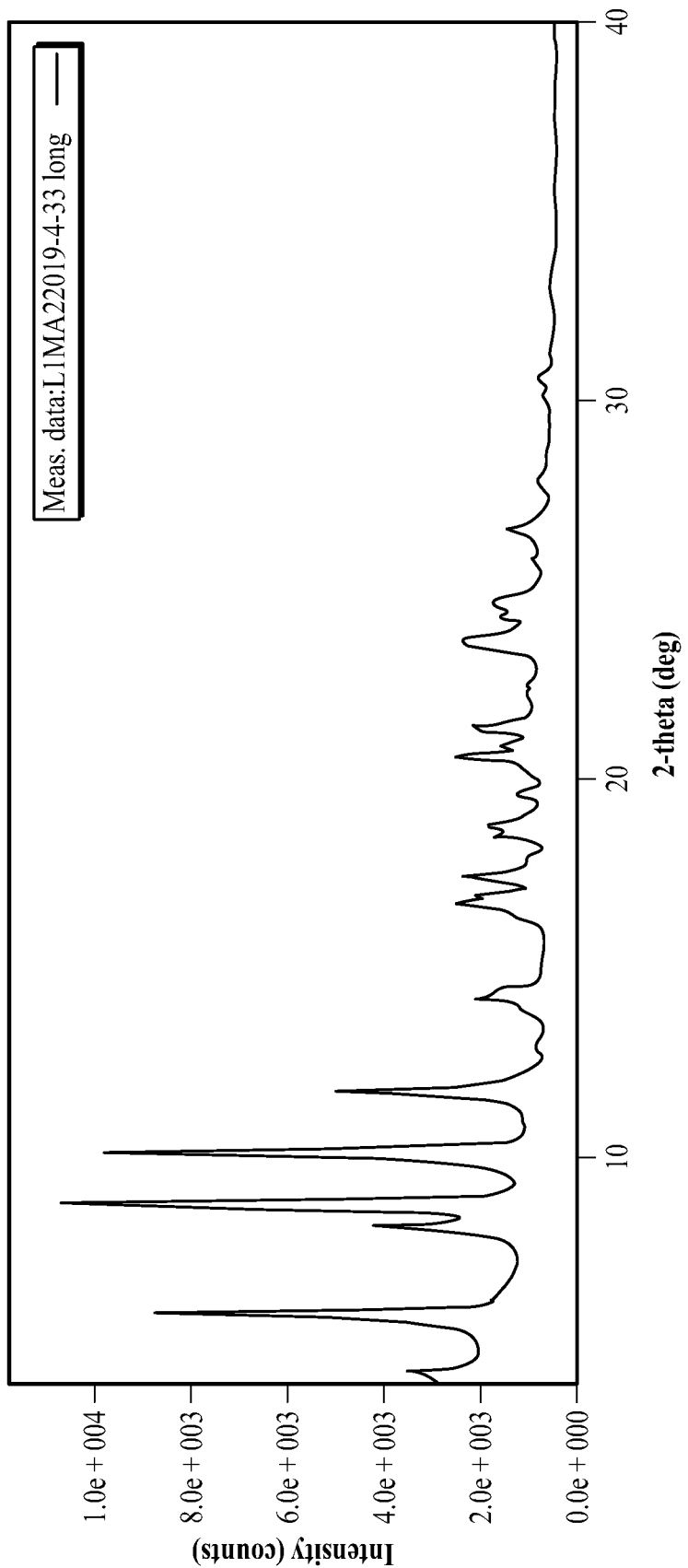
FIG. 29A is a XRPD pattern obtained from a glutarate salt of pralsetinib in Solid Form 11-A.
Figure 29B:
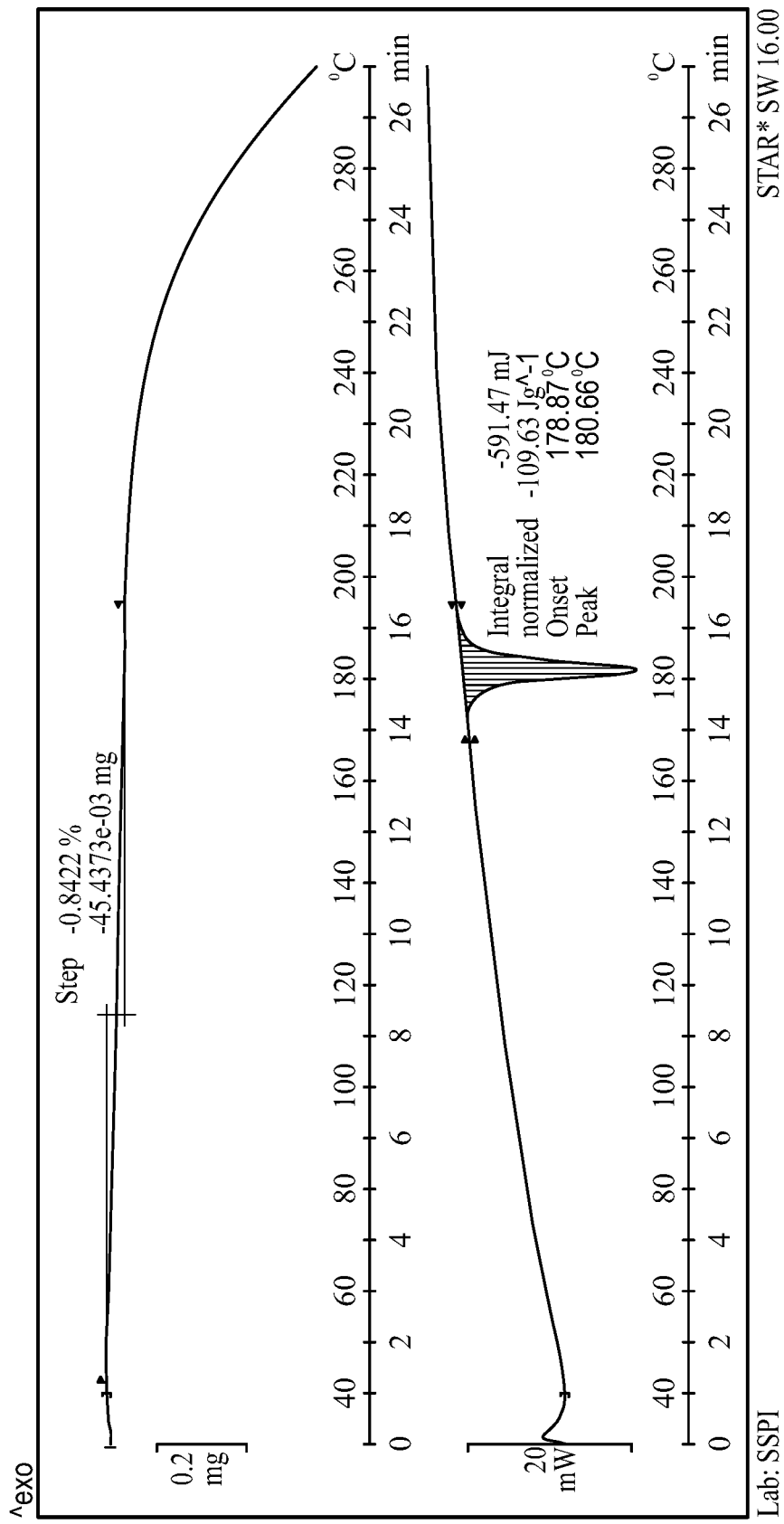
FIG. 29B shows DSC and TGA thermograms of the material tested in FIG. 29A, obtained from a glutarate salt of pralsetinib in Solid Form 11-A.

Compound (I) can be prepared as a solid glutarate salt form. For example, pralsetinib glutarate salt in solid form 11-A (FIG. 29A) was isolated as a highly crystalline material from multiple solvent systems and was stable to drying and humidification. The water solubility at room temperature was moderate at 0.24 mg/mL while residual solvents were low (e.g., 0.09 wt. % EtOH in one sample) and the thermogram (FIG. 29B) revealed a single sharp endotherm with an onset of 177.8° C. An XRPD pattern (FIG. 29A) and peak list (Table 20A, Table 20B, Table 20C and Table 20D) are provided below for the solid form 11-A of the pralsetinib glutarate salt.

TABLE 20A

| 2-theta (deg) | d-Spacing (ang.) | Relative Intensity |
|---|---|---|
| 5.89 | 14.99 | 68 |
| 8.20 | 10.78 | 31 |
| 8.82 | 10.02 | 100 |
| 10.15 | 8.71 | 96 |
| 11.76 | 7.52 | 45 |

TABLE 20B

| 2-theta (deg) | d-Spacing (ang.) | Relative Intensity |
|---|---|---|
| 5.89 | 14.99 | 68 |
| 8.20 | 10.78 | 31 |
| 8.82 | 10.02 | 100 |
| 10.15 | 8.71 | 96 |
| 11.76 | 7.52 | 45 |
| 16.75 | 5.29 | 21 |
| 17.46 | 5.07 | 18 |
| 20.63 | 4.30 | 21 |
| 21.42 | 4.15 | 16 |
| 23.70 | 3.75 | 17 |

TABLE 20C

| 2-theta (deg) | d-Spacing (ang.) | Relative Intensity |
|---|---|---|
| 5.89 | 14.99 | 68 |
| 8.20 | 10.78 | 31 |
| 8.82 | 10.02 | 100 |
| 10.15 | 8.71 | 96 |
| 11.76 | 7.52 | 45 |
| 14.26 | 6.21 | 15 |
| 14.36 | 6.16 | 11 |
| 16.45 | 5.38 | 6 |
| 16.75 | 5.29 | 21 |
| 16.91 | 5.24 | 15 |
| 17.46 | 5.07 | 18 |
| 18.53 | 4.78 | 10 |
| 18.78 | 4.72 | 13 |
| 19.64 | 4.52 | 6 |
| 20.63 | 4.30 | 21 |
| 20.93 | 4.24 | 9 |
| 21.42 | 4.15 | 16 |
| 23.70 | 3.75 | 17 |
| 24.35 | 3.65 | 9 |
| 24.74 | 3.60 | 12 |
| 26.69 | 3.34 | 9 |

TABLE 20D

| 2θ (deg.) | d-spacing (ang.) | Relative Intensity |
|---|---|---|
| 4.36 | 20.25 | 41 |
| 5.90 | 14.97 | 75 |
| 8.25 | 10.71 | 28 |
| 8.85 | 9.98 | 100 |
| 10.15 | 8.71 | 95 |
| 11.76 | 7.52 | 51 |
| 14.34 | 6.17 | 18 |
| 16.81 | 5.27 | 32 |
| 17.48 | 5.07 | 14 |
| 18.80 | 4.72 | 15 |
| 20.62 | 4.30 | 14 |
| 20.96 | 4.24 | 6 |
| 21.43 | 4.14 | 14 |
| 23.74 | 3.75 | 27 |
| 24.70 | 3.60 | 25 |
| 26.68 | 3.34 | 10 |

Figure 29C:
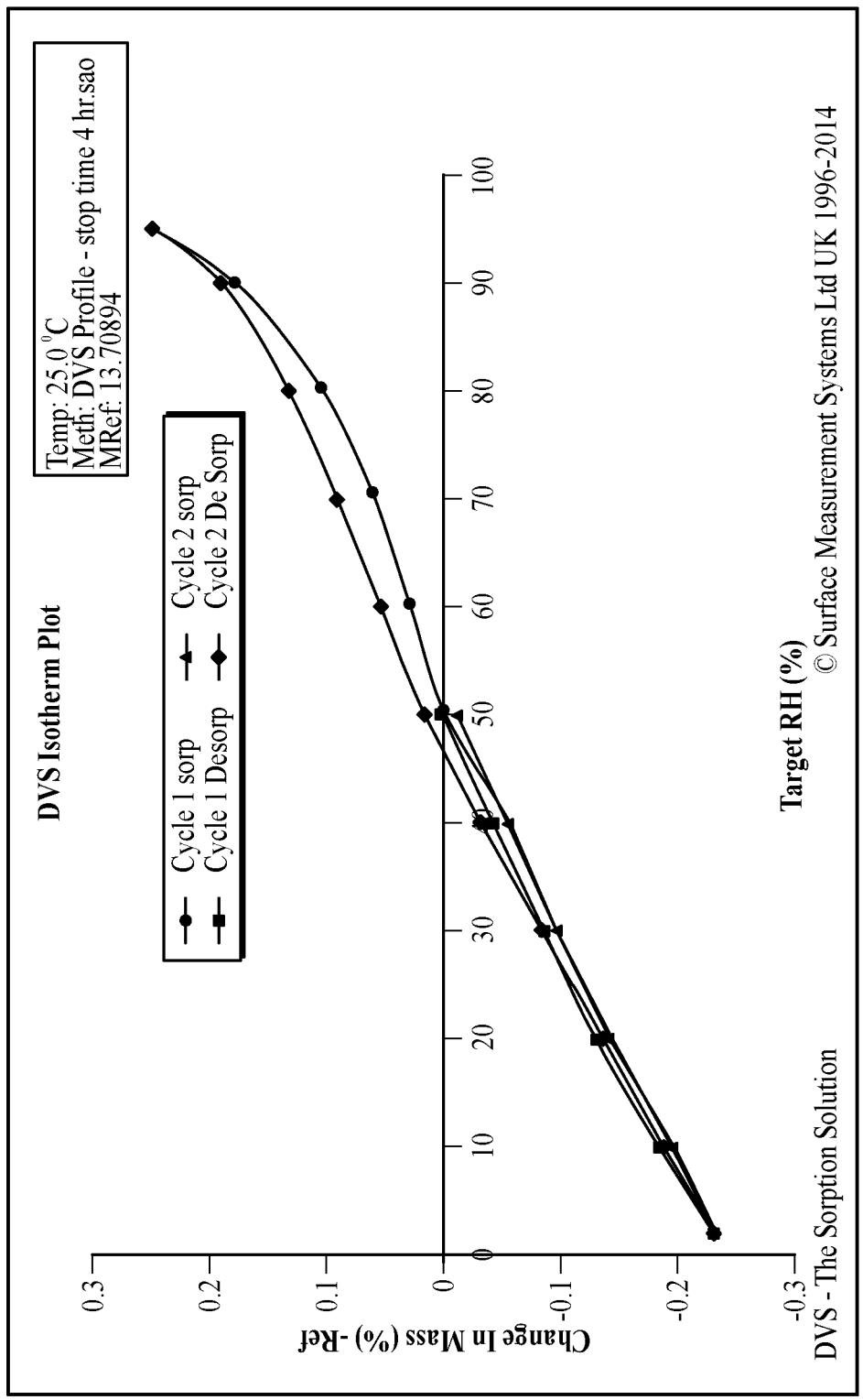
FIG. 29C is a DVS isotherm obtained from a sample of a glutarate salt of pralsetinib pralsetinib in Solid Form 11-A.

The pralsetinib glutarate solid form 11-A was initially observed for this counter-ion during the initial screening experiments and was found to be stable to both drying and humidification. The TGA/DSC of pralsetinib glutarate salt in solid form 11-A (FIG. 29B) revealed a gradual mass loss of 0.8 wt. % from 40° C. to the end of the melt event which had an onset of 187.9° C. Water content by KF was found to be below the detection limit for a 14.4 mg sample size and 1H-NMR revealed 0.11 wt. % residual EtOH in the dried solids. The stoichiometry, by NMR, was higher than expected with a ratio of 1.16:1 (CI:API). However, it should be noted that the peak corresponding to glutaric acid overlaps with one of the API peaks which introduces an increased error to the calculation. The pralsetinib glutarate solid form 11-A exhibited high purity (99.85% by HPLC). DVS isotherms of the pralsetinib glutarate salt in solid form 11-A shown in FIG. 29C. The pralsetinib glutarate salt in solid form 11-A showed a small mass change of 0.48 wt. % between 2% and 90% relative humidity. Between 15% and 75% relative humidity there was a mass change of 0.27 wt. %. There was minimal hysteresis observed in the plot and this loss of water appears to be reversible.

Figure 30:
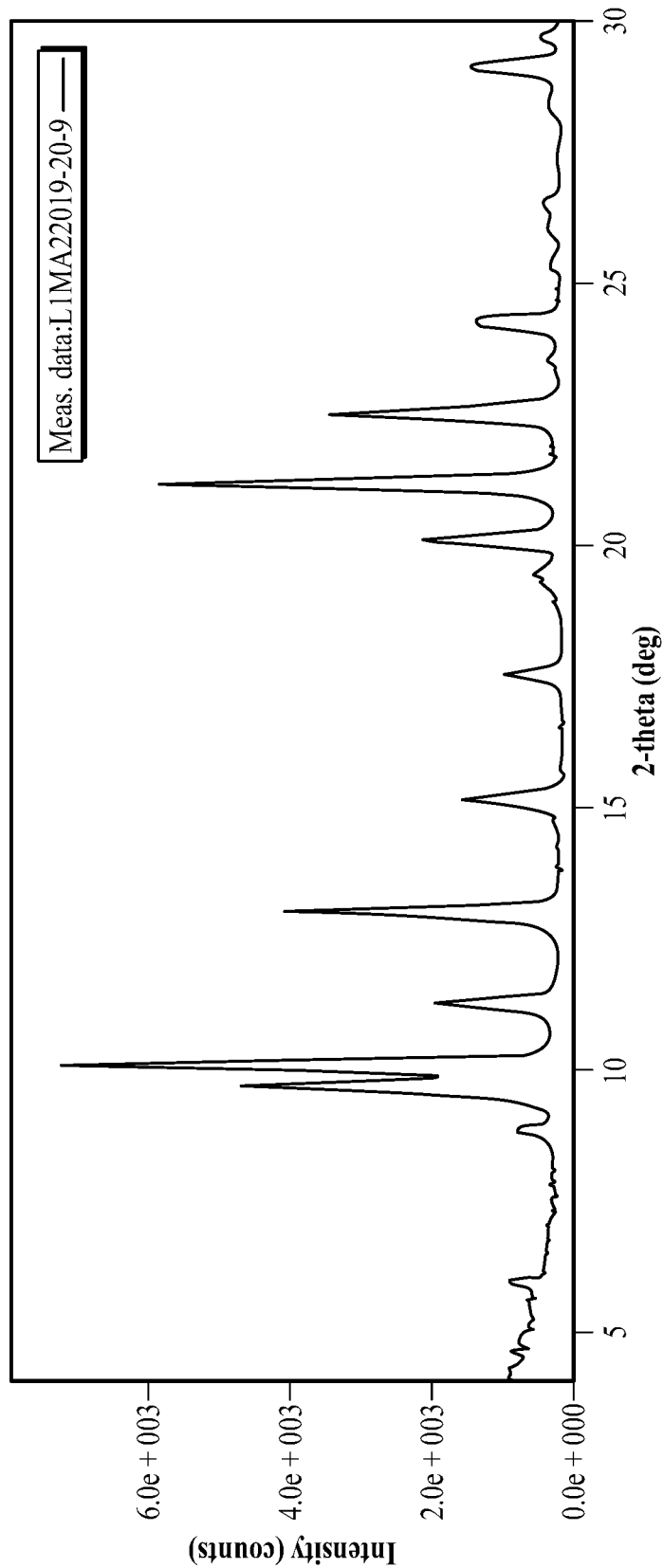
FIG. 30 is a XRPD pattern obtained from a glutarate salt of pralsetinib in Solid Form 11-B.

During the one week slurry experiments, pralsetinib glutarate salt in solid form 11-A converted to a solid form designated as solid form 11-B in EtOH and EtOAc and was a mixture of Pattern 11-B and another form. An XRPD Pattern 11-B (FIG. 30) of this solid form of Compound (I) glutarate salt is provided with a list of XRPD peaks (e.g., Table 21A, Table 21B, Table 21C and Table 21D).

TABLE 21A

| 2-theta (deg) | d-Spacing (ang.) | Relative Intensity |
|---|---|---|
| 9.65 | 9.15 | 63 |
| 10.08 | 8.77 | 100 |
| 13.02 | 6.79 | 59 |
| 21.25 | 4.18 | 93 |
| 22.55 | 3.94 | 54 |

TABLE 21B

| 2-theta (deg) | d-Spacing (ang.) | Relative Intensity |
|---|---|---|
| 9.65 | 9.15 | 63 |
| 10.08 | 8.77 | 100 |
| 11.26 | 7.85 | 25 |
| 13.02 | 6.79 | 59 |
| 17.57 | 5.04 | 13 |
| 20.15 | 4.40 | 31 |
| 21.25 | 4.18 | 93 |
| 22.55 | 3.94 | 54 |
| 24.30 | 3.66 | 19 |
| 29.13 | 3.06 | 21 |

TABLE 21C

| 2-theta (deg) | d-Spacing (ang.) | Relative Intensity |
|---|---|---|
| 8.82 | 10.01 | 6 |
| 9.65 | 9.15 | 63 |
| 10.08 | 8.77 | 100 |
| 11.26 | 7.85 | 25 |
| 13.02 | 6.79 | 59 |
| 17.57 | 5.04 | 13 |
| 19.54 | 4.54 | 5 |
| 20.15 | 4.40 | 31 |
| 21.25 | 4.18 | 93 |
| 22.55 | 3.94 | 54 |
| 24.30 | 3.66 | 19 |
| 29.13 | 3.06 | 21 |

TABLE 21D

| 2θ (deg.) | d-spacing (ang.) | Relative Intensity |
|---|---|---|
| 5.93 | 14.90 | 6 |
| 8.83 | 10.01 | 5 |
| 9.66 | 9.15 | 59 |
| 10.09 | 8.76 | 100 |
| 11.27 | 7.84 | 29 |
| 13.03 | 6.79 | 58 |
| 15.17 | 5.84 | 24 |
| 17.56 | 5.05 | 11 |
| 19.53 | 4.54 | 10 |
| 20.16 | 4.40 | 23 |
| 21.25 | 4.18 | 79 |
| 22.51 | 3.95 | 43 |
| 24.28 | 3.66 | 19 |
| 26.48 | 3.36 | 7 |
| 28.41 | 3.14 | 6 |
| 29.08 | 3.07 | 24 |
| 29.68 | 3.01 | 7 |

Figure 31A:
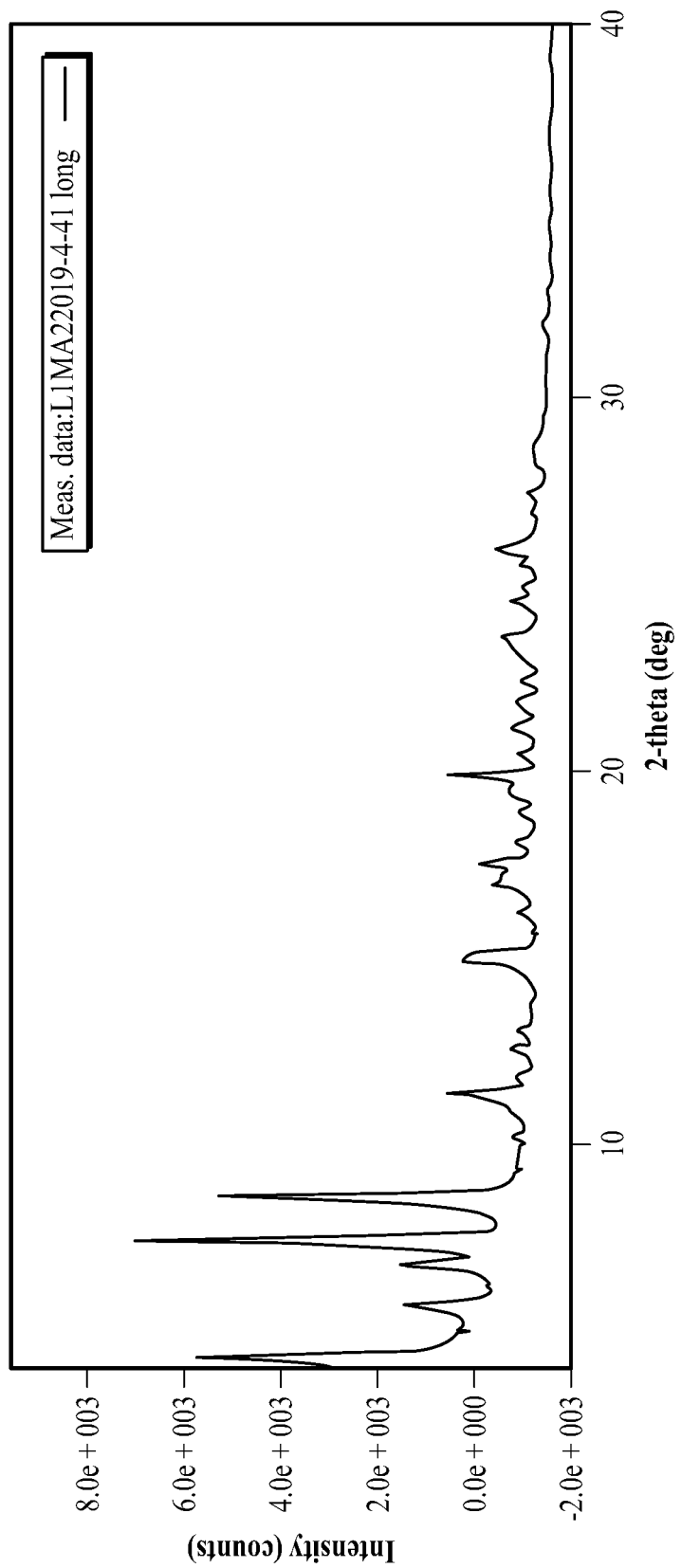
FIG. 31A is a XRPD pattern obtained from a succinate salt of pralsetinib in Solid Form 15-A.
Figure 31B:
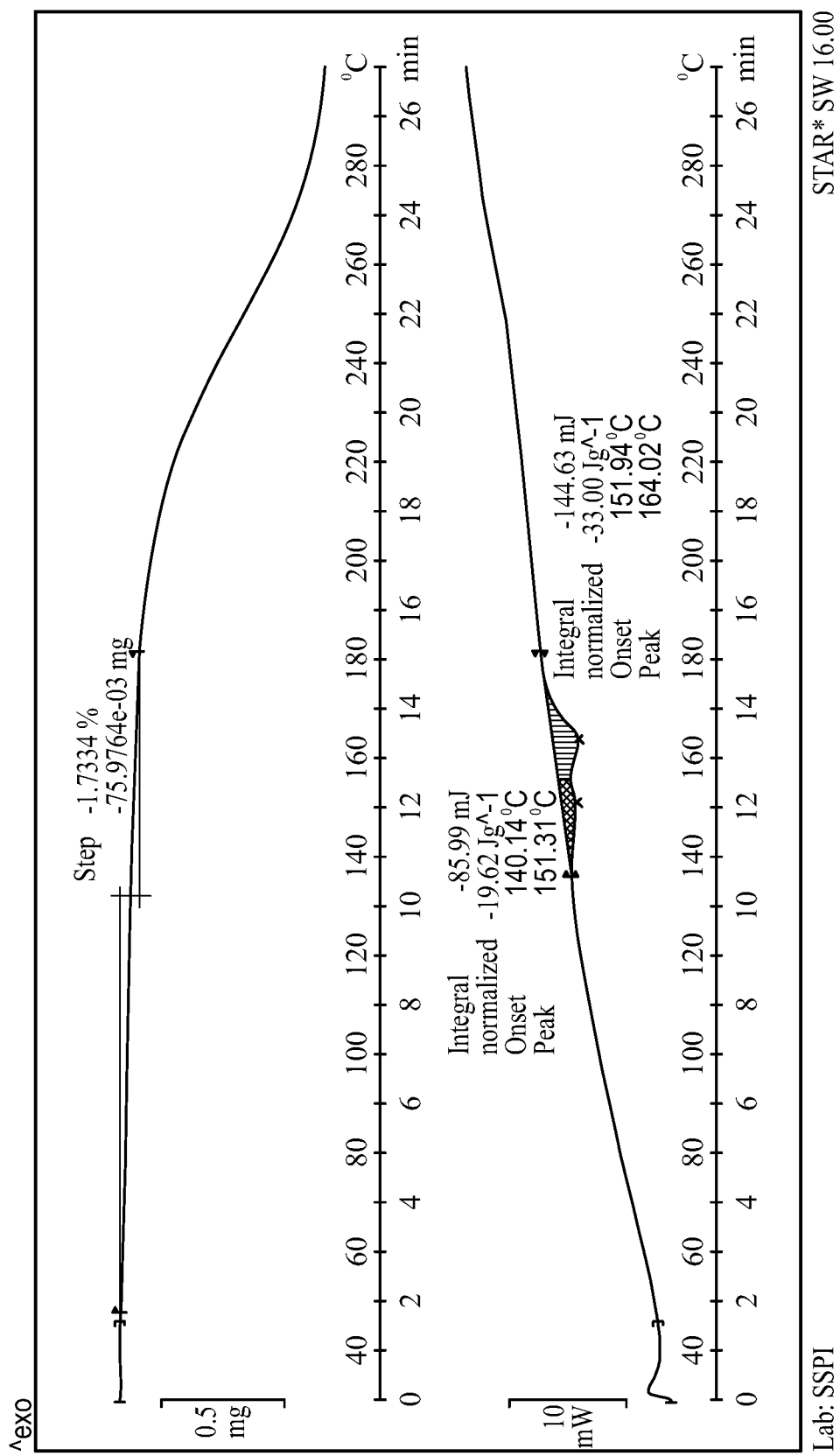
FIG. 31B shows DSC and TGA thermograms of the material tested in FIG. 31A, obtained from a succinate salt of pralsetinib in Solid Form 15-A.

Compound (I) can be prepared as a solid succinate salt form. A pralsetinib succinate salt was prepared as solid form 15-A, characterized by the XRPD pattern 15-A in FIG. 31A, the DSC/TGA thermogram in FIG. 31B and/or the DVS isotherm pattern in FIG. 31C. The pralsetinib succinate solid form 15-A, while isolated as a stable and highly crystalline solid from EtOH, had a higher residual solvent then other candidates and was observed to have broad low enthalpy thermal events by TGA/DSC whereas other candidates exhibited single sharp melt events. For example, the pralsetinib succinate solid form 15-A can be identified by an XRPD pattern comprising the peaks at 2 theta angles specified in Table 22.

TABLE 22

| 2θ (deg.) | d-spacing (ang.) | Relative Intensity |
|---|---|---|
| 4.33 | 20.38 | 100 |
| 5.70 | 15.48 | 20 |
| 6.85 | 12.89 | 18 |
| 7.47 | 11.83 | 95 |
| 8.63 | 10.24 | 94 |
| 11.42 | 7.74 | 30 |
| 11.85 | 7.46 | 5 |
| 15.00 | 5.90 | 27 |
| 17.20 | 5.15 | 20 |
| 17.53 | 5.05 | 7 |
| 19.51 | 4.55 | 9 |
| 19.90 | 4.46 | 17 |
| 21.26 | 4.18 | 5 |
| 21.89 | 4.06 | 5 |
| 23.61 | 3.77 | 14 |
| 25.95 | 3.43 | 19 |
| 28.63 | 3.12 | 5 |

The pralsetinib succinate salt solid form providing XRPD Pattern 15-A was the only pattern observed for this counterion during the initial screening experiments and was found to be stable to both drying and humidification.

TGA/DSC of solid form 15-A of the pralsetinib succinate salt (FIG. 31B) revealed a gradual mass loss of 1.7 wt. % from 45° C. to the end of the second endotherm which had an onset of 151.9° C. The first endotherm occurred at an onset if 140.1° C. Water content by KF was found to be below the detection limit for an 8.2 mg sample size and 1H-NMR revealed 0.74 wt. % residual EtOH and 0.38 wt. % residual MeOH in the dried solids. The stoichiometry, by NMR, was higher than expected with a ratio of 1.10:1 (CI:API).

The pralsetinib succinate salt in solid form 15-A exhibited high purity (99.85% by HPLC). Solid form 15-A of the pralsetinib succinate salt was stable slurrying 7 days in EtOH, EtOAc, but converted to Pattern 15-C in EtOH:water (95:5 vol) by XRPD. This succinate pralsetinib salt was stable, by HPLC, but had a reduction in purity of 0.13% in the EtOH:water (95:5 vol) slurry. The succinate converted to Pattern 15-A+B on exposure to 75% RH at 40° C. for 7 days.

The pralsetinib succinate in solid form 15-A exhibited high solubility in fasted state simulated gastric fluid. Solubility in fasted state simulated intestinal fluid was 0.02 mg/mL. Solubility was 0.84 mg/mL in the fed state simulated intestinal fluid with residual solids identified as amorphous. Solubility in fasted state simulated gastric fluid was 1.12 mg/mL and the resulting solid was designated solid form 15-D. Solubility in water was 0.45 mg/mL.

Figure 31C:
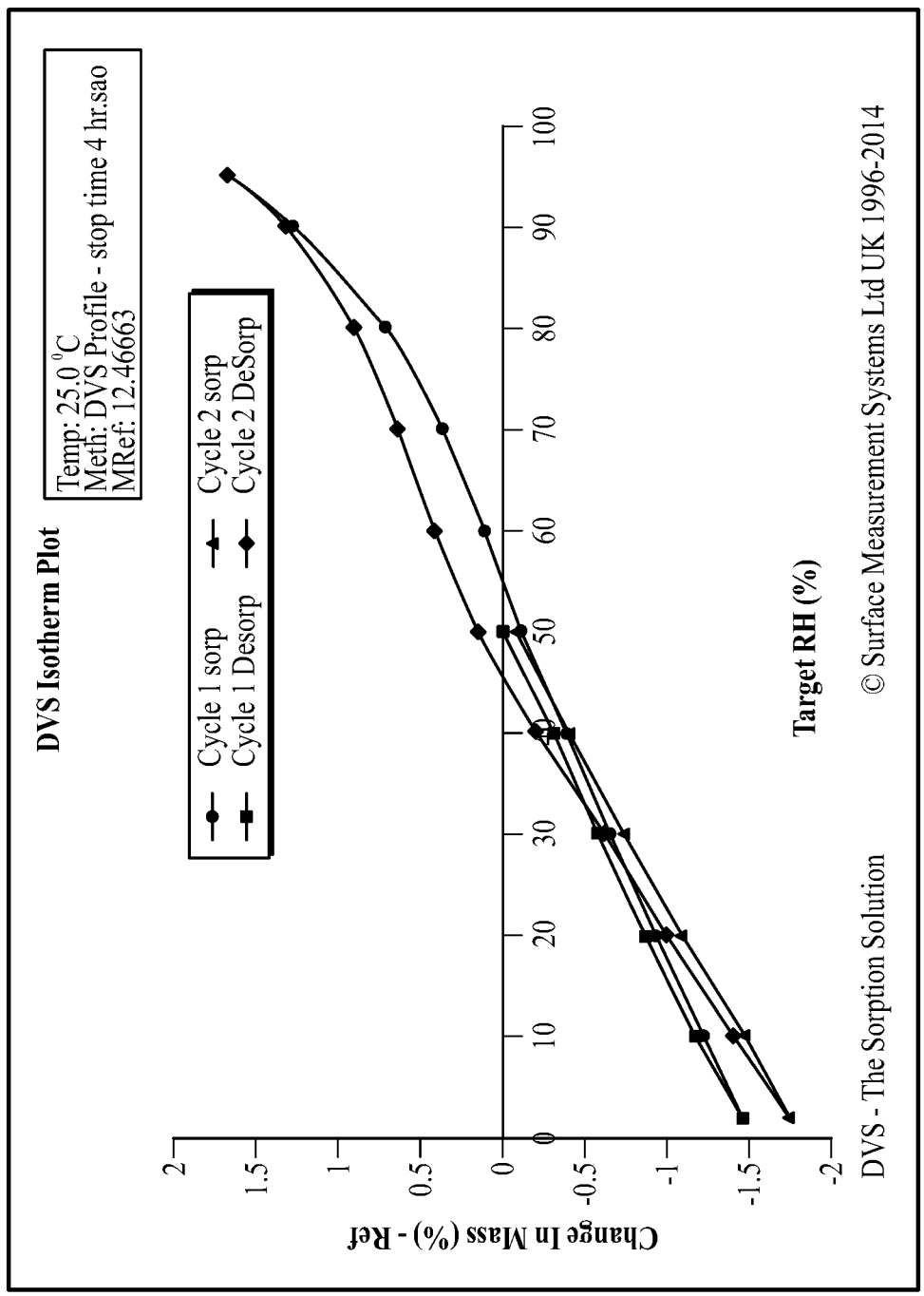
FIG. 31C is a DVS isotherm obtained from a sample of a succinate salt of pralsetinib pralsetinib in Solid Form 15-A.

DVS isotherms of the pralsetinib succinate salt in solid form 15-A are shown in FIG. 31C. Pralsetinib succinate salt is solid form 15-A showed a mass change of 3.4 wt. % between 2% and 90% relative humidity. Between 15% and 75% relative humidity there was a mass change of 1.9 wt. %. There was minimal hysteresis observed in the plot and this loss of water appears to be reversible. However, new peaks which did not correspond to the freebase or counter ion appeared in the XRPD pattern after humidity exposure in the DVS and the pattern was designated as Pattern/solid forms 15 A+B.

Compound (I) can be prepared as a solid maleate salt form. Maleate 8-A was only moderately crystalline, with a lower crystallinity than other candidates. However, it did have a melt onset with a clean thermogram and low residual solvent by NMR. The salicylate 10-A was low solubility in water and only isolated from EtOAc, while IPA:water (9:1 vol) seemed to give a mixture of patterns and the material isolated from EtOH was amorphous. Despite the high crystallinity of the salicylate 10-A and the single sharp endotherm at 167.3° C., the low solubility of this material ruled it out for scale up.

Figure 32:
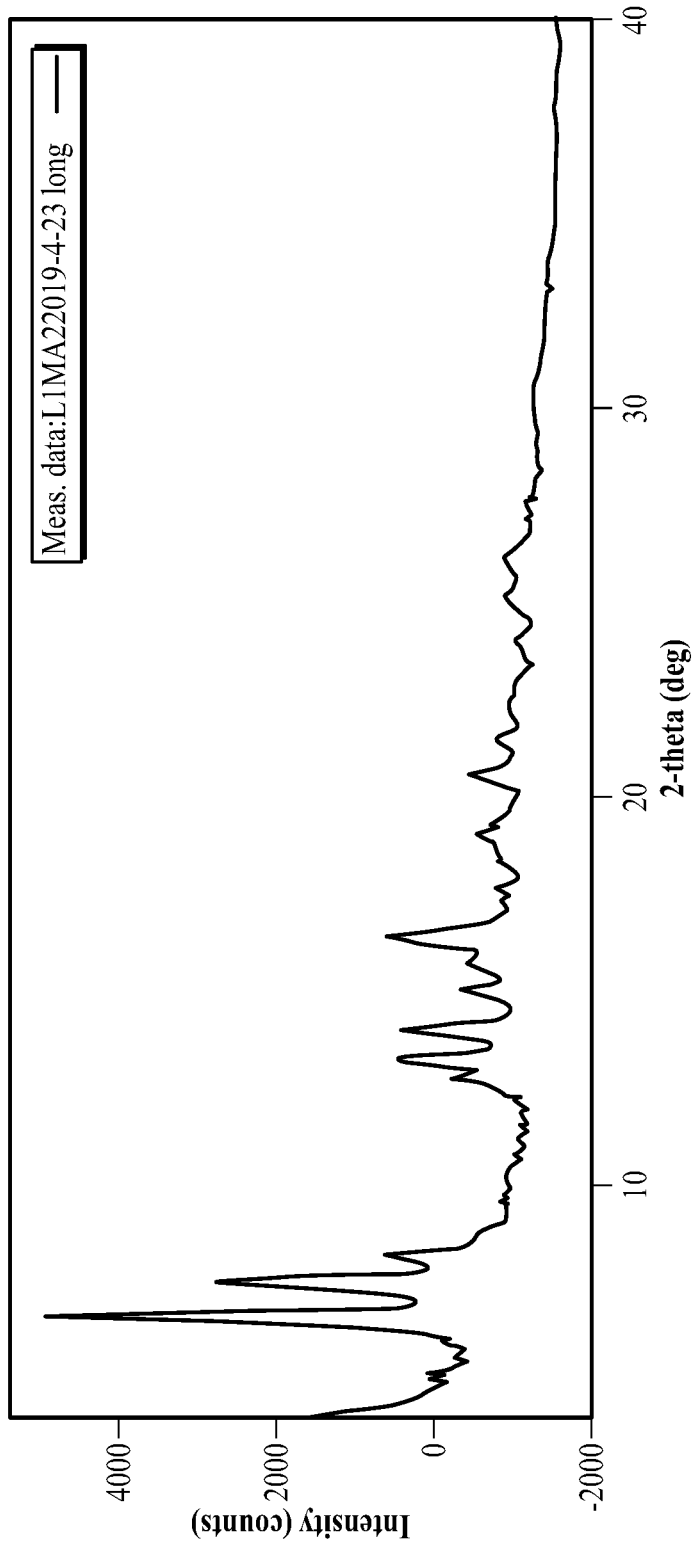
FIG. 32 is a XRPD pattern obtained from a maleate salt of pralsetinib in Solid Form 8-A.

Compound (I) can be prepared as a solid maleate salt form, characterized by the XRPD Pattern 8-A (FIG. 32) having XRPD 2-theta degree and d-spacing peaks in Table 23 below.

TABLE 23

| 2θ (deg.) | d-spacing (ang.) | Relative Intensity |
|---|---|---|
| 6.69 | 13.21 | 100 |
| 7.55 | 11.69 | 75 |
| 8.26 | 10.70 | 35 |
| 12.78 | 6.92 | 17 |
| 13.28 | 6.66 | 30 |
| 14.02 | 6.31 | 26 |
| 15.03 | 5.89 | 11 |
| 15.74 | 5.63 | 13 |
| 16.42 | 5.39 | 38 |
| 18.99 | 4.67 | 12 |
| 20.59 | 4.31 | 10 |
| 25.18 | 3.53 | 6 |
| 26.20 | 3.40 | 9 |

Figure 33A:
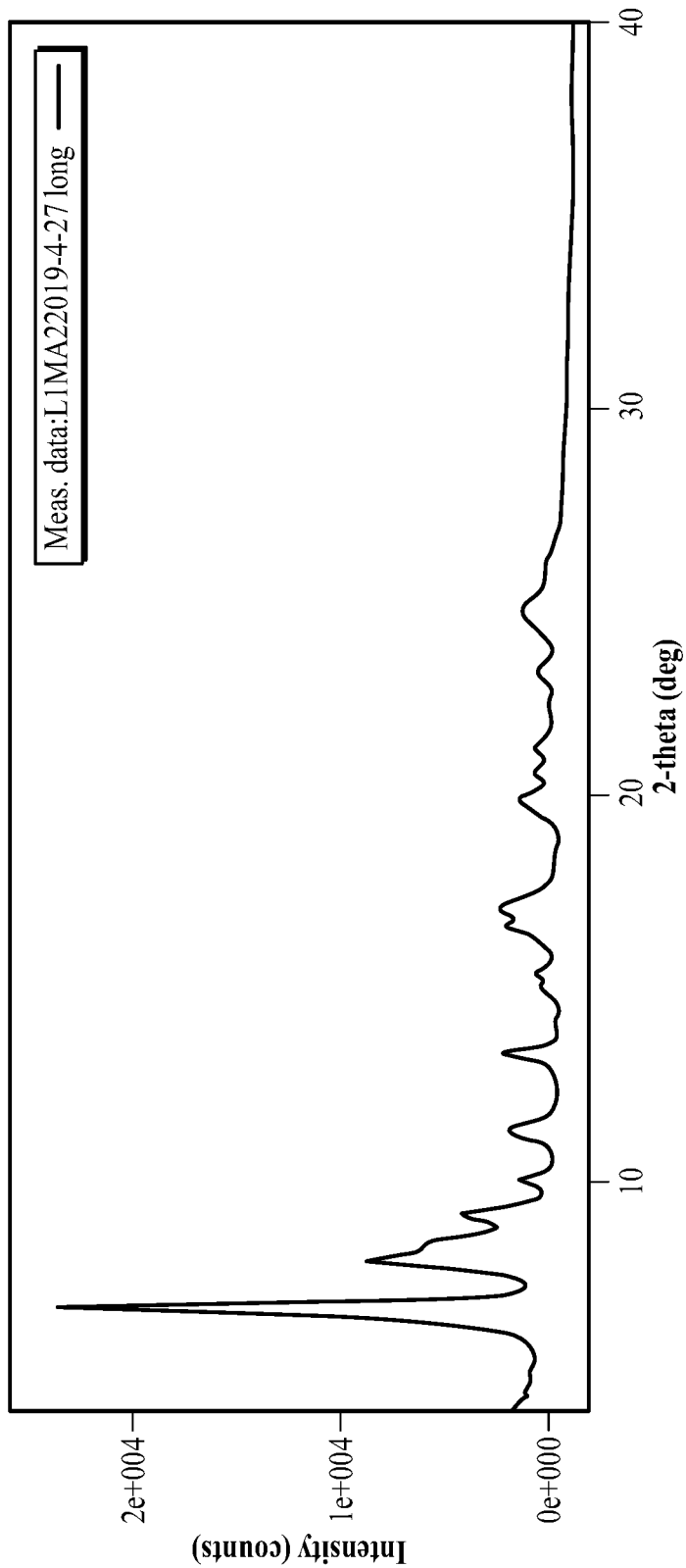
FIG. 33A is a XRPD pattern obtained from an oxalate salt of pralsetinib in Solid Form 9-A.
Figure 33B:
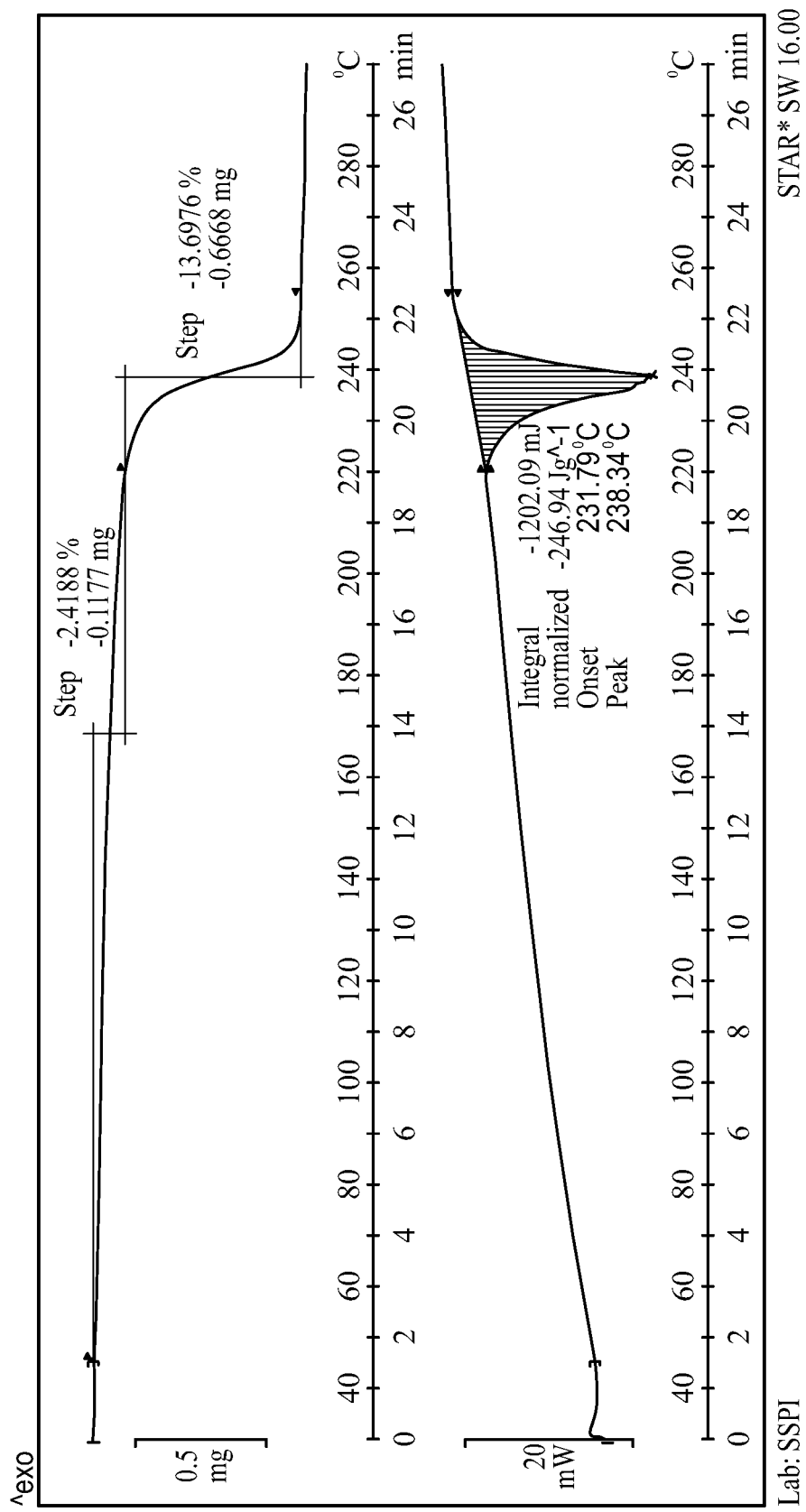
FIG. 33B shows DSC and TGA thermograms of the material tested in FIG. 33A, obtained from an oxalate salt of pralsetinib in Solid Form 9-A.

Compound (I) can be prepared as a solid oxalic acid salt form, characterized by the XRPD Pattern 9-A (FIG. 33A) having XRPD 2-theta degree and d-spacing peaks in Table 24 below. The coupled TGA/DSC thermograms of solid form 9-A of the pralsetinib oxalic salt is provided in FIG. 33B.

TABLE 24

| 2θ (deg.) | d-spacing (ang.) | Relative Intensity |
|---|---|---|
| 6.69 | 13.19 | 100 |
| 7.89 | 11.19 | 30 |
| 8.34 | 10.60 | 36 |
| 9.12 | 9.69 | 22 |
| 9.99 | 8.84 | 5 |
| 11.28 | 7.84 | 11 |
| 13.30 | 6.65 | 10 |
| 16.60 | 5.33 | 14 |
| 17.06 | 5.19 | 14 |
| 19.81 | 4.48 | 10 |
| 24.74 | 3.60 | 22 |

Figure 34A:
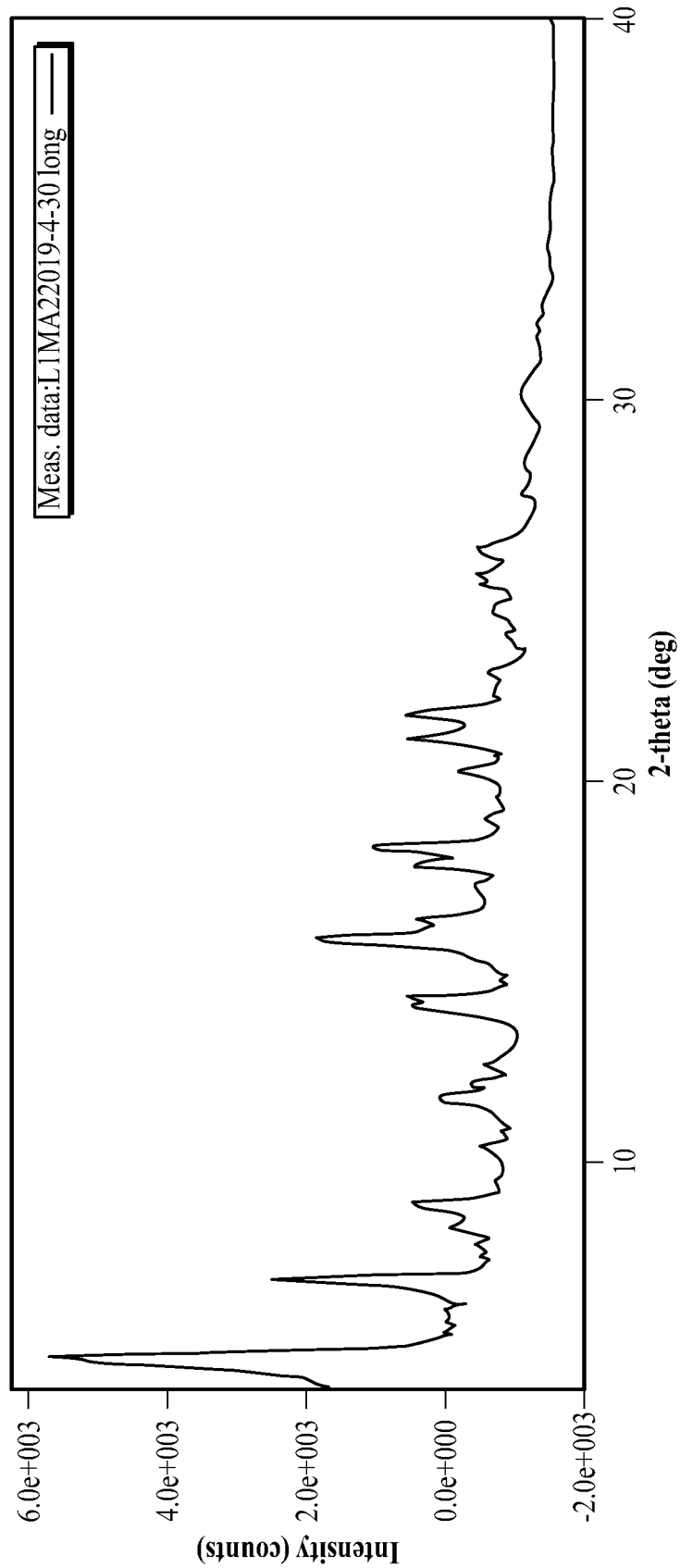
FIG. 34A is a XRPD pattern obtained from a salicylate salt of pralsetinib in Solid Form 10-A.
Figure 34B:
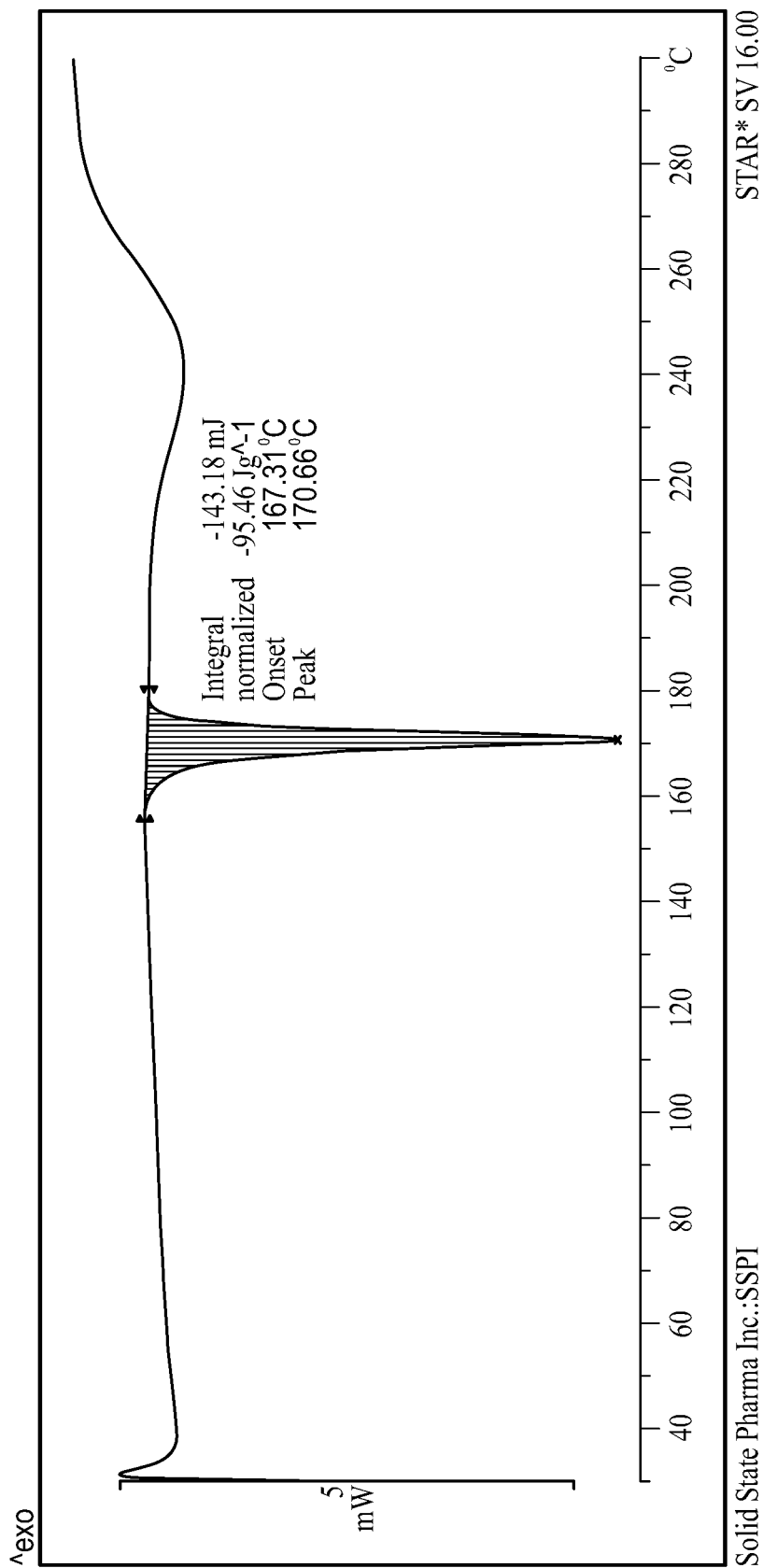
FIG. 34B shows a DSC thermogram of the material tested in FIG. 34A, obtained from a salicylate salt of pralsetinib in Solid Form 10-A.

Compound (I) can be prepared as a solid salicylic acid salt form 10-A, characterized by the XRPD Pattern 10-A in FIG. 34A and/or the DSC thermogram of FIG. 34B. Solid form 10-A of the pralsetinib salicylic salt can be characterized by a XRPD spectrum comprising the 2-theta degree and d-spacing peaks as shown in Table 25 below. Solid form 10-A of the pralsetinib salicylic salt was found to have 0.12 wt. % residual EtOAc in the sample, a stoichiometry of 1:1 (CI: API) by 1H-NMR, and a single sharp endotherm with an onset of 167.3° C.

TABLE 25

| 2θ (deg.) | d-spacing (ang.) | Relative Intensity |
|---|---|---|
| 4.90 | 18.01 | 100 |
| 6.91 | 12.77 | 24 |
| 8.90 | 9.93 | 22 |
| 11.64 | 7.60 | 13 |
| 12.09 | 7.31 | 6 |
| 12.59 | 7.03 | 5 |
| 14.12 | 6.27 | 21 |
| 15.88 | 5.57 | 27 |
| 16.38 | 5.41 | 13 |
| 17.82 | 4.97 | 10 |
| 18.24 | 4.86 | 14 |
| 20.28 | 4.37 | 5 |
| 21.19 | 4.19 | 13 |
| 21.79 | 4.08 | 15 |
| 22.64 | 3.92 | 6 |
| 24.47 | 3.64 | 5 |
| 25.32 | 3.51 | 10 |
| 26.08 | 3.41 | 8 |
| 30.19 | 2.96 | 9 |

Figure 34C:
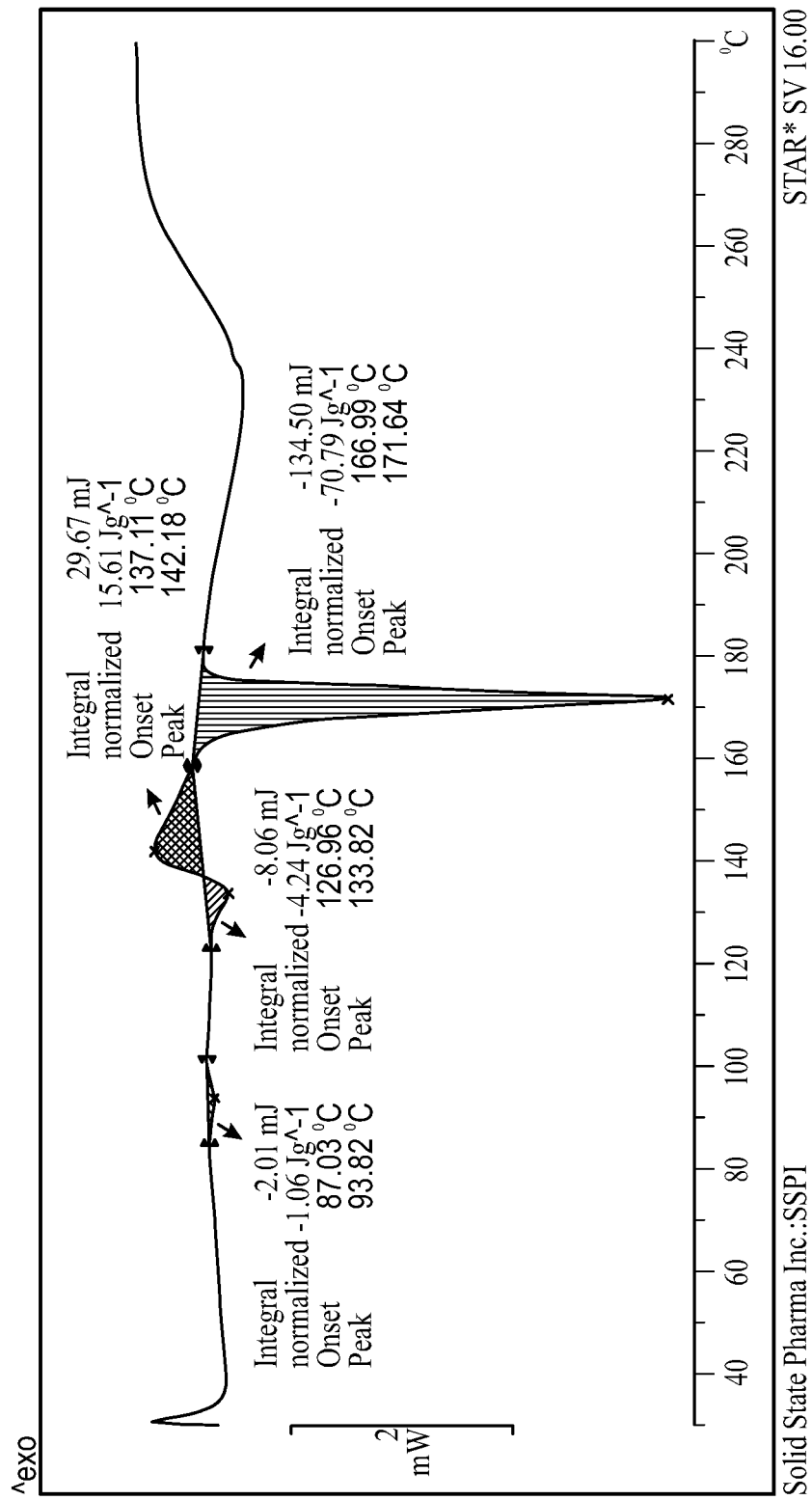
FIG. 34C shows a DSC thermogram of the material tested in FIG. 34A, obtained from a salicylate salt of pralsetinib in Solid Forms 10-A and 10-B.

FIG. 34C is a DSC thermogram of a solid form of the pralsetinib salicylic salt designated s solid form 10-A+B, exhibiting the same endothermic event at 167.0° C. as well as two low temperature endotherms with onsets of 87.03° C. and 127.0° C. The endotherm at 127.0° C. was immediately followed by an exotherm with an onset of 137.1° C.

Figure 48:
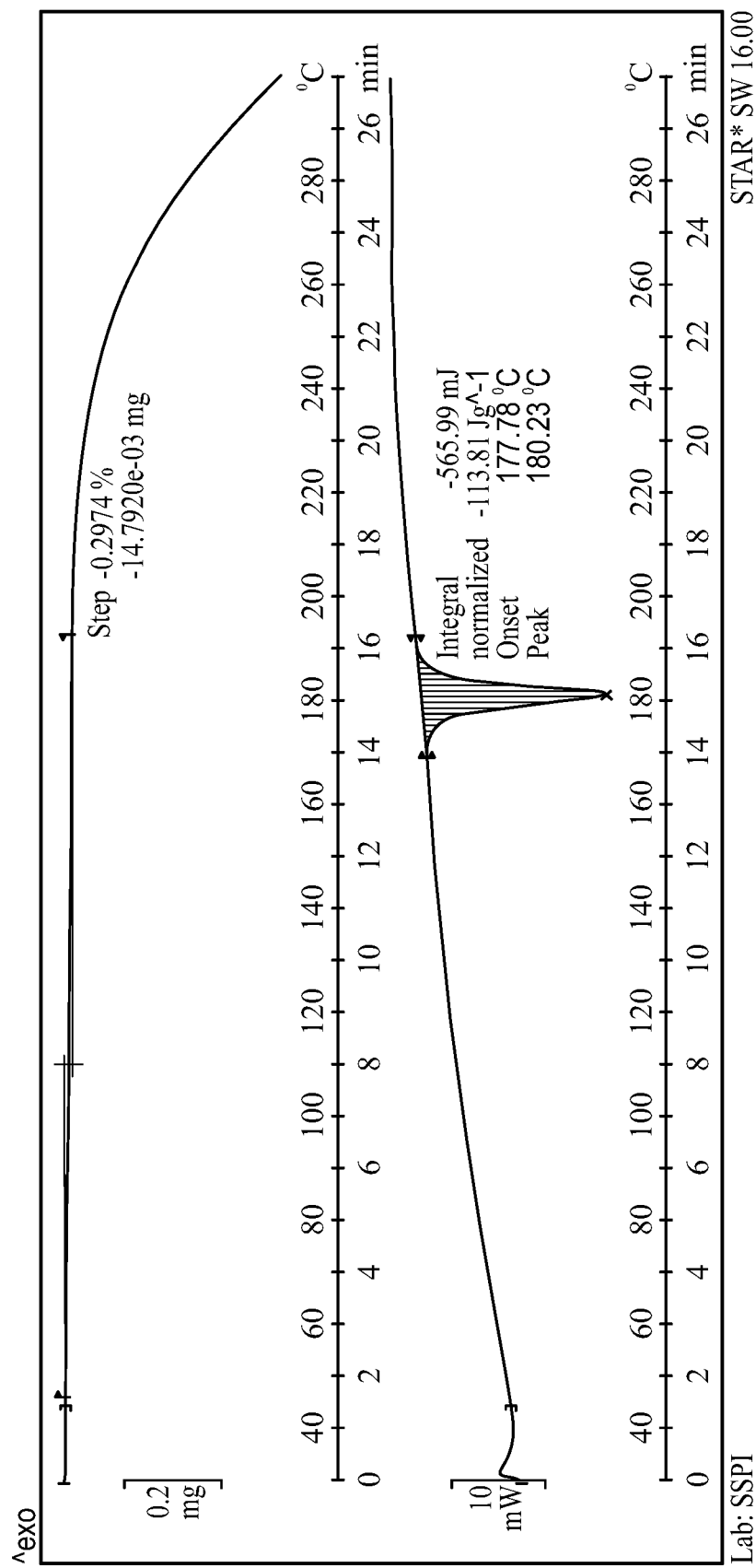
FIG. 48 shows a TGA/DSC thermogram obtained from a glutarate salt of pralsetinib in Solid Form 11-A.

FIG. 48 shows coupled DSC and TGA thermograms from the glutaric acid salt of pralsetinib. The glutarate pralsetinib salt in solid form 11-A has a TGA/DSC with a single endotherm with an onset of 177.8° C. and a low mass loss of 0.3 wt. % from the beginning of the experiment to the end of the melt. The mass loss after the melt event 0 may be associated with decomposition of the material. Pralsetinib glutarate in solid form 11-A was found to have 0.09 wt. % residual EtOH in the sample and a stoichiometry of 1:1 (CI:API), by 1H-NMR.

Figure 35A:
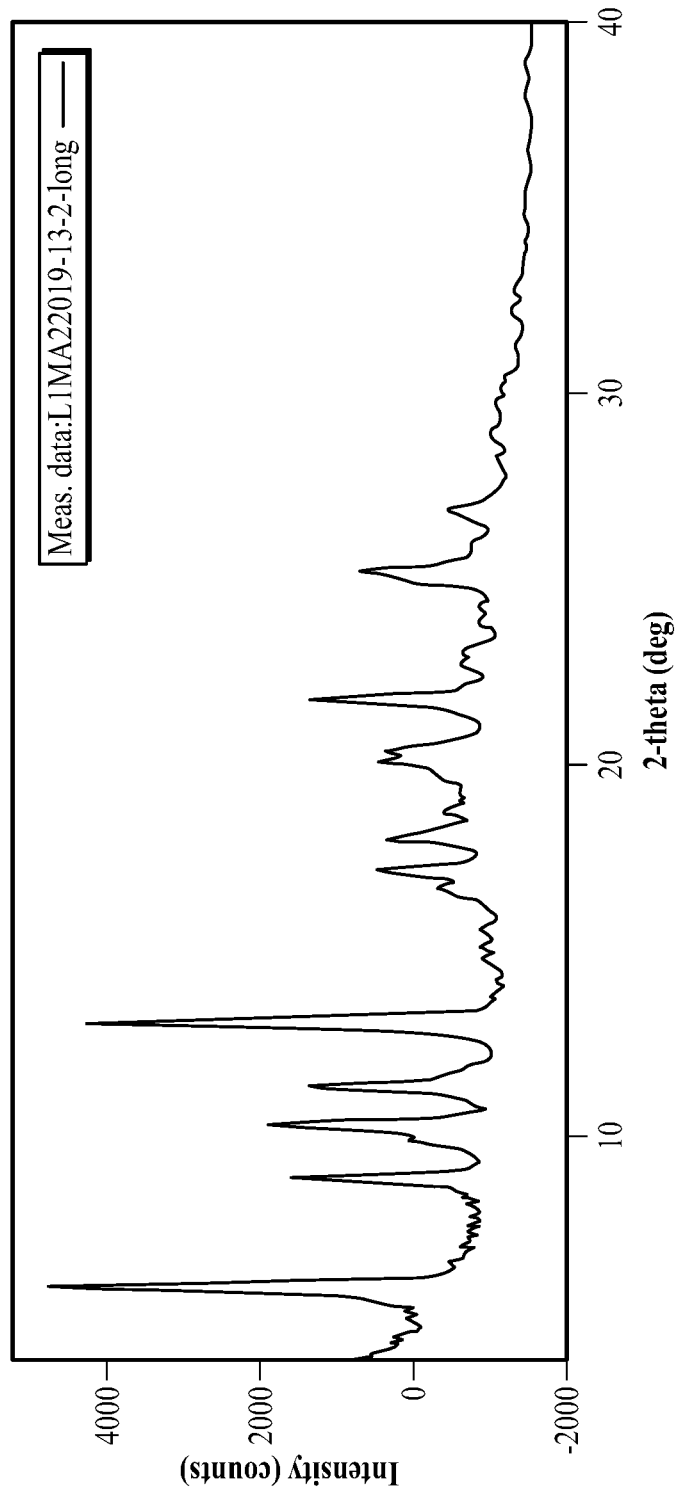
FIG. 35A is a XRPD pattern obtained from a sulfate of pralsetinib in Solid Form 12-A.
Figure 35B:
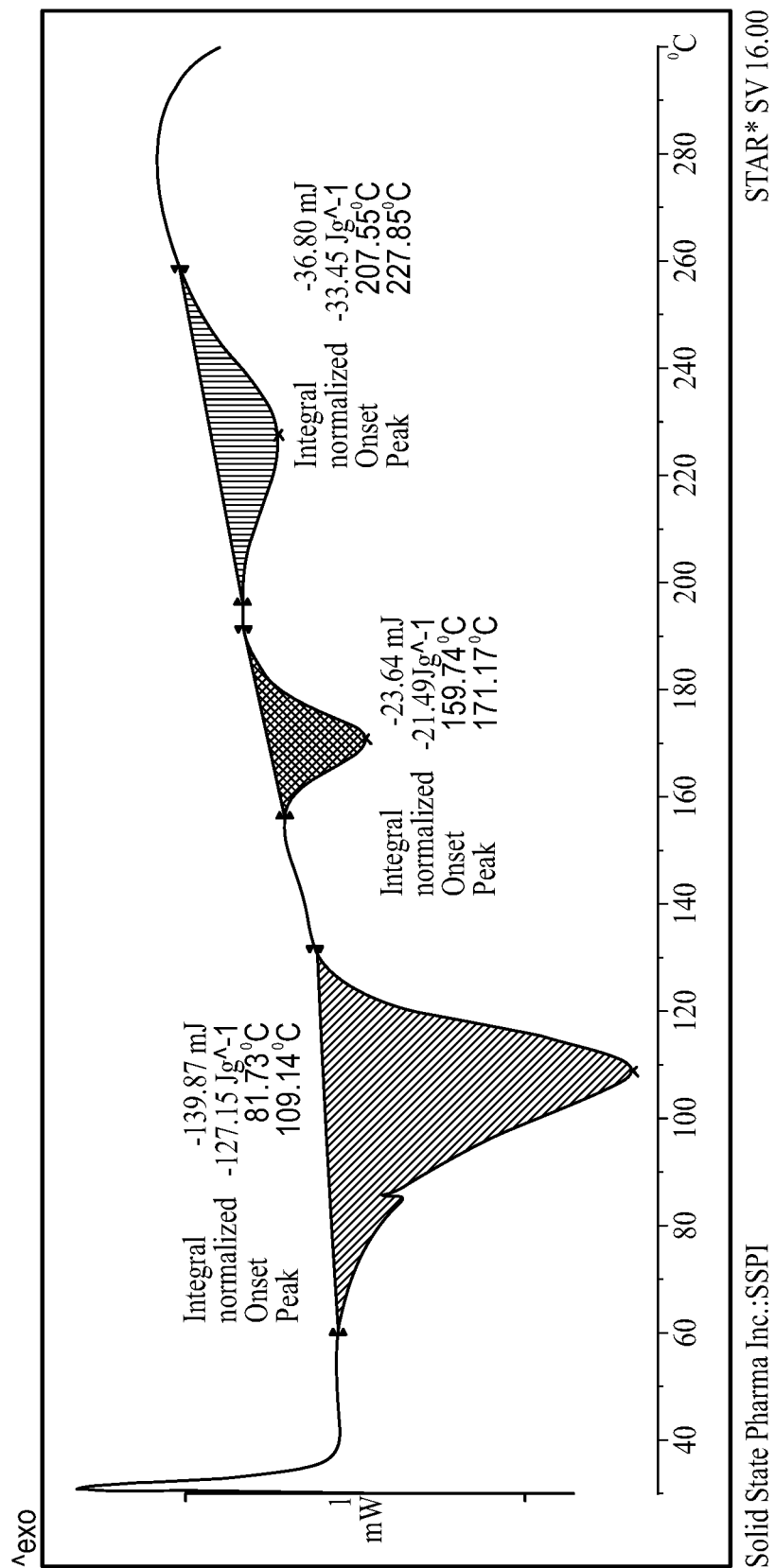
FIG. 35B shows a DSC thermogram obtained from a sulfate salt of pralsetinib in Solid Form 12-A.

Compound (I) can be prepared as a solid sulfate salt form, such as the pralsetinib sulfate solid form 12-A characterized by the XRPD pattern in FIG. 35A and/or the DSC thermogram in FIG. 34B. The solid form 12-A of the pralsetinib sulfate salt from (0.55 eq. Sulfuric acid) was characterized by low broad endotherms observed in DSC and low qualitative water solubility. Solid form 12-A of a pralsetinib sulfate salt was obtained from 0.55 eq. of sulfuric acid had a broad endotherm associated with a hydrate with an onset of 81.7° C. and two smaller endotherms with onsets of 159.7° C. and 207.6° C. with evidence of decomposition above 280° C.

TABLE 26

| 2θ (deg.) | d-spacing (ang.) | Relative Intensity |
|---|---|---|
| 5.99 | 14.75 | 100 |
| 8.93 | 9.90 | 47 |
| 9.86 | 8.96 | 12 |
| 10.32 | 8.57 | 62 |
| 11.37 | 7.78 | 58 |
| 13.07 | 6.77 | 95 |
| 16.66 | 5.32 | 15 |
| 17.15 | 5.17 | 19 |
| 18.04 | 4.91 | 21 |
| 18.73 | 4.73 | 5 |

TABLE 26-continued

| 2θ (deg.) | d-spacing (ang.) | Relative Intensity |
|---|---|---|
| 20.22 | 4.39 | 49 |
| 21.85 | 4.06 | 35 |
| 23.02 | 3.86 | 7 |
| 25.28 | 3.52 | 54 |
| 26.92 | 3.31 | 14 |
| 29.57 | 3.02 | 13 |

Figure 35C:
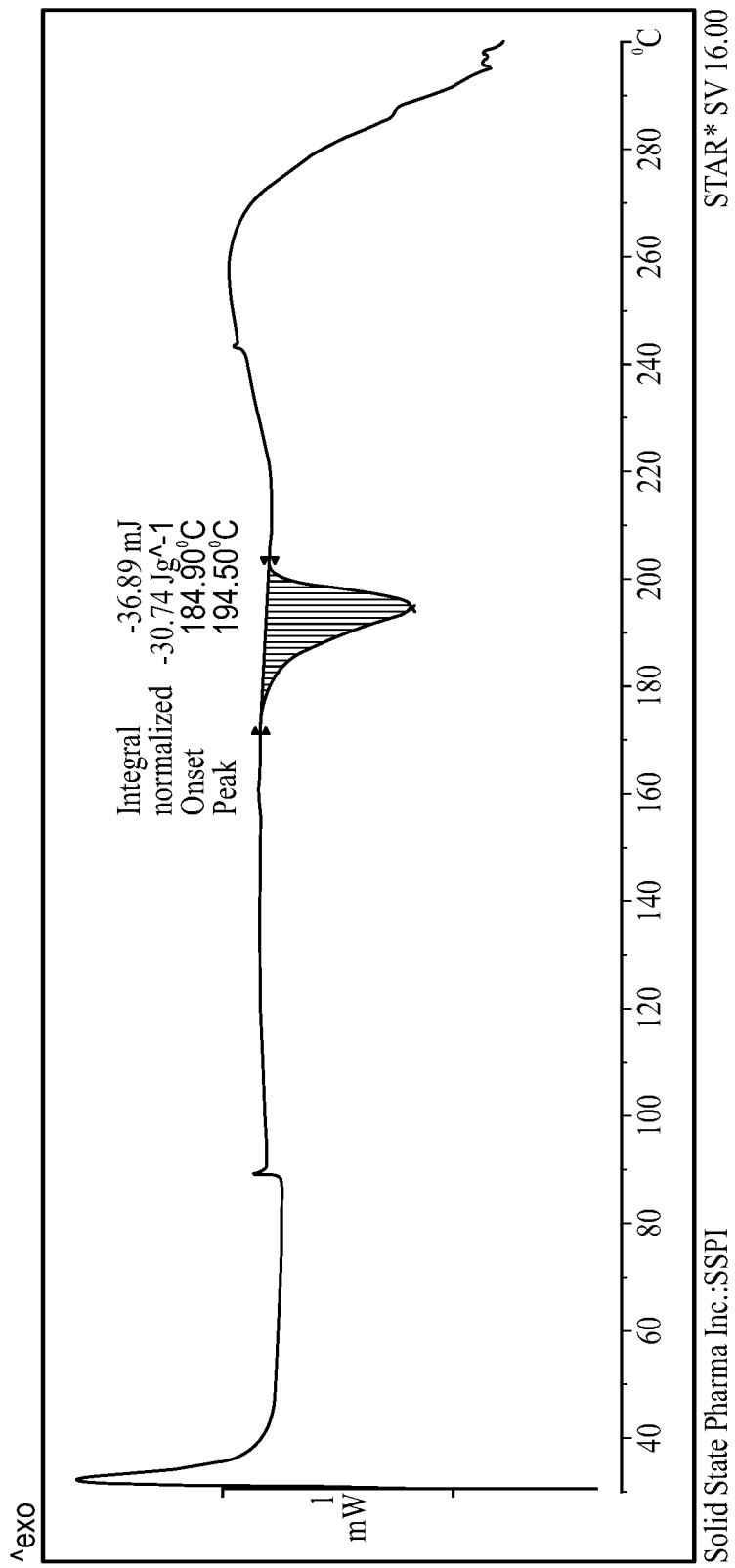
FIG. 35C shows a DSC thermogram obtained from a sulfate salt of pralsetinib in Solid Form 12-B.
Figure 35D:
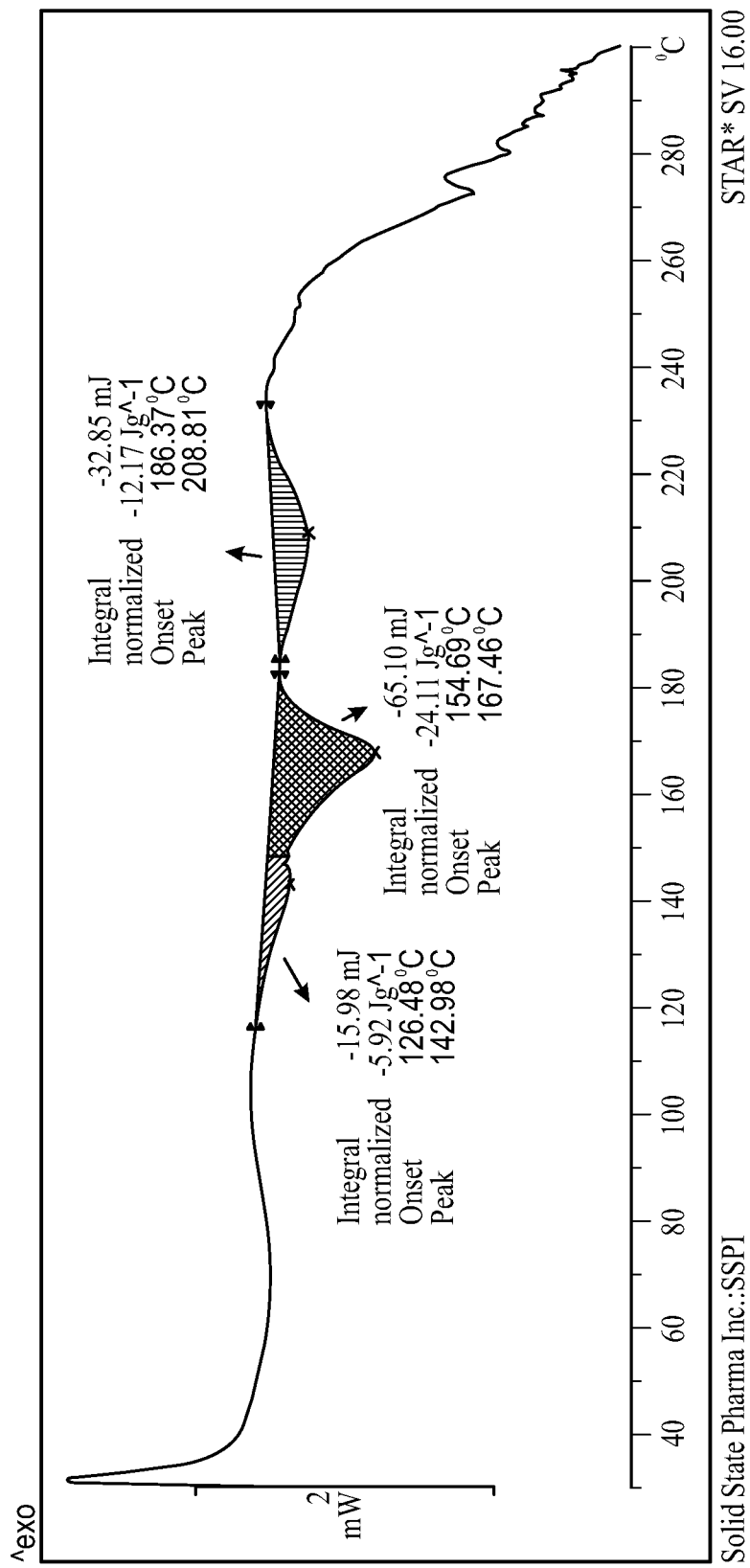
FIG. 35D shows a DSC thermogram obtained from a sulfate salt of pralsetinib in Solid Form 12-C.
Figure 35E:
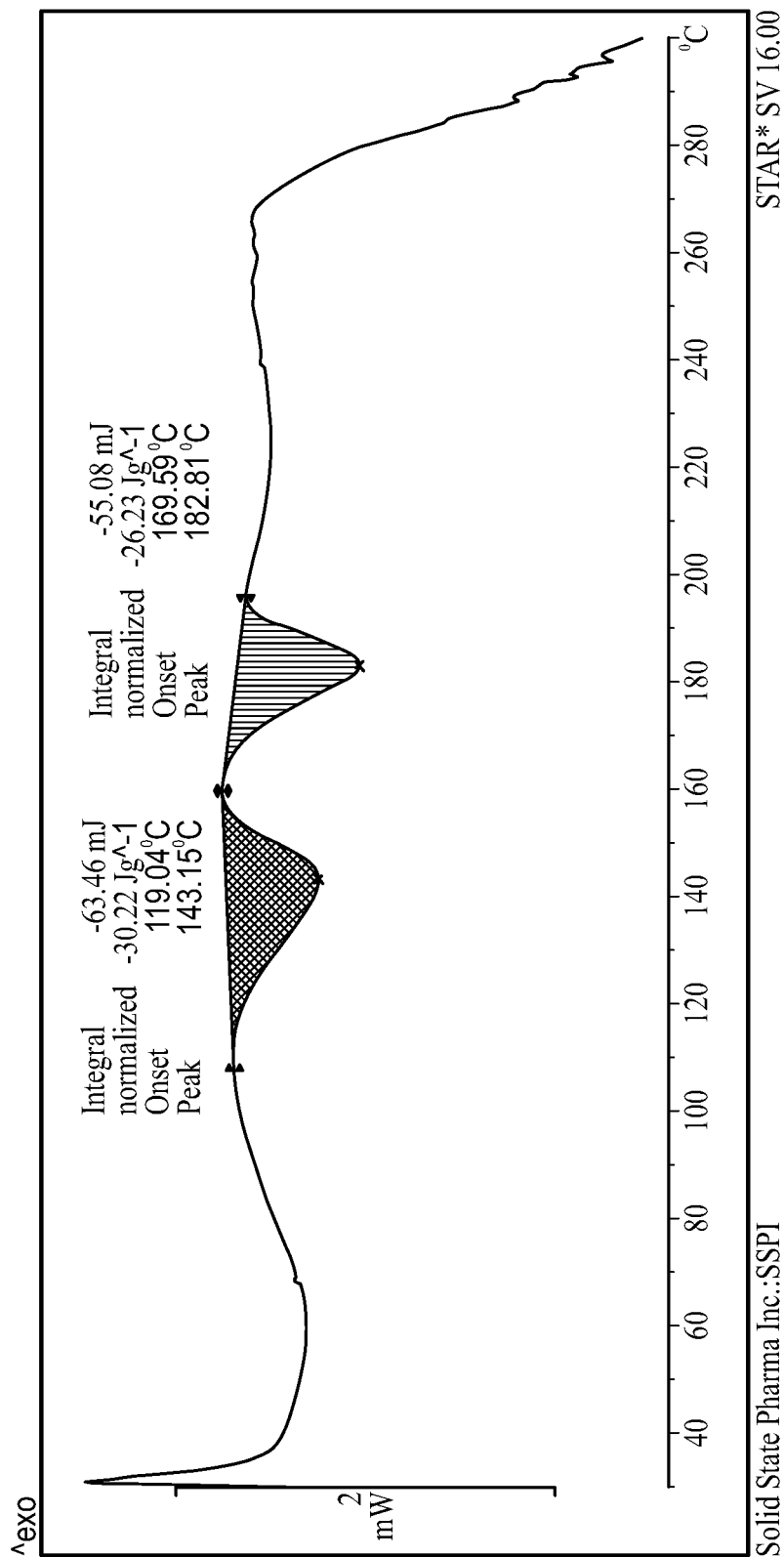
FIG. 35E shows a DSC thermogram obtained from a sulfate salt of pralsetinib in Solid Form 12-E.
Figure 35F:
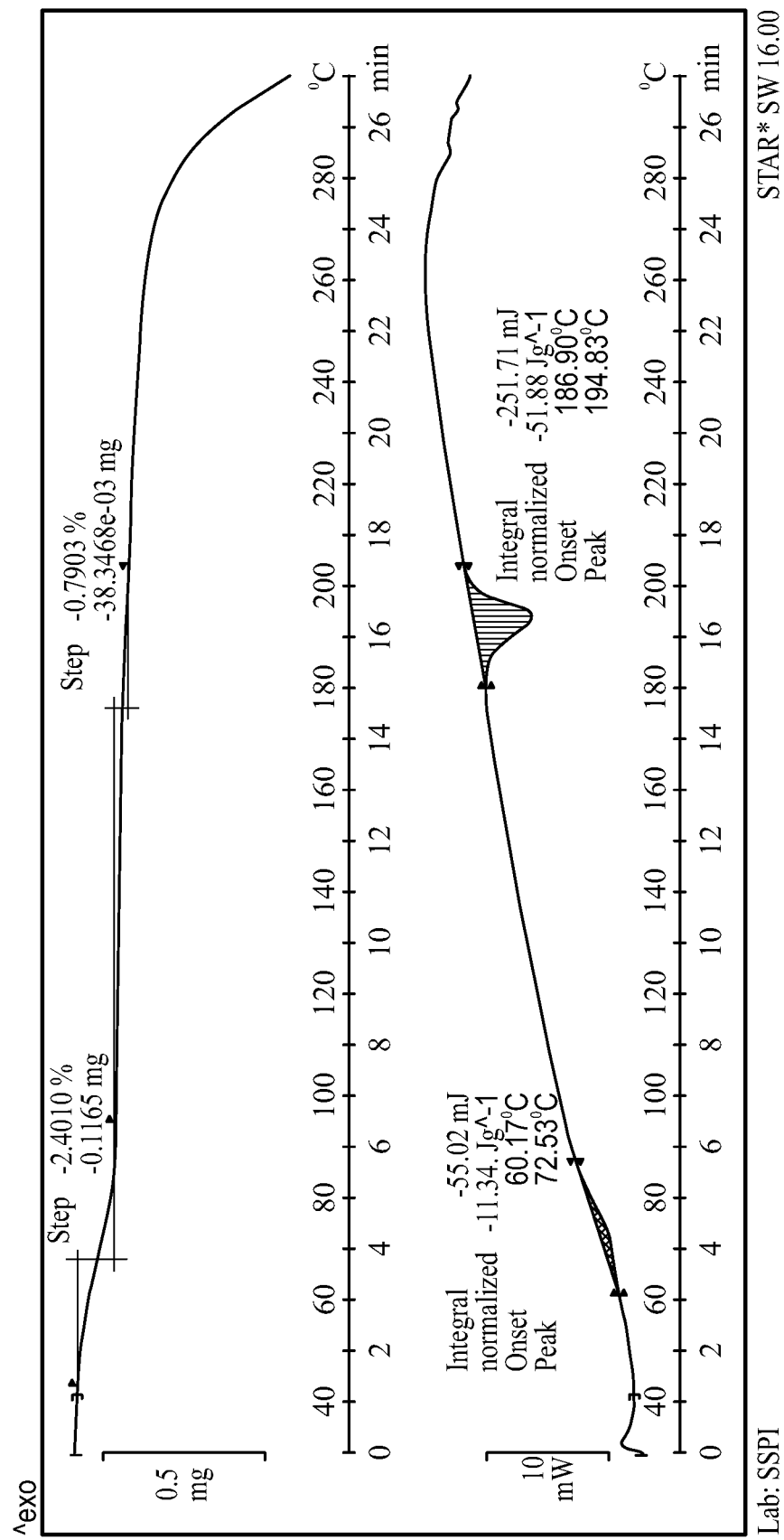
FIG. 35F shows a DSC thermogram obtained from a sulfate salt of pralsetinib in Solid Form 12-H.
Figure 35G:
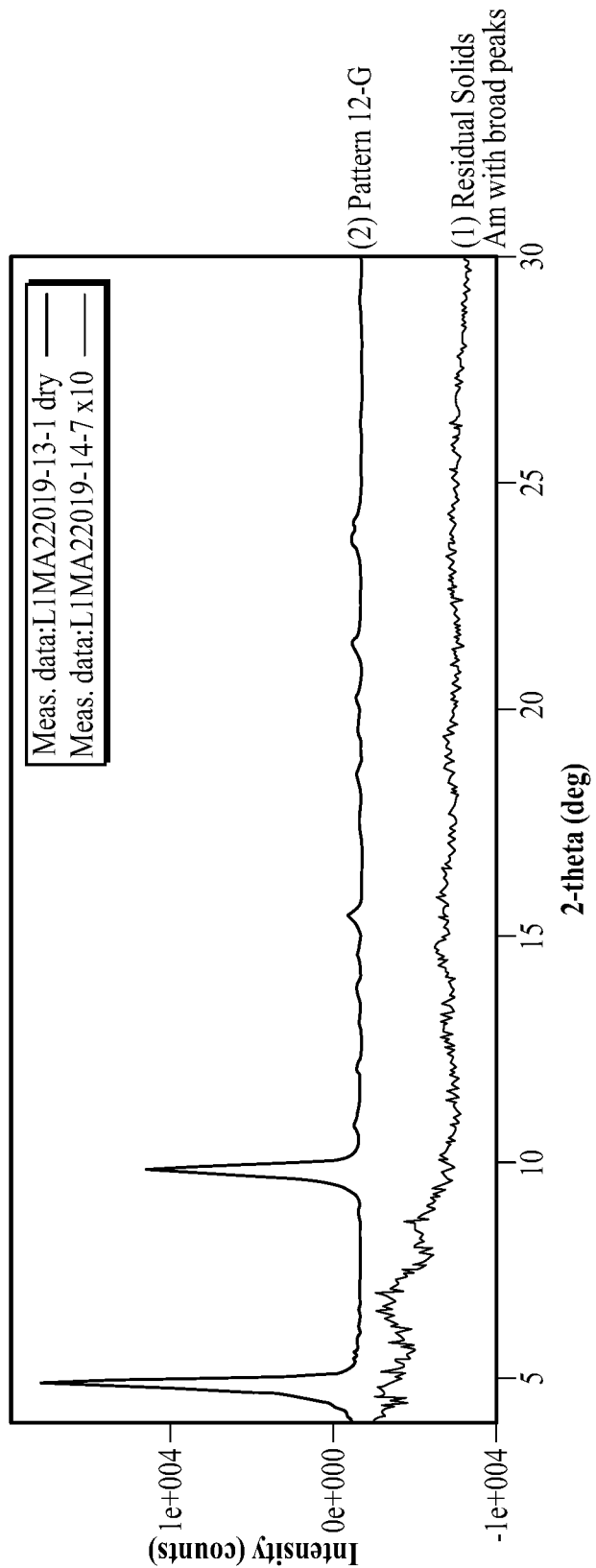
FIG. 35G shows XRPD patterns obtained from the residual solids from qualitative water solubility of sulfate (1) and the XPRD Pattern 12-G obtained from the sulfate salt of pralsetinib in solid form 12-G (2).

Alternatively, Compound (I) can be prepared as other solid sulfuric acid salt forms having XRPD patterns shown in FIG. 35G, including solid forms of the pralsetinib sulfate characterized by XRPD Pattern 12-B, Pattern 12-C, Pattern 12-D, Pattern 12-E, Pattern 12-F, Pattern 12-G or Pattern 12-H (see FIGS. 35G, FIG. 35H and FIG. 35I).

Solid form 12-B of a pralsetinb sulfate salt can be characterized by the corresponding XRPD Pattern 12-B (FIG. 35G) and/or the DSC thermogram of FIG. 35C was obtained from 1.1 eq. of sulfuric acid had a single endotherm with an onset of 184.9° C. with evidence of decomposition above 260° C.

Solid form 12-C of a pralsetinb sulfate salt can be characterized by the corresponding XRPD Pattern 12-C (FIG. 35G) and/or the DSC thermogram of FIG. 35D, was obtained from 1.1 eq. sulfuric acid had a broad endotherm at 126.5° C. and the 1H-NMR showed evidence of water, which could indicate this material is a hydrate. This event was followed by two additional endotherms at 154.7° C. and 186.4° C. before decomposition.

Solid form 12-D of a pralsetinb sulfate salt can be characterized by the corresponding XRPD Pattern 12-D (FIG. 35G).

Solid form 12-E of a pralsetinb sulfate salt can be characterized by the corresponding XRPD Pattern 12-E (FIG. 35H), and/or the DSC thermogram of FIG. 35E observed to have two endotherms, the first with an onset of 119.0° C. as water was evolved from the hydrate and the second with an onset of 169.6° C.

Solid form 12-F of a pralsetinb sulfate salt can be characterized by the corresponding XRPD Pattern 12-F (FIG. 35H).

Solid form 12-G of a pralsetinb sulfate salt can be characterized by the corresponding XRPD Pattern 12-G (FIG. 35G).

Solid form 12-H of a pralsetinb sulfate salt can be characterized by the corresponding XRPD Pattern 12-H (FIG. 35I). Solid form 12-H was also analyzed by DSC (FIG. 35F) and found to have an endotherm with an onset of 60.2 C and an associated mass loss of 2.4 wt. %. A further gradual mass loss of 0.8 wt. % was observed until the end of the melt endotherm with an onset of 186.9° C.

Stoichiometry of the sulfates could not be determined by 1H-NMR, however it the residual solvent in the samples of solid form 12-A was 0.10 wt. % IPA, solid form 12-B was 3.10 wt. % EtOH, solid form 12-C was 5.86 wt. % EtOAc, and solid form 12-E was 3.20 wt. % IPA.

Figure 36A:
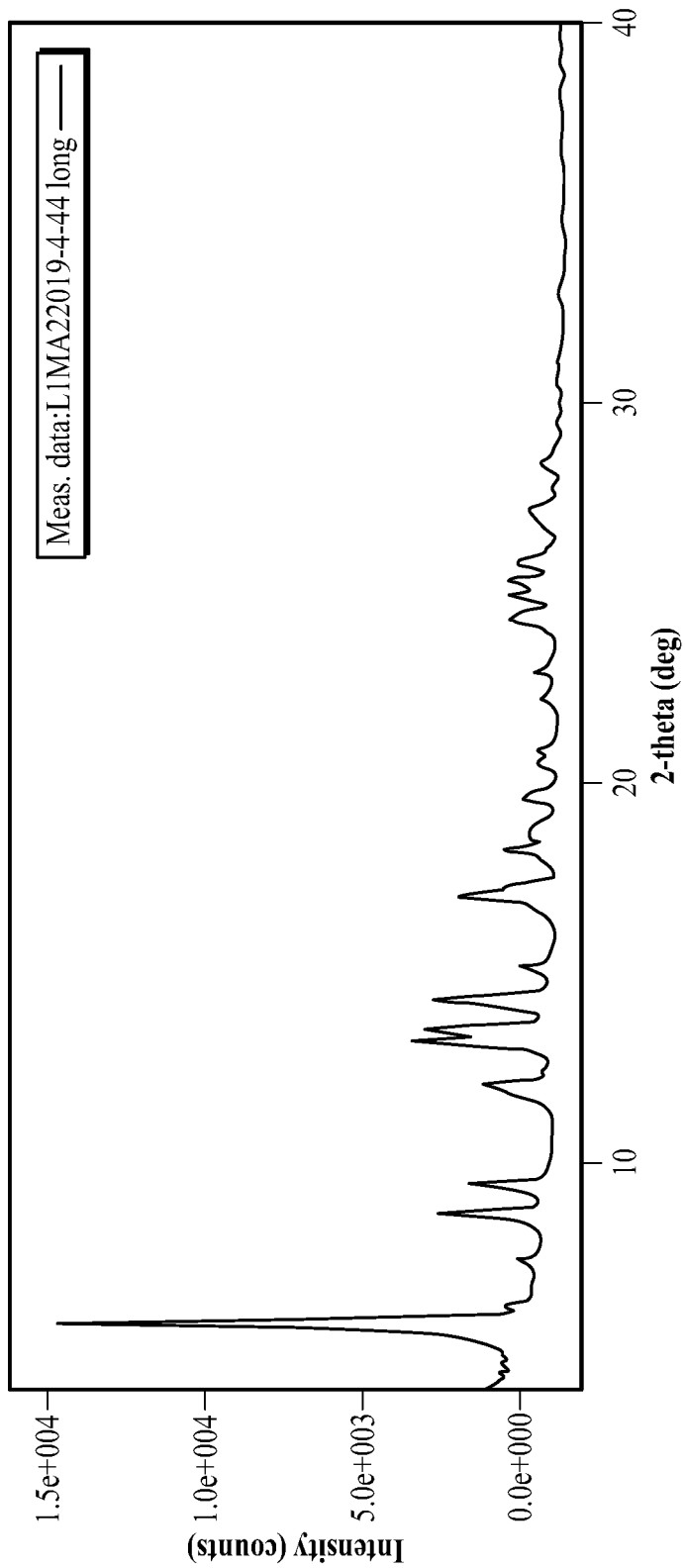
FIG. 36A is a XRPD pattern obtained from a tartarate salt of pralsetinib in Solid Form 13-A.
Figure 36B:
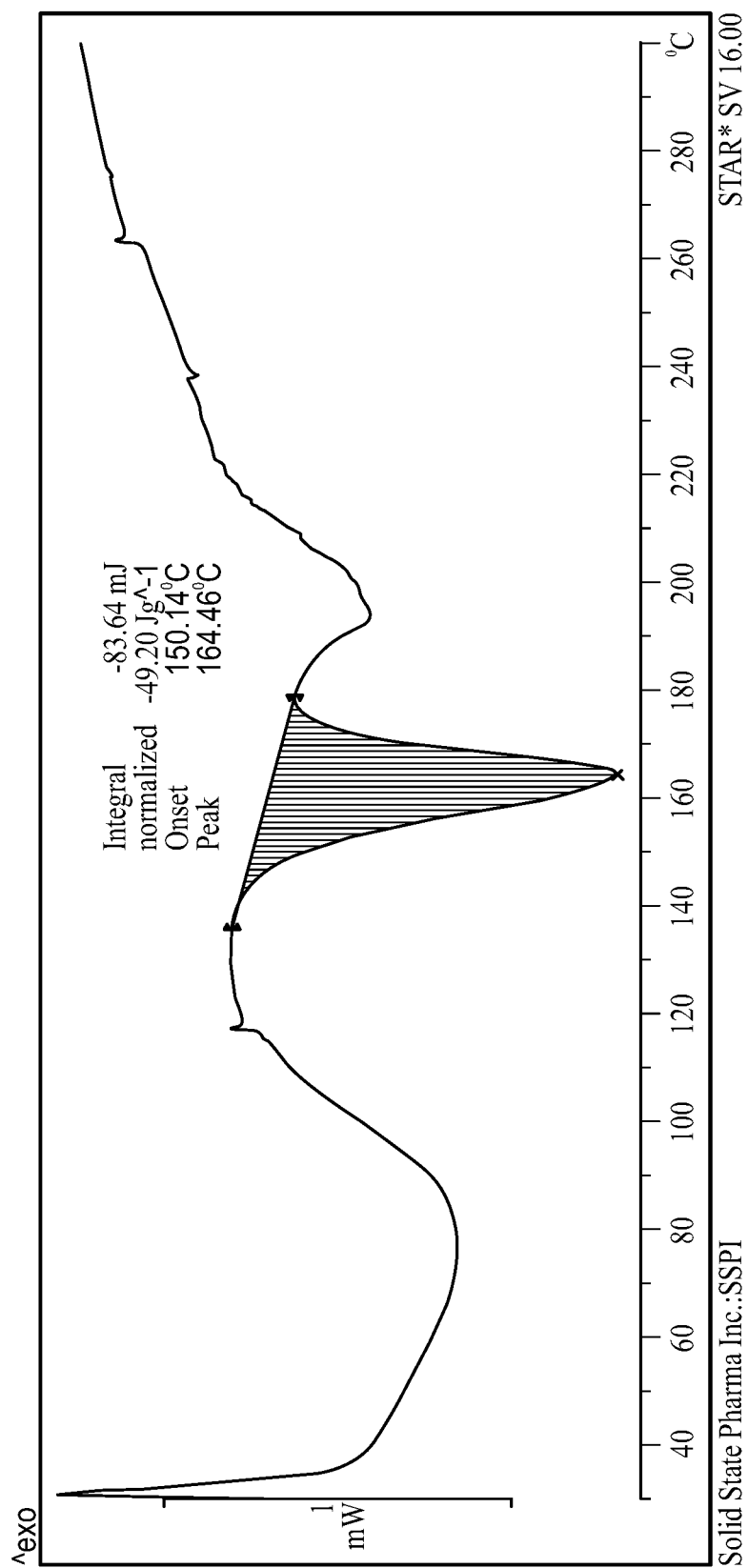
FIG. 36B shows a DSC thermogram obtained from a sulfate salt of pralsetinib in Solid Form 13-A.
Figure 36C:
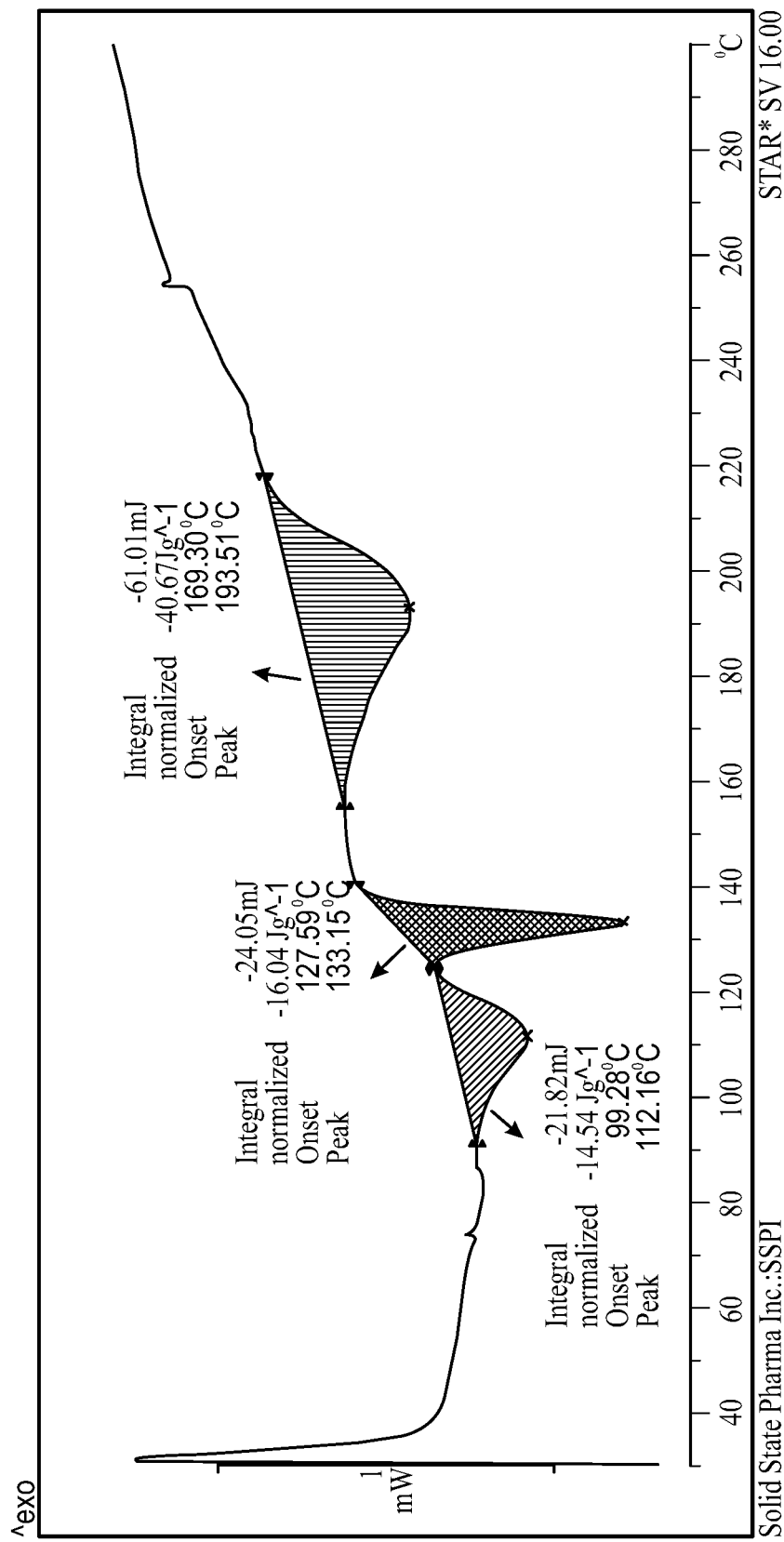
FIG. 36C shows a DSC thermogram obtained from a sulfate salt of pralsetinib in Solid Form 13-B.
Figure 36D:
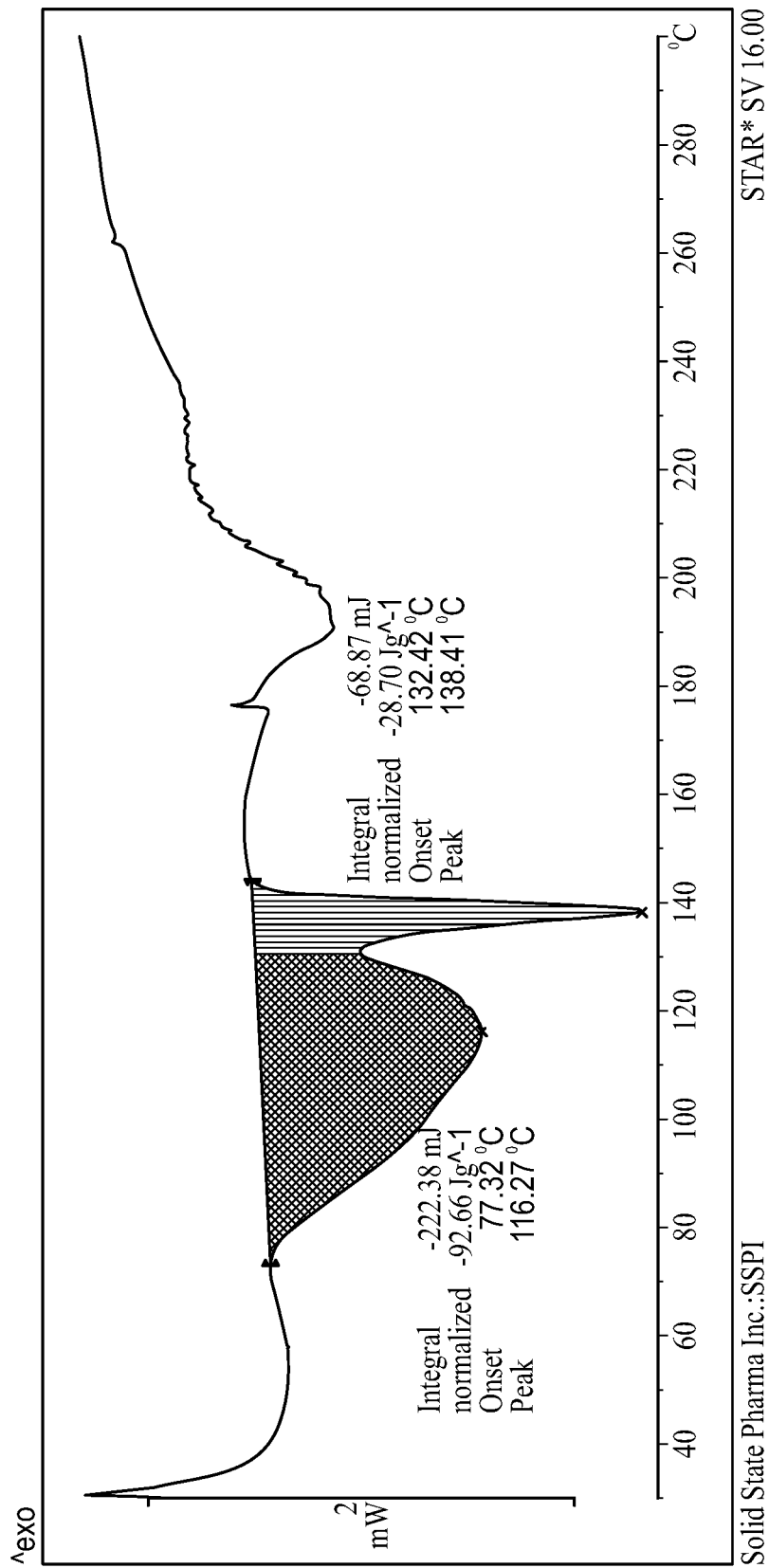
FIG. 36D shows a DSC thermogram obtained from a sulfate salt of pralsetinib in Solid Form 13-C.
Figure 36E:
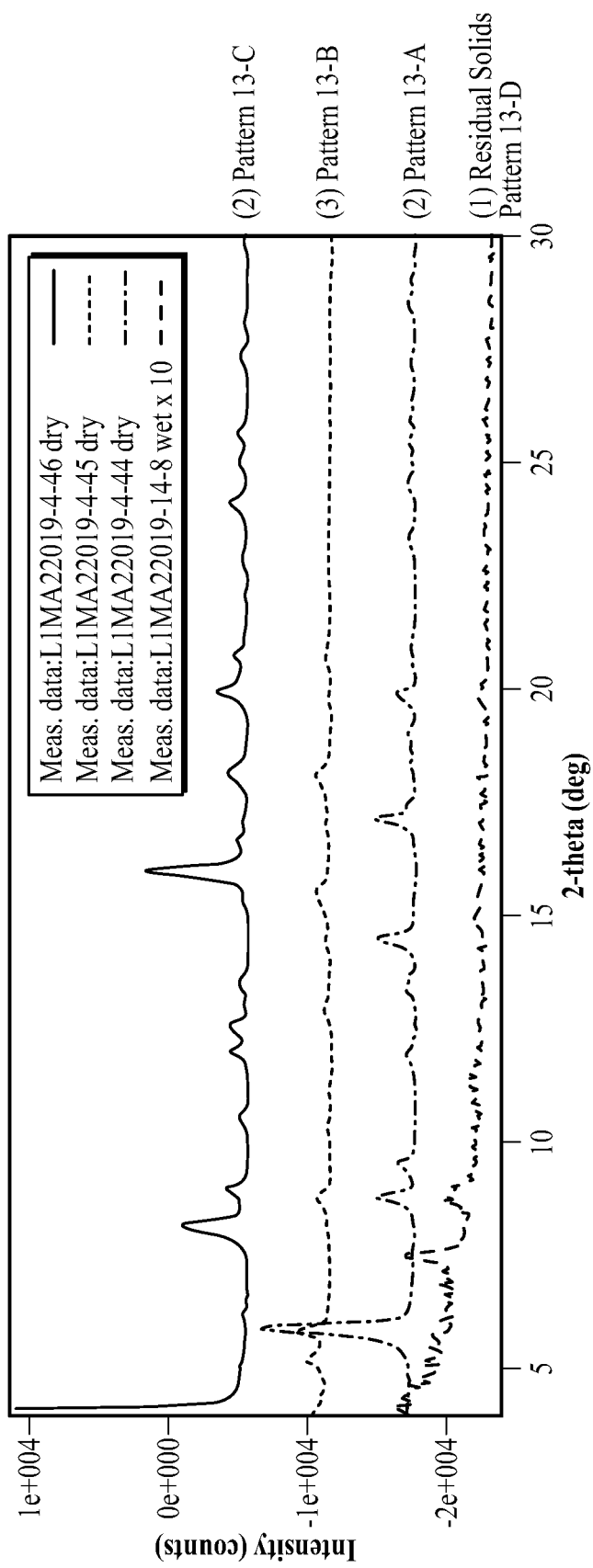
FIG. 36E shows XRPD patterns obtained from the residual solids from qualitative water solubility of tartrate (1) and pralsetinib tartrate salts of solid form 13-A (2), solid form 13-B (3), and solid form 13-C (4).

Compound (I) was prepared as multiple different solid tartaric acid salt forms. A first solid form 13-A of the tartaric acid salt of pralsetinib was characterized by the XRPD Pattern 13-A (FIG. 36A) In addition, the DSC thermogram (FIG. 36B) of the tartrate pralsetinib salt in solid form 13-A had a single observed endotherm at 150.1° C., however the thermogram did display a large broad feature at low temperatures and was messy beyond 180° C. A solid form 13-B of the tartaric acid salt of pralsetinib had a DSC thermogram shown in FIG. 36C, with a broad endotherm having an onset of 99.3° C. followed by a sharper endotherm with an onset of 127.6° C. A third broad endotherm was observed with an onset of 169.3° C. Another solid form 13-C of the tartaric acid salt of pralsetinib had a DSC thermogram shown in FIG. 36D, observed to have a large broad feature with an onset of 77.3° C. followed by a sharp endotherm at 132.4° C. All three tartrate solid forms show evidence of water within the samples. The 1H-NMR gave the stoichiometry of the tartrates samples as 0.79:1 (CI:API) for solid form 13-A with residual solvent of 0.03 wt. % EtOH, 1.03:1 (CI:API) for solid form 13-B with residual solvents of 0.34 wt. % EtOAc, and 1.03:1 (CI:API) for solid form 13-C with residual solvents of 1.36 wt. % IPA.

Figure 37A:
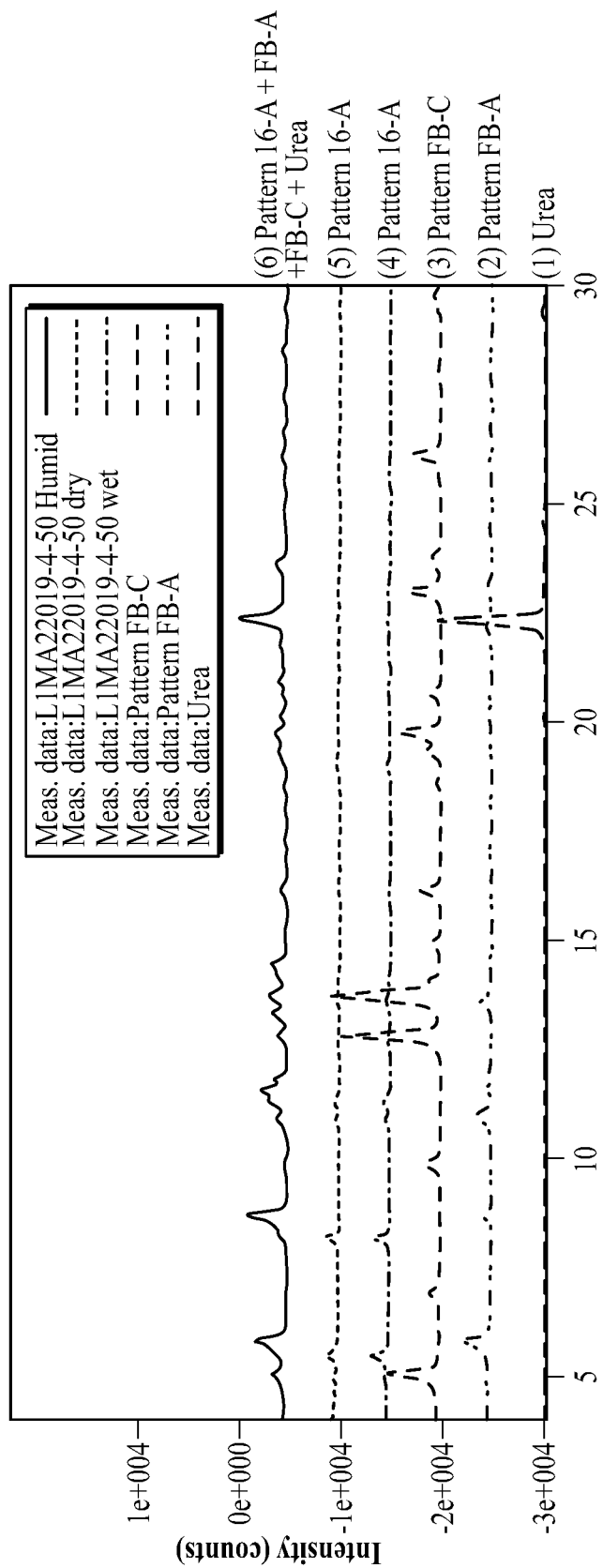
FIG. 37A is a XRPD patterns obtained from urea (1), pralsetinib freebase Pattern FB-A (2), freebase Pattern FB-C (3), and the solids generated from the freebase and urea (urea salt form of pralsetinib in solid form 16-A) obtained upon co-evaporation from MeOH as a wet cake (4), dried solid (5), and after exposure to 97% RH (6).
Figure 37B:
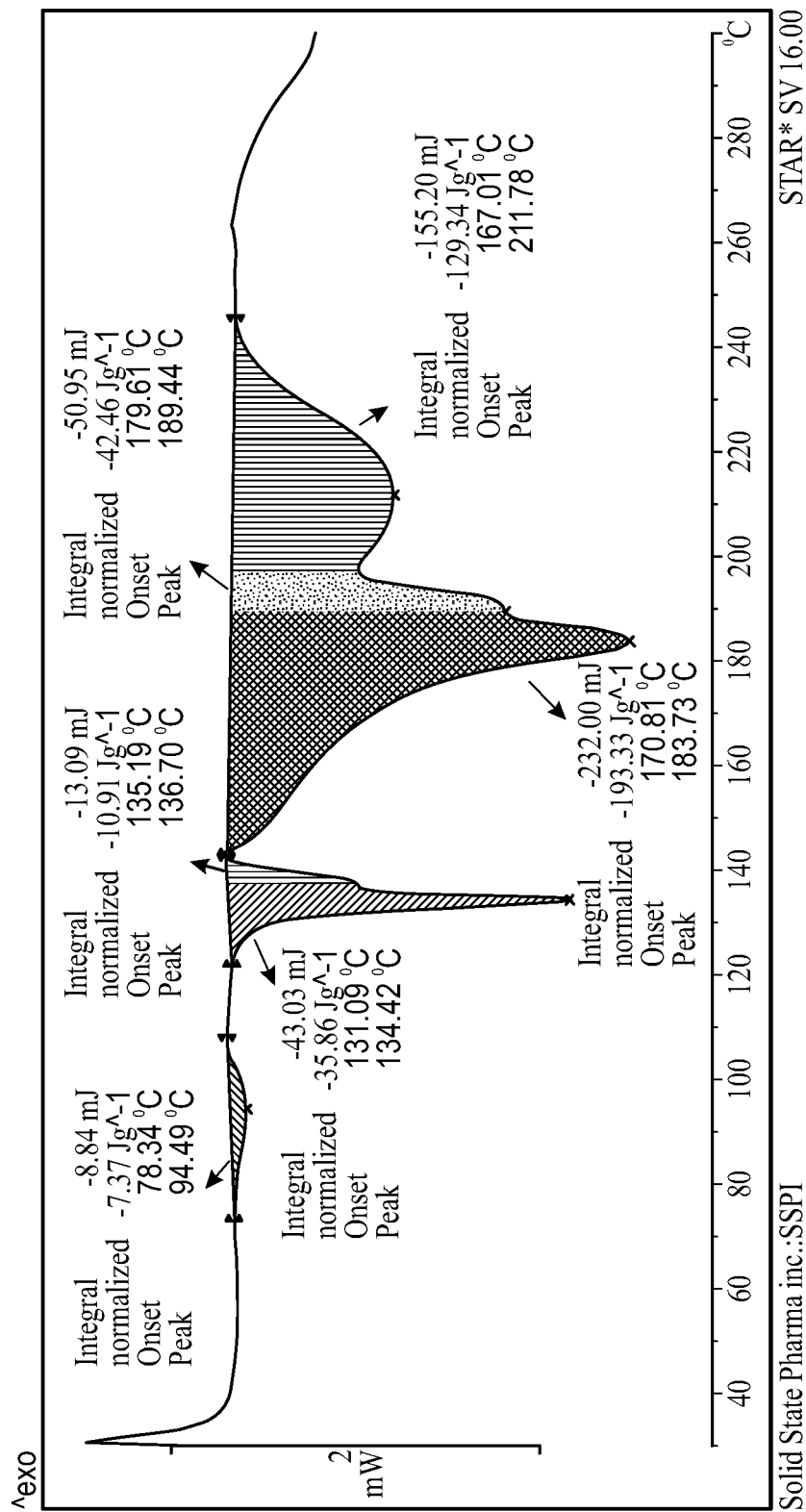
FIG. 37B shows a DSC thermogram obtained from a urea salt of pralsetinib in Solid Form 16-A.

A solid form of Compound (I) can be prepared from urea and Compound (I) that is characterized by the XRPD Pattern 16-A (FIG. 37A) and/or the DSC Thermogram of FIG. 37B. The solid generated with urea and freebase solid form FB-C, Pattern 16-A (FIG. 37A), was found to have many broad endothermic features from low temperature until decomposition of the material. The first endotherm had an onset of 78.3° C. followed by an endotherm with an onset of 131.1° C. which corresponds to the melting temperature of urea. This endotherm had a shoulder with a peak position of 136.7° C. and was followed by a series of very broad endothermic events with onsets of 170.8° C., 179.6° C., and 167.01° C., respectively.

Figure 38A:
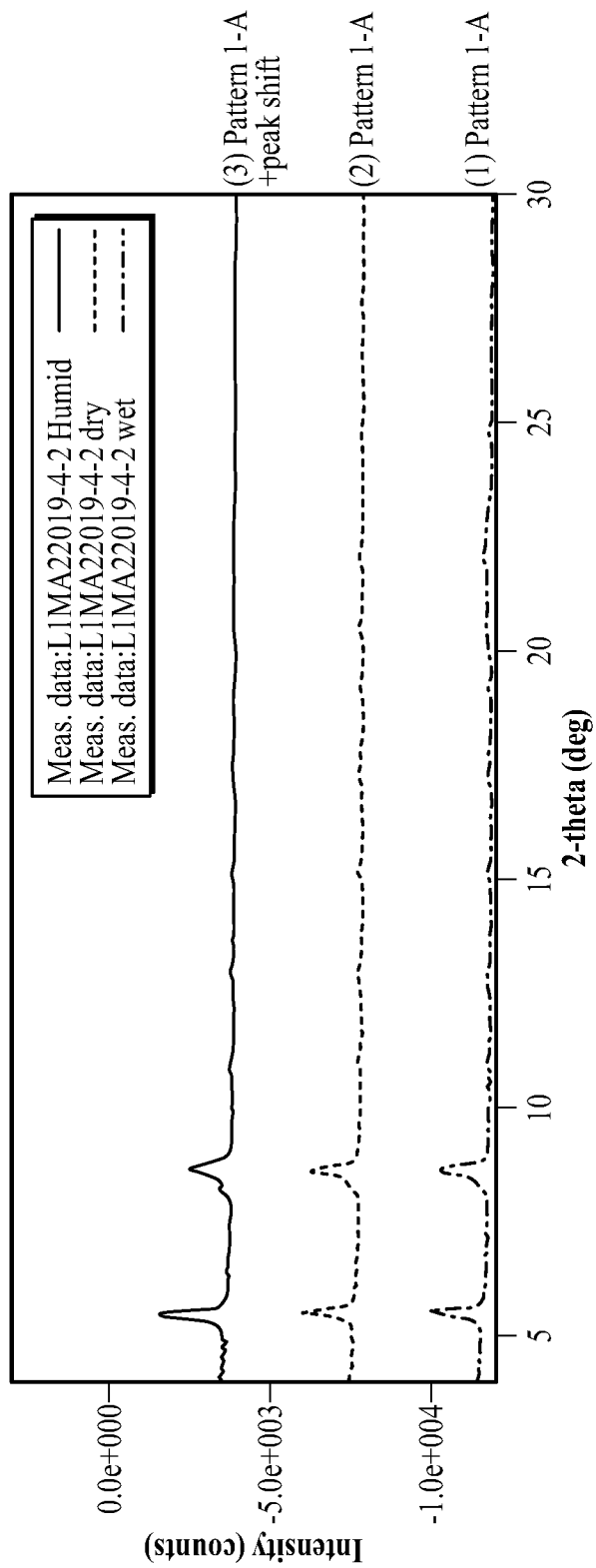
FIG. 38A is a XRPD pattern obtained from a pyruvic acid salt of pralsetinib in Solid Form 1-A.
Figure 38B:
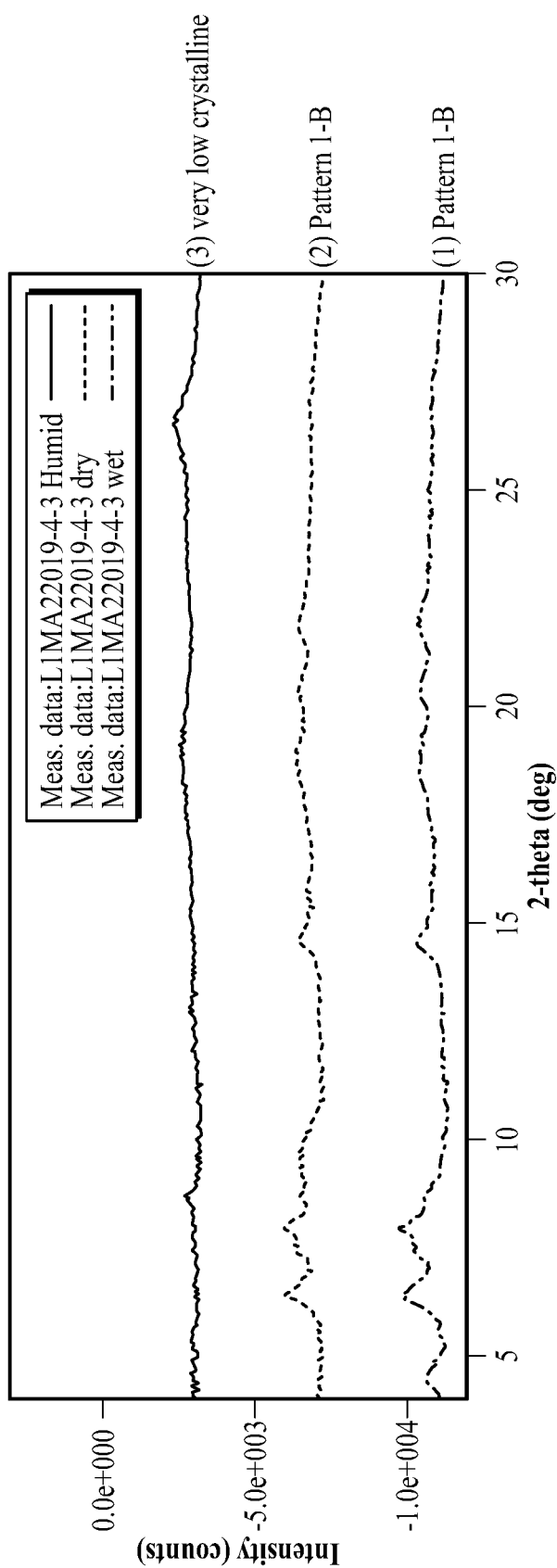
FIG. 38B is a XRPD pattern of a pyruvic salt of pralsetinib in Solid Form 1-B, obtained from the solids generated from the freebase and pyruvic acid in EtOAc as a wet cake (1), dried solid (2), and after exposure to 97% RH (3)

Compound (I) can be prepared as a salt of pralsetinib with pyruvic acid. For example, the pyruvate salt of pralsetinib can be solid form 1-A characterized by the XRPD Pattern 1-A shown in FIG. 38A or the solid form 1-B characterized by the XRPD Pattern 1-B shown in FIG. 38B.

Figure 39:
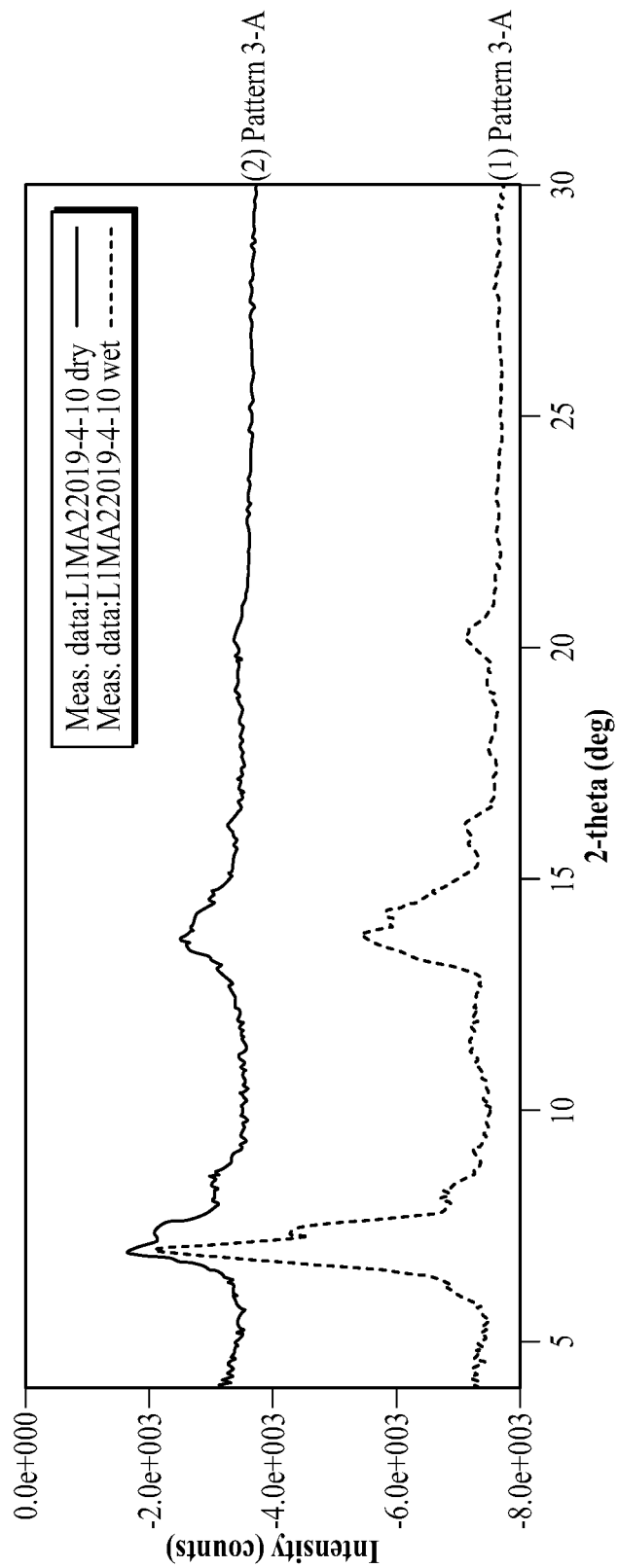
FIG. 39 is a XRPD pattern of a citric acid salt of pralsetinib in Solid Form 3-A, obtained from the solids generated from the freebase and citric acid in IPA:water(:1 vol) as a wet cake (1) and dried solid (2).

Compound (I) can be prepared as a salt of pralsetinib with citric acid. For example, the citrate salt of pralsetinib can be solid form 3-A characterized by the XRPD Pattern 3-A shown in FIG. 39.

Figure 40A:
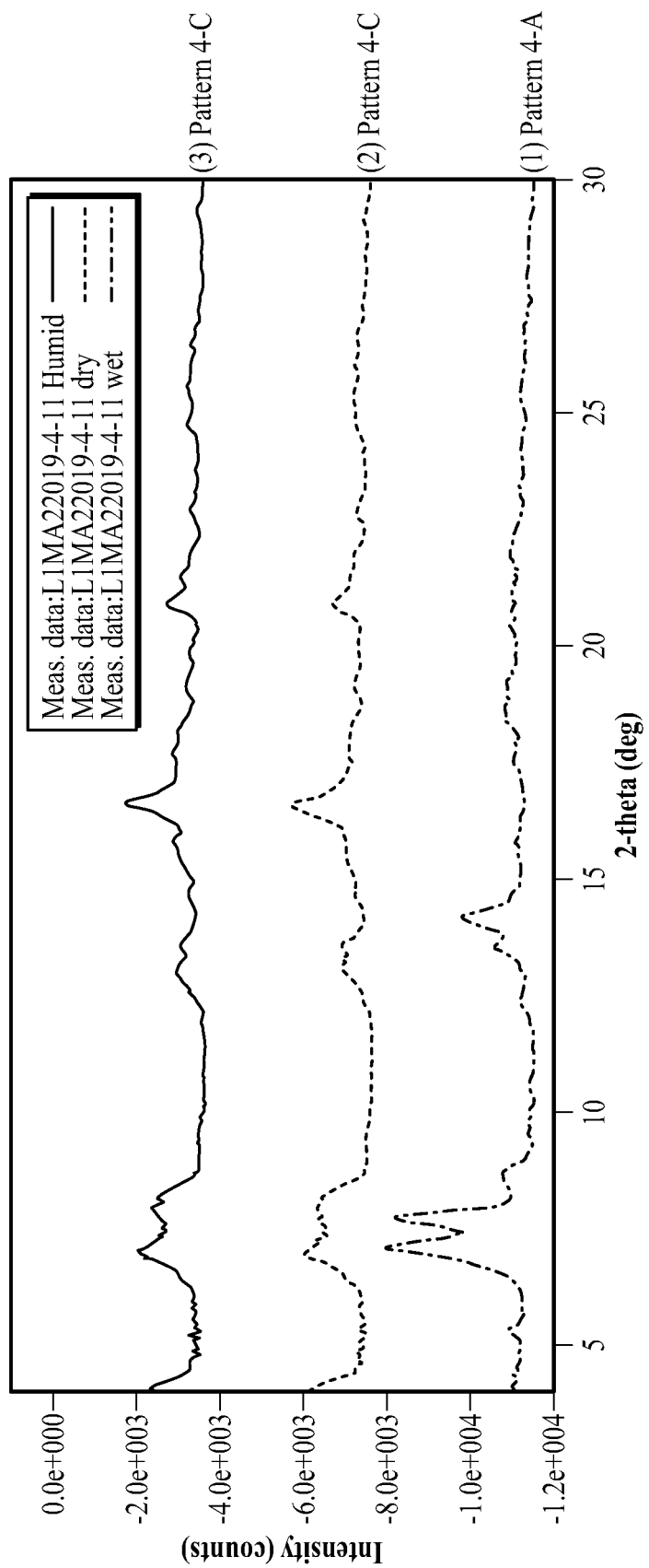
FIG. 40A is a XRPD pattern of a fumaric acid salt of pralsetinib in Solid Form 4-A and a XRPD pattern obtained from a fumaric acid salt of pralsetinib in Solid Form 4-C, obtained from the solids generated from the freebase and fumeric acid in EtOH as a wet cake (1), dried solid (2), and after exposure to 97% RH (3).
Figure 40B:
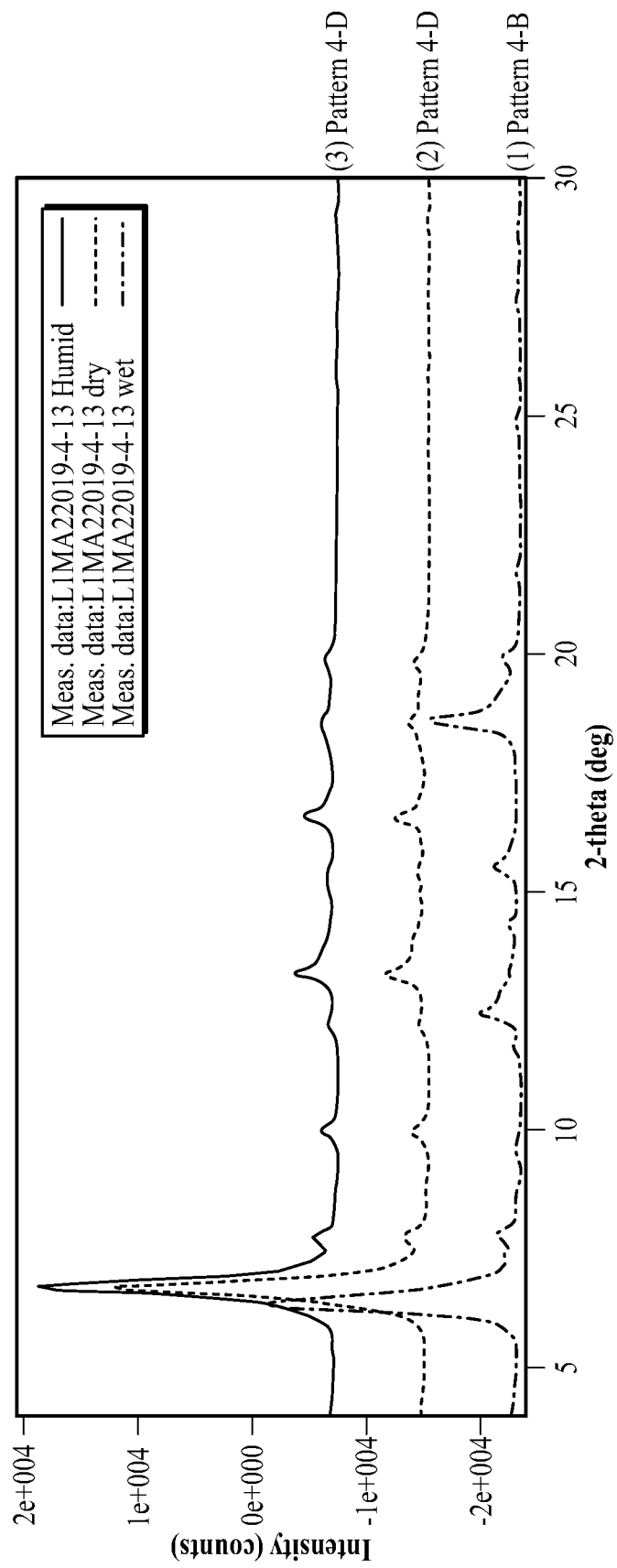
FIG. 40B is a XRPD pattern obtained from a fumaric acid salt of pralsetinib in Solid Form 4-B and a XRPD pattern obtained from a fumaric acid salt of pralsetinib in Solid Form 4-D, obtained from the solids generated from the freebase and fumeric acid in IPA:water (9:1 vol) as a wet cake (1), dried solid (2), and after exposure to 97% RH (3).

Compound (I) can be prepared as a solid fumaric acid salt form. For example, the fumarate salt of pralsetinib can be solid form 4-A characterized by the XRPD Pattern 4-A shown in FIG. 40A, solid form 4-B characterized by the XRPD Pattern 4-B shown in FIG. 40B, solid form 4-C characterized by the XRPD Pattern 4-C shown in FIG. 40A, or the solid form 4-D characterized by the XRPD Pattern 4-D shown in FIG. 40B.

Figure 41:
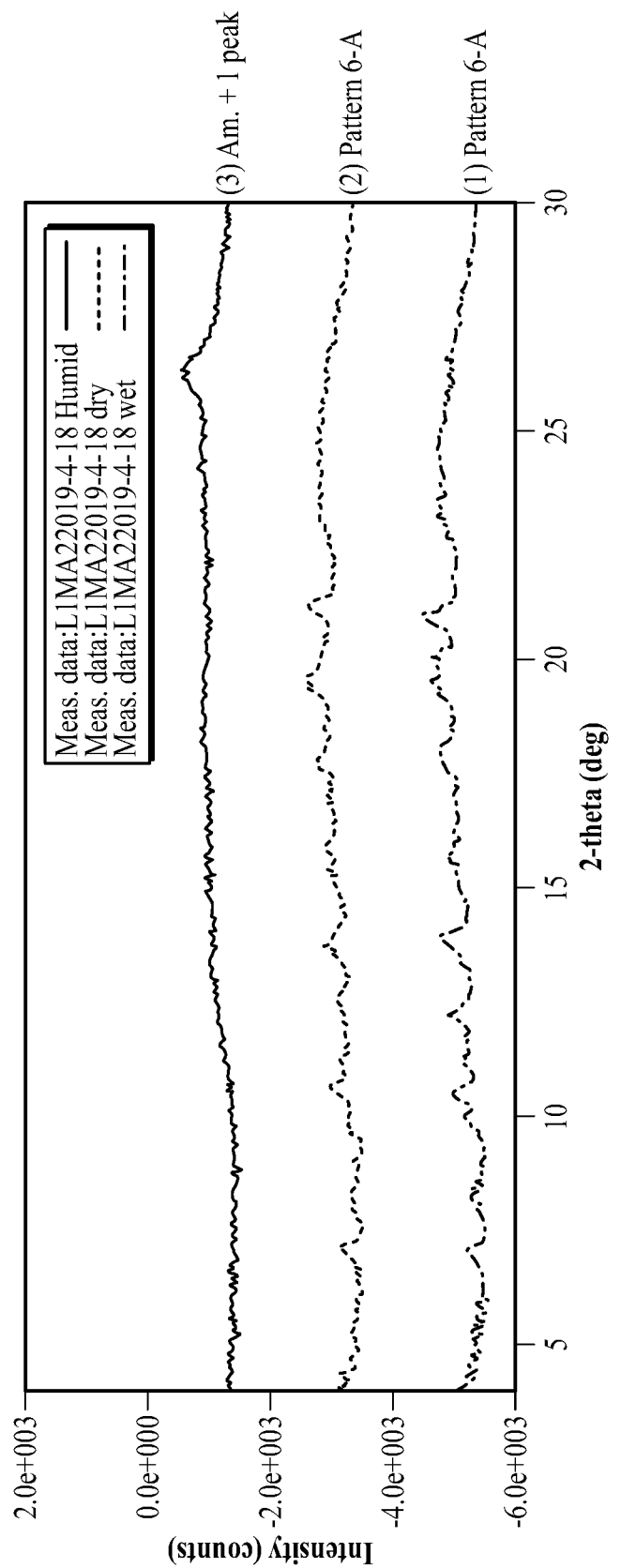
FIG. 41 is a XRPD pattern obtained from a saccharin salt of pralsetinib in Solid Form 6-A, obtained from the solids generated from the freebase and saccharin in EtOAc as a wet cake (1), dried solid (2), and after exposure to 97% RH (3).

Compound (I) can be prepared as a salt of pralsetinib with saccharin. For example, the saccharine salt of pralsetinib can be solid form 6-A characterized by the XRPD Pattern 6-A shown in FIG. 41.

Figure 42:
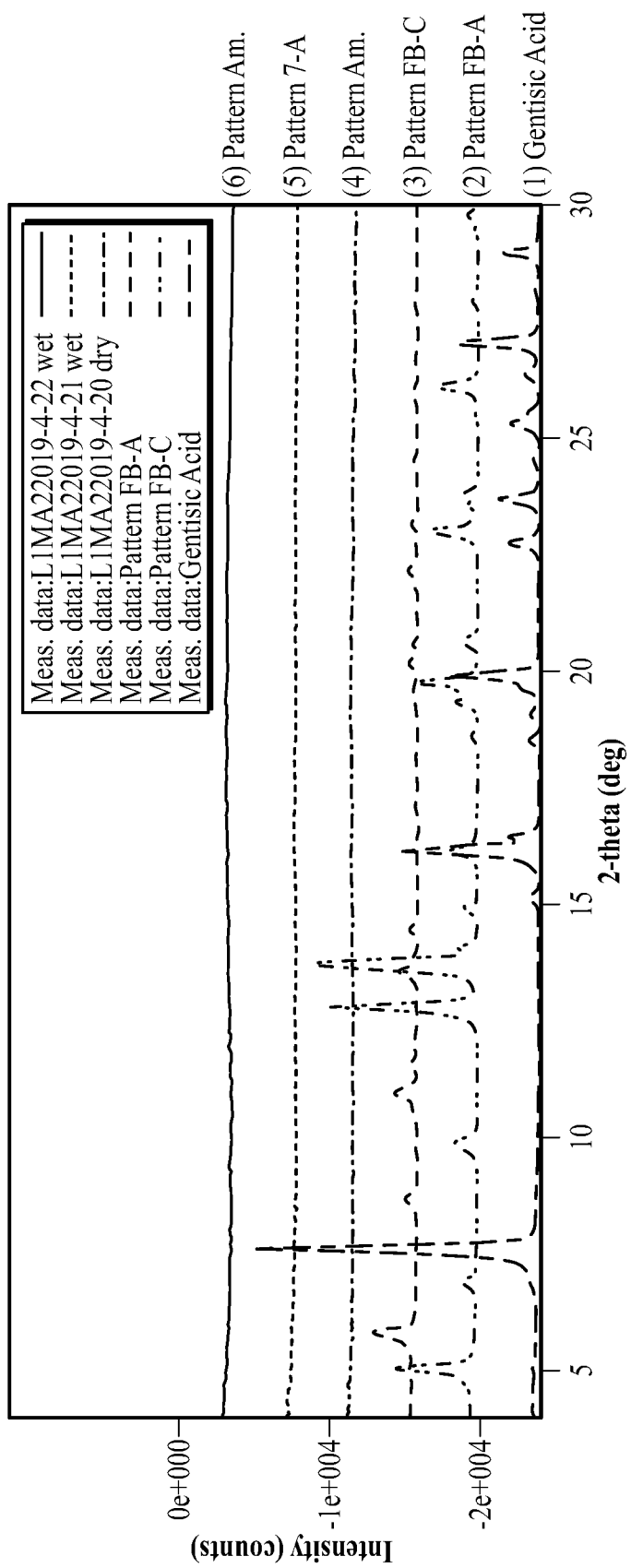
FIG. 42 is a XRPD pattern obtained from a gentisic salt of pralsetinib in Solid Form 7-A (5), shown with XRPD patterns obtained from gentisic acid (1), freebase Pattern FB-A (2), freebase Pattern FB-C (3), and the freebase with gentisic acid as a wet cake in MtBE (4), EtOAc (5), and IPAc (6).

Compound (I) can be prepared as a salt of pralsetinib with gentisic acid. For example, the gentisic acid salt of pralsetinib can be solid form 7-A characterized by the XRPD Pattern 7-A shown in FIG. 42.

Figure 43A:
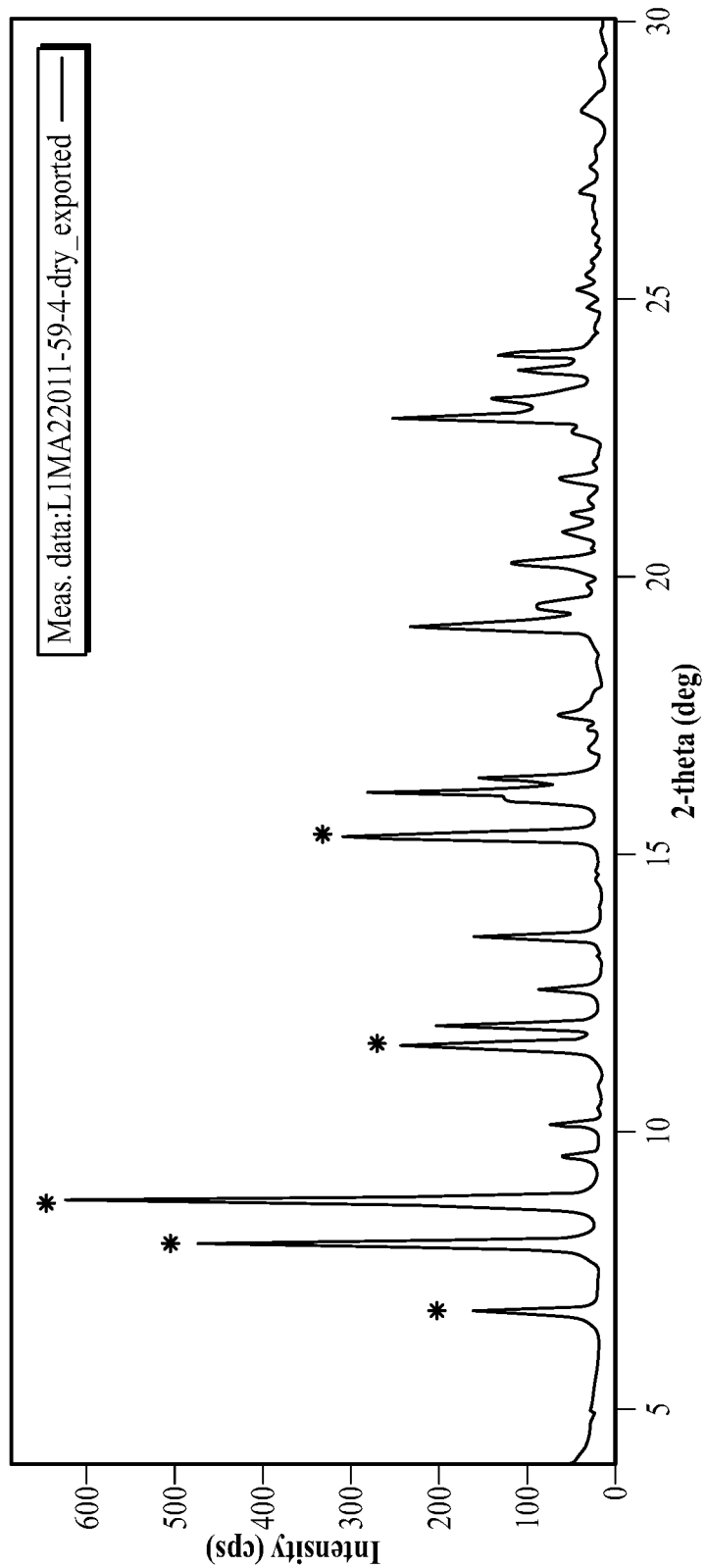
FIG. 43A is a XRPD pattern obtained from a mesylate salt of pralsetinib in Solid Form 2-B.
Figure 43B:
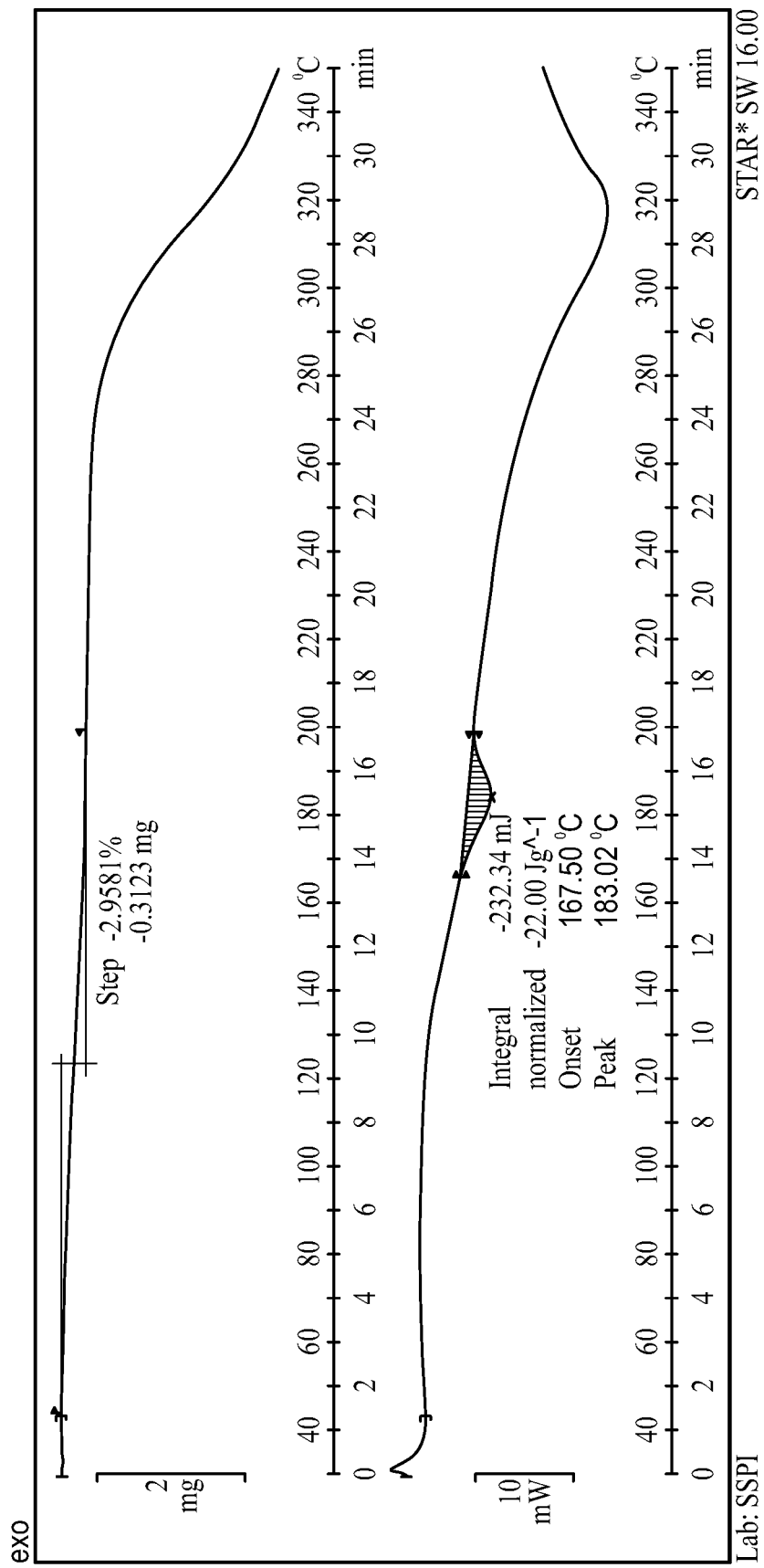
FIG. 43B shows a TGA/DSC thermogram obtained from a mesylate salt of pralsetinib in Solid Form 2-B.
Figure 43C:
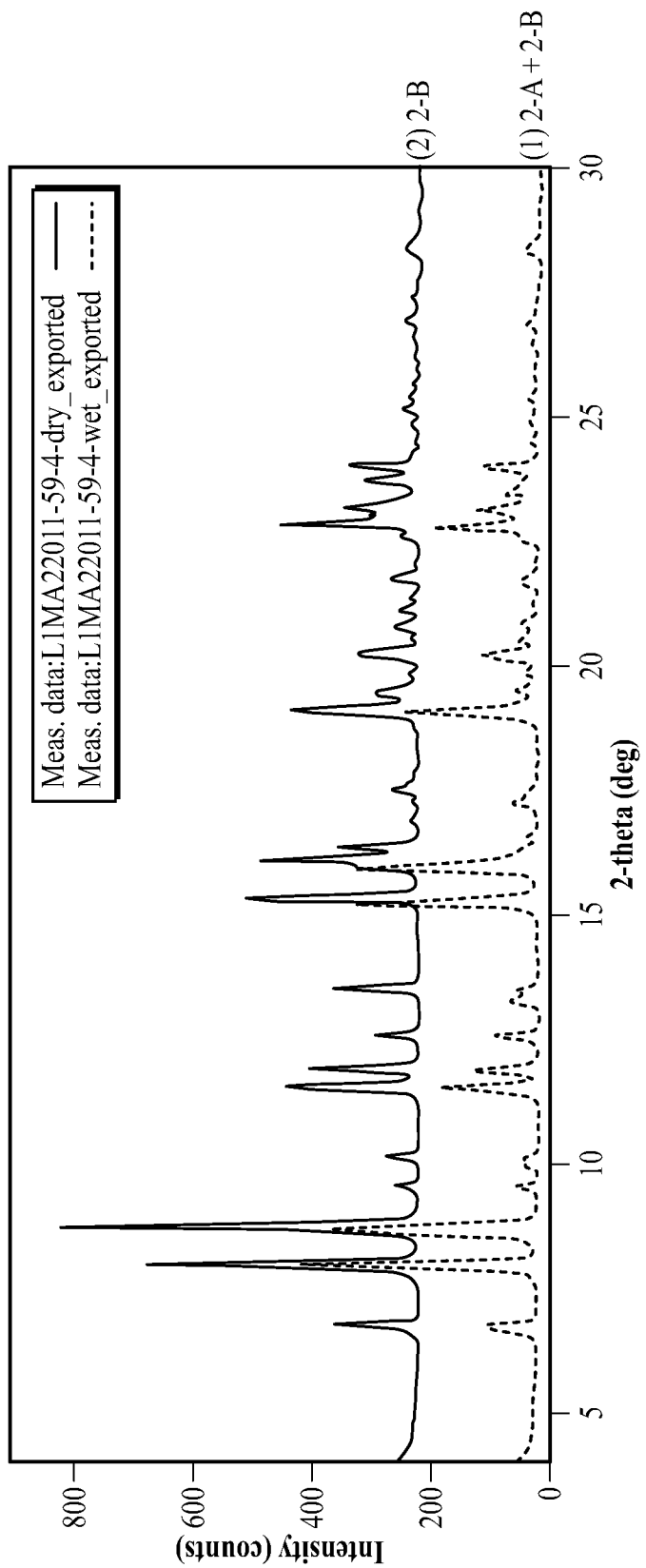
FIG. 43C is a XRPD pattern of a mesylate salt of pralsetinib in Solid Form 2-A and a XRPD pattern obtained from a mesylate salt of pralsetinib in Solid Form 2-B, obtained from screening with MSA in EtOH wet (1) and dry (2).
Figure 43D:
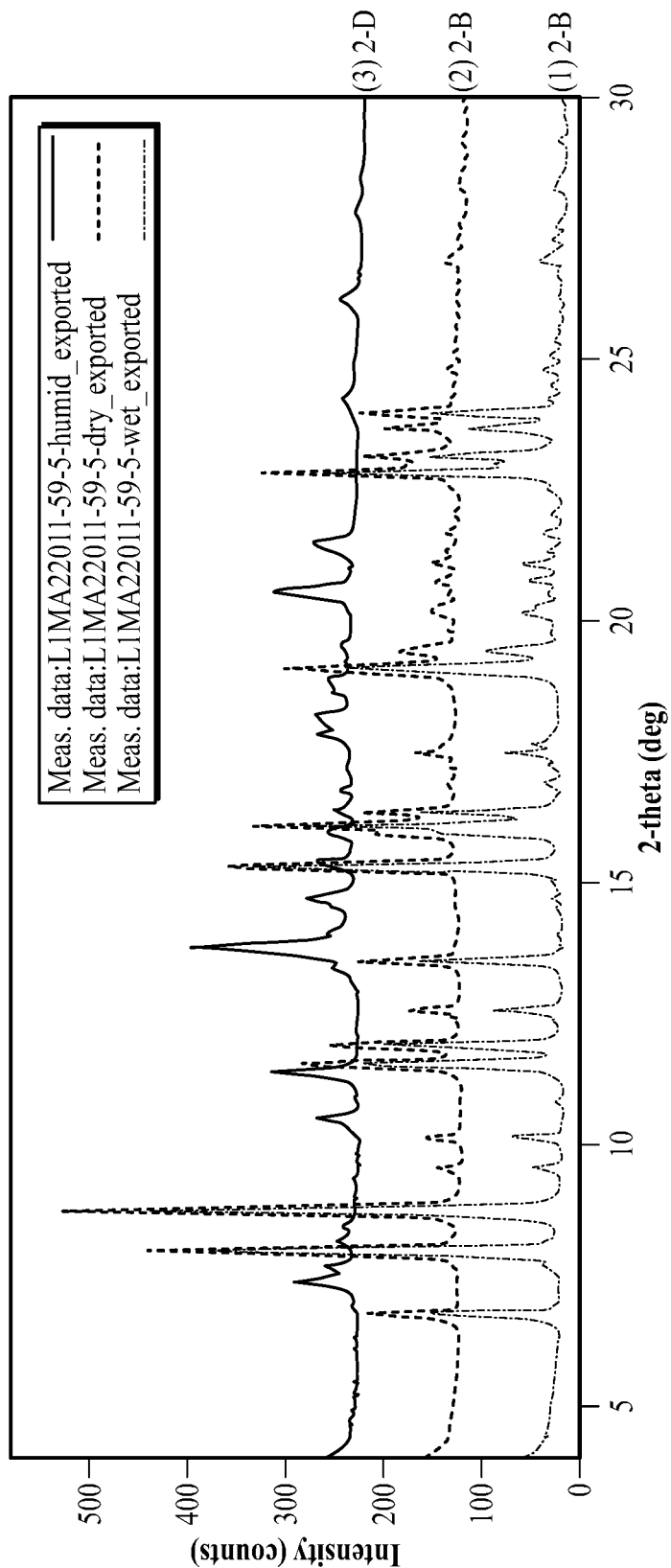
FIG. 43D is a XRPD pattern of a mesylate salt of pralsetinib in Solid Form 2-B in (1) and (2) and a XRPD pattern obtained from a mesylate salt of pralsetinib in Solid Form 2-D (3), obtained from screening MSA with EtOAc, wet (1), dry (2) and humid (3).
Figure 43E:
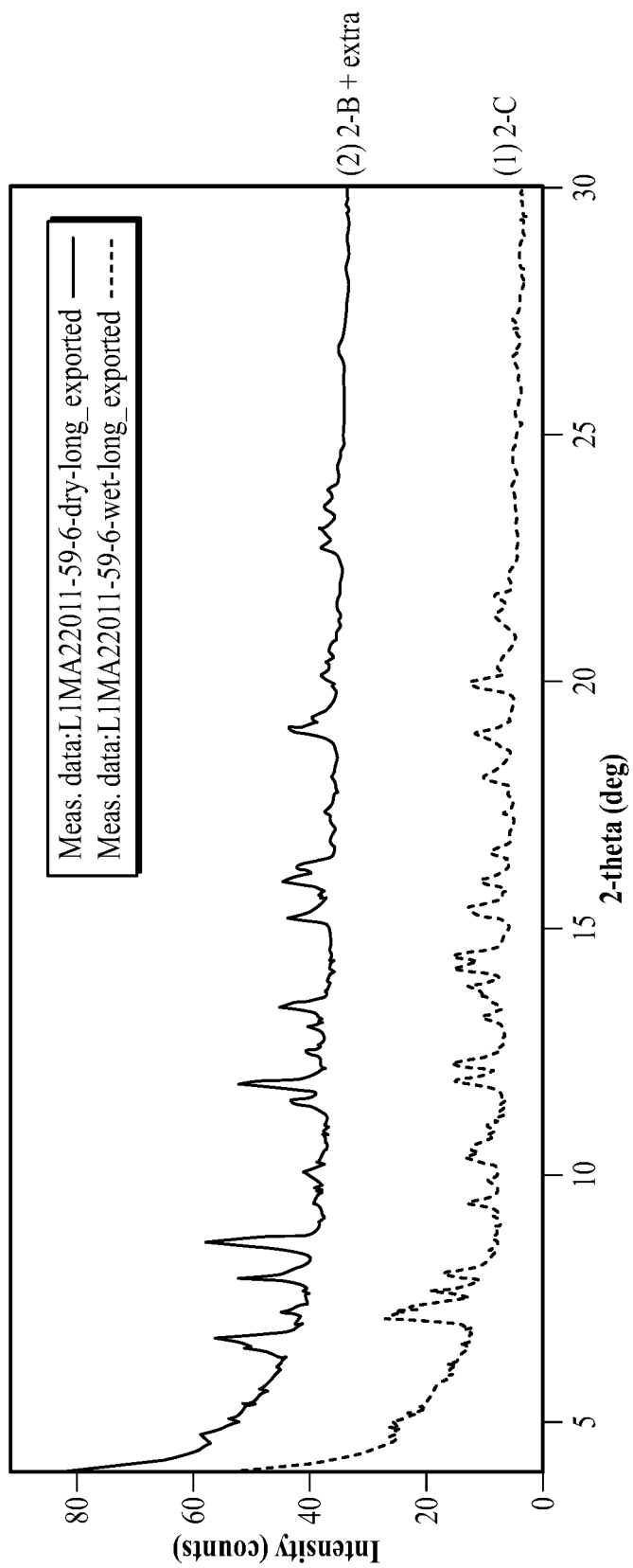
FIG. 43E is a XRPD pattern of a mesylate salt of pralsetinib in Solid Form 2-C (1), obtained from screening with MSA in IPA:water (9:1 vol), wet (1) and dry (2).

Compound (I) can be prepared as a salt of pralsetinib with mesylate. For example, the mesylate salt of pralsetinib can be solid form 2-A characterized by the XRPD Pattern 2-A shown in FIG. 43A and/or the TGA/DSC thermogram shown in FIG. 43B. In other examples, the mesylate salt of pralsetinib can be solid form 2-A+2B characterized by the XRPD Pattern 2-A+2B shown in FIG. 43C and/or the solid form 2-B or 2-D characterized by the XRPD Pattern 2B or 2D shown in FIG. 43D. In some examples, a salt of pralsetinib and mesylate can be a solid form 2-C having the XRPD Pattern 2-C shown in FIG. 43E.

Figure 44:
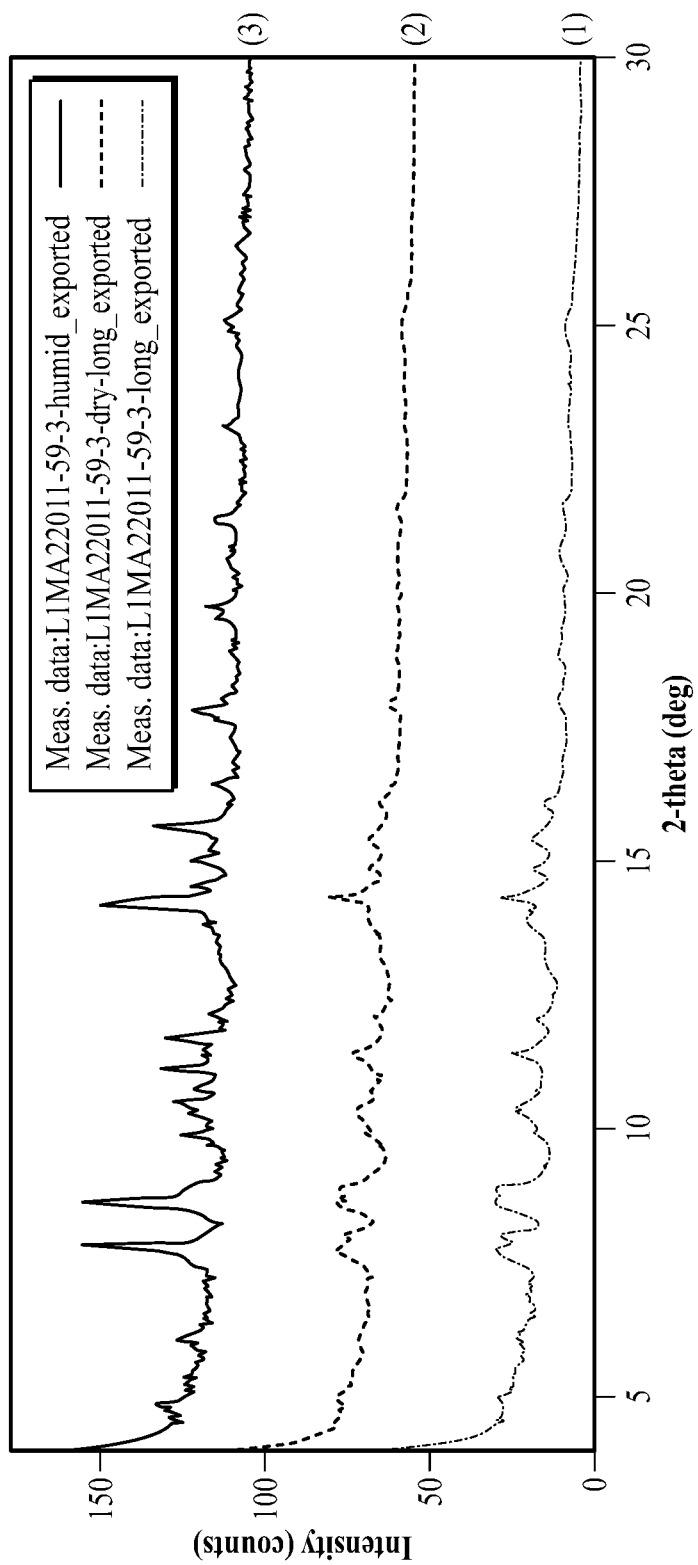
FIG. 44 is a XRPD pattern of a BSA salt of pralsetinib in Solid Form 18-A in (1) and (2) and a XRPD pattern obtained from a mesylate salt of pralsetinib in Solid Form 18-B (3), obtained from screening with BSA wet cake (1), IPA:water (9:1 vol), dry solid (2) and humid (3) conditions.

Compound (I) can be prepared as a salt of pralsetinib with benzenesulfonic acid (BSA). For example, the BSA salt of pralsetinib can be solid form 18-A characterized by the XRPD Pattern 18-A shown in FIG. 44.

Figure 45A:
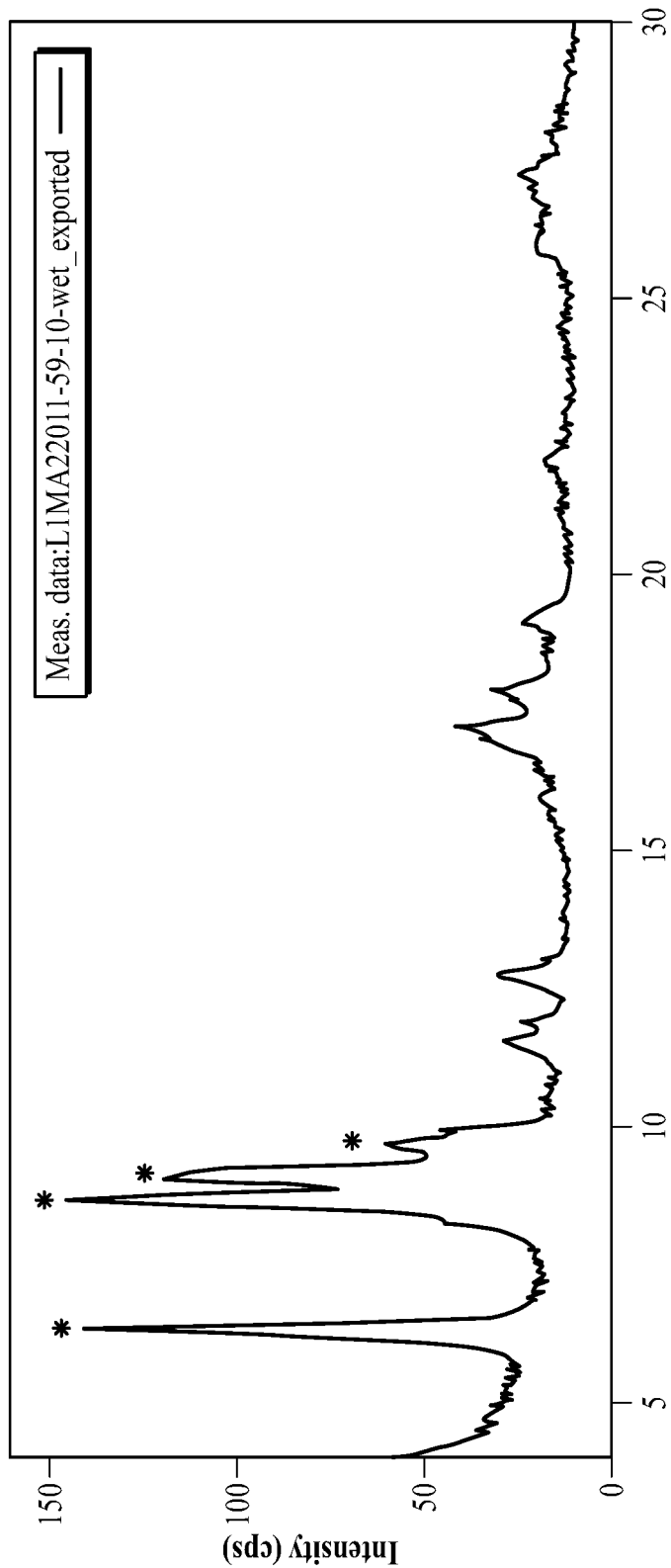
FIG. 45A is a XRPD pattern obtained from a HBr salt of pralsetinib in Solid Form 19-A.
Figure 45B:
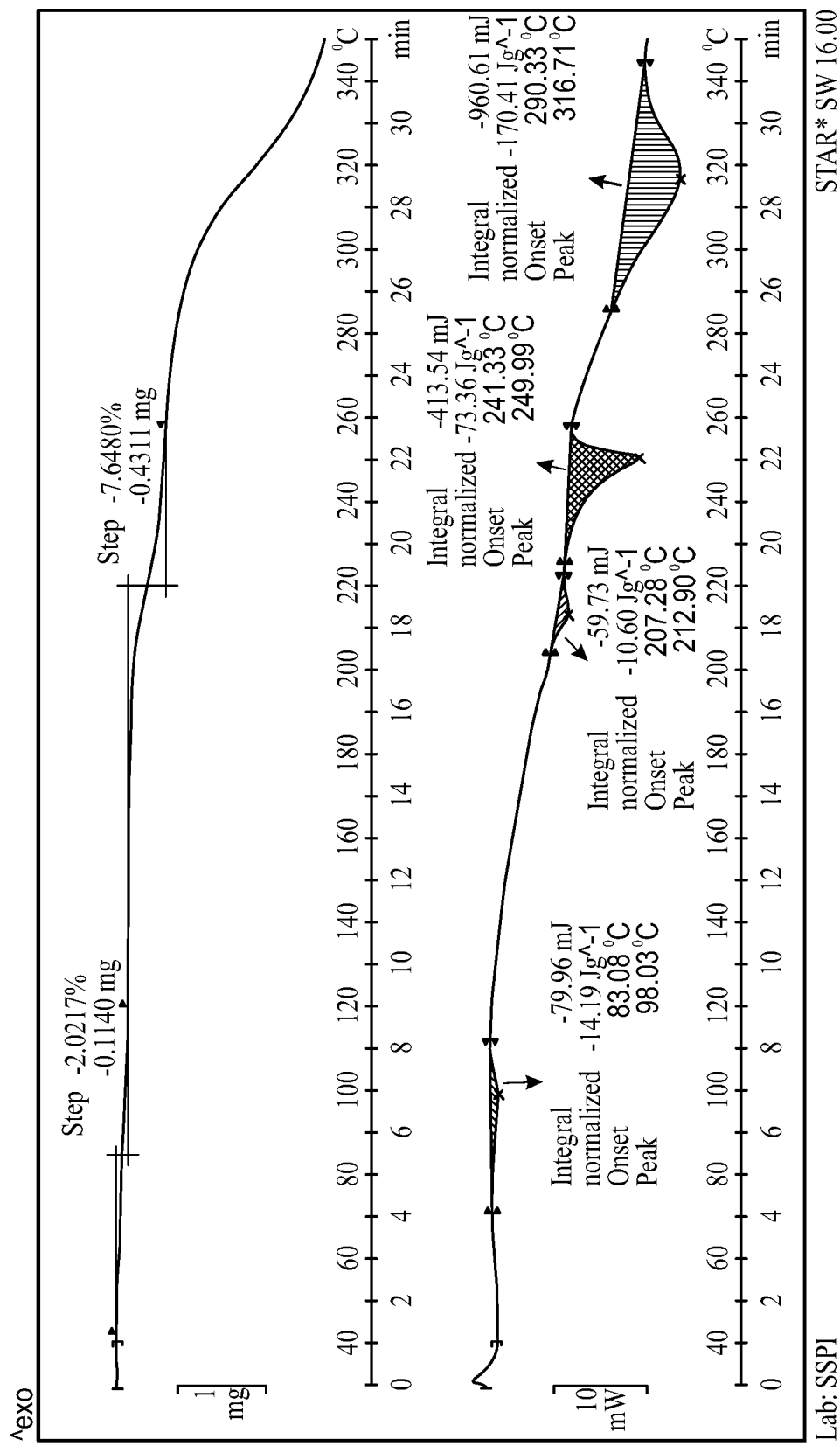
FIG. 45B shows a TGA and DSC thermogram obtained from a HBr salt of pralsetinib in Solid Form 19-A.
Figure 45C:
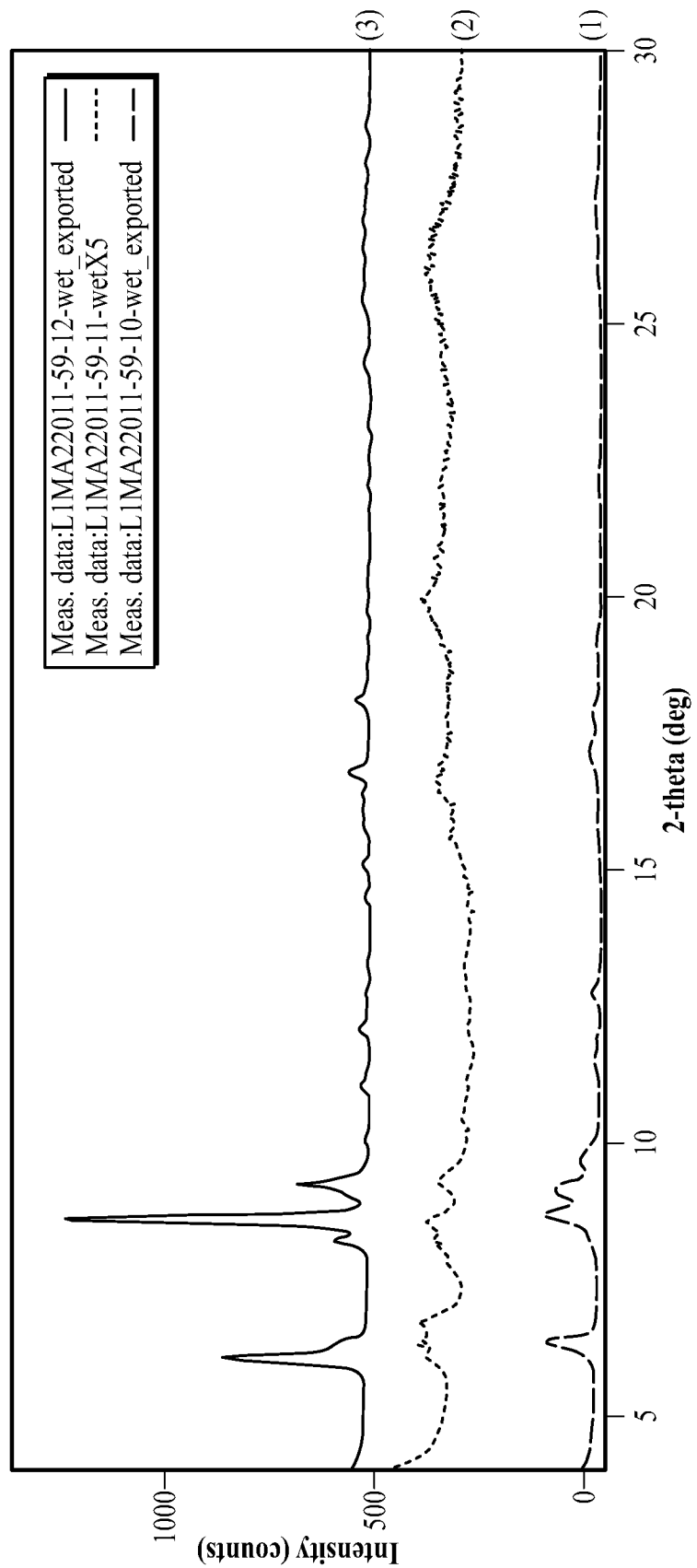
FIG. 45C is a XRPD pattern obtained from a HBr salt of pralsetinib in Solid Form 19-A (1), a HBr salt of pralsetinib in Solid Form 19-B (2), and a XRPD pattern obtained from a HBr salt of pralsetinib in Solid Form 19-C (3), obtained from wet solids obtained from screening with HBr in (1) EtOH, (2) EtOAc, and (3) IPA:water (9:1 vol).
Figure 45D:
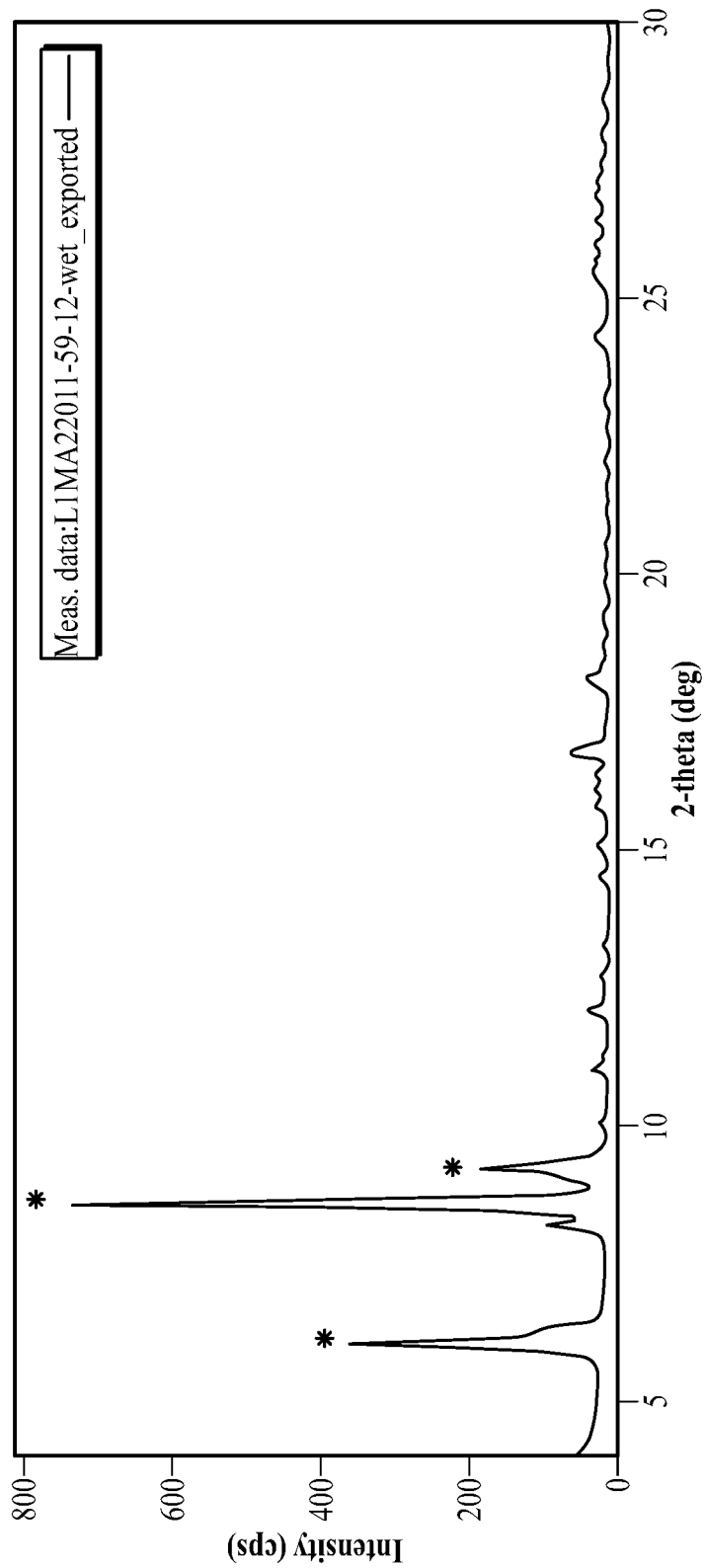
FIG. 45D is a XRPD pattern obtained from a HBr salt of pralsetinib in Solid Form 19-C.
Figure 45E:
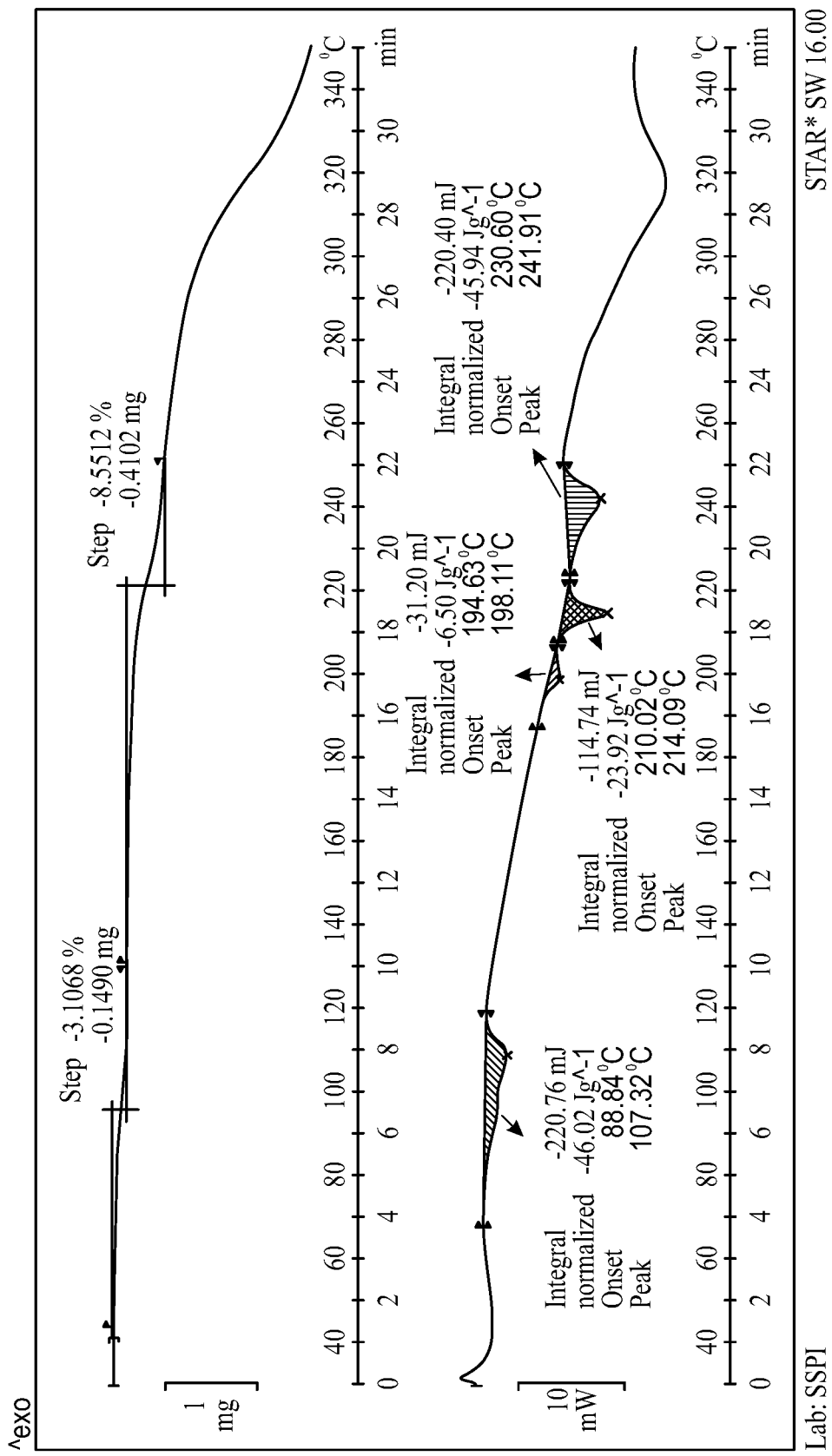
FIG. 45E shows a TGA and DSC thermogram obtained from a HBr salt of pralsetinib in Solid Form 19-C+D.

Compound (I) can be prepared as a salt of pralsetinib with hydrobromic acid (HBr). For example, the HBr salt of pralsetinib can be solid form 19-A characterized by the XRPD Pattern 19-A shown in FIG. 45A and/or the TGA/DSC thermogram shown in FIG. 45B. In other examples, the HBr salt of pralsetinib can be solid form 19-B or 19-C characterized by the XRPD Pattern 19-B or 19-C shown in FIG. 45C and/or the solid form 19-C characterized by the XRPD Pattern 19-C shown in FIG. 45D. In some examples, a salt of pralsetinib and HBr can be a solid form 19-C+D having the TGA/DSC thermogram 19 C+D shown in FIG. 45E.

Figure 46A:
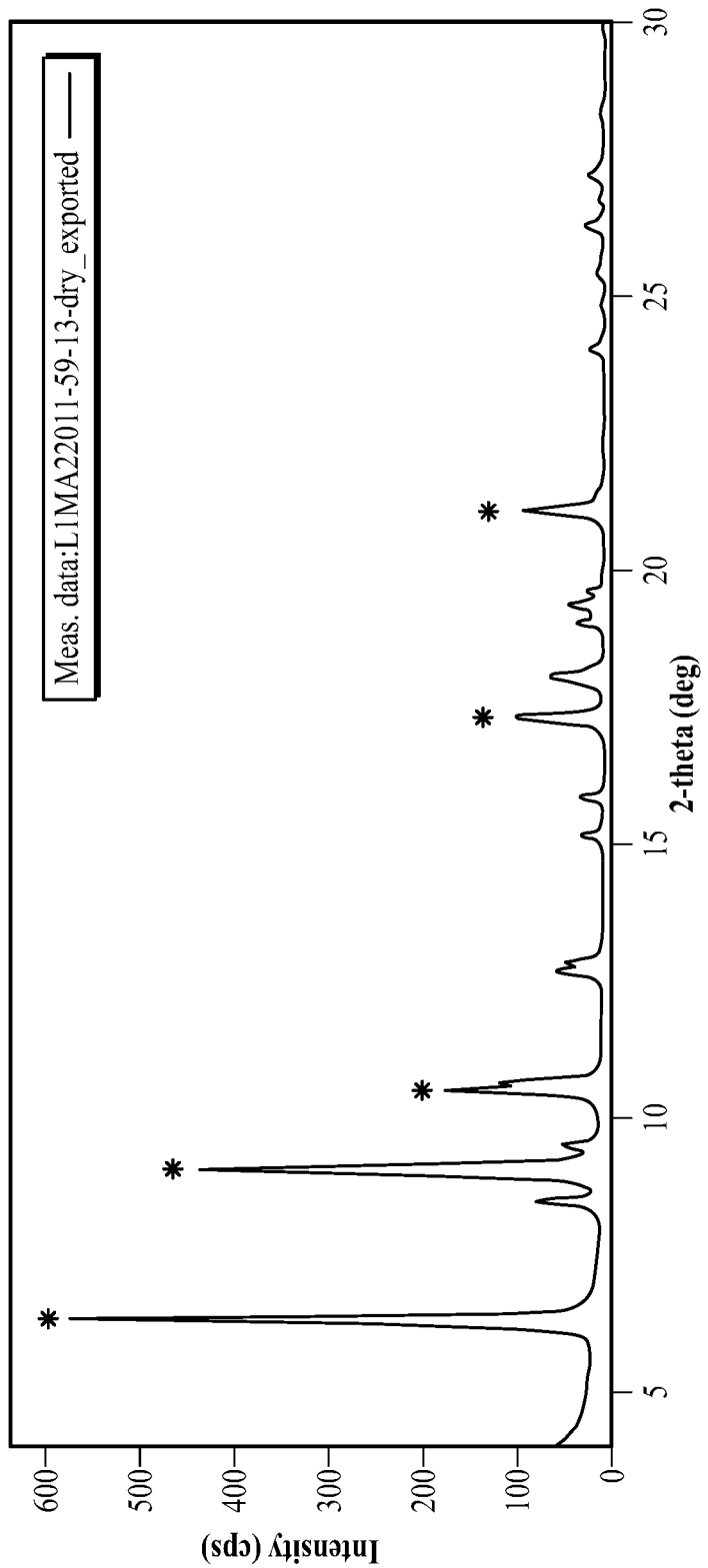
FIG. 46A is a XRPD pattern obtained from a nitrate salt of pralsetinib in Solid Form 20-A.
Figure 46B:
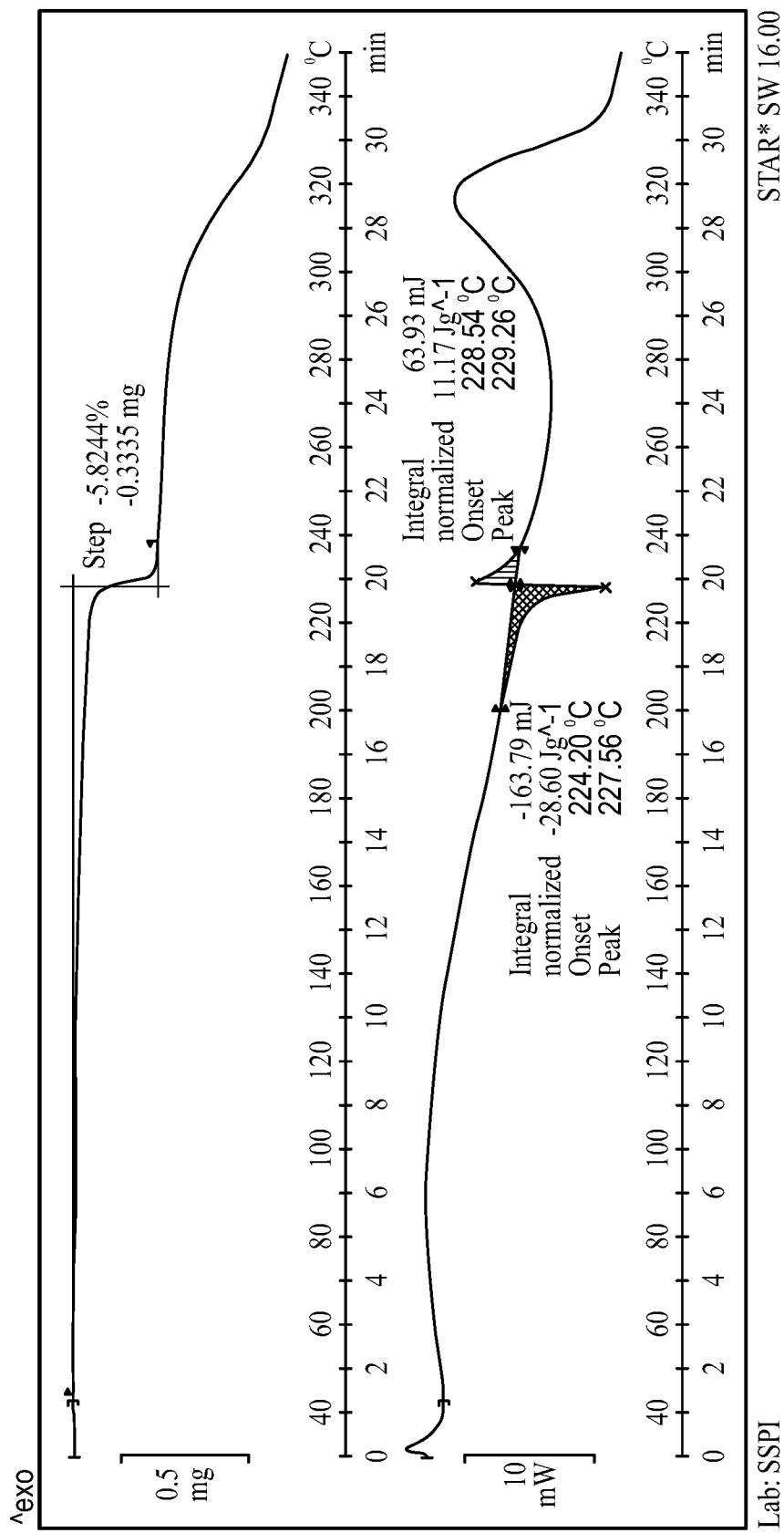
FIG. 46B shows a TGA/DSC thermogram obtained from a HBr salt of pralsetinib in Solid Form 20-A.

Compound (I) can be prepared as a salt of pralsetinib with nitric acid. For example, the nitrate salt of pralsetinib can be solid form 20-A characterized by the XRPD Pattern 20-A shown in FIG. 46A or the TGA/DSC thermogram shown in FIG. 46B.

Figure 47:
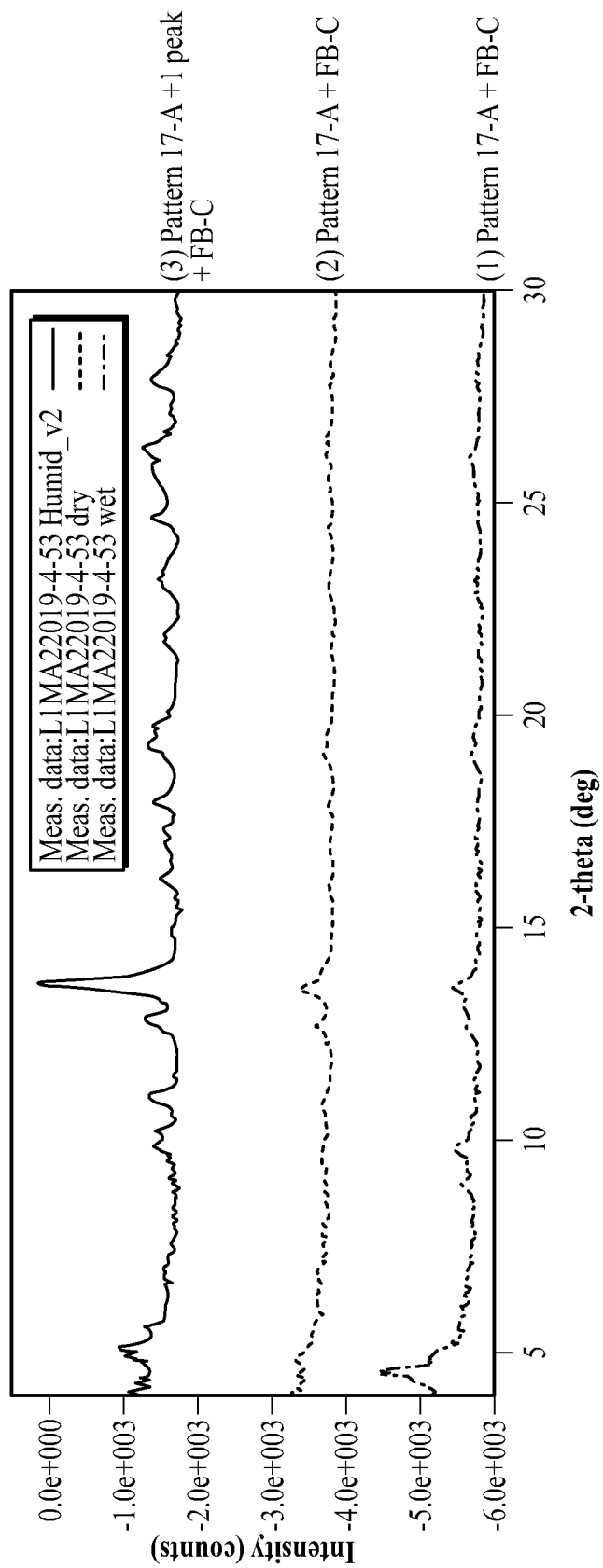
FIG. 47 is a XRPD pattern of a quercetin dihydrate (QD) salt of pralsetinib in Solid Form 17-A, obtained from the solids generated from the freebase and quercetin dihydrate upon coevaporation from MeOH as a wet cake (4), dried solid (5), and after exposure to 97% RH (6).

Compound (I) can be prepared as a salt of pralsetinib with quercetin dihydrate (QD). For example, the QD salt of pralsetinib can be solid form 17-A characterized by the XRPD Pattern 17-A shown in FIG. 47.

Pharmaceutical Compositions

The salts and solid forms of Compound (I) are useful in the manufacture and preparation of pharmaceutical compositions. A pharmaceutical composition can comprise an active pharmaceutical ingredient (API) comprising, consisting essentially of, or consisting of Compound (I) prepared under applicable Good Manufacturing Practice (GMP). For example, the pharmaceutical composition can be a batch composition comprising Compound (I) that can be converted from or between one or more suitable salt form or free base solid form during the manufacture or preparation of the API. For example, the Examples provide methods of making Compound (I) in multiple salt and solid forms and techniques for converting between various free base solid forms and salts of Compound (I) in multiple solid forms. The salt form and/or solid form of Compound (I) can be selected at different steps in the manufacture of a drug substance to provide desirable physical properties, such as storage stability. The API can be combined with one or more excipients to form a drug substance in a batch composition that adheres to Good Manufacturing Practices (e.g., ICH Harmonized Tripartite Guideline, Good Manufacturing Practice Guide for Active Pharmaceutical Ingredients Q7, Current Step 4 version dated 10 Nov. 2010).

The FDA (Food and Drug Administration) provides applicable guidance on Good Manufacturing Practice (GMP) for the manufacturing of active pharmaceutical ingredients (APIs) under an appropriate system for managing quality. As used with respect to manufacture of API under GMP, "manufacturing" is defined to include all operations of receipt of materials, production, packaging, repackaging, labelling, re-labelling, quality control, release, storage and distribution of APIs and the related controls. An "API Starting Material" is a raw material, intermediate, or an API that is used in the production of an API and that is incorporated as a significant structural fragment into the structure of the API. API Starting Materials typically have defined chemical properties and structure.

In some embodiments, an oral dosage form can comprise Compound (I) and one or more pharmaceutically acceptable excipients in an oral dosage form such as a tablet or a capsule. In some embodiments, an oral dosage form is prepared via converting a crystalline solid form of Compound (I) to an amorphous form followed by combination with one or more excipients. In some embodiments, an oral dosage form of Compound (I) is a capsule comprising Compound (I) in a solid form disclosed herein. In some embodiments, an oral dosage form comprises a filler, lubricant, a glidant, an anti-adherents and/or an anti-statics.

EXAMPLES

Instrumentation

Unless otherwise stated herein, the following instrumentation was used in the free base solid form analysis of Examples 1-3 and in obtaining data shown in corresponding Figures.

As used herein, reference to material as "Pattern *" where "*" indicates any letter or number-letter combination (e.g., A, or 1-A, and the like) refers to the corresponding solid form of pralsetinib free base or salt form characterized by the corresponding XRPD pattern (e.g., Pattern A refers to pralsetinib free base solid form having XRPD Pattern A; Pattern 5-A refers to pralsetinib HCl salt having XRPD Pattern 5-A).

Differential Scanning Calorimetry (DSC)

Differential scanning calorimetry was done using a Mettler Toledo DSC3+. The desired amount of sample is weighed directly in a hermetic aluminum pan with pin-hole. A typical sample mass for is 3-5 mg. A typical temperature range is 30° C. to 300° C. at a heating rate of 10° C. per minute (total time of 27 minutes). Typical parameters for DSC are listed below.

TABLE 27

| | Parameters |
|---|---|
| Method | Ramp |
| Sample size | 3-5 mg |
| Heating rate | 10.0° C./min |
| Temperature range | 30 to 300° C. |
| Method gas | $N_2$ at 60.00 mL/min |

Dynamic Vapor Sorption (DVS)

Dynamic Vapor Sorption (DVS) was done using a DVS Intrinsic 1. The sample is loaded into a sample pan and suspended from a microbalance. A typical sample mass for DVS measurement is 25 mg. Nitrogen gas bubbled through distilled water provides the desired relative humidity. A typical measurement comprises the steps:

1—Equilibrate at 50% RH
2—50% to 2%. (50%, 40%, 30%, 20%, 10% and 2%)
  a. Hold minimum of 5 mins and maximum of 60 minutes at each humidity. The pass criteria is less than 0.002% change
3—2% to 95% (2%, 10%, 20%, 30%, 40%, 50%, 60%, 70%, 80%, 90%, 95%)
  a. Hold minimum of 5 mins and maximum of 60 minutes at each humidity. The pass criteria is less than 0.002% change
4—95% to 2% (95%, 80%, 70%, 60%, 50%, 40%, 30%, 20%, 10%, 2%)
  a. Hold minimum of 5 mins and maximum of 60 minutes at each humidity. The pass criteria is less than 0.002% change
5—2% to 50% (2%, 10%, 20%, 30%, 40%, 50%)
  a. Hold minimum of 5 mins and maximum of 60 minutes at each humidity. The pass criteria is less than 0.002% change High Pressure Liquid Chromatography (HPLC)

High pressure liquid chromatography (HPLC) was conducted using an Agilent 1220 Infinity LC. Flow rate range is 0.2-5.0 mL/min, operating pressure range is 0-600 bar, temperature range is 5° C. above ambient to 60° C., and wavelength range is 190-600 nm.

TABLE 28

| Parameters | |
|---|---|
| Mobile Phase A | 0.1% TFA in DI water |
| Mobile Phase B | MeOH:ACN (1:1 vol) |
| Diluent | MeOH:water (1:4 vol) |
| Injection Volume | 1 µL |
| Monitoring Wavelength | 288 min |
| Column | Waters Acquity BEH C-18, 2.1 × 50 mm, 1.7 µm |
| Column Temperature | 25° C. |

| | Time (min) | % A | Flow rate (mL/min) |
|---|---|---|---|
| Gradient Method | 0 | 75 | 0.3 |
| | 20 | 40 | |
| | 25 | 5 | |
| | 25.1 | 75 | |
| | 30 | 75 | |

Thermogravimetric Analysis and Differential Scanning Calorimetry (TGA and DSC)

Thermogravimetric analysis and differential scanning calorimetry was done using a Mettler Toledo TGA/DSC3+. The desired amount of sample is weighed directly in a hermetic aluminum pan with pin-hole. A typical sample mass for the measurement is 5-10 mg. A typical temperature range is 30° C. to 300° C. at a heating rate of 10° C. per minute (total time of 27 minutes). Protective and purge gasses are nitrogen (20-30 mL/min and 50-100 mL/min). Typical parameters for DSC/TGA are listed below.

TABLE 29

| Parameters | |
|---|---|
| Method | Ramp |
| Sample size | 5-10 mg |
| Heating rate | 10.0° C./min |
| Temperature range | 30 to 300° C. |

X-Ray Powder Diffraction (XRPD)

Powder X-ray diffraction was done using a either Rigaku MiniFlex 600 or Bruker D8 Advance. For Rigaku:

Samples were prepared on Si zero-return wafers. A typical scan is from 2θ of 4 to 30 degrees, with step size 0.05 degrees over five minutes with 40 kV and 15 mA. A high-resolution scan is from 2θ of 4 to 40 degrees, with step size 0.05 degrees over thirty minutes with 40 kV and 15 mA. Typical parameters for XRPD are listed below.

TABLE 30

| Parameters for Reflection Mode | |
|---|---|
| X-ray wavelength | Cu Kα1, 1.540598 Å, |
| X-ray tube setting | 40 kV, 15 mA |
| Slit condition | Variable + Fixed Slit System |
| Scan mode | Continuous |
| Scan range (°2TH) | 4-30 |
| Step size (°2TH) | 0.05 |
| Scan speed (°/min) | 5 |

For Bruker:

X-ray powder diffraction were performed using a Bruker D8 Advance equipped with a Lynxeye detector (i.e. Bragg-Brentano geometry). Samples were prepared on Si zero-return wafers. Parameters for XRPD are shown below in Table A-1:

TABLE A-1

| Parameter | Regular Scan |
|---|---|
| X-ray wavelength | Cu Kα1, 1.540598 Å |
| X-ray tube setting | 40 kV, 40 mA |
| Slit condition | 0.6 mm div., 2.5° Soller |
| Scan mode | Step |
| Scan range (°2θ) | 4-30 |
| Step size (°2θ) | 0.03 |
| Dwell time (s/step) | 0.23 |
| Spin | Yes (0.5 Hz) |

Unless otherwise stated herein, the following instrumentation was used in the salt solid form analysis of Examples 4-7 and in obtaining data shown in corresponding Figures.

Differential Scanning Calorimetry (DSC)

Differential scanning calorimetry was performed using a Mettler Toledo DSC3+. The sample (3-5 mg) was weighed directly in a 40 µL hermetic aluminum pan with pin-hole and analyzed according to the parameters below:

TABLE 31

| Parameters | |
|---|---|
| Method | Ramp |
| Sample size | 3-5 mg |
| Heating rate | 10.0° C./min |
| Temperature range | 30 to 300° C. |
| Method gas | N$_2$ at 60.00 mL/min |

Dynamic Vapor Sorption (DVS)

Dynamic Vapor Sorption (DVS) was performed using a DVS Intrinsic 1. The samples (12-31 mg) was loaded into a sample pan, suspended from a microbalance and exposed to a humidified stream of nitrogen gas. The sample was held for a minimum of 5 min at each level and only progressed to the next humidity level if there was <0.002% change in weight between measurements (interval: 60 seconds) or 240 min had elapsed. The following program was used:

1—Equilibration at 50% RH

2—50% to 2%. (50%, 40%, 30%, 20%, 10% and 2%)

3—2% to 95% (2%, 10%, 20%, 30%, 40%, 50%, 60%, 70%, 80%, 90%, 95%)

4—95% to 2% (95%, 80%, 70%, 60%, 50%, 40%, 30%, 20%, 10%, 2%)

5—2% to 50% (2%, 10%, 20%, 30%, 40%, 50%)

High Performance Liquid Chromatography (HPLC)

Agilent 1220 Infinity LC: High performance liquid chromatography (HPLC) was conducted using an Agilent 1220 Infinity LC. Flow rate range was 0.2-5.0 mL/min, operating pressure range was 0-600 bar, temperature range was 5° C. above ambient to 60° C., and wavelength range was 190-600 nm.

Agilent 1220 Infinity 2 LC: High performance liquid chromatography (HPLC) was conducted using an Agilent 1220 Infinity 2 LC equipped with diode array detector (DAD). Flow rate range is 0.2-5.0 mL/min, operating pressure range is 0-600 bar, temperature range is 5° C. above ambient to 60° C., and wavelength range is 190-600 nm.

The HPLC method used in this study is shown below:

TABLE 32

| Parameters | |
|---|---|
| Mobile Phase A | 0.1% TFA in Distilled water |
| Mobile Phase B | MeOH:CAN (1:1 vol) |
| Diluent | MeOH:water (4:1 vol) |
| Injection Volume | 1 μL |
| Monitoring Wavelength | 288 nm |
| Column | Waters Acquity BEH C-18, 2.1 × 50 mm, 1.7 μm |
| Columns Temperature | Ambient |

| | Time (min) | % A | Flow rate (mL/min) |
|---|---|---|---|
| Gradient Method | 0 | 75 | 0.3 |
| | 20 | 40 | 0.3 |
| | 25 | 5 | 0.3 |
| | 25.1 | 75 | 0.3 |
| | 30 | 75 | 0.3 |

Karl Fischer Titration

Karl Fischer titration for water determination was performed using a Mettler Toledo C20S Coulometric KF Titrator equipped with a current generator cell with a diaphragm, and a double-platinum-pin electrode in a coulometric method. The range of detection of the instrument is 1 ppm to 5% water. Aquastar™ CombiCoulomat fritless reagent was used in both the anode and cathode compartments. Samples of approximately 0.03-0.10 g were dissolved in the anode compartment and titrated until the solution potential dropped below 100 mV. Hydranal 1 wt. % water standard was used for validation prior to sample analysis.

Simultaneous Thermogravimetric Analysis and Differential Scanning Calorimetry (TGA and DSC)

Thermogravimetric analysis and differential scanning calorimetry were performed on the same sample simultaneously using a Mettler Toledo TGA/DSC3+. Protective and purge gas was nitrogen at flowrate 20-30 mL/min and 50-100 mL/min respectively. The desired amount of sample (5-10 mg) was weighed directly in a hermetic aluminum pan with pin-hole and analyzed according to the parameters below:

TABLE 33

| Parameters | |
|---|---|
| Method | Ramp |
| Sample size | 5-10 mg |
| Heating rate | 10.0° C./min |
| Temperature range | 30 to 300° C. |

Commonly Used Abbreviations

Unless otherwise indicated, the following abbreviations are used throughout the specification.

TABLE 34A

| Solvents | |
|---|---|
| Name | Abbreviation |
| 1-propanol | 1-PA |
| 2-propanol | IPA |
| Acetonitrile | ACN |
| Benzyl Alcohol | BA |
| Dichloromethane | DCM |
| Dimethyl Sulfoxide | DMSO |
| Ethanol | EtOH |
| Ethyl Acetate | EtOAc |

TABLE 34A-continued

| Solvents | |
|---|---|
| Name | Abbreviation |
| Isopropyl Acetate | IPAc |
| Methanol | MeOH |
| Methyl Acetate | MeOAc |
| Methyl Butyl Ketone | MBK |
| Methyl Ethyl Ketone | MEK |
| Methyl Isobutyl Ketone | MIBK |
| N,N-Dimethylacetamide | DMAc |
| N,N-Dimethylformamide | DMF |
| N-Methyl Pyrrolidone | NMP |
| tert-Butyl Methyl Ether | MtBE |
| Tetrahydrofuran | THF |
| Trifluoroacetic Acid | TFA |
| Trifluoroethanol | TFE |

TABLE 34B

| Units | |
|---|---|
| Name | Abbreviation |
| Celsius | C. |
| Degrees | ° |
| Equivalents | eq. |
| Gram | g |
| Hour | h |
| Kelvin | K |
| Liters | L |
| Milligrams | mg |
| Milliliters | mL |
| Minute | min |
| Second | sec |
| volume | vol. |
| Watt | W |
| weight | wt |

TABLE 36C

| Instruments | |
|---|---|
| Name | Abbreviation |
| Differential scanning calorimetry | DSC |
| Dynamic Vapor Sorption | DVS |
| High Pressure Liquid Chromatography | HPLC |
| Karl Fisher Titration | KF |
| Nuclear Magnetic Resonance | NMR |
| Powder X-ray Diffraction | XRPD |
| Thermogravimetric Analysis | TGA |

Example 1: Compound Synthesis

1A. Synthesis of Compound (I)

For each of the Forms of Compound (I) (i.e., pralsetinib) described herein in Example 1B and for each of the HCl salts of Compound (I) described herein Example 4, Compound (I) can be prepared as described with respect to compound 130 disclosed in publication WO2017/079140.

1B: Synthesis of Solid Forms of Compound (I)

a) Solid Form A (anhydrous) was crystallized in the methanol/water system.

Compound (I) (2-3 g) was added to the vessel, to which 6.5 vol of MeOH was then added to the vessel. The mixture was stirred, maintaining stirring at 350 rpm (approximately 0.25 W/kg) with retreat curve impeller throughout. The mixture was heated to 60-65° C. over a period of 35 minutes, with dissolution observed at 63-64° C. The solution was then cooled solution to 44-45° C., and 1 volume of water was added over a period of 20 minutes. The solution was seeded with 0.5 wt. % Solid Form A in saturated methanol:water (1:1 vol) as-is. Over 6 hr, 4.5 vol water was added, resulting in a final composition methanol:water (54:46 vol). The solution was held at 45° C. for 6-10 hours and then cooled to 25° C. over 2 hours (−10° C./h) and then held at 25° C. 1-2 hours. The mixtures was then filtered and washed 2×2 volumes methanol:water (1:1 vol) and dried at 50° C. under vacuum overnight to yielded 85-88% w/w anhydrous Solid Form A.

Solid Form A did not convert to Solid Form C on prolonged humidity exposure. Solid Form A converted to Solid Form C during competitive slurry experiments in methanol:water at high ratios of water to methanol and lower temperatures. Solid Form A exhibited low solubility in simulated intestinal fluid and water, but high solubility in simulated gastric fluid (possibly due to conversion to HCl salt).

b) Solid Form C (hydrate) was crystallized in the acetone/water system. Compound (I) is added 10 volumes acetone/water 87:13 v/v and the mixture was heated to 50-55° C. for dissolution. The temperature was adjust temperature to 40° C. and 3 volumes water were added over a period of 30 minutes (rate of 15 mL/hour at 2.5 g scale), resulting in a solvent system that was acetone/water 67:33 v/v. The solution was seeded with 0.5 wt. % Solid Form C, with the seed added as sonicated slurry in water. The slurry was held for 6 hours and then 7 volumes water was added over a period of 8 hours (rate of 2.2 mL/hour at 2.5 g scale), resulting in a solvent system of acetone/water 43:57 v/v. The mixture was cooled to 23° C. and filtered, with a yield of 85-90%.

c) Solid Form C (hydrate) converted to a dehydrate, Solid Form B, upon drying at 50° C.

Example 2: Polymorph Screen of Solid Form C

A polymorph screen was performed starting with a sample of Solid Form C of the free base form of Compound (I), including (a) short term slurries, (b) evaporative crystallization, (c) cooling crystallization, (d) antisolvent crystallization, (e) milling, (f) amorphous slurries, and (g) thermal treatment, as described in the polymorph screen of Example 2 below.

Example 2A: Short Term Slurries

Short term slurries were carried out at two temperature in 15 solvents during the initial screening. Starting solids were Pattern C. Most solids were Pattern C after slurrying. Solids converted to Pattern A in EtOH, IPA, acetone, and acetonitrile at both temperatures.

In EtOAc solids remained as solid form C at room temperature, but converted to solid form A at 50° C. In IPAc solids remained as solid form C at room temperature and partial conversion to solid form A was observed at 50° C. Slurrying in chloroform at room temperature resulted in a thin slurry, which formed a two phase system upon centrifugation. The upper phase was sticky and when filtered yielded a low amount of a solid form characterized by XRPD Pattern H.

TABLE 37

| Solvent | XRPD Pattern | |
|---|---|---|
| | 22-23° C. | 50° C. |
| MeOH | — | — |
| EtOH | A (wet) | — |
| | A (dry) | |
| IPA | A | A |
| acetone | A | A |
| MtBE | C | C |
| EtOAc | C | A |
| IPAc | C | A + C |
| ACN | A | A |
| THF | — | — |
| cyclohexane | C | C |
| heptane | C | C |
| toluene | C | C |
| water:DMSO (95:5 vol) | C | C |
| DCM | C | — |
| chloroform | H (wet) | — |
| | H (dry) | |

Example 2B: Evaporative Crystallization

Supernatant from some slurries was recovered for evaporative crystallization. The solutions were evaporated to dryness at 50° C. in atmospheric pressure and then placed at 50° C. under vacuum for 1.5 hours. Most resulting solids were solid form A; however, evaporation from DCM and chloroform resulted in solids which were amorphous by XRPD. It is possible that these solids were solvates with structures that collapsed to amorphous solids upon drying. The results are summarized in Table 38. Where two experiment numbers are indicated, evaporation was at different concentration.

TABLE 38

| Solvent | Solution concentration (mg/mL solvent) | XRPD Pattern |
|---|---|---|
| MeOH | 99 | A |
| EtOH | 27 | A |
| IPA | 12, 27 | A |
| acetone | 24, 29 | A |
| EtOAc | 31, 14 | A |
| IPAc | 9, 14 | A |
| ACN | 5 | A |
| THF | 94 | A |
| DCM | 37 | amorphous* |
| chloroform | 70 | amorphous* |

*to be confirmed by other analytical methods

Example 2C: Cooling Crystallization

Cooling crystallization was done in a range of solvent systems. Two cooling regimes were used: cooling from 50° C. at 5° C. per hour, and crash cooling from 50° C. to 0° C. In all experiments, solids were completely dissolved before cooling. If solids did not precipitate from solution at either room temperature or 0° C. for slow or fast cooling, the solutions were further cooled to −20° C. In most cases, solids did not precipitate at −20° C. Cooling in IPA resulted in solid form A. Cooling in acetone gave a very thin slurry at −20° C., but solids quickly dissolved upon transferring to room temperature for filtrations. Cooling in THF gave two low crystallinity solids, Solid form N (fast cooling), and solid form I (slow cooling). Pattern I lost crystallinity upon drying. Fast cooling in MeOH:chloroform gave solid form D, which converted to solid form B upon drying. This indicates that solid form B may not necessarily be a dehydrate of solid form C, but an anhydrous solid. The results are summarized in Table 39.

TABLE 39

| Solvent | XRPD Pattern (fast cool) | XRPD Pattern (slow cool) |
|---|---|---|
| IPA | no solids (−20° C.) | A (wet) |
| acetone | no solids (−20° C.) | few solids at −20° C., but dissolved quickly at RT |
| EtOAc | no solids (−20° C.) | very few solids |
| IPAc | no solids (−20° C.) | no solids (−20° C.) |
| MeOH | P (−20° C.) | no solids (−20° C.) |
| EtOH | no solids (−20° C.) | no solids (−20° C.) |
| THF | N (wet) | O + I (wet) |
|  |  | O + I (dry, lost cryst.) |
| DMSO:IPA (2:8 vol) | no solids (−20° C.) | no solids (−20° C.) |
| DMSO:ACN (2:8 vol) | no solids (−20° C.) | no solids (−20° C.) |
| DMAc:IPA (2:8 vol) | no solids (−20° C.) | no solids (−20° C.) |
| DMAc:ACN (2:8 vol) | no solids (−20° C.) | no solids (−20° C.) |
| ACN water (8:2 vol) | no solids (−20° C.) | no solids (−20° C.) |
| MeOH chloroform (1.88:1 vol) | D (wet) B (dry) | D (wet) B (dry) |
| 1,4-dioxane | no solids (−20° C.) | Q (wet) Q (dry, low cryst.) |
| 1-propanol | no solids (−20° C.) | A (wet) A (dry) |

Example 2D: Antisolvent Crystallization

Antisolvent crystallization was done in various solvent systems. First, about 30 mg solid free base of Compound (I) characterized by XRPD Pattern C (solid form C) was dissolved in solvent. Then antisolvent crystallization was done either using the direct or reverse addition method. For direct addition, antisolvent was added dropwise to the solution until a slurry was formed. For reverse addition, solution was added all at once to the antisolvent. The volume of antisolvent used was 4 times the volume of solvent required to dissolve the solid. For example, if 0.15 mL solvent was required to dissolve the solid then the solution was added at once to 0.30 mL antisolvent. Once solids were formed, the slurries were filtered and solids were recovered for XRPD analysis. XRPD results of reverse antisolvent experiments are summarized in Table 40A.

TABLE 40A

| Solvent | water | cyclohexane | heptane |
|---|---|---|---|
| DMSO | B + small extra peaks (wet) B + small extra peaks (dry) | — | — |
| DMAc | C (wet) | phase sep. | — |
| THF | C (wet) | J (wet) am. (dry) | am. (wet) |
| MeOH | C (wet) | — | — |

XRPD results of direct antisolvent experiments are summarized in Table 40B.

TABLE 40B

| Solvent/ Antisolvent | water | cyclohexane | heptane |
|---|---|---|---|
| DMSO | K (wet) K + B (dry) B + small extra peaks (on bench ~5 d) | — | — |
| DMAc | C + some B (wet) C + some B (wet) | phase sep. | — |
| THF | oiling | J (wet) J (lost crystallinity, dry) | I (wet) I (dry) |
| MeOH | L (wet) L (dry) | — | — |

Pattern O shares peaks with Pattern B, but differences are observed in the XRPD patterns at high angle and Pattern O has extra peaks when compared to Pattern B.

Pattern J was observed in THF/cyclohexane systems and either lost crystallinity or became amorphous on drying (i.e. the crystalline structure begins to collapse as THF evaporates).

Example 2E: Milling

Solvent milling was done using a small ball mill with ¼" stainless steel ball as milling media. About 50 mg solid free base of Compound (I) characterized by XRPD Pattern C was weighed into vessel and one volume solvent was added. The milling was carried out in 3×30 second increments, scraping solids off vessel walls to minimize caking between millings. Dry milling resulted in a lower crystallinity solid form characterized by XRPD Pattern C. Conversion to solid form A was observed after milling with MeOH and EtOH, which is consistent with what was observed in slurry experiments (solid form C converted to solid form A in EtOH). Some conversion to solid form A was observed after milling with THF and the solid also lost crystallinity. Solids remained as solid form C with trace solids converting to solid form A, but lost crystallinity upon milling with EtOAc. The results are summarized in Table 41.

TABLE 41

| Solvent | XRPD Pattern (initial) | XRPD Pattern |
|---|---|---|
| none | C | C (low cryst) |
| MeOH | C | A |
| EtOH | C | A + trace C |
| THF | C | C + some A (low cryst) |
| EtOAc | C | C + trace A (low cryst) |

Example 2F: Amorphous Slurries

Amorphous solids were prepared by forming a very thin slurry in chloroform followed by evaporation of the slurry. The resulting solid was amorphous by XRPD. Amorphous solid from experiments (evaporation from chloroform slurry) were slurried in 250 μL solvent for 1 hour, filtered and XRPD was performed. Gel formation was observed in the case of IPA, so the mixture was centrifuged and XRPD was performed on the gel. A low crystallinity material with XRPD Pattern H was observed when slurrying in MtBE, IPAc, ACN, acetone, and IPA. Solids remained amorphous is cyclohexane, and solids remained in solution in IPAc. The results are summarized in Table 42.

TABLE 42

| Solid (mg) | Solvent | Pattern |
|---|---|---|
| 8.8 | MtBE | H |
| 8.3 | IPAc | no solids |
| 10.5 | ACN | H |
| 9.5 | Acetone | H |
| 11.4 | Cyclohexane | amorphous |
| 11.1 | IPA | H |

Example 2G: Thermal Treatment

Select solids were used for thermal treatment in DSC. Solids were heated to specified temperature and then cooled back to room temperature for analysis by XRPD. The results are summarized in Table 30. A solid form C sample converted to solid form B upon heating to 150° C. A solid form A sample did not convert to material with XRPD Pattern H after a hold at the melting point. Solid form B converted to solid form A when heating to 190° C. Solid form F converted to solid form B when heating to 140° C.

TABLE 43

| Starting pattern | Heating regime | Resulting Pattern |
|---|---|---|
| C (1-1) | Heat to 150° C. then cool | B |
| A (2-3) | up to 205° C., hold 10 min then cool | A |
| B (17-2) | up to 190° C. then cool | A |
| F (17-4) | up to 140° C. then cool | B |

Example 3: Salt Screen

Salt screening was carried out on Compound (I) using 15 counter-ions and three solvents, while the co-crystal screening employed 5 potential co-formers. Crystalline patterns were formed with most counter-ions. Fumarate and sulfate changed on drying. Citrate, hydrochloride (5-A), and gentisate deliquesced on exposure to >95% relative humidity. Pyruvate, saccharine salt, and sulfates generated from the 1.1 eq. experiments all changed form after exposure to >95% relative humidity. X-ray powder diffraction patterns of many salts were stable to both drying and humidity exposure (maleate 8-A, oxalate 9-A, glutarate 11-A, succinate 15-A, and phosphate 14-A). Low crystalline patterns were obtained from screening with pyruvic acid, sulfuric acid, citric acid, fumaric acid, and saccharine while moderate to high crystallinity patterns were obtained from hydrochloric acid, maleic acid, oxalic acid, salicylic acid, glutaric acid, sulfuric acid, succinic acid, tartaric acid, and phosphoric acid. The salts all exhibited improved solubility over the freebase and select results are summarized in Table 44.

TABLE 44

| Salt | Endotherm Onset (° C.) | Residual Solvents by $^1$H-NMR (wt. %) | DVS Mass Change (wt. %) | Stability 40° C./75% RH | 7-day slurry |
|---|---|---|---|---|---|
| freebase (Pattern FB-A) | 49.4 162.7 (exo) 205.3 | N/A | 10.2 | Stable | n/a |
| freebase (Pattern FB-C) | 125.7 146.1 208.2 | N/A | 1.29-1.44 | Stable | n/a |
| Phosphate 14-A | 113.3 198.4 237.5 | 0.32 wt. % EtOH | 0.94 | Stable | Stable |
| Glutarate 11-A | 177.8 | 0.11 wt. % EtOH | 0.48 | Stable | 11-A → 11-B (EtOH, EtOAc) 11-A → 11-B + C (EtOH: water) |
| Succinate 15-A | 126.8 150.9 | 0.74 wt % EtOH and 0.38 wt. 9% MeOH | 3.40 | 15-A → 15-A + B | 15-A → 15-C in EtOH: water |
| HCl 5-B | 88.7 244.2 | 4.04 wt % EtOAc | N/A | Stable | Stable |

Compound (I) was evaluated during a salt screening using five counter-ions which given in Table 32. EtOH, EtOAc, and IPA:water (9:1 vol) where the solvents selected for salt screening and will be used during this project as well. A summary of the data generated during this project is presented in Table 45 and Table 46. Additional Compound (I) counter ions listed in Table 45 were also evaluated.

TABLE 45

| ID | Counter Ion | pKa | Equivalents used for screening |
|---|---|---|---|
| 1 | Benzenesulfonic Acid | 0.7 | 1.1 |
| 2 | Methanesulfonic Acid | −1.2 | 1.1 |
| 3 | Hydrochloric Acid | −6 | 1.1 |
| 4 | Hydrobromic Acid | −9 | 1.1 |
|  | Nitric Acid | −1.3 | 1.1 |

TABLE 46

| Counter Ion | XRPD Pattern → Solvent ↓ | Wet | Dry | Humid | Comments |
|---|---|---|---|---|---|
| BSA | EtOH | — | — | — | Clear solution |
| BSA | EtOAc | — | — | — | Clear, some gum on walls |
| BSA | IPA:water (9:1 vol) | 18-A | 18-A | 18-B, gummed | Opalescent, gel-like; centrifuged to obtain solids |
| MSA | EtOH | 2-A + 2-B | 2-B | — | White slurry |
| MSA | EtOAc | 2-B | 2-B | 2-D | White slurry |
| MSA | IPA:water (9:1 vol) | 2-C (small sample) | 2-B + extra peaks | — | Thin slurry; centrifuged to obtain |
| HCl | EtOH | 5-B | 5-C | — | White slurry |
| HCl | EtOAc | 5-B + 5-C | 5-C + broad extra peaks | 5-C + trace 5-B | White slurry, somewhat gel-like |

TABLE 46-continued

| Counter Ion | XRPD Pattern → Solvent ↓ | Wet | Dry | Humid | Comments |
|---|---|---|---|---|---|
| HCl | IPA:water (9:1 vol) | 5-B | 5-C | 5-C + trace 5-B | White slurry |
| HBr | EtOH | 19-A | 19-A (slight peak shifts) | 19-A (slight peak shifts) | White slurry |
| HBr | EtOAc | 19-B (low cryst.) | 19-A (low cryst.) | — | Off-white gel-like slurry |
| HBr | IPA:water (9:1 vol) | 19-C (some shared peaks w/A) | 19-C + 19-D | 19-C + 19-D | White slurry |
| HNO$_3$ | EtOH | 20-A | 20-A | 20-A | White slurry |
| HNO$_3$ | EtOAc | 20-A | 20-A | — | White slurry |
| HNO$_3$ | IPA:water (9:1 vol) | 20-A | 20-A | — | White slurry |
| none | EtOH | FB-A | FB-A | — | White slurry |
| none | EtOAc | FB-A | — | — | White slurry |
| none | IPA:water (9:1 vol) | — | — | — | Insufficient solids to filter |

TABLE 47

| Counter Ion | Solvent | XRPD (Dry, used for analysis) | Crystallinity | DSC Onsets (° C.) | TGA Mass Loss (wt. %)[1] | Water Solubility (mg/mL) | Stability |
|---|---|---|---|---|---|---|---|
| BSA | IPA:water | 18-A | low | — | — | — | — |
| MSA | EtOH | 2-B | moderate-high | — | — | — | physically stable, 99.73% a/a (HPLC) |
| MSA | EtOAc | 2-B | | 167.50 | 2.96 | >5.47 | — |
| MSA | IPA:water | 2-B + extra peaks | | — | — | — | — |
| HCl | EtOH, IPA:water | 5-C | moderate-high | 86.78, 224.11, 241.70 | 3.41, 2.00 | 2.18 | physically stable, 99.71% a/a (HPLC) |
| HCl | EtOAc | 5-C + broad extra peaks | | — | — | — | — |
| HBr | EtOH | 19-A (slight peak shifts) | moderate | 83.08, 207.28, 241.33 | 2.02, 7.65 | 1.88 | converted to 4-C/D, 99.44% a/a (HPLC) |
| HBr | EtOAc | 19-A (low cryst.) | low | — | — | — | — |
| HBr | IPA:water (9:1 vol) | 19-C + 19-D | moderate-high | 88.84, 194.63, 210.02, 230.60 | 3.11, 8.55 | 1.47 | — |
| HNO$_3$ | EtOH, EtOAc, IPA:water | 20-A | high | 224.20, 228.54 (exo) | 5.82 | 1.63 | physically stable, 99.66% a/a (HPLC) |

TABLE 48

| ID | Counter Ion | pKa (lowest) | Equivalents used for screening | Solvent for Stock Solution |
|---|---|---|---|---|
| 1 | Pyruvic Acid | 2.39 | 1.1 | EtOH |
| 2 | Benzoic Acid | 4.19 | 1.1 | EtOH |
| 3 | Citric Acid | 3.13 | 1.1 | EtOH |
| 4 | Fumaric Acid | 3.03 | 1.1 | EtOH |
| 5 | Hydrochloric Acid | −6 | 2.2 | EtOH |
| 6 | Saccharin | 1.31 | 1.1 | EtOH |
| 7 | Gentisic Acid | 2.93 | 1.1 | EtOH |
| 8 | Maleic Acid | 1.92 | 1.1 | EtOH |
| 9 | Oxalic Acid | 1.27 | 1.1 | EtOAc |
| 10 | Salisylic Acid | 2.97 | 1.1 | EtOH |
| 11 | Glutaric Acid | 2.93 | 1.1 | EtOH |
| 12 | Sulfuric Acid | −3.0 | 0.55, 1.1 | MeOH |
| 13 | Tartaric Acid | 3.02 | 1.1 | EtOH |
| 14 | Phosphoric Acid | 1.96 | 1.1 | EtOH |
| 15 | Succinic Acid | 4.21 | 1.1 | EtOH |

Example 3A: Salt Screening

A stock solution of the freebase was prepared in MeCOH (60.09 mg/mL). Stock solutions of counter-ion were prepared in EtOH, MeOH, or EtOAc, depending on solubility. Salt formation was carried out at room temperature in 2 mL vials. 30 mg Compound (I) (499.3 µL stock solution) and 1.1 equivalents of counter-ion were added to each vial, with the exception of HCl which was 2.2 eq. and sulfuric acid which was both 0.55 eq. and 1.1 eq. The solvent was allowed to evaporate at room temperature over the weekend and then placed at 50° C. under vacuum for 3 hours to remove any remaining solvent.

Approximately 25 volumes solvent (0.6 mL) was added to each vial for screening. The three solvents selected were EtOH, EtOAc, and IPA:water (9:1 vol). Once solvents were added, the mixtures (or solutions) were stirred at 45° C. for 1.5 hours and then cooled to room temperature and allowed to stir overnight before collection of any generated solids.

XRPD analysis was done in three stages. XRPD of the wet cake was done for all samples. Unique solids were then left on XRPD plates and dried under vacuum at 50° C. XRPD of unique dry solids was then done. Solids were then exposed to 97% relative humidity for at least one day and XRPD on resulting solids was done. The humid environment was generated by placing a beaker of saturated potassium sulfate in water in a sealed container. All XRPD patterns were compared to counter ion XRPD patterns and known free base patterns.

Unique salt XRPD patterns are identified by their ID number and then addition patterns are designated alphabetically. For example, the third unique XRPD pattern of citrate would be designated 3-C.

Where solids were not of sufficient quantity to isolate, the solvent was evaporated at room temperature, the material dried at 50° C. under active vacuum for 3 hours, and then reslurried at room temperature in either MtBE or IPAc overnight after heating to 45° C. for 30 minutes.

During the screening portion of this project, Pattern FB-A (anhydrous) (i.e., solid form A of the free base of pralsetinib) was isolated from the slurry of Compound (I) freebase in EtOH while Pattern FB-C (hydrate) (i.e., the solid form C of the free base of pralsetinib) was collected from the slurry with EtOAc. A mixture of Patterns FB-A and FB-C was collected from the IPA:water (9:1 vol) slurry.

The pyruvates were low crystalline and stable to drying, but solid form 1-B with XRPD Pattern 1-B converted to Pattern 1-C and there was a peak shift observed in solid form 1-A having XRPD Pattern 1-A upon humidification. The nearly amorphous pattern gained one peak at 26.54 upon exposure to humidity. Solids formed with pyruvic acid were soluble in IPA:water (9:1 vol) and isolated from MtBE instead. The pyruvate, Pattern 1-B, had a single endotherm with an onset of 95.43° C. and an associated mass loss of 3.2 wt. % followed by a mass loss of 9.9 wt. % up until the end of the run at 300° C.

Benzoic acid was not found to form a salt with compound (I) and only peaks associated with freebase Pattern FB-C were observed. Solids were isolated from MtBE and IPAc.

The citrates were stable to drying with a low crystalline form collected from EtOH and IPA:water (9:1 vol) with higher crystallinity observed from the EtOH system. An amorphous material was isolated from EtOAc. All solids were found to deliquesce upon exposure to humidity. The low crystallinity citrate salt, Pattern 3-A, was observed to have three broad endotherms with onsets of 124.4° C., 153.7° C., and 195.9° C. with associated mass losses of 3.8 wt. %, 9.8 wt. %, and 4.6 wt. % respectively.

Fumaric acid salts, Pattern 4-A and Pattern 4-B converted to Pattern 4-C and 4-D, respectively, on drying and were stable upon humidification. Pattern 4-D was analyzed using TGA/DSC and was found to have three broad endotherms with onsets of 111.8° C., 167.9° C., and 203.2° C. The first endotherm has a mass loss of 3.5 wt. %, while the second endotherm exhibited a much smaller mass loss of 0.3 wt. %. The last observed endotherm had a mass loss of 6.2 wt. %. The lower crystallinity pattern, Pattern 4-C was also analyzed by TGA/DSC and found to have three broad endothermic events as well. The first broad endotherm was observed with an onset of 101.0° C. and an associated mass loss of 2.3 wt. %. The second endotherm had an onset of 181.7° C. followed by an endotherm at 205° C. which had an associated mass loss of 8.5 wt. %. Both Pattern 4-D and Pattern 4-C exhibited evidence of hydrate formation in the DSC/TGA as well as in the 1H-NMR spectra.

The stoichiometry of Pattern 4-D and Pattern 4-C was determined to be 0.96:1 and 0.6:1 (CI:API), respectively, by 1H-NMR. 0.26 wt. % IPA was present in the 1H-NMR of Pattern 4-D and EtOH was BDL in the 1H-NMR of Pattern 4-C.

The HCl salt (2.2 eq.) formed thick viscous slurries in all three solvent systems. Materials collected from EtOAc and IPA:water (9:1 vol) were identified as Pattern 5-B and dried to Pattern 5-C and were stable upon humidification. Pattern 5-A was isolated from the slurry of the HCl salt in EtOH and was stable to drying, but deliquesced at elevated humidity.

Salts formed with saccharin were low crystallinity or amorphous and stable to drying, but the low crystalline pattern, Pattern 6-A, became amorphous with one peak following exposure to elevated humidity. The amorphous form deliquesced on exposure to elevated humidity. Solids formed with saccharin were soluble in EtOH and IPA:water (9:1 vol) and isolated from MtBE and IPAc instead.

Gentisic acid formed salts that were either amorphous or low crystalline. In both cases the material deliquesced upon exposure to elevated humidity and the amorphous pattern with broad peaks was observed to deliquesce under ambient storage conditions in the lab (relative humidity of aprox. 56%). The amorphous form gained one low crystalline, high angle peak upon exposure to humidity. Solids formed with gentisic acid were soluble in EtOH and IPA:water (9:1 vol) and were isolated from MtBE and IPAc instead.

Maleic acid and oxalic acid both formed a crystalline materials with BLU-667 freebase, in all three solvents, and were designated Pattern 8-A and 9-A respectively. Both patterns were stable to drying and humidification with white slurries forming in EtOH and EtOAc. However, in IPA: water (9:1 vol) both slurries froze after stirring overnight.

Maleic acid formed one pattern, Pattern 8-A, which exhibited a gradual mass loss of 1.1 wt. % up until the onset of the first endotherm at 188.5° C. which had an associated mass loss of 2.3 wt. %. A further mass loss of 6.5 wt. % was observed with the third endothermic event which had an onset of 196.1° C. [0320]1H-NMR revealed the stoichiometry of the Pattern 8-A to be 0.91:1 (CI:API) with 0.13 wt. % EtOH as a residual solvent.

Salts formed with salicylic acid were amorphous when slurried in EtOH and were a moderately crystalline Pattern 10-A in EtOAc. The material isolated from IPA:water (9:1 vol) was identified as Pattern 9-A with extra peaks that did not correspond to the freeform API or salicylic acid and designated Pattern 10-A+B. The amorphous form converted to Pattern 10-C under humidification and Patterns 10-A+B and 10-A were both stable to drying and humidification. Solids formed with salicylic acid were soluble in EtOH and IPA:water (9:1 vol) and isolated from MtBE and IPAc instead. In MtBE, the solids formed a gummy material while in EtOAc and IPAc the solids froze after stirring overnight.

Glutaric acid formed a highly crystalline salt designated Pattern 11-A which was stable to drying and humidification. Solids formed with glutaric acid dissolved in IPA:water (9:1 vol) and were collected from MtBE instead. All solids were observed to be thick slurries before filtration.

Solids generated from 0.55 eq. sulfuric acid in EtOH and EtOAc were very low crystalline with evidence of Pattern 12-A which was isolated as a highly crystalline solid from IPA:water (9:1 vol). 1.1 eq. sulfuric acid and the freebase formed more highly crystalline material, but were very polymorphic. Only Pattern 12-A was stable to both drying and humidification while Pattern 12-B and Pattern 12-C were stable to drying. Pattern 12-C was very similar to Pattern 12-E which was generated from the drying of Pattern 12-D. All of the crystalline solids formed with 1.1 eq. sulfuric acid changed form to a low crystalline pattern, Pattern 12-F, on humidification. Solids formed with 0.55 eq. sulfuric acid were soluble in EtOH and isolated from MtBE. Slurries varied in consistency from white and flowable (0.55 eq. Sulfuric acid in MtBE), to thick (0.55 eq. in EtOAc and IPA:water (9:1 vol) as well as 1.1 eq in EtOAc), to frozen (1.1 eq. in EtOH) or thick and gel like (1.1 eq. in IPA:water (9:1 vol)).

In order to complete characterization of pattern 12-A and 12-B, additional solids were generated by direct weighing 30 mg of freebase into a 2 mL vial and slurrying in 1.0 mL of solvent. Ethanol, for the generation of Pattern 12-B, and IPA:water (9:1 vol.) for Pattern 12-A. Sulfuric acid, as a solution in the appropriate solvent system, was added dropwise. Salt formation was incomplete after stirring overnight at room temperature, therefore the slurries were heated to 50° C. for half an hour before cooling and allowing to stir at room temperature for an additional 4 hours. Solids were collected and dried under active vacuum at 50° C. for a minimum of 6 hours. Generating additional 12-A was successful, however, a new pattern of sulfate (1.1 eq. sulfuric acid) was generated with some peaks similar to Pattern 12-B. The new pattern was designated Pattern 12-G+2 peaks. This pattern converted to Pattern 12-H on drying and reverted to Pattern 12-G on humidification.

Tartaric acid formed high to moderately crystalline solids with pralsetinib freebase with a different polymorph generated from each solvent. Solids were all stable to drying and humidification. The slurry in IPA:water (9:1 vol) became thick and gel-like after initially dissolving and the solids in EtOH were also very thick while solids slurried in EtOAc were more flowable.

Phosphoric acid and Compound (I) freebase generated one highly crystalline pattern, Pattern 14-A which was stable to drying and humidification. Slurries in all three solvents were thick.

Solids formed with succinic acid where all designated as Pattern 15-A, but were only highly crystalline as the wet cake from EtOH. Drying lowered the crystallinity and solids collected from EtOAc and IPA:water (9:1 vol) were not generated in sufficient quantity to produce a crystalline XRPD pattern. Solids were white slurries in EtOH and EtOAc and thin in IPA:water (9:1 vol.).

A summary of the XRPD results from the screening is given in FIGS. 26A-26C. In the summary table of XRPD results from screening (wet, dry, and after humidity exposure), a solvent in brackets indicates that the original solution was evaporated to dryness and a new solvent was added to slurry. A hyphen indicates the analysis was not done.

Example 38: Co-Milling

About 30 mg of Compound (I) freebase and 1.05 eq. of co-former were direct weighed into the milling capsule and manually mixed before the addition of 1 volume of solvent (MtBE, MeOAc, or EtOH). Each system was milled once for 30 seconds before solids were collected. Samples of the wet material were taken for XRPD of the 'wet' material before drying under active vacuum at 50° C. for 2 hours. Unique patterns were further exposed to 97% R.H. for 24 hours.

From the co-milling experiments, only urea and the freebase produced a crystalline solid that was identified as containing a new pattern, Pattern 16-B. However, this material also contained freebase Pattern FB-C. The other potential co-formers either produced material with powder patterns containing crystalline FB-C or a combination of crystalline FB-C and co-former.

The solids containing 16-B and FB-C dried to produce a material with crystalline urea present. The peak associated with urea vanished upon humidification.

Table 49 is a summary of co-crystal XRPD results from co-milling screening.

TABLE 49

| Co-Former | Solvent System | Wet | Dry | Humidity | Comments |
| --- | --- | --- | --- | --- | --- |
| 4-Aminobenzoic Acid | MtBE, MeOAc | FB-C + 4-Aminobenzoic Acid | — | — | MtBE-white powder MeOAc-gel |
| | EtOH | FB-C | | | EtOH-gel |
| 4-Hydroxybenzoic Acid | MtBE, MeOAc, EtOH | FB-C | — | — | MtBE-wet paste/gum MeOAc-gel/gum EtOH-gum |
| Benzoic Acid | MtBE, MeOAC, EtOH | FB-C | — | — | MtBE-gel/gum MeOAc-oily gel EtOH-gel |
| Vanillic Acid | MtBE, MeOAc | FB-C + vanillic acid | — | — | MtBE-pale yellow powder MeOAc-pale yellow powder |
| | EtOH | FB-C | | | EtOH-oily gum |
| Quercetin Dihydrate | MtBE MeOAc EtOH | FB-C + quercetin dihydrate | | | MtBE-yellow powder MeOAc-yellow paste, dried quickly to a powder EtOH-yellow paste, dried quickly to a powder |
| Gentisic Acid | MtBE, MeOAc, EtOH | FB-C | — | — | MtBE-paste MeOAc-paste/gum EtOH-oily gum |

TABLE 49-continued

| | | | | | |
|---|---|---|---|---|---|
| Saccharin | MtBE | FB-C + saccharin | — | — | MtBE-powder |
| | MeOAc | Am. + trace FB-C | | | MeOAc-gum |
| | EtOH | Am. + 1 peak | | | EtOH-gum |
| Urea | MtBE, MeOAC | FB-C + urea | — | | MtBE-powder |
| | | | | | MeOAc-dry paste/powder |
| | EtOH | 16-B + FB-C | 16-B + FB-C + urea | 16-B + FB-C | EtOH-paste |

Example 3C: Co-Melting

About 30 mg of pralsetinib freebase and 1.05 eq. of co-former were direct weighed into 2 mL vials and well mixed until a visually homogeneous mixture was achieved. The resulting powder was packed into a 100 μL DSC pan and heated at a rate of 10° C./min to 10° C. above the melting temperature of the lowest melting component. The experiment was isothermally held for 5 min before cooling to room temperature at a rate of 10° C./min. Samples were then taken for XRPD.

Only the co-melt of urea and freebase produced a crystalline material and that was determined to be Pattern FB+A with urea.

Table 50 is a summary of co-crystal XRPD results from co-melting screening.

TABLE 50

| Co-Former | Dry | Comments |
|---|---|---|
| Urea | FB-A + urea | off-white powder |
| Saccharin | Am. | vibrant neon green glass |
| 4-Hydroxybenzoic Acid | Am. | pale yellow glass |
| Vanillic Acid | Am. | off-white glass |
| Quercetin Dihydrate | Am. | golden yellow material with darker flecks |
| Benzoic Acid | Am. | white glass-like material |
| Gentisic Acid | Am. | pale yellow glass |

Coupled TGA/DSC or DSC was carried out on the crystalline solids generated during the salt screening, sample dependent. In cases were enough material was generated, TGA/DSC was the preferred method of characterization; however, a number of experiments resulted in a low quantity of recovered solids. In these cases, standalone DSC was utilized for characterization. The data is summarized in the tables of FIG. 26A and FIG. 26B.

Solution 1H-NMR in DMSO-d6 was carried out on crystalline solids as material allowed and characterized to determine the stoichiometry of the counter-ion or co-former as well as to quantify the residual solvents present.

Example 4: Compound (I) HCl Salt Solid Forms a) Pralsetinib HCl Salt Form 5-a A solution of Compound (I) was prepared in MeOH (60 mg/mL). 2.2 equivalents of HCl was added to 0.6 mL of EtOH. 0.5 mL of the MeOH/Compound (I) solution was added to the EtOH/HCl solution. The mixture was stirred at 45° C. for 1.5h, and then cooled to room temperature and stirred overnight. The mixture was then filtered and an XRPD was taken of the wet solid (FIG. 27A). This form was identified as Form 5-A of the HCl salt. Form 5-A was stable to drying but deliquesced at elevated humidity.

b) Pralsetinib HCl Salt Form 5-B and Pralsetinib HCl Salt Form 5-C

A solution of Compound (I) was prepared in MeOH (60 mg/mL). 2.2 equivalents of HCl was added to 0.6 mL (25 volumes) of IPA/water (9:1). 0.5 mL of the MeOH/Compound (I) solution was added to the IPA/HCl solution. The mixture was stirred at 45° C. for 1.5h, and then cooled to room temperature and stirred overnight. The mixture was then filtered and an XRPD was taken of the wet solid. This wet form was identified as Form 5-B of the HCl salt. This material was then dried at 50° C. under vacuum for 3 hours to remove any remaining solvent. Once dried, Form 5-B converted to Form 5-C that was stable to humidification and stability.

The HCl salt exhibited high purity (99.89% by HPLC). Pattern 5-B was stable slurrying 7 days in EtOH, EtOAc, and EtOH:water (95:5 vol) by XRPD and HPLC. The HCl salt was also stable on exposure to 75% RH at 40° C. for 7 days.

Example 5: Compound (I) Phosphate Salt Solid Forms

Compound (I) freebase, 0.5255 g, was slurried in 7.5 Vol of EtOH at 35° C. 1.1 eq. phosphoric acid, as a 0.033 g/mL solution in EtOH, was added dropwise at 15 minute increments over 1 hour. A spatula tip of solid form 14-A was added as seed following the initial addition of acid solution. The initial API slurry was thin and cloudy, but began to thicken following the first addition of phosphoric acid and seed. After the second addition of phosphoric acid solution the slurry was very thick, but became more flowable with each acid addition. The slurry was heated to 50° C. to stir for 1 hour and remained flowable. The slurry was cooled to room temperature and stirred overnight.

XRPD of the wet cake confirmed the solid crystallized as solid form 14-A before drying. Microscopy revealed the morphology to be fine particles.

Solids were filtered and the wet cake was placed under static vacuum at 50° C. to dry overnight.

Example 6: Compound (I) Glutarate Salt Solid Forms

Compound (I) freebase, 0.5092 g was slurried in 7.5 Vol of EtOH at 35° C. 1.1 eq. glutaric acid, as a 0.083 g/mL solution in EtOH, was added dropwise at 15 minute increments over 1 hour. A spatula tip of solid form 11-A was added as seed following the initial addition of acid solution. The initial API slurry was thin and cloudy, but began to thicken following the first addition of glutaric acid and seed. After the second addition of glutaric acid solution the slurry was very thick and almost immobile. 5 vol. of EtOH was added to mobilize the slurry. The slurry continued to thicken throughout the subsequent additions of glutaric acid. The slurry was heated to 50° C. to stir for 1 hour and became flowable. The slurry was subsequently cooled to room temperature and stirred overnight upon which it formed a flowable slurry with large particles. XRPD day revealed only partial salt formation.

An additional 0.25 eq. of glutaric acid was added to the slurry and the solvent evaporated to dryness. The solids were then dissolved in a minimum of MeOH at 50° C. The solution was removed from the heat and seeded with solid form 11-A. A thin slurry was formed and MeOH was evaporated under a gentle flow of nitrogen gas at room temperature to condense to solvent until a thick slurry was formed.

XRPD confirmed the solids as glutarate solid form 11-A and the solids were filtered and dried under static vacuum at 50° C. The quantity of collected solids was low, so an additional scale up was conducted to generate enough material for analysis. A sample of the slurry taken for microscopy revealed the morphology of the solids to be needles.

Example 7: Compound (I) Succinate Salt Solid Forms

Compound (I) freebase, 0.5020 g was dissolved in 10 vol of MecOH at 50° C. 1.1 eq. succinic acid, as a 0.028 g/mL solution in EtOH, was added dropwise at 15 minute increments over 1 hour. A spatula tip of solid form 15-A was added as seed following the initial addition of acid solution and again after the second addition of acid. The solution became cloudy on addition of seed and began to thicken slightly over the course of acid addition, but remained thin after the final addition of glutaric acid. MeOH was evaporated at 35° C. with a gentle flow of nitrogen gas and the solids were dried under active vacuum at 50° C. The solids were then slurried in EtOH at 45° C. for 20 minutes. The slurry was then cooled to room temperature and 2.5 vol additional EtOH added to loosen the very thick immobile slurry so that it could be filtered. The solids were collected by vacuum filtration and dried under a combination of static and active vacuum overnight. Microscopy of the slurry revealed the morphology to be wispy needles that tended to form some almond shaped aggregates, and solid form 15-A was confirmed by XRPD analysis.

Additional Embodiments

It is to be understood that while the invention has been described in conjunction with the detailed description thereof, the foregoing description is intended to illustrate and not limit the scope of the invention, which is defined by the scope of the appended claims. Other aspects, advantages and modifications are within the scope of the claims. Those skilled in the art will recognize, or be able to ascertain using no more than routine experimentation, many equivalents to the specific embodiments of the invention described herein. Such equivalents are intended to be encompassed by the following claims. All of the above-cited references and publications are hereby incorporated by reference.

We claim:

1. A crystalline Solid Form A of the free base of (cis)-N-((S)-1-(6-(4-fluoro-1H-pyrazol-1-yl)pyridin-3-yl)ethyl)-1-methoxy-4-(4 methyl-6-(5-methyl-1H-pyrazol-3-ylamino) pyrimidin-2-yl)cyclohexanecarboxamide.

2. The solid form of claim 1 characterized by an X-ray powder diffraction (XRPD) pattern having diffractions at angles (2 theta±0.2) of 5.0°, 9.7°, 12.7°, 13.6°, and 16.1°.

3. The solid form of claim 2, characterized by an X-ray Powder Diffraction (XRPD) pattern having additional diffractions at angles (2 theta±0.2) of 6.8, 19.2, 19.5, and 23.5.

4. The solid form of claim 1 characterized by an X-ray Powder Diffraction (XRPD) pattern having peaks at the same or substantially the same angles (2 theta±0.2) and corresponding d-spacing (A±0.2) of:

| 2-theta (deg) | d-Spacing (ang.) | Relative Intensity |
|---|---|---|
| 4.95 | 17.82 | 62 |
| 6.80 | 12.98 | 16 |
| 9.74 | 9.07 | 29 |
| 12.71 | 6.96 | 48 |
| 13.62 | 6.50 | 100 |
| 14.82 | 5.97 | 9 |
| 16.06 | 5.52 | 39 |
| 17.18 | 5.16 | 5 |
| 17.83 | 4.97 | 8 |
| 19.22 | 4.62 | 20 |
| 19.52 | 4.54 | 35 |
| 20.50 | 4.33 | 5 |
| 21.56 | 4.12 | 6 |
| 23.09 | 3.85 | 14 |
| 23.51 | 3.78 | 16 |
| 24.77 | 3.59 | 5 |
| 25.59 | 3.48 | 10 |
| 25.97 | 3.43 | 9 |
| 27.86 | 3.20 | 7 |
| 29.41 | 3.03 | 7. |

5. The solid form of claim 1, further characterized by one or more of:
   a differential scanning calorimetry (DSC) thermogram with an endothermic event observed at about 205° C.; and
   a reversible mass change of about 10% by DVS between 2-95% relative humidity.

6. A crystalline Solid Form B of the free base of (cis)-N-((S)-1-(6-(4-fluoro-1H-pyrazol-1-yl)pyridin-3-yl)ethyl)-1-methoxy-4-(4 methyl-6-(5-methyl-1H-pyrazol-3-ylamino) pyrimidin-2-yl)cyclohexanecarboxamide.

7. The solid form of claim 6, characterized by an X-ray powder diffraction (XRPD) pattern having diffractions at angles (2 theta±0.2) of 5.9°, 8.8°, 11.6°, 14.7°, and 19.5°.

8. The solid form of claim 7, characterized by an X-ray Powder Diffraction (XRPD) pattern having additional diffractions at angles (2 theta±0.2) of 17.0, 17.6 and 22.2.

9. The solid form of claim 6, characterized by an X-ray Powder Diffraction (XRPD) pattern having peaks at the same or substantially the same angles (2 theta±0.2) and corresponding d-spacing (A±0.2) of:

| 2-theta (deg) | d-Spacing (ang.) | Relative Intensity |
|---|---|---|
| 5.89 | 14.99 | 100 |
| 8.81 | 10.03 | 28 |
| 11.58 | 7.64 | 33 |
| 14.73 | 6.01 | 23 |
| 17.01 | 5.21 | 11 |
| 17.63 | 5.03 | 8 |
| 19.45 | 4.56 | 13 |
| 22.21 | 4.00 | 5. |

10. The solid form of claim 6, further characterized by one or more of:
    a differential scanning calorimetry (DSC) thermogram with an endothermic event observed at about 205° C.; and
    a reversible mass change of about 10% by DVS between 2-95% relative humidity.

11. A crystalline Solid Form C of the free base of (cis)-N-((S)-1-(6-(4-fluoro-1H-pyrazol-1-yl)pyridin-3-yl)ethyl)-1-methoxy-4-(4 methyl-6-(5-methyl-1H-pyrazol-3-ylamino)pyrimidin-2-yl)cyclohexanecarboxamide.

12. A Solid Form 5-A of crystalline hydrochloride salt of pralsetinib.

13. A Solid Form 5-B of crystalline hydrochloride salt of pralsetinib.

14. The solid form of claim 13 characterized by one or more of the following:
- a XRPD pattern comprising characteristic diffraction peaks at 2-theta angles at approximately (±0.2 degrees) 6.1°, 8.9, 9.5°, 15.0°, 16.6°; and
- A TGA/DSC thermogram characterized by an initial mass loss of 3.4 wt. % associated with a broad endotherm with an onset of 88.7° C. (±0.2 degrees) and a second mass loss event of 6.7 wt. % was observed from the end of the first broad endotherm to the end of the melt which had an onset of 244.2° C. (±0.2 degrees.

15. A Solid Form 5-C of crystalline hydrochloride salt of pralsetinib.

16. The solid form of claim 15 characterized by XRPD pattern 5-C.

17. The solid form of claim 11, characterized by an X-ray powder diffraction (XRPD) pattern having diffractions at angles (2 theta±0.2) of 5.8°, 8.7°, 11.0°, 13.6°, and 20.2°.

18. The solid form of claim 12 characterized by a XRPD pattern having diffractions at angles (2 theta±0.2) of 5.0°, 6.1°, 91°, 9.9°, and 14.7°.

19. The solid form of claim 15 characterized by a XRPD pattern having diffractions at angles (2 theta±0.2) of 6.4°, 8.5°, 8.9°, 9.6°, and 17.3°.

\* \* \* \* \*